US006777118B2

(12) United States Patent
Shioya

(10) Patent No.: US 6,777,118 B2
(45) Date of Patent: Aug. 17, 2004

(54) POWER SUPPLY SYSTEM, FUEL PACK CONSTITUTING THE SYSTEM, AND DEVICE DRIVEN BY POWER GENERATOR AND POWER SUPPLY SYSTEM

(75) Inventor: Masaharu Shioya, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 94 days.

(21) Appl. No.: 10/053,698

(22) Filed: Jan. 22, 2002

(65) Prior Publication Data

US 2002/0106540 A1 Aug. 8, 2002

(30) Foreign Application Priority Data

Jan. 24, 2001 (JP) ........................................ 2001-015285
Aug. 6, 2001 (JP) ........................................ 2001-238216

(51) Int. Cl.[7] .............................. H01M 8/06; B01J 8/02
(52) U.S. Cl. ........................... 429/19; 429/20; 422/188; 422/189
(58) Field of Search ............................ 429/17, 19, 20; 422/188, 189, 193, 196, 197

(56) References Cited

U.S. PATENT DOCUMENTS

| 3,785,870 | A | * | 1/1974 | Winsel ........................ 429/17 |
| 3,865,924 | A | | 2/1975 | Gidaspow et al. |
| 4,597,363 | A | * | 7/1986 | Emelock .................... 429/17 X |
| 4,751,151 | A | * | 6/1988 | Healy et al. ................ 429/17 |
| 5,723,229 | A | * | 3/1998 | Scheifers et al. ........... 429/19 |
| 5,932,365 | A | | 8/1999 | Lin et al. |
| 6,376,112 | B1 | * | 4/2002 | Clingerman et al. ........ 429/17 |

FOREIGN PATENT DOCUMENTS

| EP | 0 700 107 | * | 3/1996 | ............ H01M/8/06 |
| GB | 2305139 A | | 4/1997 | |
| JP | 60-200470 | * | 10/1985 | ............ H01M/8/06 |
| JP | 9-204925 | * | 8/1997 | ............ H01M/8/06 |

OTHER PUBLICATIONS

Patent Abstracts of Japan vol. 016, No. 246 (E–1212), Jun. 5, 1992 and JP 04–051464 A (Toshiba Corp.), Feb. 19, 1992—Abstract only.
K. Ledhoff–Hey et al: :CO2—scrubbing and methanation as purification system for PEFC, Journal of Power Sources, Elsevier Sequoia S.A., Lausanne, Switzerland, vol. 86, No. 1–2, Mar. 2000, ISSN: 0378–7753—entire document.

* cited by examiner

Primary Examiner—Stephen J. Kalafut
(74) Attorney, Agent, or Firm—Frishauf, Holtz, Goodman & Chick, P.C.

(57) ABSTRACT

A by-product elimination device used in a power generation system includes a fuel pack provided with a fuel charged portion having a power generation fluid fuel containing hydrogen, and a power generation module which detachably attached to the fuel pack, the module including a reforming portion which transforms the power generation fuel supplied from the charged portion into first gas containing hydrogen gas and carbon dioxide, and a fuel cell which generates an electrical energy by using the hydrogen gas. The device includes an absorbent charged portion which selectively absorbs carbon dioxide contained in the first gas and feeds second gas whose carbon dioxide concentration is lowered by the first gas to the fuel cell.

24 Claims, 85 Drawing Sheets

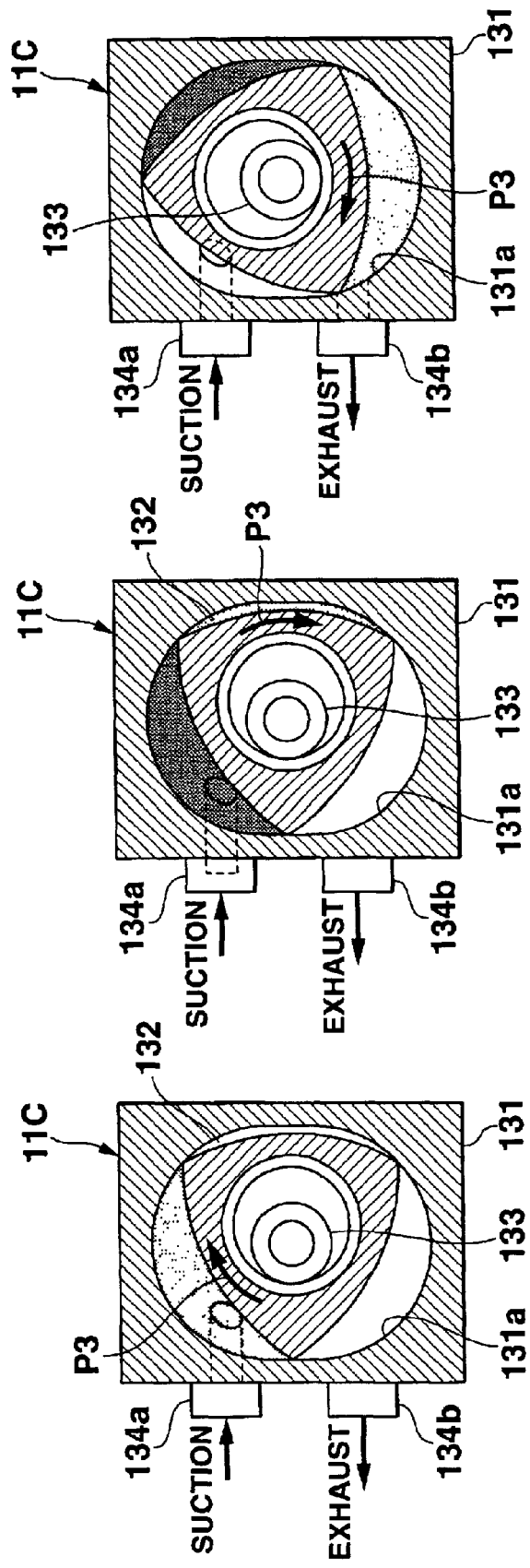

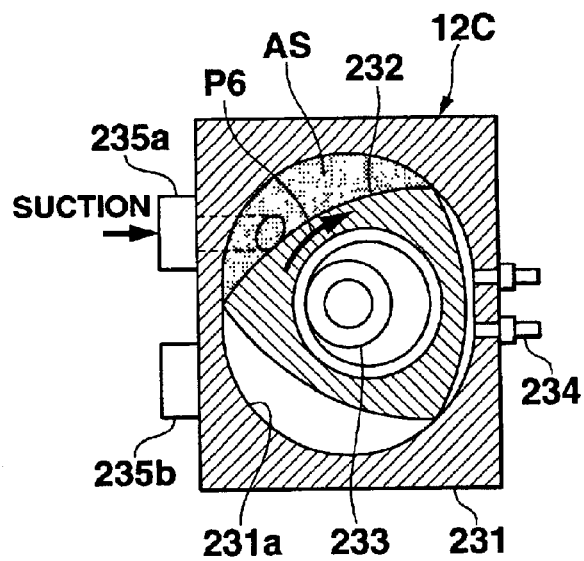
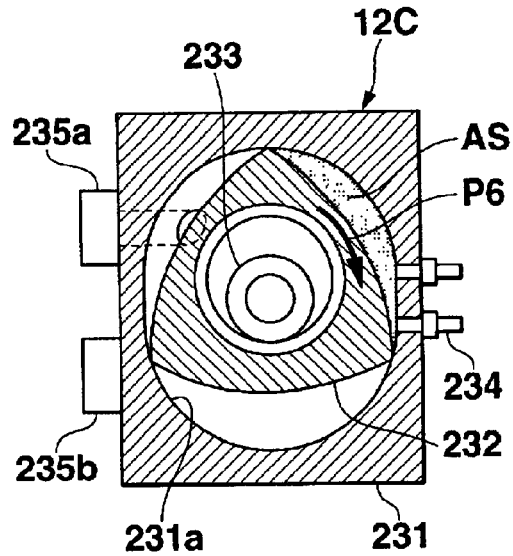
FIG.22A  FIG.22B
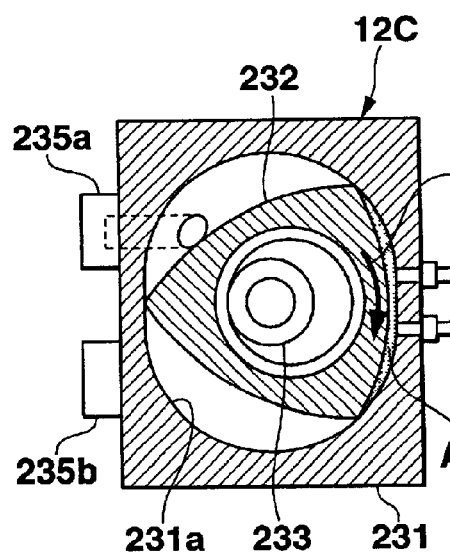
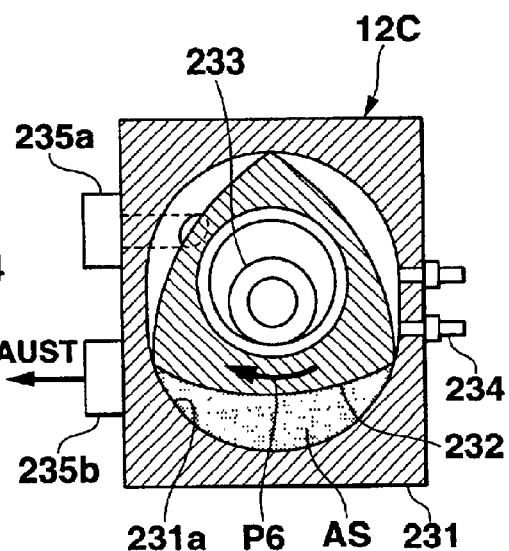
FIG.22C  FIG.22D

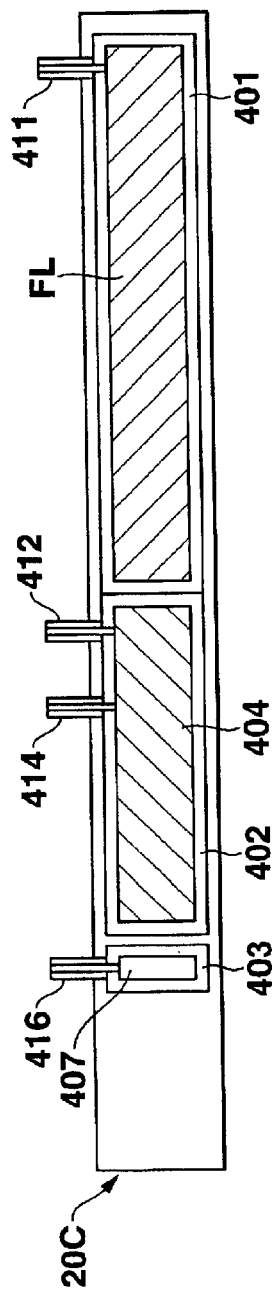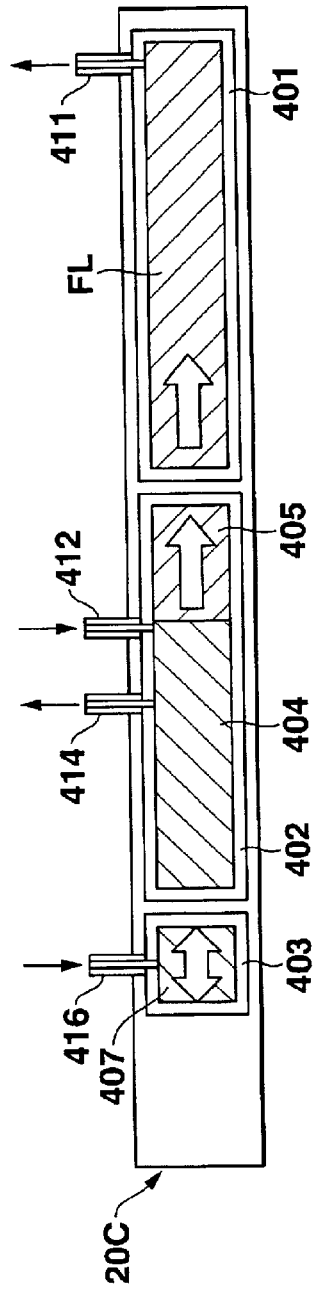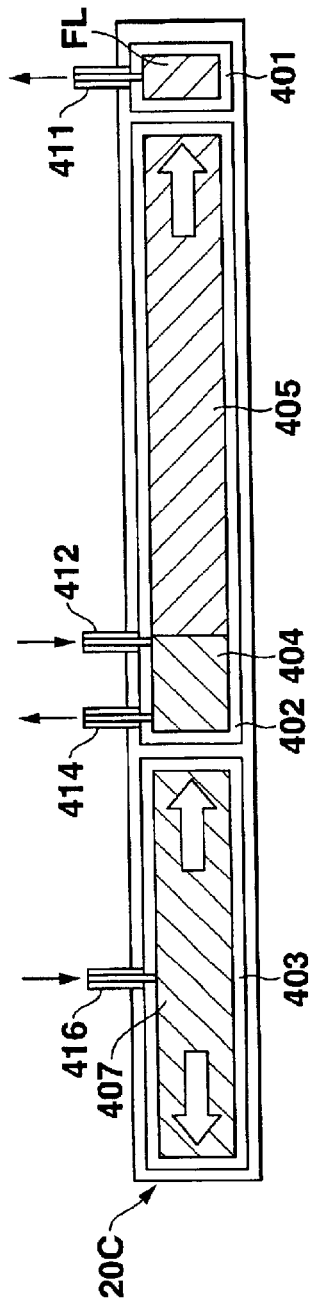

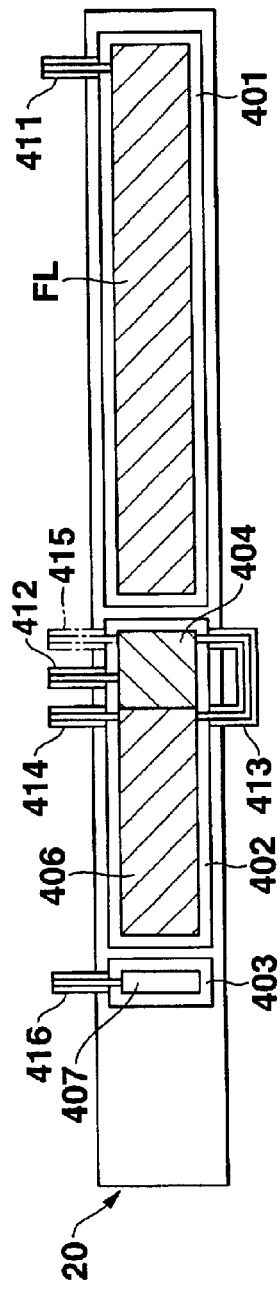
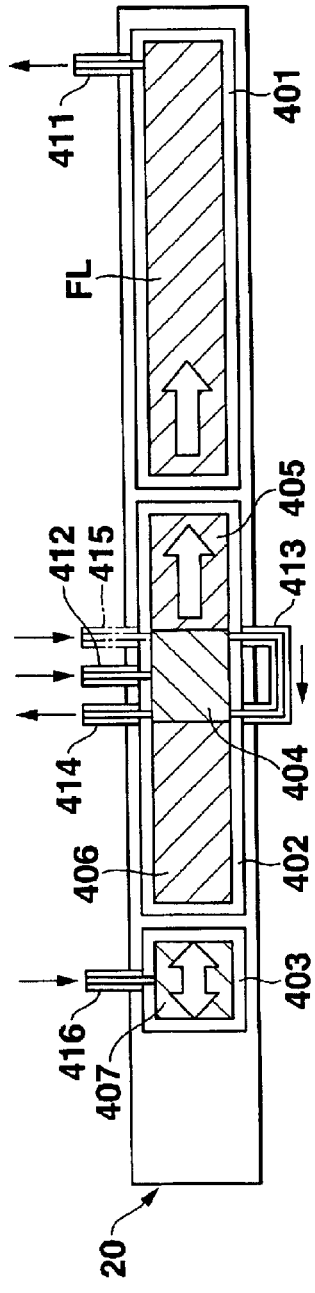
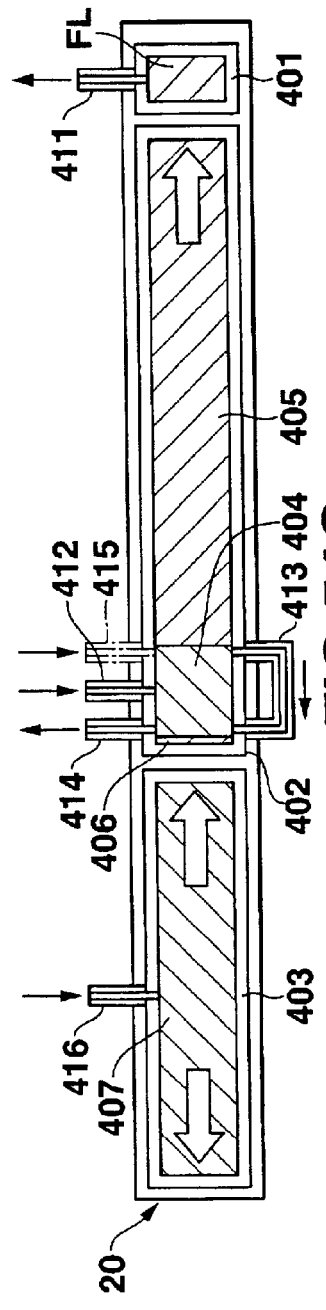

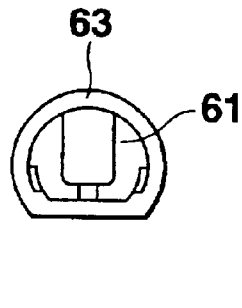
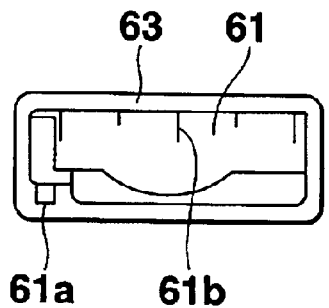
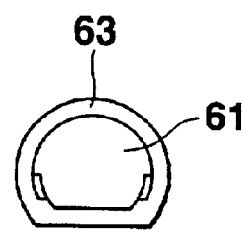
FIG.77A  FIG.77B  FIG.77C
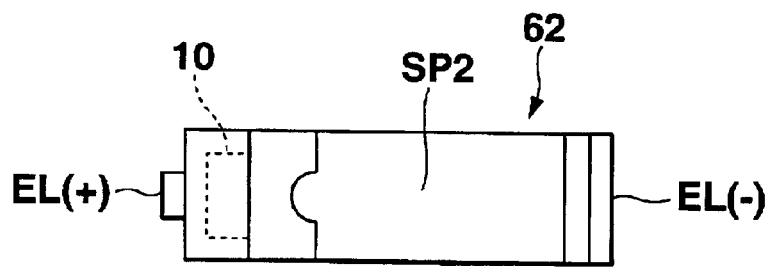
FIG.77D
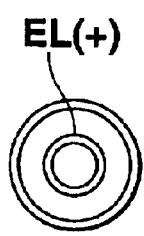
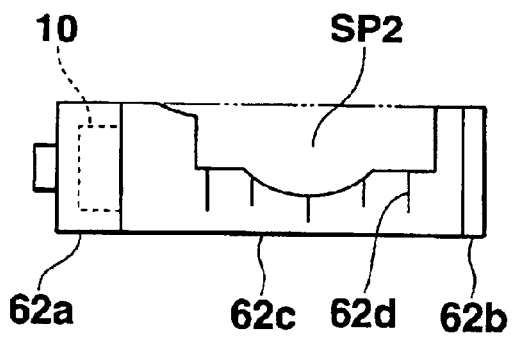
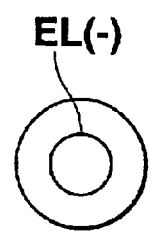
FIG.77E  FIG.77F  FIG.77G

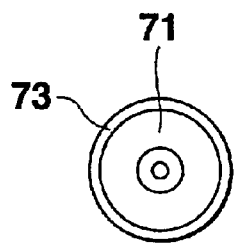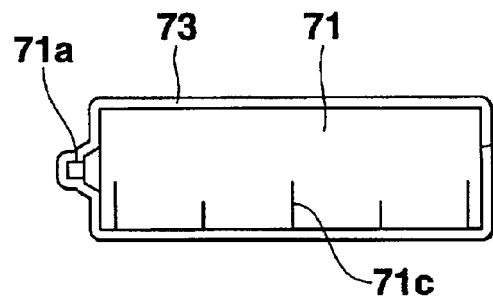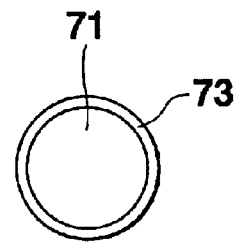
FIG.79A   FIG.79B   FIG.79C
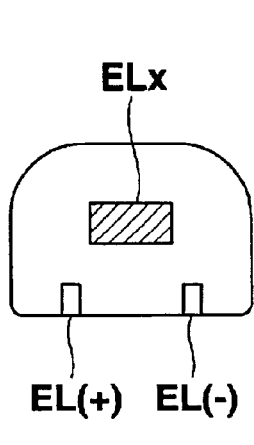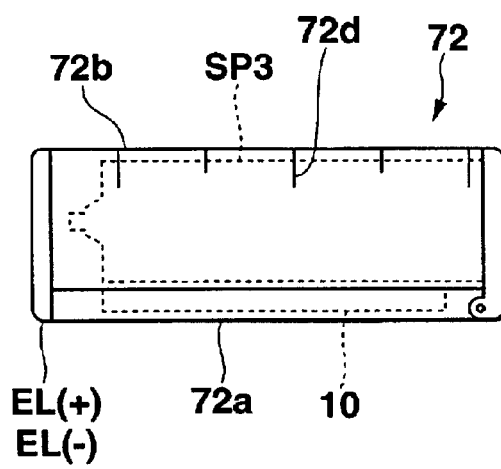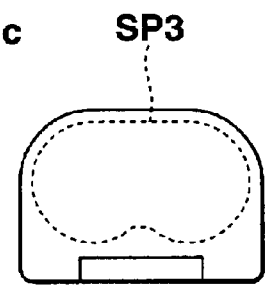
FIG.79D   FIG.79E   FIG.79F

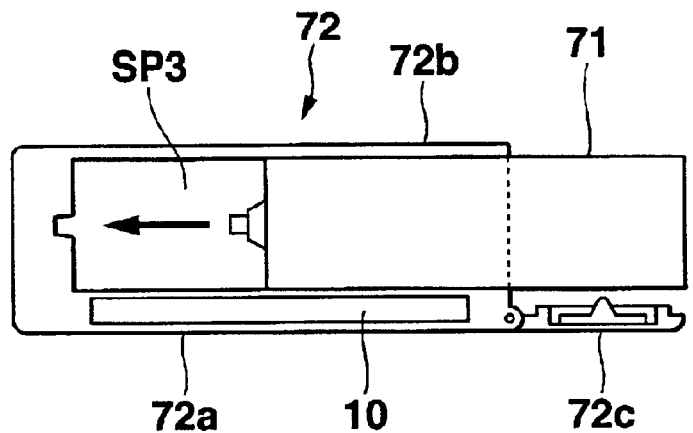
FIG.80A
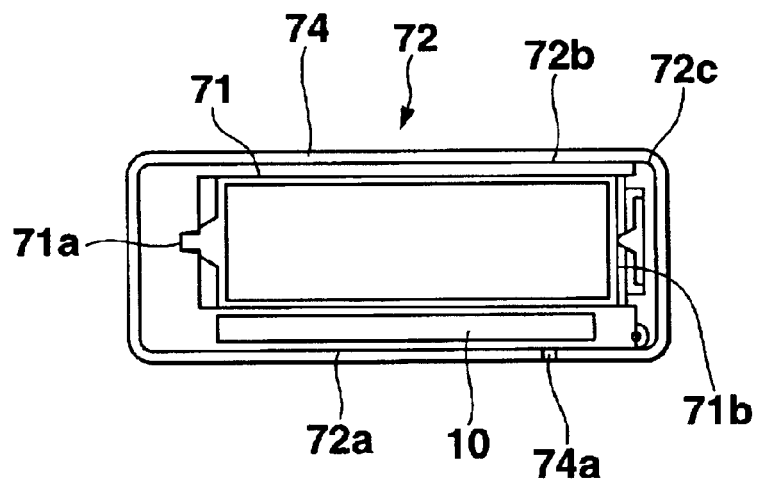 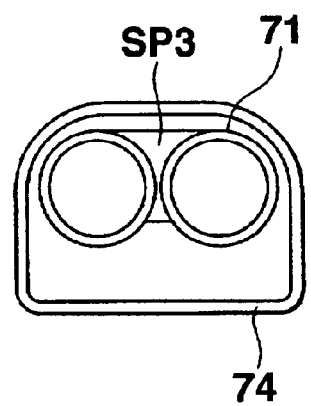
FIG.80B     FIG.80C

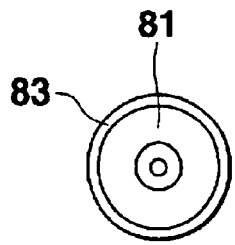 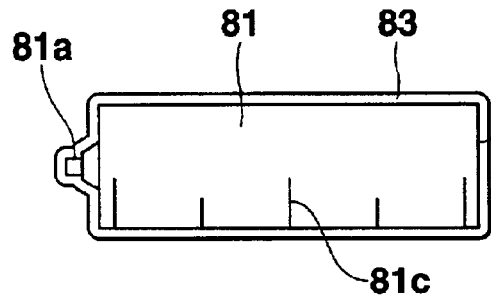 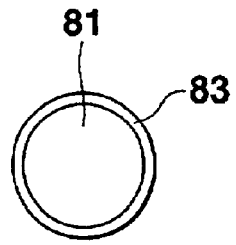
FIG.81A FIG.81B FIG.81C
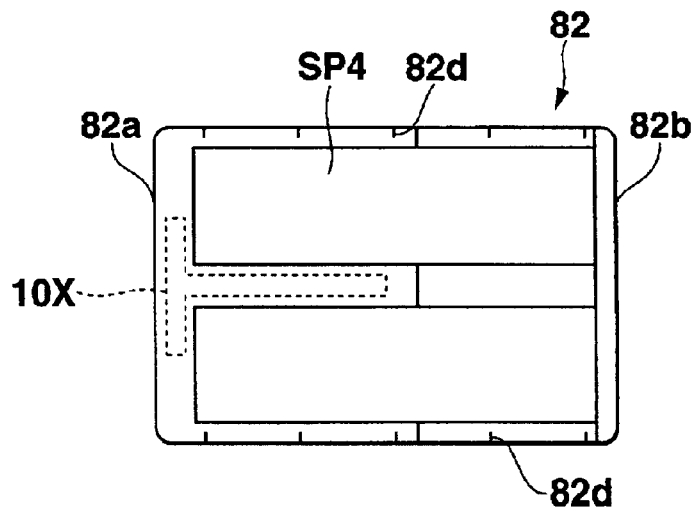
FIG.81D
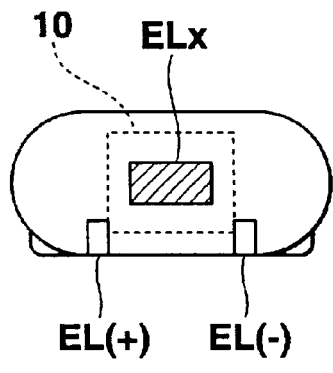 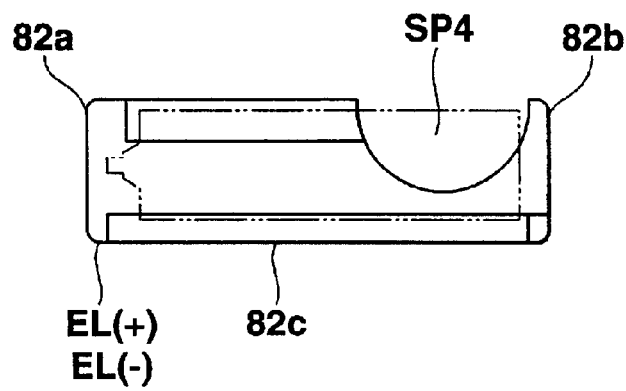
FIG.81E FIG.81F

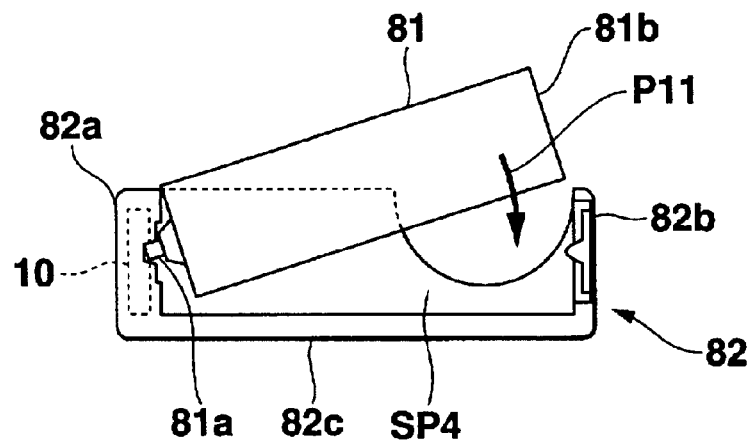
FIG.82A
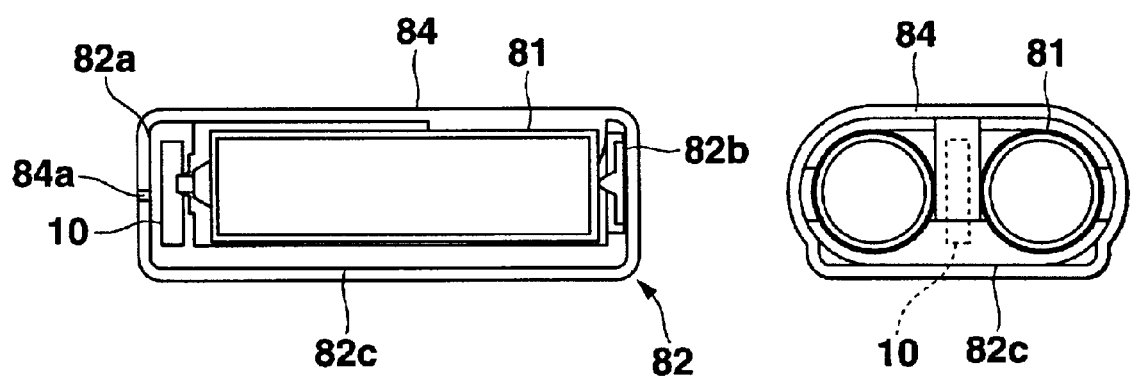
FIG.82B　　FIG.82C

POWER SUPPLY SYSTEM, FUEL PACK CONSTITUTING THE SYSTEM, AND DEVICE DRIVEN BY POWER GENERATOR AND POWER SUPPLY SYSTEM

CROSS-REFERENCE TO RELATED APPLICATIONS

This application is based upon and claims the benefit of priority from the prior Japanese Patent Applications No. 2001-015285, filed Jan. 24, 2001; and No. 2001-238216, filed Aug. 6, 2001, the entire contents of both which are incorporated herein by reference.

BACKGROUND OF THE INVENTION

1. Field of the Invention

The present invention relates to a by-product elimination device used in a power supply system, and more particularly to a by-product elimination device used in a portable power supply system with a high energy utilization efficiency.

2. Description of the Related Art

In all household and industrial fields, various kinds of chemical cells are used. For example, a primary cell such as an alkaline dry cell or a manganese dry cell is often used in watches, cameras, toys, and portable acoustic devices, and it has a characteristic that its quantity of production is large from the global viewpoint and it is inexpensive and readily available.

A secondary cell such as a lead storage battery, a nickel-cadmium storage battery, a nickel-hydrogen storage battery, a lithium ion battery is often used in mobile phones or personal digital assistances (PDA) which are in widespread use in recent portable devices such as a digital video camera or a digital still camera, and it has a characteristic which is superior in the economical efficiency because it can be repeatedly charged and discharged. Among secondary cells, the lead storage battery is utilized as a start-up power supply for vehicles or marine vessels or an emergency power supply in industrial facilities or medical facilities and the like.

In recent years, with the rising interest in environmental concerns or energy problems, problems concerning waste materials generated after use of chemical cells such as described above or those concerning the energy conversion efficiency have come under close scrutiny.

The primary cell has its inexpensive product price and is readily available as described above, and there are many devices which utilize this cell as a power supply. Further, basically, when the primary cell is once discharged, the battery capacity can not be recovered, namely, it can be used only once (which is a so-called disposable battery). A quantity of waste materials per year, therefore, exceeds, several millions tons. Here, there is static information mentioning that a ratio of the entire chemical cells which are collected for recycling is only approximately 20% and remaining approximately 80% is thrown away in the natural world or subjected to landfill disposal. Thus, there is fear of environmental destruction and disfigurement of the natural environment by heavy metal such as mercury or indium included in such uncollected batteries.

Verifying the above-described chemical battery in the light of the efficiency of use of an energy resource, since the primary cell is produced by utilizing the energy which is approximately 300-fold of the dischargeable energy, the efficiency of use of the energy is less than 1%. Even in case of the secondary cell which can be repeatedly charged and discharged and is superior in the economical efficiency, when the secondary cell is charged from a domestic power supply (convenience outlet) or the like, the efficiency of use of the energy drops to approximately 12% due to the efficiency of power generation in an electric power plant or the transmission loss. Therefore, it can not be said that the energy resource is necessarily efficiency utilized.

Thus, the attention is recently drawn on various kinds of new power supply systems or power generation systems (which will be generically referred to as a "power supply system" hereinafter) including a fuel battery which has less influence (burden) on the environment and is capable of realizing the extremely high energy utilization efficiency of, e.g., approximately 30 to 40%. Furthermore, for the purpose of application to a drive power supply for vehicles or a power supply system for business use, a cogeneration system for domestic use and others, or substitution for the above-described chemical cell, study and development for practical application are carried out extensively.

However, there are various problems to make the power generation element with the high energy utilization efficiency of the fuel cell or the like smaller and lighter, and apply it as the portable or carry-along power supply system, for example as the alternate for the chemical cell above described, hereafter.

Actually, in the power supply system that effuses hydrogen from an alloy which occludes hydrogen and generates electric power by hydrogen, there is a problem that power generation capacity (power consistency) or energy per unit volume of the hydrogen occludent alloy is low. Also, there is a problem that the power consistency and output grade are low in the previous fuel direct power generation system which supplies an organic chemistry fuel to the fuel cell directly.

On one hand, the fuel reforming power generation system supplies hydrogen to the fuel cell from the fuel reformer which forms hydrogen from the organic chemistry fuel, for example methanol or methane gas. The fuel reforming power generation system has such an advantage that energy amount per unit capacity of the fuel vessel is high in comparison with the fuel direct power generation system or said hydrogen occludent alloy power generation system. Here, in the fuel reforming power generation system that combines said vapor fuel reformer with the oxygen-hydrogen fuel cell, by-product such as carbon dioxide gas is generated in addition to the hydrogen gas. There is also a problem that the power generation efficiency declines, since the concentration of the hydrogen gas which contributes to power generation is low in case that mixed gas based on the hydrogen gas and carbon dioxide gas is simply supplied to the fuel cell. Further, there is a problem that virulent carbon monoxide may be contained slightly in the mixed gas.

Furthermore, due to the volume of the vapor fuel reformer itself, the power generation system known in the prior art could not obtain the power consistency sufficient to use as the portable or carry-along power supply system.

Then, the present invention has an advantage to obtain sufficient power consistency and energy utilization efficiency at an easy rate without exhaust of by-product to outside as possible.

BRIEF SUMMARY OF THE INVENTION

A by-product elimination device used in a power generation system according to one aspect of the present invention, comprises at least any one of:

(a) a fuel pack provided with a fuel charged portion having a power generation fuel having a liquid or gas containing hydrogen charged therein; and (b) a power generation module which can be attached to or detached from the fuel pack, the module including a reforming portion which transforms the power generation fuel supplied from the fuel charged portion into first gas containing hydrogen gas and carbon dioxide as main components, and a fuel cell which generates an electrical energy by using the hydrogen gas contained in the first gas, the by-product elimination device further comprising an absorbent charged portion which selectively absorbs carbon dioxide contained in the first gas fed from the reforming portion and feeds second gas whose carbon dioxide concentration is lowered by the first gas to the fuel cell.

That is, in the by-product elimination device, the power generation fuel including hydrogen element charged in the fuel charged portion is transformed to the hydrogen ($H_2$)-carbon dioxide ($CO_2$) mixed gas (first gas) by the reforming portion firstly. The first gas is transformed to the second gas based on hydrogen gas by absorbing and eliminating carbon dioxide gas by the absorbent charged portion. The second gas is supplied to the hydrogen-oxygen fuel cell (fuel cell). The second gas has high hydrogen gas concentration for power generation, thereby improving the power generation efficiency of the fuel cell highly in comparison with the case that the power generation element don't comprise the absorbent charged portion. As a result, it is possible to apply the fuel cell as the portable or carry-along power supply system that has high energy utilization efficiency and high power consistency and can be controlled easily.

A fuel pack used in the power supply system according to the other aspect of the present invention comprises:

a fuel charged portion which can be connected to the fuel pack, and contains a fuel to be supplied to a reforming portion which generates hydrogen and carbon dioxide from the fuel, and whose volumetric capacity is reduced as carbon dioxide is generated in the reforming portion; and a carbon dioxide absorption portion which absorbs carbon dioxide generated in the reforming portion and whose volumetric capacity is increased as carbon dioxide is generated in the reforming portion.

The carbon dioxide absorption portion expands when it absorbs carbon dioxide to supply hydrogen with high concentration to the fuel cell. In the fuel charged portion, however, whose volumetric capacity is reduced as carbon dioxide is generated in the reforming portion, whereby there is no need to make the fuel pack large. As a result, the portable power generation system can be obtained.

A fuel pack used in the power supply system according to further aspect of the present invention, comprises:

a fuel charged portion which contains a fuel to be supplied to a reforming portion which generates mixed gas containing hydrogen and a first by-product from the fuel, and whose volumetric capacity is reduced as the first by-product is generated in the reforming portion;

a first by-product absorption portion which generates a second by-product by absorbing the first by-product from the mixed gas, and whose volumetric capacity is increased as the first by-product is generated in the reforming portion; and a second by-product absorption portion which absorbs hydrogen fed from the reforming portion and the second by-product fed from the first by-product absorption portion.

The first by-product absorption portion and the second by-product absorption portion absorb the first by-product and the second by-product respectively, thereby supplying hydrogen with high concentration to the fuel cell.

A fuel pack used in the power supply system according to further aspect of the present invention comprises:

a fuel charged portion which contains a fuel to be supplied to a reforming portion which generates mixed gas including hydrogen and a first by-product from the fuel, and whose volumetric capacity is reduced as the first by-product is generated in the reforming portion;

a first by-product absorption portion which absorbs the first by-product from the mixed gas, and whose volumetric capacity is increased as the first by-product is generated in the reforming portion; and a second by-product absorption portion which collects a second by-product from a fuel cell which generates power by using hydrogen fed from the first by-product and also generates the second by-product, and whose volumetric capacity is increased as power is generated in the fuel cell.

Consequently, the by-products that are formed until the power generation is performed can be accommodated therein. As result, the effect on environment at the time of the power generation can be controlled, and hydrogen with high concentration may be supplied to the fuel cell, thereby performing the power generation effectually.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 7A to 7C are views schematically showing a third structural example of the sub power supply portion applicable to the power generation module according to the embodiment;

FIGS. 22A to 22D are schematic views showing a third structural example of the power generation portion applicable to the power generation module according to the embodiment;

FIGS. 50A to 50C are schematic structural views showing examples of an outside shape of a fuel pack illustrated in FIG. 49;

FIGS. 54A to 54C are schematic structural views showing an example of an outside shape of the fuel pack illustrated in FIG. 53;

FIGS. 77A to 77G are views schematically showing a fuel pack of the power supply system according to the second embodiment of the present invention and outside shapes of the fuel pack;

FIGS. 79A to 79F are views schematically showing a fuel pack of the power supply system according to the third embodiment of the present invention and outside shapes of the fuel pack;

FIGS. 80A to 80C are views schematically showing an attachable and detachable structure of the power generation module and the fuel pack in the power supply system according to the embodiment;

FIGS. 81A to 81F are views schematically showing a fuel pack of the power supply system according to the fourth embodiment of the present invention and outside shapes of the fuel pack;

FIGS. 82A to 82C are schematic views showing an attachable and detachable structure of the power generation module and the fuel pack in the power supply system according to the embodiment;

DETAILED DESCRIPTION OF THE INVENTION

Embodiments of a power supply system according to the present invention will now be described hereinafter with reference to the accompanying drawings.

The entire outline to which the power supply system according to the present invention is applied will be first explained in conjunction with the drawings.

Figure 1A:
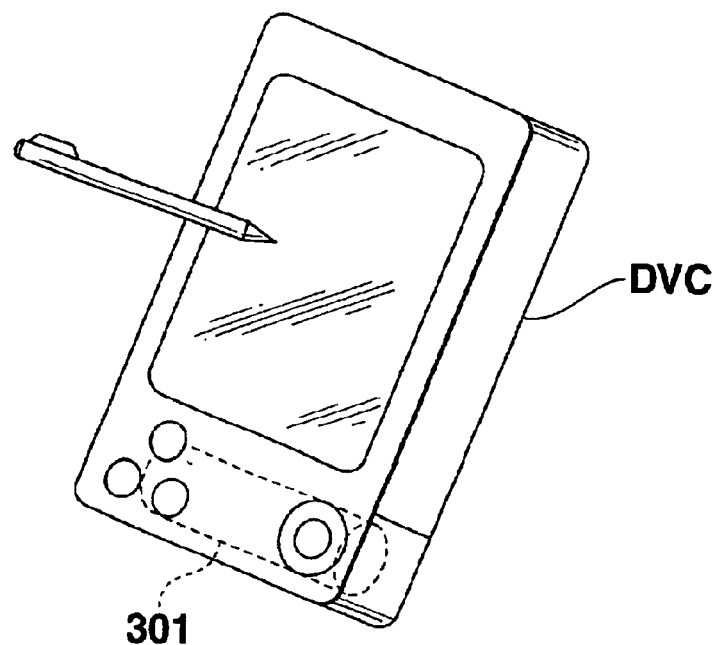
FIGS. 1A and 1B are perspective views for showing application of a power supply system according to the present invention.
Figure 1B:
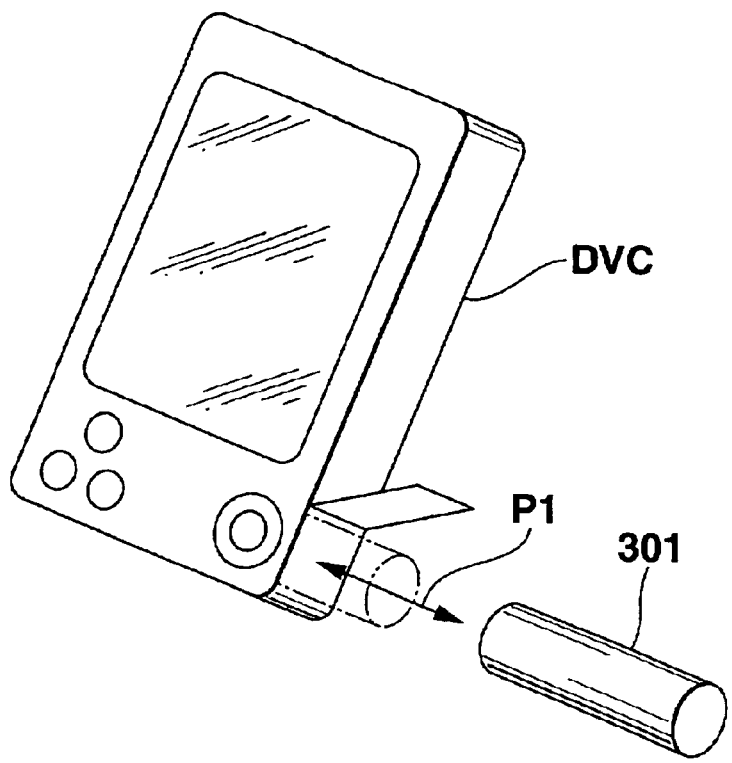

FIGS. 1A and 1B are conceptual views showing the application conformation of the power supply system according to the present invention.

For example, as shown in FIGS. 1A and 1B, a part or the whole of a power supply system 301 according to the present invention can be arbitrarily attached to and removed from (see an arrow P1) an existing electric/electronic device (FIGS. 1A and 1B show a personal digital assistant: which will be generally referred to as a "device" hereinafter) DVC which operates by a general-purpose primary cell or a secondary cell, as well as a specific electric/electronic device.

The power supply system 301 is configured so that a part or the whole thereof can be independently portable. To the power supply system 301 is provided electrodes having a positive electrode and a negative electrode for supplying electric power to the device DVC at a predetermined position (for example, a position equivalent to the general-purpose primary cell or secondary cell as will be described later).

The basic structure of the power supply system according to the present invention will now be described.

Figure 2A:
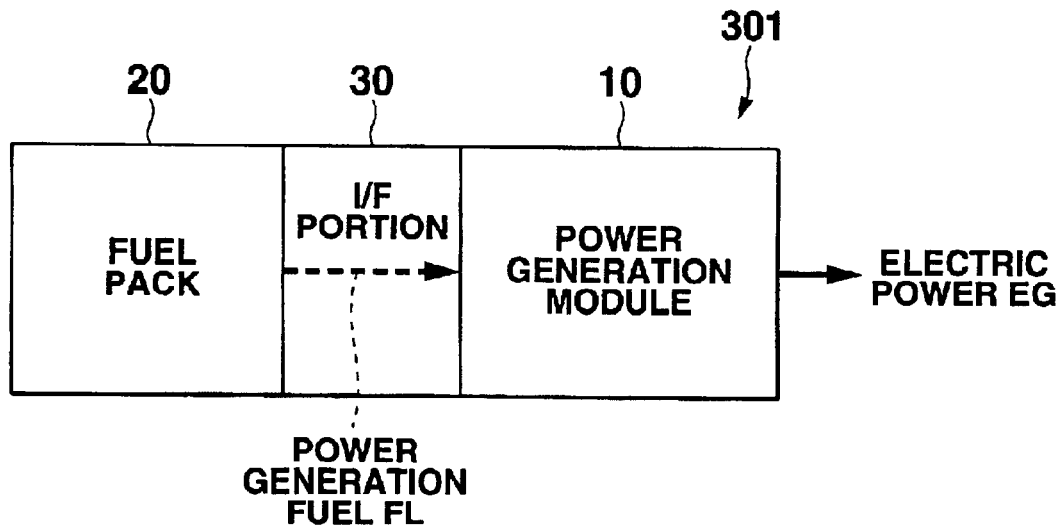
FIGS. 2A to 2C are block diagrams showing basic structures of the power supply system according to the present invention.
Figure 2B:
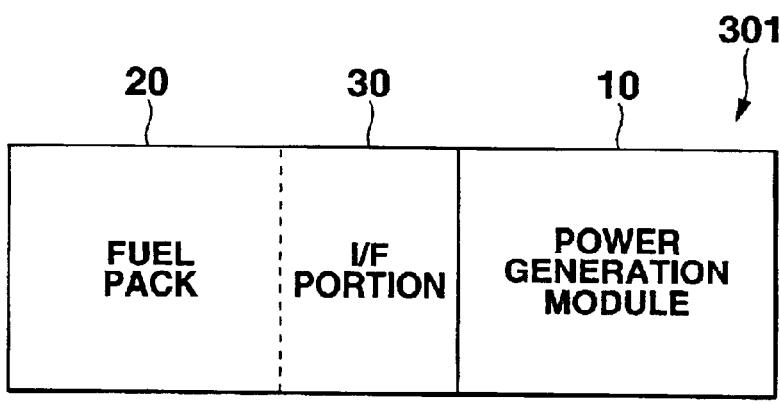
Figure 2C:
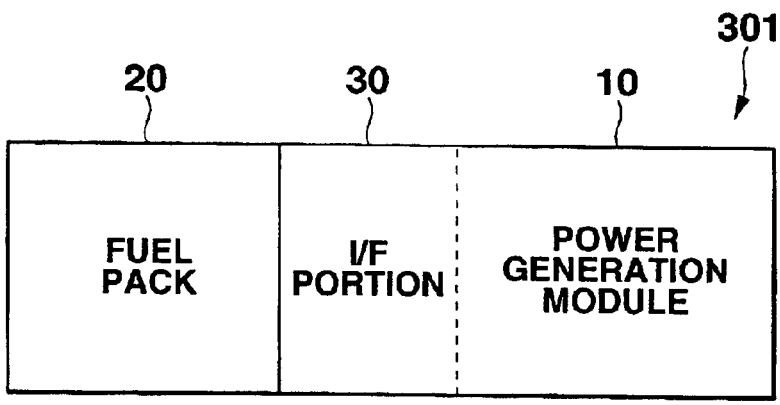

FIGS. 2A to 2C are block diagrams showing basic structures of the power supply system according to the present invention.

As shown in FIG. 2A, the power supply system 301 according to the present invention roughly includes: a fuel pack 20 in which a power generation fuel FL consisting of a liquid fuel and/or a gas fuel is charged; a power generation module 10 for generating electric power EG (power generation) according to a drive state (load state) of the device DVC based on at least the power generation fuel FL supplied from the fuel pack 20; and an interface portion (which will be abbreviated as an "I/F portion" hereinafter) 30 provided with a fuel feed path or the like for supplying the power generation fuel FL charged in the fuel pack 20 to the power generation module 10. The respective constituent parts are configured so that they can be coupled with and separated from each other (attachable and detachable) in an arbitrary conformation, or they are integrally configured. Here, as shown in FIG. 2A, the I/F portion 30 may be structured independently from the fuel pack 20 and the power generation module 10, or structured integrally with either the fuel pack 20 or the power generation module 10 as shown in FIGS. 2B and 2C. Alternatively, the I/F portion 30 may be configured to be divided for both the fuel pack 20 and the power generation module 10.

The structure of each block will now be concretely described.

[First Embodiment]

(A) Power Generation Module 10

Figure 3:
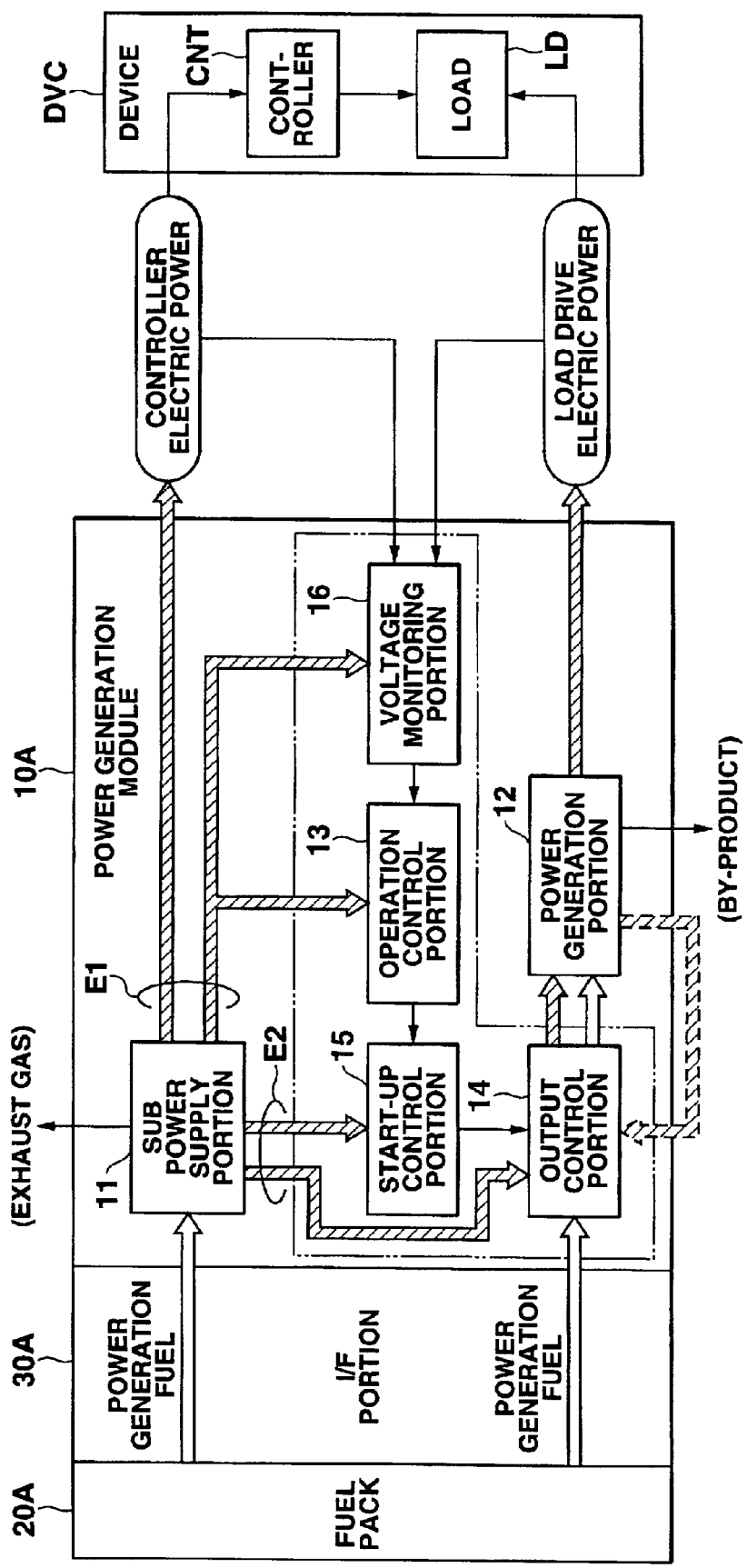
FIG. 3 is a block diagram showing a first embodiment of a power generation module applied to the power supply system according to the present invention.
Figure 4:
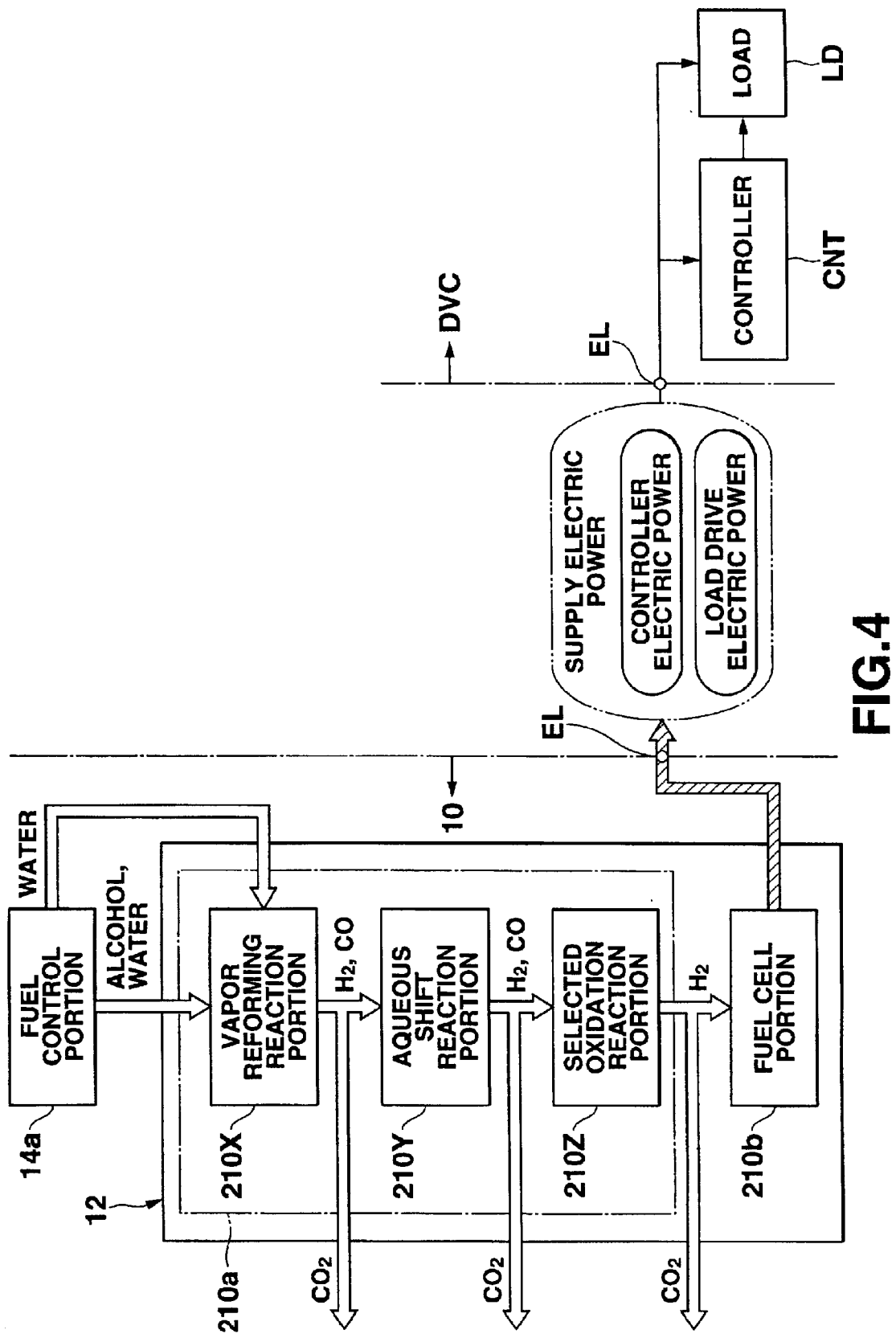
FIG. 4 is a block diagram showing a structure of a power generation portion of the power supply system according to the embodiment.

FIG. 3 is a block diagram showing a first embodiment of a power generation module applied to the power supply system according to the present invention, and FIG. 4 is a schematic view showing a structure of the power supply system according to this embodiment.

As shown in FIG. 3, a power generation module 10A according to this embodiment constantly autonomously generates predetermined electric power (second electric power) by using a power generation fuel supplied from a fuel pack 20A through an I/F portion 30A and outputs it as a drive electric power (controller electric power) for a controller CNT which is included in the device DVC connected to at least the power supply system 301 and controls to drive a load LD (an element or a module having various kinds of functions of the device DVC). There is provided a sub power supply portion (second power supply means) 11 for outputting power as operating power for a later-described operation control portion 13 which is disposed in the power generation module 10A. Furthermore, the power generation module 10A includes: an operation control portion 13 which operates using electric power supplied from the sub power supply portion 11 and controls the operation state of the entire power supply system 301; a power generation portion (first power supply means) 12 which has a heater (heating means) provided inside according to needs, generates predetermined electric power (first electric power) by using the power generation fuel supplied from the fuel pack 20A through the I/F portion 30A or a specified fuel component extracted from the power generation fuel and outputs it as at least load drive electric power for driving various kinds of functions (load LD) of the device DVC connected to the power supply system 301; an output control portion 14 which at least controls a quantity of supplied power generation fuel to the power generation portion 12 and/or controls a temperature of the heater of the power generation portion 12 based on an operation control signal from the operation control portion 13; a start-up control portion 15 for at least controlling so as to shift (activate) the power generation portion 12 from the standby mode to the operation mode capable of generating power based on an operation control signal from the operation control portion 13; and a voltage monitoring portion (voltage detection portion) 16 for detecting a change in a voltage component of electric power (control electric power or load drive electric power) outputted from the power generation module 10A (the sub power supply portion 11 and the power generation portion 12) to the device DVC.

As shown in FIG. 4, the power generation portion 12 includes: a fuel reforming portion (fuel reformer) 210a for extracting a predetermined fuel component (hydrogen) contained in the power generation fuel FL by utilizing a predetermined reforming reaction with respect to the power generation fuel FL supplied from the fuel pack 20; and a fuel cell portion 210b for generating predetermined electric power for driving the device DVC and/or the load LD by an electrochemical reaction utilizing the fuel component extracted by the fuel reforming portion 210a.

The fuel reforming portion (fuel reformer) 210a includes: a vapor reforming reaction portion 210X which receives a fuel formed of alcohol and water in the fuel pack 20 from the fuel control portion 14a of the output control portion 14 and generates hydrogen, carbon dioxide as a by-product and a small amount of carbon monoxide; an aqueous shift reaction portion 210Y which causes carbon monoxide supplied from the vapor reforming reaction portion 210X with water supplied from the fuel control portion 14a and/or the fuel cell portion 210b and generates carbon dioxide and hydrogen; and a selected oxidation reaction portion 210Z for causing carbon monoxide which has not reacted in the aqueous shift reaction portion 210Y with oxygen and generates carbon dioxide. Therefore, the fuel reforming portion 210a supplies to the fuel cell portion 210b hydrogen obtained by reforming the fuel charged in the fuel pack 20 and performs detoxication to a small amount of generated carbon monoxide. That is, the fuel cell portion 210b generates the supply electric power made up of the controller electric power and the load drive electric power by using hydrogen gas with the high density generated in the vapor reforming reaction portion 210X and the aqueous shift reaction portion 210Y.

Here, the operation control portion 13, the output control portion 14, the start-up control portion 15 and the voltage monitoring portion 16 according to this that embodiment constitute system controlling means in the present invention. Further, the power supply system 301 and the device DVC according to this embodiment are constituted in such a manner that the supply electric power outputted from the later-described power generation portion 12 is commonly supplied to the controller CNT and the load LD of the device DVC through a single electrode terminal EL.

Therefore, the power supply system 301 according to this embodiment is configured to be capable of outputting predetermined electric power (load drive electric power) with respect to the device DVC connected to the power supply system 301 without depending on fuel supply or control from the outside of the system (other than the power generation module 10, the fuel pack 20 and the I/F portion 30).

<Sub Power Supply Portion 11>

As shown in FIG. 3, the sub power supply portion 11 applied to the power generation module according to this embodiment is configured to always autonomously generate predetermined electric power (second electric power) required for the start-up operation of the power supply system 301, by using the physical or chemical energy or the like of the power generation fuel FL supplied from the fuel pack 20A. This electric power is roughly made up of electric power E1 and electric power E2. The power E1 is constantly supplied as drive electric power (controller electric power) for the controller CNT which is included in the device DVC and controls the drive state of various kinds of functions (load LD) and operating electric power of the operation control portion 13 controlling the operation state of the entire power generation module 10A. The electric power E2 is supplied as start-up electric power (voltage/electric current) to at least the output control portion 14 (the power generation portion 12 may be included depending on structures) and the start-up control portion 15 at the time of start-up of the power generation module 10A.

As a concrete structure of the sub power supply portion 11, it is possible to excellently apply, for example, one utilizing the electrochemical reaction (fuel cell) using the power generation fuel FL supplied from the fuel pack 20A or one utilizing the thermal energy (temperature difference power generation) which is involved by the catalytic combustion reaction or the like. Besides, it is possible to apply one utilizing the dynamic energy conversion action (gas turbine power generation) or the like which rotates a power generator by using a charged pressure of the power generation fuel FL included in the fuel pack 20A or a gas pressure caused due to evaporation of the fuel and generates electric power, one which captures electrons generated by metabolism (photosynthesis, aspiration or the like) due to microbes whose source of nutrition is the power generation fuel FL and directly converts the electrons into the electric power (biochemical power generation), one which converts the vibration energy generated by the fluid energy of the power generation fuel FL based on the charged pressure or the gas pressure into the electric power by utilizing the principle of electromagnetic induction (vibration power generation), one utilizing discharge from the unit of electric power storing means such as a secondary cell (battery charger), or a capacitor, one which stores the electric power generated by each constituent part performing the above-described power generation into electric power storing means (for example, a secondary cell, a capacitor) and emits (discharges) it, and others.

Each concrete example will now be described in detail hereinafter with reference to the accompanying drawings.

(First Structural Example of Sub Power Supply Portion)

Figure 5:
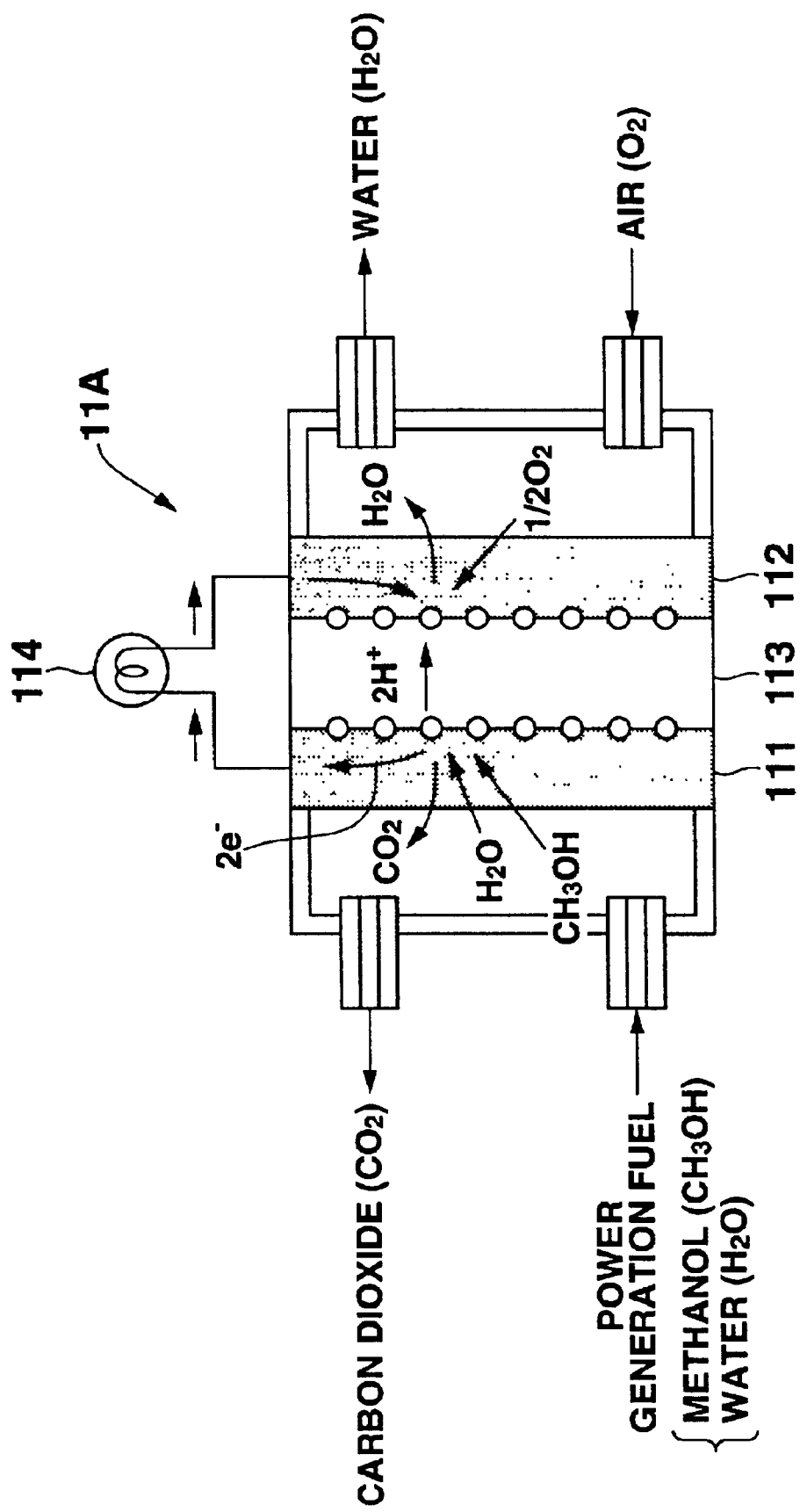
FIG. 5 is a view schematically showing a first structural example of a sub power supply portion applicable to the power generation module according to the embodiment.

FIG. 5 is a view showing a first structural example of the sub power supply portion applicable to the power generation module according to this embodiment. Here, the example will be appropriately described in conjunction with the structure of the above-described power supply system (FIG. 3).

In the first structural example, as a concrete example, the sub power supply portion has a structure of a proton-exchange membrane fuel cell adopting the fuel direct supply system by which the power generation fuel FL directly supplied from the fuel pack 20A is used and the electric power (second electric power) is generated by the electrochemical reaction.

As shown in FIG. 5, the sub power supply portion 11A according to this structural example generally includes: a fuel electrode (cathode) 111 consisting of a carbon electrode to which predetermined catalytic fine particles adhere; an air electrode (anode) 112 consisting of a carbon electrode to which predetermined catalytic fine particles adhere; an ion conductive membrane (exchange membrane) 113 interposed between the fuel electrode 111 and the air electrode 112. Here, the power generation fuel (for example, alcohol-based substance such as methanol and water) charged in the fuel pack 20A is directly supplied to the fuel electrode 111, and oxygen gas ($O_2$) in air is supplied to the air electrode 112.

As an example of the electrochemical reaction in the sub power supply portion (fuel cell) 11A, specifically, when methanol ($CH_3OH$) and water ($H_2O$) are directly supplied by the fuel electrode 111, as indicated by the following chemical equation (1), the electron ($e^-$) is separated by the catalysis and the hydrogen ion (proton; $H^+$) is generated and passes to the air electrode 112 side through the ion conductive membrane 113. Furthermore, the electron ($e^-$) is taken out by the carbon electrode constituting the fuel electrode 111 and supplied to the load 114 (predetermined structures inside and outside the power supply system; here, the controller CNT of the device DVC, the operation control portion 13, the power generation portion 12, the output control portion 14 and the like). It is to be noted that a small amount of carbon dioxide ($CO_2$) other than the hydrogen ion generated by the catalysis is emitted into air from, for example, the fuel electrode 111 side.

$$CH_3OH + H_2O \rightarrow 6H^+ + 6e^- + CO_2 \qquad (1)$$

On the other hand, when air (oxygen $O_2$) is supplied to the air electrode 112, the electron ($e^-$) which has passed the load 114 by the catalysis, the hydrogen ion ($H^+$) which has passed the ion conductive membrane 113 and the oxygen gas ($O_2$) in air react with each other and water ($H_2O$) is generated.

$$6H^+ + (3/2)O_2 + 6e^- \rightarrow 3H_2O \qquad (2)$$

Such a series of electrochemical reactions (chemical equations (1) and (2)) proceed in the environment of a relatively low temperature which is approximately a room temperature. Here, by collecting water ($H_2O$) as a by-product generated at the air electrode 112 and supplying a necessary amount of water to the fuel electrode 111 side, it can be reused as a source material of the catalysis indicated by the chemical equation (1), and an amount of water ($H_2O$) previously stored (charged) in the fuel pack 20A can be greatly reduced. Therefore, the capacity of the fuel pack 20A can be considerably reduced, and the sub power supply portion 11 can be continuously operated for a long period of time in order to supply predetermined electric power. It is to be noted that the structure of by-product collecting means which collects and reuses a by-product such as water ($H_2O$) generated at the air electrode 112 will be explained later along with the similar structure in the later-described power generation portion 12.

By applying the fuel cell having such a structure to the sub power supply portion, since the peripheral structure is not required as compared with other systems (for example, the later-described fuel reforming type fuel cell), the structure of the sub power supply portion 11A can be simplified and minimized, and a predetermined amount of the power generation fuel is automatically fed to the sub power supply portion 11A (fuel electrode 111) by the capillary phenomenon through a fuel transport pipe provided to the I/F portion 30A by only the very simple operation, for example, coupling the fuel pack 20A with the power generation module 10A, thereby starting and continuing the power generation operation based on the chemical equations (1) and (2) mentioned above.

Therefore, predetermined electric power is always autonomously generated by the sub power supply portion 11A as long as supply of the power generation fuel from the fuel pack 20A continues, and this electric power can be supplied as the controller electric power of the device DVC and the operating electric power of the operation control portion 13 as well as the start-up electric power for the power generation portion 12 or the output control portion 14. Furthermore, in the above-described fuel cell, since the electric power is directly generated by utilizing the electrochemical reaction using the power generation fuel, the extremely high power generation efficiency can be realized. Also, the power generation fuel can be effectively utilized and the power generation module including the sub power supply portion can be minimized. Moreover, since vibrations or noises are not generated, this structure can be utilized for extensive devices as similar to the general-purpose primary cell or secondary cell.

In the fuel cell in this structural example, although description has been given on only the application of methanol as the power generation fuel supplied from the fuel pack 20A, the present invention is not restricted thereto, and any of a liquid fuel, a liquefied fuel and a gas fuel including at least a hydrogen element can suffice. Specifically, it is possible to use an alcohol-based liquid fuel such as methanol, ethanol or butanol mentioned above, a liquefied fuel consisting of hydrocarbon such as dimethyl ether, isobutene, natural gas (CNG), or a gas fuel such as hydrogen gas. In particular, it is possible to excellently apply such a fuel which is in the gas state under predetermined environmental conditions such as an ordinary temperature or a normal pressure when supplied from the fuel pack 20A to the sub power supply portion 11A.

(Second Structural Example of Sub Power Supply Portion)

Figure 6A:
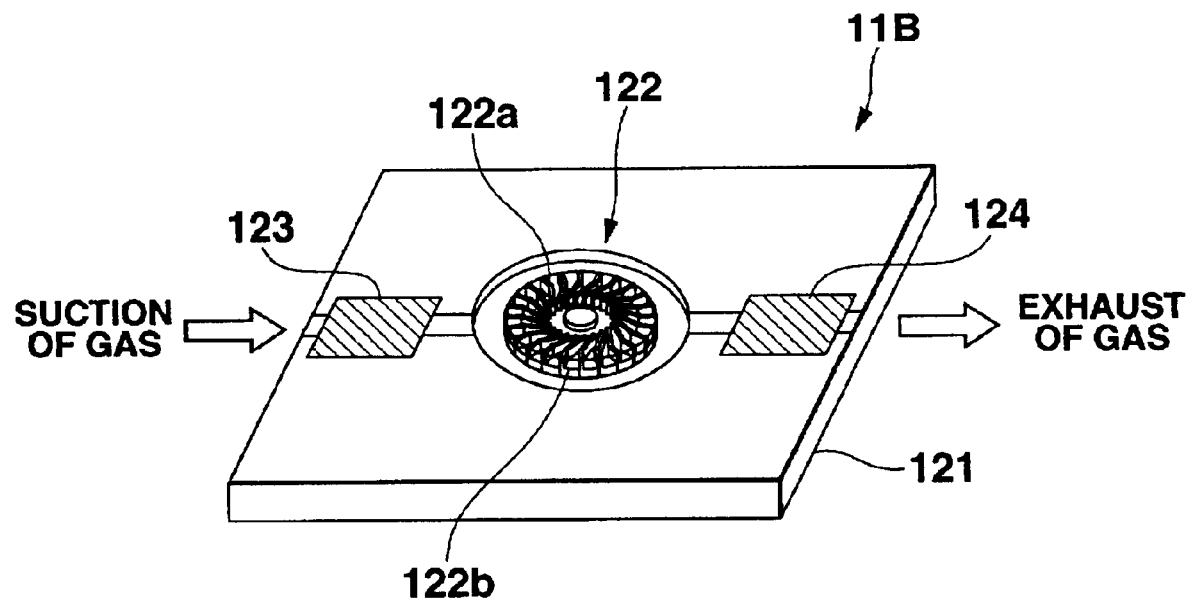
FIGS. 6A and 6B are views schematically showing a second structural example of the sub power supply portion applicable to the power generation module according to this embodiment.
Figure 6B:
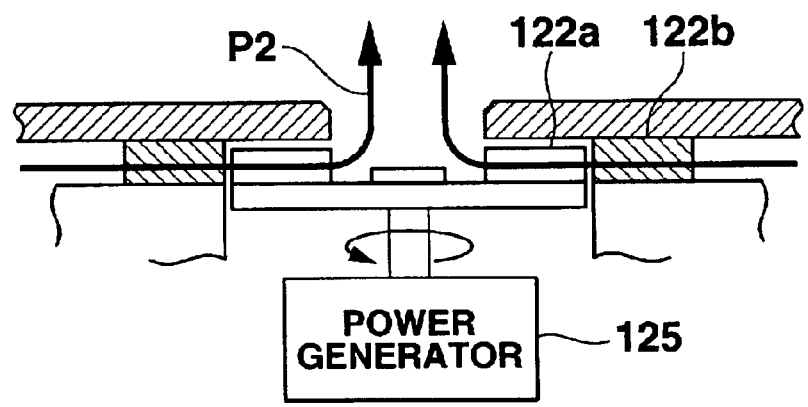

FIGS. 6A and 6B are views showing a second structural example of the sub power supply portion applicable to the power generation module according to this embodiment.

In the second structural example, as a concrete example, the sub power supply portion has a structure as a power generation device which drives a pressure drive engine (gas turbine) by the pressure energy (charged pressure or gas pressure) of the power generation fuel included in the fuel pack 20A and converts the drive energy into electric power.

As shown in FIGS. 6A and 6B, the sub power supply portion 11B according to this structural example includes: a movable blade 122a configured in such a manner that a plurality of blades are curved in a predetermined circumferential direction, arranged in the circumferential direction so as to extend in the substantially radial manner and capable of rotation; a power generator 125 which is directly connected to the center of rotation of the movable blade 122a and converts the rotation energy of the movable blade 122a into electric power based on the principle of known electromagnetic induction or piezoelectric conversion; a fixed blade 122b configured in such a manner that a plurality of blades are curved in an opposite direction from that of the movable blade 122a along the outer peripheral side of the movable blade 122a, arranged substantially radially, and relatively fixed with respect to the movable blade 122a; a suction control portion 123 for controlling supply of the vaporized power generation fuel (fuel gas) to the gas turbine 122 made up of the movable blade 122a and the fixed blade 122b; and an exhaust control portion 124 for controlling exhaust of the power generation fuel after passing through the gas turbine 122. Here, as to the structure of the sub power supply portion 11B constituted by the gas turbine 122, the suction control portion 123 and the exhaust control portion 124, the sub power supply portion 11B can be integrated and formed in, for example, a small space on a single silicon chip 121 by applying micro-fabrication technique and others accumulated by the semiconductor manufacturing technology and the like, which is a so-called micromachine manufacturing technique. In FIG. 6A, in order to clarify the structure of the gas turbine 122, although the movable blade 122a and the fixed blade 122b are exposed for the sake of convenience, they are actually covered with a cover provided in the upper part except for the center of the movable blade as shown in FIG. 6B.

In such a sub power supply portion 11B, for example, as shown in FIG. 6B, when the fuel gas with the high pressure obtained by vaporizing the liquid fuel charged in the fuel pack 20 is sucked (see arrows P2) from the fixed blade 122b side toward the movable blade 122a side of the gas turbine 122 through the suction control portion 123, a vortex flow of the fuel gas is generated along the curving direction of the fixed blade 122b, and the movable blade 122a is rotated in a predetermined direction by the vortex flow, thereby driving the power generator 125. As a result, the pressure energy of the fuel gas is converted into electric power through the gas turbine 122 and the power generator 125.

That is, the power generation fuel applied to the sub power supply portion 11B according to this structural example is sucked in the state of the high-pressure gas at least when the suction control portion 123 is opened and the fuel is sucked into the gas turbine 122, and the movable blade 122a is rotated in a predetermined direction with a predetermined rotational speed (or a number of revolutions) by flowage of the gas based on a pressure difference caused when the exhaust control portion 124 is opened and the gas in the gas turbine 122 is emitted toward the lower air pressure side, e.g., outside air having an ordinary pressure, thereby generating predetermined electric power in the power generator 125.

The fuel gas which has contributed to rotation of the movable blade 122a and whose pressure has been reduced (pressure energy has been consumed) is emitted to the outside of the sub power supply portion 11B through the exhaust control portion 124. Incidentally, in the power generation module 10A shown in FIG. 3, although description has been given as to the structure for directly discharging the fuel gas (exhaust gas) emitted from the sub power supply portion 11 to the outside of the power supply system 301, the present invention is not restricted thereto and may have a structure for reusing the fuel gas as the power generation fuel in the power generation portion 12 as will be explained in the following embodiment.

In the sub power supply portion 11B according to this structural example, therefore, the power generation fuel (fuel gas) FL supplied from the fuel pack 20A does not need to necessarily have the combustibility (or the inflammability) and, in the structure for directly discharging the fuel gas utilized for generation of electric power to the outside of the power supply system 301 in particular, it is desirable for the power generation fuel to have the incombustibility or the flame resistance and no toxicity when taking emission of the power generation fuel FL as the exhaust gas into consideration. Incidentally, it is needless to say that the flame resisting processing or the detoxication processing is required before emitting the exhaust gas to the outside if the power generation fuel consists of a substance having the combustibility or including a toxic component.

As in the sub power supply portion 11B according to this structural example, in the structure for generating electric power based on the pressure energy of the fuel gas, the fuel gas only passes through the sub power supply portion 11B (gas turbine 122), and a by-product (for example, water) is not generated as with the electrochemical reaction in the above-described fuel cell. Thus, when a substance having the incombustibility or the flame resistance but no toxicity is applied as the power generation fuel or when there is adopted a structure for performing the flame resisting processing or the detoxication processing before emitting the power generation fuel to the outside of the power supply system 301 even if the power generation fuel is a substance having the flame resistance or the toxicity, it is not necessary to provide means for collecting the exhaust gas.

By applying the power generation device having such a structure to the sub power supply portion, as similar to the first structural example mentioned above, the power generation fuel with the high pressure (fuel gas) FL can be automatically fed to the sub power supply portion 11B (gas turbine 122) through the I/F portion 30A by only the very simple operation, i.e., coupling the fuel pack 20A with the power generation module 10A, and the power generation operation can be started and continued. Also, predetermined electric power can be always autonomously generated by the sub power supply portion 11B as long as supply of the power generation fuel FL continues, thereby supplying this electric power to predetermined structures inside and outside the power supply system 301.

(Third Structural Example of Sub Power Supply Portion)

FIGS. 7A to 7C are views showing a third structural example of the sub power supply portion applicable to the power generation module according to this embodiment.

In the third structural example, as a concrete example, the sub power supply portion has a structure as a power generation device which drives a pressure drive engine (rotary engine) by the pressure energy (charged pressure or gas pressure) of the power generation fuel FL charged in the fuel pack 20A and converts the drive energy into electric power.

As shown in the drawings, the sub power supply portion 11C according to the third structural example includes: a housing 131 having an operation space 131a whose cross section is substantially elliptical; a rotor 132 which rotates around a central shaft 133 along the inner wall of the operation space 131a and has a substantially triangular cross section; and a power generator (not shown) directly connected to the central shaft 133. Here, as to the structure of the sub power supply portion 11C, the sub power supply portion 11C can be integrated and formed in, for example, a small space of the millimeter order by applying the micromachine manufacturing technique as similar to each embodiment mentioned above.

In the sub power supply portion 11C having such a structure, the operation space 131a is maintained at a substantially ordinary temperature. When the fuel is charged in the liquid form into the operation space 131a from an inlet 134a, the fuel is vaporized and expanded, and a difference in atmospheric pressure is generated in respective operation chambers formed by the inner wall of the operation space 131a and the rotor 132 by controlling the outlet 134b side to a low pressure, e.g., an ordinary pressure. As shown in FIGS. 7A to 7C, the inner periphery of the rotor 132 is rotated along the outer periphery of the central shaft 133 with the pressure of the fuel gas by flowage of the vaporized fuel gas from the inlet 134a to the outlet 134b (arrows P3). As a result, the pressure energy of the fuel gas is converted into the rotational energy of the central shaft 133 and then converted into electric power by the power generator connected to the central shaft 133.

Here, as the power generator applied to this structural example, it is possible to excellently apply a power generator using the known principle of, e.g., electromagnetic induction or piezoelectric conversion as similar to the second structural example mentioned above.

In this structural example, since there is also employed the structure for generating electric power based on the pressure energy of the fuel gas, the fuel gas only passes through the sub power supply portion 11C (operation space 131a in the housing 131) in order to generate electric power, and hence the fuel gas does not need to necessarily have the combustibility (or inflammability) as the power generation fuel. It is possible to excellently apply the fuel gas as long as it is a substance which becomes the high-pressure fuel gas that is vaporized and expanded to a predetermined cubic volume at least under predetermined environmental conditions such as an ordinary temperature or an ordinary pressure when supplied to the sub power supply portion 11C.

By applying the power generation device having such a structure to the sub power supply portion, therefore, as similar to each embodiment mentioned above, the high-pressure power generation fuel (fuel gas) FL is automatically fed to the sub power supply portion 11C (operation space 131a) through the I/F portion 30A by only the very simple operation, i.e., coupling the fuel pack 20A with the power generation module 10A, and the power generation operation can be started and continued. Also, predetermined electric power can be always autonomously generated by the sub power supply portion 11C as long as supply of the power generation fuel FL continues, thereby supplying the electric power to predetermined structures inside and outside the power supply system 301.

(Fourth Structural Example of Sub Power Supply Portion)

Figure 8A:
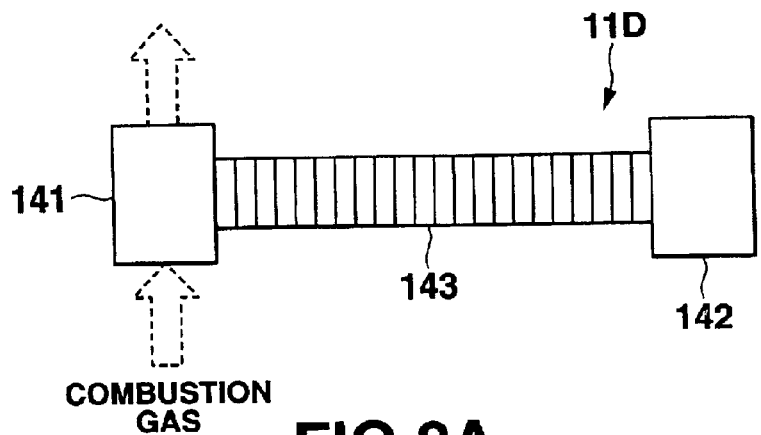
FIGS. 8A to 8C are views schematically showing a fourth structural example of the sub power supply portion applicable to the power generation module according to the embodiment.
Figure 8B:
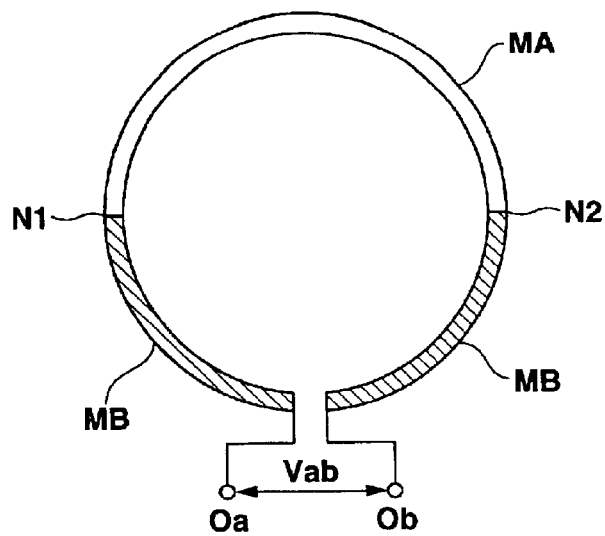
Figure 8C:
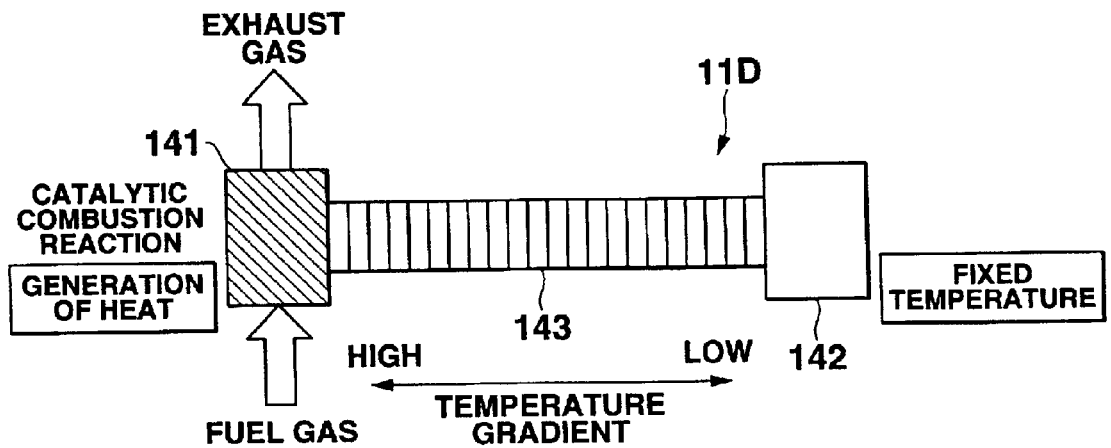

FIGS. 8A to 8C are schematic structural views showing a fourth structural example of the sub power supply portion applicable to the power generation module according to this embodiment.

In the fourth structural example, as a concrete example, the sub power supply portion has a structure as a power generation device which generates electric power by thermoelectric conversion power generation utilizing a difference in temperature caused due to generation of the thermal energy based on the catalytic combustion reaction of the power generation fuel FL charged in the fuel pack 20A.

As shown in FIG. 8A, the sub power supply portion 11D according to the fourth structural example has a structure of a temperature difference power generator generally including: a catalytic combustion portion 141 for generating the thermal energy by subjecting the power generation fuel FL to catalytic combustion; a fixed temperature portion 142 for holding a substantially fixed temperature; and a thermoelectric conversion element 143 connected between first and second temperature ends, the catalytic combustion portion 141 being determined as the first temperature end and the fixed temperature portion 142 as the second temperature end. Here, as shown in FIG. 8B, the thermoelectric conversion element 143 has a structure that ends of two types of semiconductors or metals (which will be referred to as "metal or the like" hereinafter for the sake of convenience) MA and MB are joined to each other (for example, the metal or the like MB is joined to the both ends of the metal or the like MA) and respective joint portions N1 and N2 are respectively connected to the catalytic combustion portion 141 (first temperature end) and the fixed temperature portion 142 (second temperature end). The fixed temperature portion 142 has, for example, a structure that it is constantly exposed to outside air through an opening portion or the like provided to the device DVC to which the power supply system 301 is attached and maintains a substantially fixed temperature. As to the structure of the sub power supply portion 11D consisting of the illustrated temperature difference power generator, as similar to each embodiment mentioned above, the sub power supply portion 11D can be integrated and formed in a small space by applying the micromachine manufacturing technique.

In the sub power supply portion 11D having such a structure, as shown in FIG. 8C, when the power generation fuel (combustion gas) FL charged in the fuel pack 20A is supplied to the catalytic combustion portion 141 through the I/F portion 30A, heat is generated by the catalytic combustion reaction, and a temperature of the catalytic combustion portion 141 (first temperature end) is increased. On the other hand, since the fixed temperature portion 142 is configured to maintain its temperature substantially constant, a difference in temperature is generated between the catalytic combustion portion 141 and the fixed temperature portion 142. Then, predetermined electromotive force is generated and electric power is produced by the Seebeck effect in the thermoelectric conversion element 143 based on this difference in temperature.

Specifically, in cases where a temperature in the first temperature end (joint portion N1) is defined as Ta and that in the second temperature end (joint portion N2) as Tb (<Ta), if a difference between the temperatures Ta and Tb is small, a voltage of $Vab=Sab\times(Ta-Tb)$ is generated between output terminals Oa and Ob shown in FIG. 8B. Here, Sab denotes a relative Seebeck coefficient of the metals or the like MA and MB.

By applying the power generation device having such a structure to the sub power supply portion, therefore, as similar to each structural example mentioned above, the power generation fuel (a liquid fuel or a liquefied fuel or a gas fuel) is automatically fed to the sub power supply portion 11D (catalytic combustion portion 141) through the I/F portion 30A by only the very simple operation, i.e., coupling the fuel pack 20A with the power generation module 10A, the thermal energy involved by the catalytic combustion reaction is generated, and the power generation operation by the temperature difference power generator can be started and continued. Also, predetermined electric power can be always autonomously generated by the sub power supply portion 11D as long as supply of the power generation fuel FL continues, thereby supplying this electric power to predetermined structures inside and outside the power supply system 301.

Although description has been given as to the temperature difference power generator which generates electric power by the Seebeck effect based on a difference in temperature between the catalytic combustion portion 141 and the fixed temperature portion 142 in this structural example, the present invention is not restricted thereto and may have a structure that electric power is generated based on the thermoelectronic emission phenomenon by which free electrons are emitted from the metal surface by heating the metal.

(Fifth Structural Example of Sub Power Supply Portion)

Figure 9A:
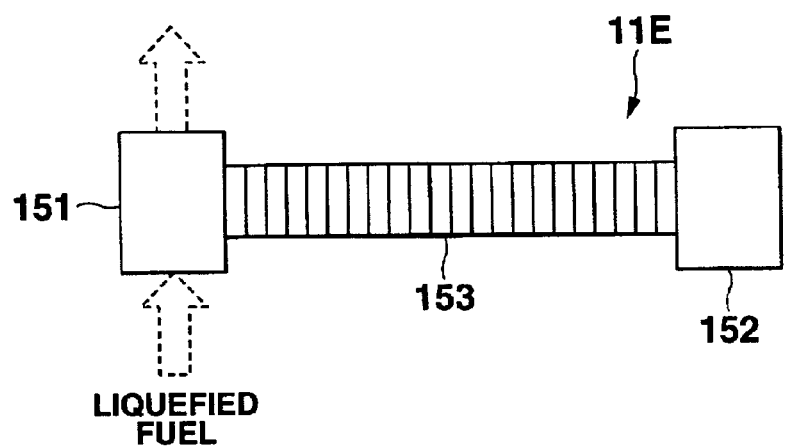
FIGS. 9A and 9B are views schematically showing a fifth structural example of the sub power supply portion applicable to the power generation module according to the embodiment.
Figure 9B:
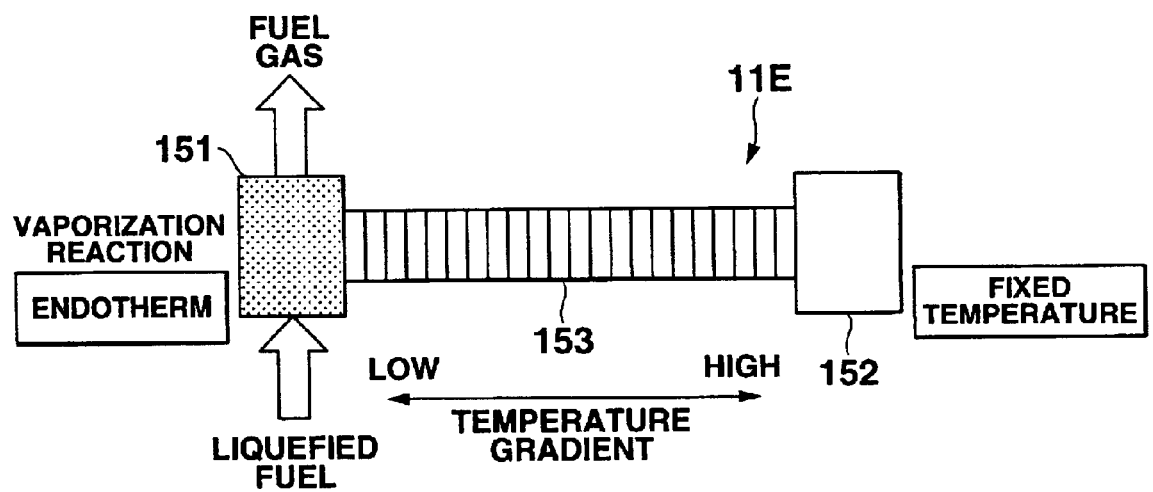

FIGS. 9A and 9B are views showing a fifth structural example of the sub power supply portion applicable to the power generation module according to this embodiment.

In the fifth structural example, as a concrete example, the sub power supply portion has a structure as a power generation device which generates electric power by thermoelectric conversion power generation utilizing a difference in temperature caused when the power generation fuel (liquid fuel) FL charged in the fuel pack 20A absorbs the thermal energy based on the evaporation reaction.

As shown in FIG. 9A, the sub power supply portion 11E according to the fifth structural example has a structure of a temperature difference power generator generally including: a heat and cold holding portion 151 for holding heat and cold realized by absorbing the thermal energy when the power generation fuel (liquefied fuel in particular) FL is vaporized; a fixed temperature portion 152 for maintaining a substantially fixed temperature; and a thermoelectric conversion element 153 connected between first and second temperature ends, the heat and cold holding portion 151 being determined as a first temperature end and the fixed temperature portion 152 as the second temperature end. Here, the thermoelectric conversion element 153 has the structure equivalent to that shown in the fourth structural example (see FIG. 8B) mentioned above. Moreover, the fixed temperature portion 152 is configured to maintain a substantially fixed temperature by being brought into contact with or exposed to other areas inside and outside the power supply system 301. Incidentally, as to the structure of the sub power supply portion 11E consisting of the temperature difference power generator shown in the drawings, the sub power supply portion 11E is integrated and formed in a small space as similar to each structural example mentioned above.

In the sub power supply portion 11E having such a structure, as shown in FIG. 9B, when the power generation fuel (liquefied fuel) FL charged in the fuel pack 20A under a predetermined pressure condition is supplied to the sub power supply portion 11E through the I/F portion 30A and transferred to predetermined environmental conditions such as an ordinary temperature or an ordinary pressure, the power generation fuel FL is vaporized. At this moment, the thermal energy is absorbed from the circumference, and a temperature of the heat and cold holding portion 151 is lowered. On the other hand, since the fixed temperature portion 152 is configured to maintain its temperature substantially constant, a difference in temperature is generated between the heat and cold holding portion 151 and the fixed temperature portion 152. Then, predetermined electromotive force is generated and electric power is produced by the Seebeck effect in the thermoelectric conversion element 153 based on this difference in temperature, as similar to the fourth structural example mentioned above.

By applying the power generation device having such a structure to the sub power supply portion, therefore, as similar to each structural example mentioned above, the power generation fuel (liquefied fuel) FL is automatically fed to the sub power generation portion 11E through the I/F portion 30A by only the very simple operation, i.e., coupling the fuel pack 20A with the power generation module 10A, the thermal energy is absorbed by the vaporization reaction to produce heat and cold, and the power generation operation by the temperature difference power generator can be started and continued. Also, predetermined electric power can be always autonomously generated by the sub power supply portion 11E as long as supply of the power generation fuel FL continues, thereby supplying this electric power to predetermined structures inside and outside the power supply system 301.

In this structural example, although description has been given as to the temperature difference power generator which generates electric power by the Seebeck effect based on a difference in temperature between the heat and cold holding portion 151 and the fixed temperature portion 152, the present invention is not restricted thereto and may have a structure for generating electric power based on the thermoelectronic emission phenomenon.

(Sixth Structural Example of Sub Power Supply Portion)

Figure 10:
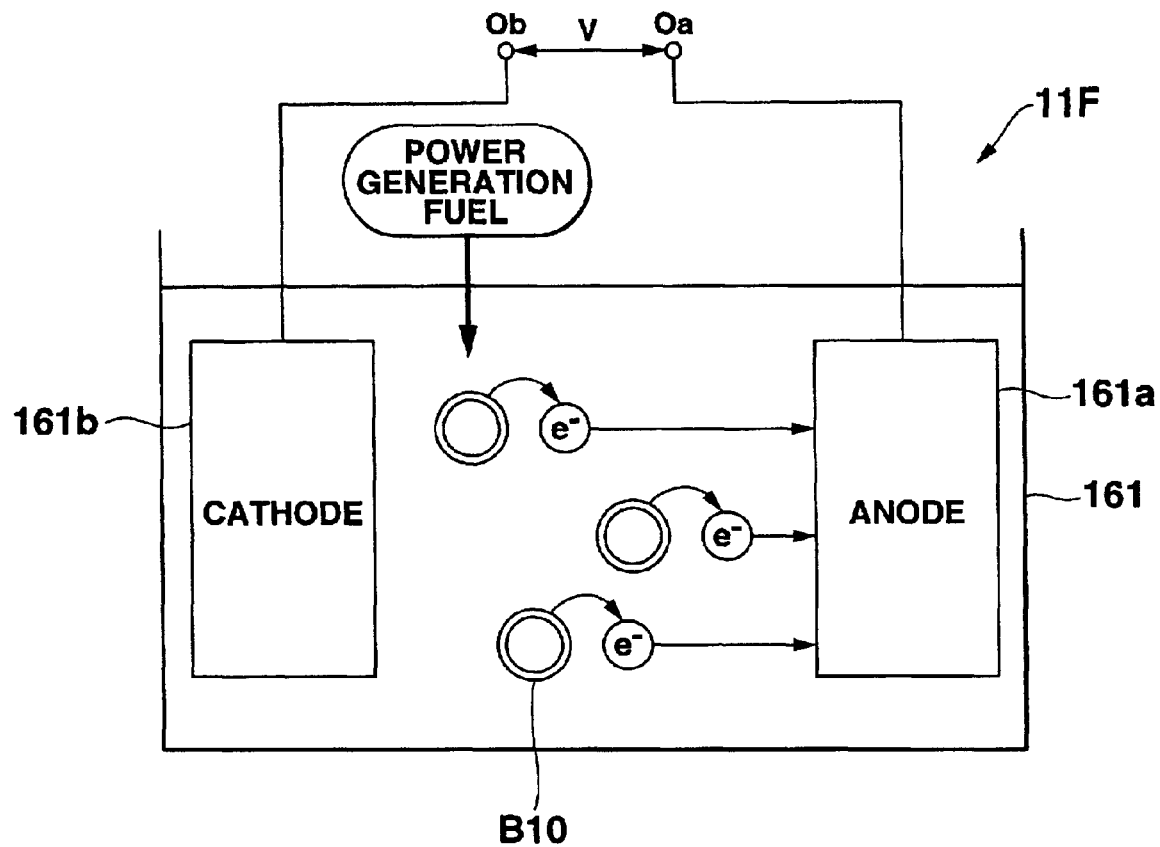
FIG. 10 is a view schematically showing a sixth structural example of the sub power supply portion applicable to the power generation module according to the embodiment.

FIG. 10 is a view showing a sixth structural example of the sub power supply portion applicable to the power generation module according to this embodiment.

In the sixth structural example, as a concrete example, the sub power supply portion has a structure as a power generation device which generates electric power by utilizing the biochemical reaction relative to the power generation fuel charged in the fuel pack 20A.

As shown in FIG. 10, the sub power supply portion 11F according to the sixth structural example generally includes: a bio-culture tank 161 in which microbes or a biocatalyst (which will be referred to as "microbes or the like" hereinafter for the sake of convenience) BIO which grow with the power generation fuel as a source of nutrition is stored; and an anode side electrode 161a and a cathode side electrode 161b provided in the bio-culture tank 161. In such a structure, by supplying the power generation fuel FL from the fuel pack 20A through the I/F portion 30A, metabolism and the like (biochemical reaction) such as aspiration by the microbes or the like BIO is produced in the bio-culture tank 161 and the electron ($e^-$) is generated. Capturing this electron by the anode side electrode 161a can obtain predetermined electric power from output terminals Oa and Ob.

By applying the power generation device having such a structure to the sub power supply portion, therefore, as similar to each structural example mentioned above, the power generation fuel FL which can be a source of nutrition for the microbes or the like BIO is automatically fed to the sub power supply portion 11F (bio-culture tank 161) through the I/F portion 30A by only the very simple operation, i.e., coupling the fuel pack 20A with the power generation module 10A, and the power generation operation by the biochemical reaction of the microbes or the like BIO is started. Also, predetermined electric power can be always autonomously generated as long as supply of the power generation fuel continues, thereby supplying this electric power to predetermined structures inside and outside the power supply system 301.

In the biochemical reaction, in case of generating electric power by utilizing photosynthesis by the microbes or the like BIO, predetermined electric power can be constantly autonomously generated and supplied by adopting, for example, a structure that the outside light can enter through an opening portion or the like provided to the device DVC to which the power supply system 301 is attached.

(Seventh Structural Example of Sub Power Supply Portion)

Figure 11A:
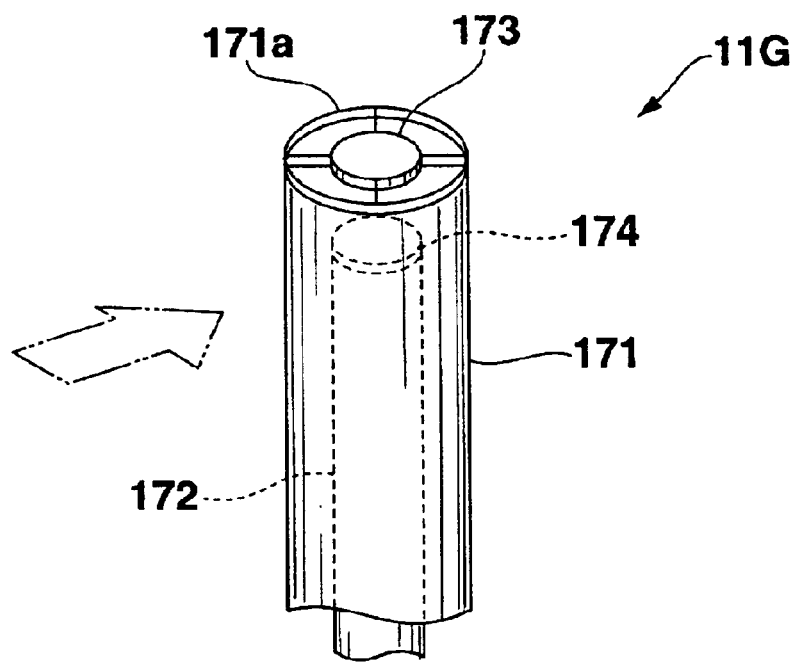
FIGS. 11A and 11B are views schematically showing a seventh structural example of the sub power supply portion applicable to the power generation module according to the embodiment.
Figure 11B:
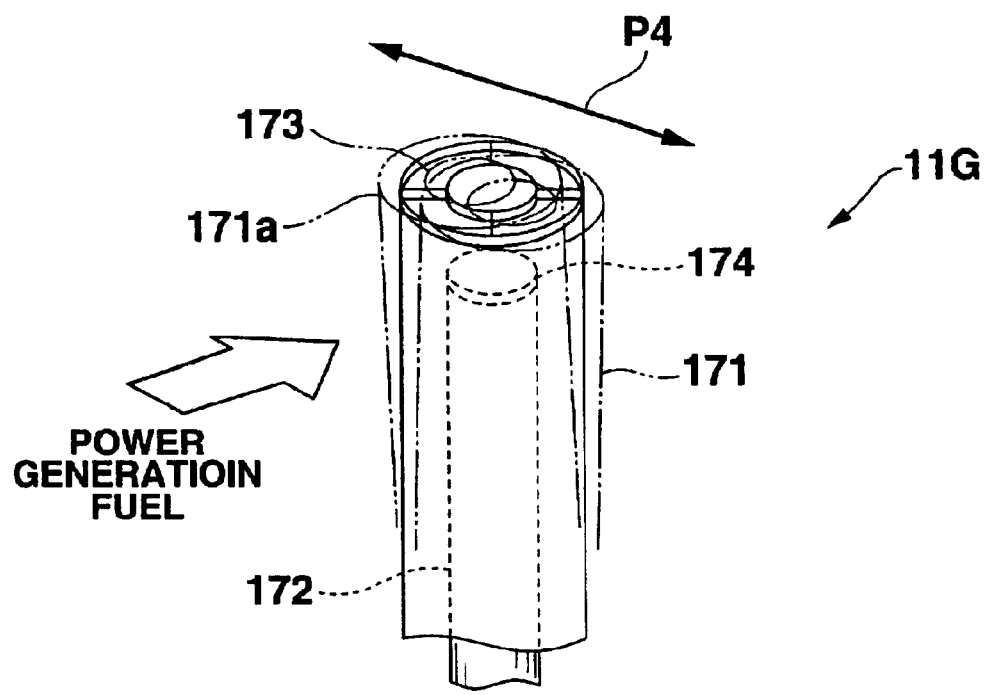

FIGS. 11A and 11B are views showing a seventh structural example of the sub power supply portion applicable to the power generation module according to this embodiment.

In the seventh structural example, as a concrete example, the sub power supply portion has a structure as a power generation device which converts the vibration energy produced by fluid movement of the power generation fuel supplied from the fuel pack 20A into electric power.

As shown in FIG. 11A, the sub power supply portion 11G according to the seventh structural example has a structure as an oscillation power generator generally including: a cylindrical oscillator 171 which is configured in such a manner that at least its one end side can oscillate when the power generation fuel consisting of a liquid or gas moves in a predetermined direction and has an electromagnetic coil 173 provided at its oscillation end 171a; and a stator 172 which is inserted into this oscillator, has a permanent magnet 174 provided so as to be opposed to the electromagnetic coil 173 and produces no oscillation relative to movement of the power generation fuel. In such a structure, as shown in FIG. 11B, by supplying the power generation fuel FL from the fuel pack 20A through the I/F portion 30A, the oscillator 171 (oscillation end 171a) produces oscillation with a predetermined number of oscillations with respect to the stator 172 in a direction (arrow P4 in the drawing) substantially orthogonal to the flowing direction of the power generation fuel FL. The relative position between the permanent magnet 174 and the electromagnetic coil 173 is changed by this oscillation, and electromagnetic induction is thereby generated, thus obtaining predetermined electric power through the electromagnetic coil 173.

By applying the power generation device having such a structure to the sub power supply portion, therefore, as similar to each structural example mentioned above, the power generation fuel FL as a fluid is automatically fed to the sub power supply portion 11G through the I/F portion 30A by only the very simple operation, i.e., coupling the fuel pack 20A with the power generation module 10A, and the power generation operation by conversion of the oscillation energy of the oscillator 171 involved by fluid movement is started. Also, predetermined electric power can be constantly autonomously generated as long as supply of the power generation fuel FL continues, thereby supplying the electric power to predetermined structures inside and outside the power supply system 301.

Each structural example mentioned above only illustrates an instance of the sub power supply portion 11 applied to the power generation module 10A and is not intended to restrict the structure of the power supply system according to the present invention. In brief, the sub power supply portion 11 applied to the present invention may have any other structure as long as electric power can be generated inside the sub power supply portion 11 based on the energy conversion action such as the electrochemical reaction, electromagnetic induction, heat generation or a difference in temperature involved by the endothermic reaction when the liquid fuel or the liquefied fuel or the gas fuel charged in the fuel pack 20A is directly supplied. For example, it may be a combination of a gas pressure drive engine other than the gas turbine or the rotary engine with the power generator utilizing electromagnetic induction or piezoelectric conversion. Alternatively, as will be described later, it is possible to apply the structure that electric power condensing means (condensing device) is provided in addition to the power generation device equivalent to each sub power supply portion 11 mentioned above, electric power (second electric power) generated by the sub power supply portion 11 is partially accumulated, and then it can be supplied as start-up electric power to the power generation portion 12 or the output control portion 14 when starting up the power supply system 301 (power generation portion 12).

(Eighth Structural Example of Sub Power Supply Portion)

FIG. 12, FIGS. 13 to 15, and FIGS. 16 to 18 are schematic structural views showing the eighth structural example and the operation state of the sub power supply portion applicable to the power generation module according to this embodiment, and arrows along wirings in the drawings indicate directions in which the electric current flows.

Figure 12:
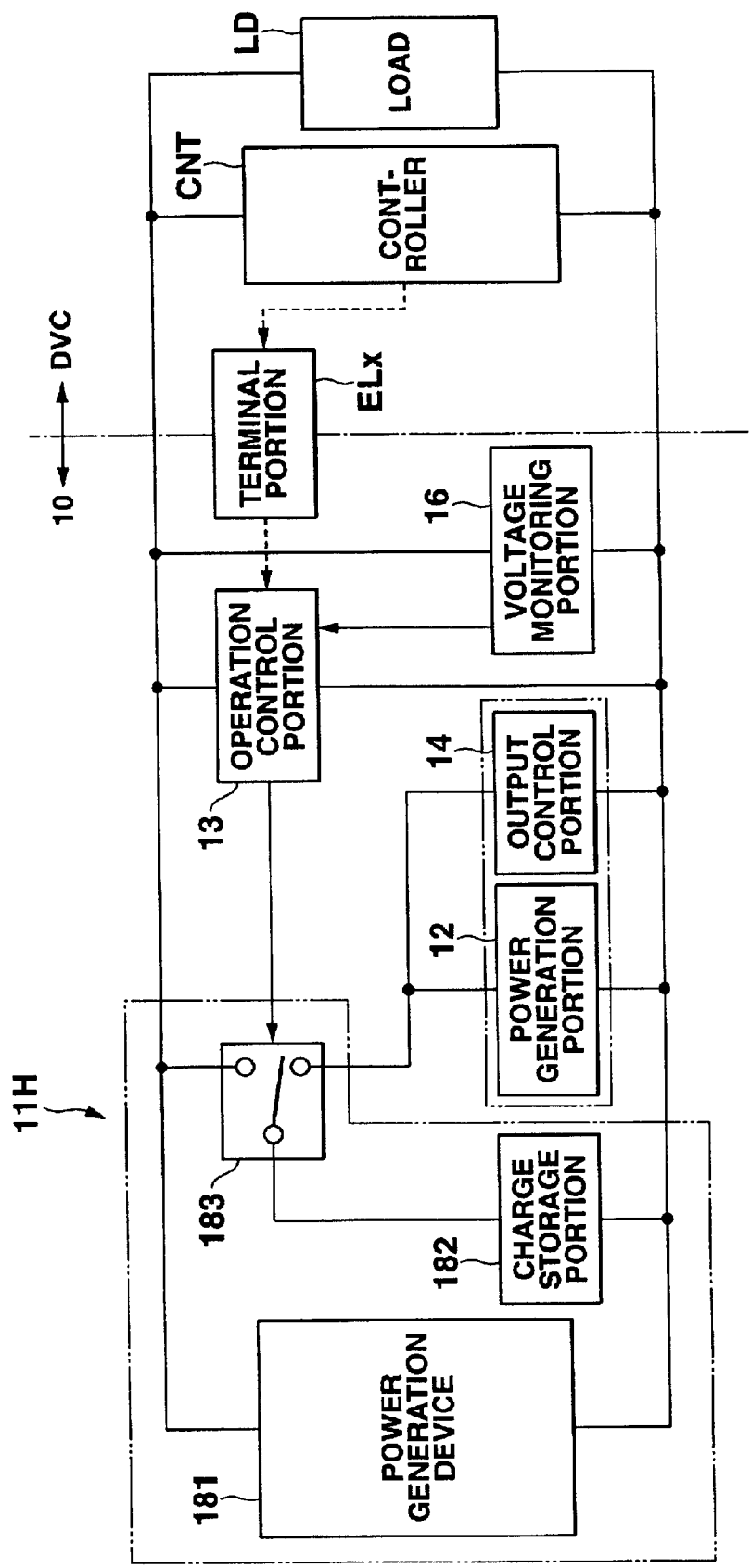
FIG. 12 is a schematic view showing an eighth structural example of the sub power supply portion applicable to the power generation module according to the embodiment.

As shown in FIG. 12, the sub power supply portion 11H according to the eighth structural example is configured to generally include: a power generation device (for example, the sub power supply portion described in each structural example mentioned above) 181 capable of autonomously generating electric power (second electric power) when the power generation fuel (a liquid fuel or a liquefied fuel or a gas fuel) FL charged in the fuel pack 20 is directly supplied through a fuel transport pipe provided to the I/F portion 30 by the capillary phenomenon; a charge storage portion 182 which stores a part of the electric power generated by the power generation device 181 and consists of a secondary cell, a capacitor or the like; and a switch 183 for switching and setting storage and discharge of the electric power to the charge storage portion 182 based on an operation control signal from the operation control portion 13.

In such a structure, the electric power generated by the power generation device 181 which is constantly driven while supply of the power generation fuel from the fuel pack continues is outputted as the controller electric power of the device DVC and the operating electric power of the operation control portion 13, and a part of this electric power is appropriately stored in the charge storage portion 182 through the switch 183. Subsequently, for example, when the operation control portion 13 detects start of drive of the device DVC (load LD) by detecting a change in voltage of the supply electric power through the voltage monitoring portion 16, the connection state of the switch 183 is changed over based on the operation control signal outputted from the operation control portion 13, and the electric power stored in the charge storage portion 182 is supplied as electromotive force to the power generation portion 12 or the output control portion 14.

Here, when the charge in the charge storage portion 182 consumed by the power generation portion 12 or the output control portion 14 is reduced to some extent because the device DVC is driven for a long period of time, it is possible to control in such a manner that the charge storage portion 182 can not be fully discharged by switching the power generation portion 12 so as to supply the electric power to the device DVC and the charge storage portion 182. In addition, the power generation device 181 may continuously charge the charge storage portion 182 while the power generation portion 12 is supplying the electric power to the device DVC. Incidentally, in the later-described second embodiment, when applying this structural example as the sub power supply portion 11, the operation control portion 13 detects drive of the device DVC (load LD) and outputs an operation control signal for switching the connection state of the switch 183 by receiving through a terminal portion ELx load drive information which is outputted from the controller CNT of the device DVC and indicates that the load LD is activated from the off state and switched to the on state.

According to the sub power supply portion having such a structure, therefore, even if the electric power generated per unit time by the power generation device 181 is set lower (weak electric force), the electric power having the sufficiently high drive electric power characteristic can be supplied to the power generation portion 12 or the output control portion 14 by instantaneously discharging the electric power accumulated in the charge storage portion 182. Thus, since the power generation capability of the power generation device 181 can be set sufficiently low, the structure of the sub power supply portion 11 can be minimized.

Figure 13:
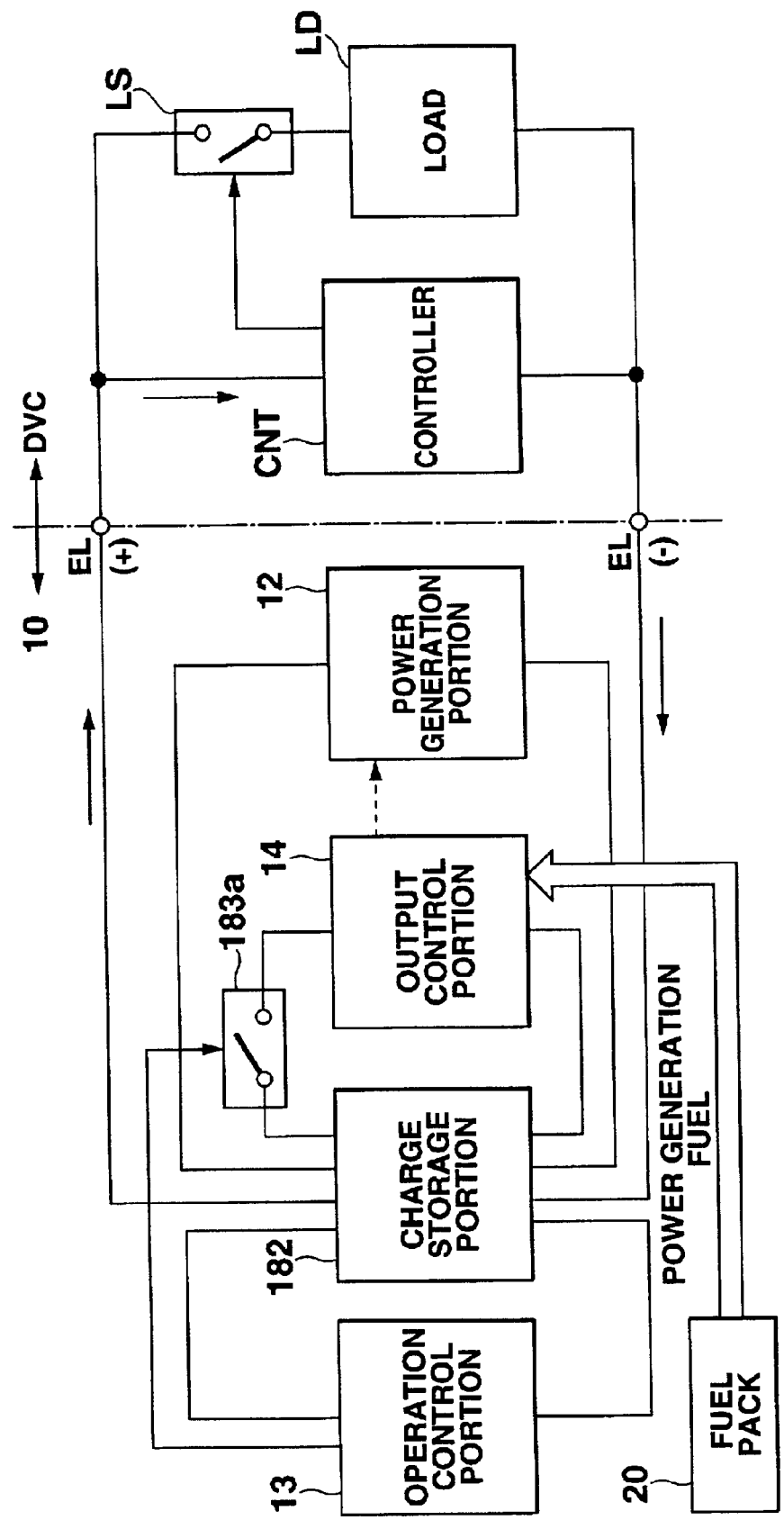
FIG. 13 is a schematic view showing an operation state (part 1) in another example of the eighth structural example of the sub power supply portion applicable to the power generation module according to the embodiment.
Figure 14:
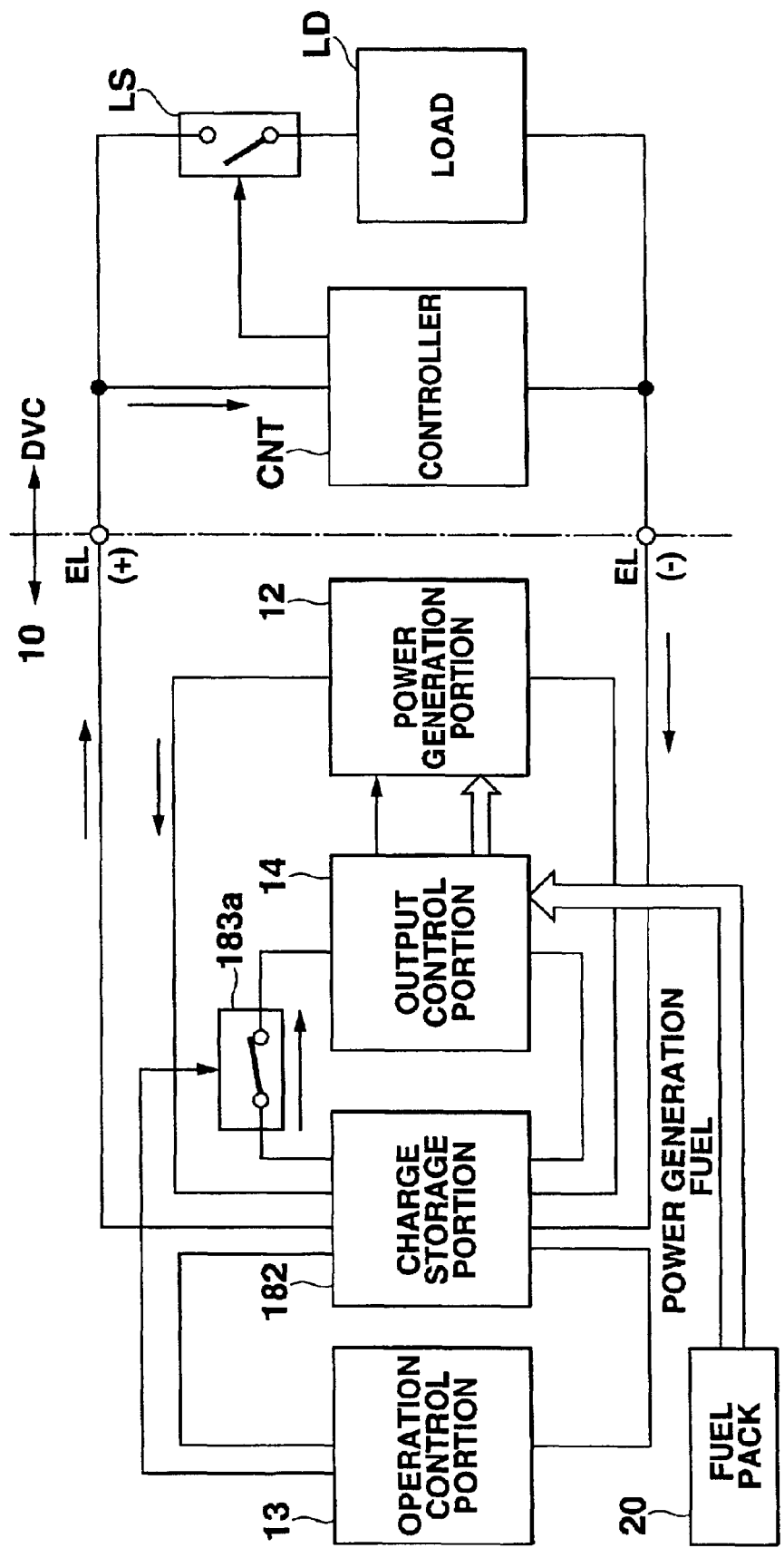
FIG. 14 is a schematic view showing an operation state (part 2) in another example of the eighth structural example of the sub power supply portion applicable to the power generation module according to the embodiment.
Figure 15:
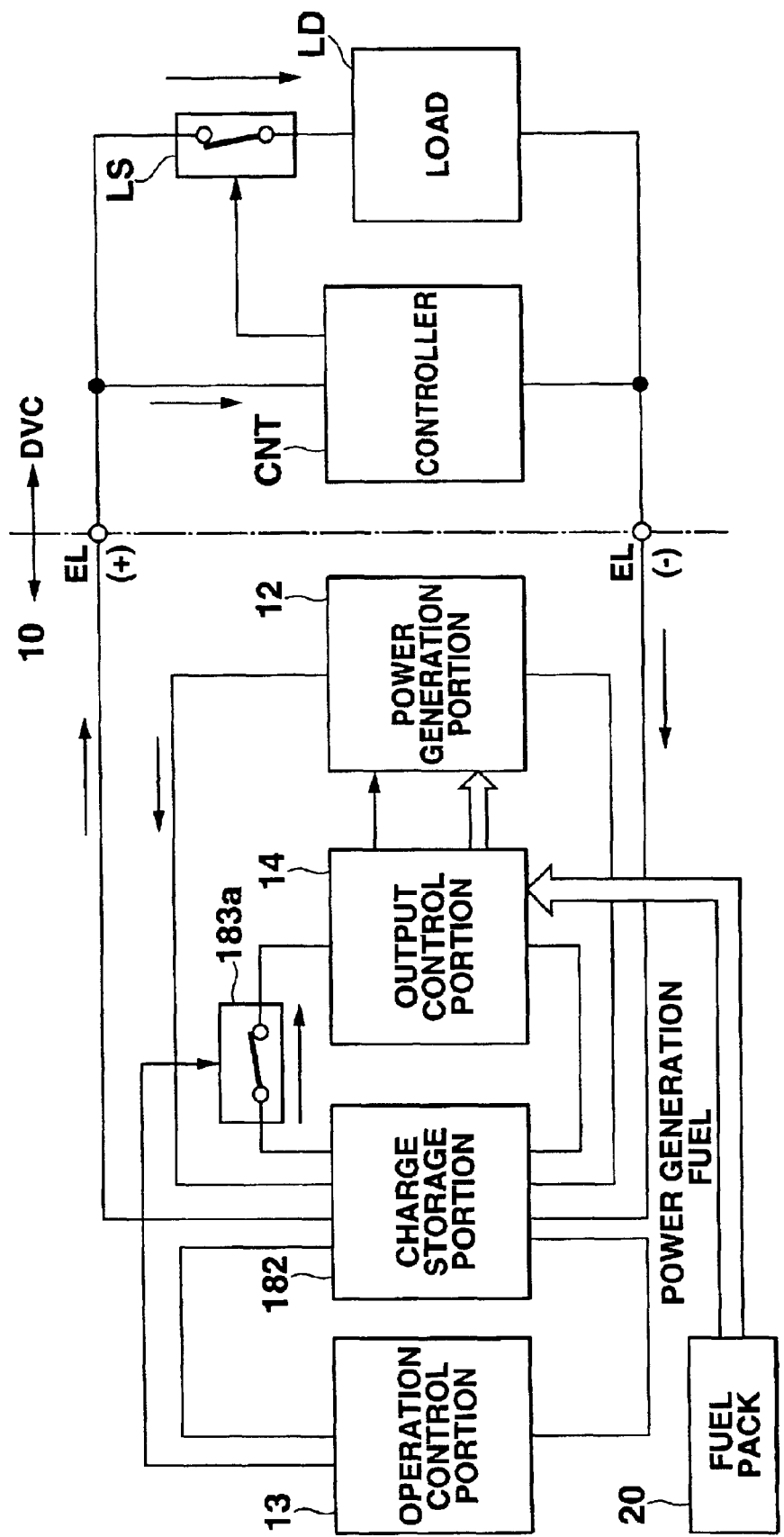
FIG. 15 is a schematic view showing an operation state (part 3) in another example of the eighth structural example of the sub power supply portion applicable to the power generation module according to the embodiment.

As the sub power supply portion according to this structural example, as shown in FIGS. 13 to 15, it is possible to apply the structure in which the power generation device 181 is omitted and only the charge storage portion 182 consisting of a capacitor previously charged up is provided.

In FIGS. 13 to 15, the charge storage portion 182 has a function for supplying electric power to the output control portion 14 by the switch 183a according to needs in addition to a function capable of constantly supplying the controller electric power for the controller CNT and the load drive electric power for the load LD from a positive electrode terminal EL (+) and a negative electrode terminal EL (−) to the device DVC.

The controller CNT has a function for causing the switch LS to be turned on in order to supply electric power to the load LD when the device DVC is started up by an operation of a device DVC operator or for some reason.

The operation control portion 13 has a function for detecting the storage state of the electric charge in the charge storage portion 182. The operation control portion 13 turns on the switch 183a, drives the output control portion 14 and starts up the power generation portion 12 only when an amount of the stored electric charge in the charge storage portion 182 is insufficient irrespective of the drive state of the load LD.

In such a structure, FIG. 13 shows a circumstance that the switch LS is turned off because the load LD of the device DVC is not driven and is in the standby mode, and the charge storage portion 182 supplies electric power to the controller CNT. At this moment, since the charge storage portion 182 stores the electric charge which is sufficient for supplying a predetermined quantity of electric power, the operation control portion 13 turns off the switch 183a.

FIG. 14 shows a circumstance that the standby mode is similarly set but the operation control portion 13 detects reduction in a charge amount of the charge storage portion 182 below a predetermined quantity and turns on the switch 183a. The output control portion 14 starts drive with electric power from the charge storage portion 182 and supplies a predetermined quantity of fuel or the like from the fuel pack 20 to the power generation portion 12. Also, the output control portion 14 supplies electric power to the power generation portion 12 in such a manner the heater of the power generation portion 12 reaches a predetermined temperature in a predetermined time. As a result, the power generation portion 12 generates electric power, the charge storage portion 182 enters the charge mode for storing the electric charge by using this electric power and maintains the standby power discharge mode in order to continue drive of the controller CNT. Then, from this state, when a predetermined amount of electric charge is stored in the charge storage portion 182, the operation control portion 13 changes over the switch 183a to the off state as shown in FIG. 13 mentioned above.

FIG. 15 shows a case that the switch LS is turned on by the controller CNT which has detected that the device DVC is started up by the operation of a device DVC operator or for some reason. When the operation control portion 13 detects that an amount of electric charge stored in the charge storage portion 182 is reduced below a predetermined amount with electric power consumption in the load LD and the controller CNT of the device DVC, the operation control portion 13 turns on the switch 183a functioning as a start-up control portion, and the output control portion 14 drives the power generation portion 12 to generate power, thereby charging the charge storage portion 182. Then, when the electric charge is sufficiently charged in the electric charge storage portion 182, the operation control portion 13 detects that state and turns off the switch 183a in order to stop power generation in the power generation portion 12 and drive of the operation control portion 13.

A threshold value corresponding to an amount of charging in the charge storage portion 182 when the operation control portion 13 has detected that the switch 183a must be turned on and a threshold value corresponding to an amount of charging in the charge storage portion 182 when the same has detected that the switch 183a must be turned off may be set so as to be substantially equal to each other, and the threshold value when turning off the switch 183a may be set to be larger.

In the power supply system having such a structure, the structure and the function operation of this system is different from the above-described power supply system shown in FIG. 12 in that: the sub power supply portion itself does not have a function for generating electric power; the power generation portion 12 generates electric power in accordance with the charging state of the charge storage portion 182 irrespective of the drive state of the load LD; the operation control portion 13 detects the charging state of the charge storage portion 182 and then controls the switch 183a; and the charge storage portion 182 supplies electric power to the device DVC. Further, since the power supply system has such a structure, it is good enough that the power generation portion 12 controls power generation and stop of power generation with only the charging state of the electric charge in the charge storage portion 182 without obtaining load drive information from the controller CNT of be device DVC. Therefore, the terminal portion ELx for inputting the load drive information is no longer necessary and the dual-electrode terminal structure can be adopted, which results in an advantage of superiority in the compatibility with any other general cell. Furthermore, since the charge storage portion 182 as the sub power supply portion does not continuously consume the fuel in the fuel pack 20 to generate electric power while the power generation portion 12 is stopped, there is also an advantage that the fuel in the fuel pack 20 is not wastefully consumed. Moreover, there is also an advantage that the device DVC does not have to include a circuit for providing the load drive information from the controller CNT to the power supply system.

Still another power supply system having the charge storage type sub power supply portion according to this structural example will now be described with reference to FIGS. 16 to 18.

Figure 16:
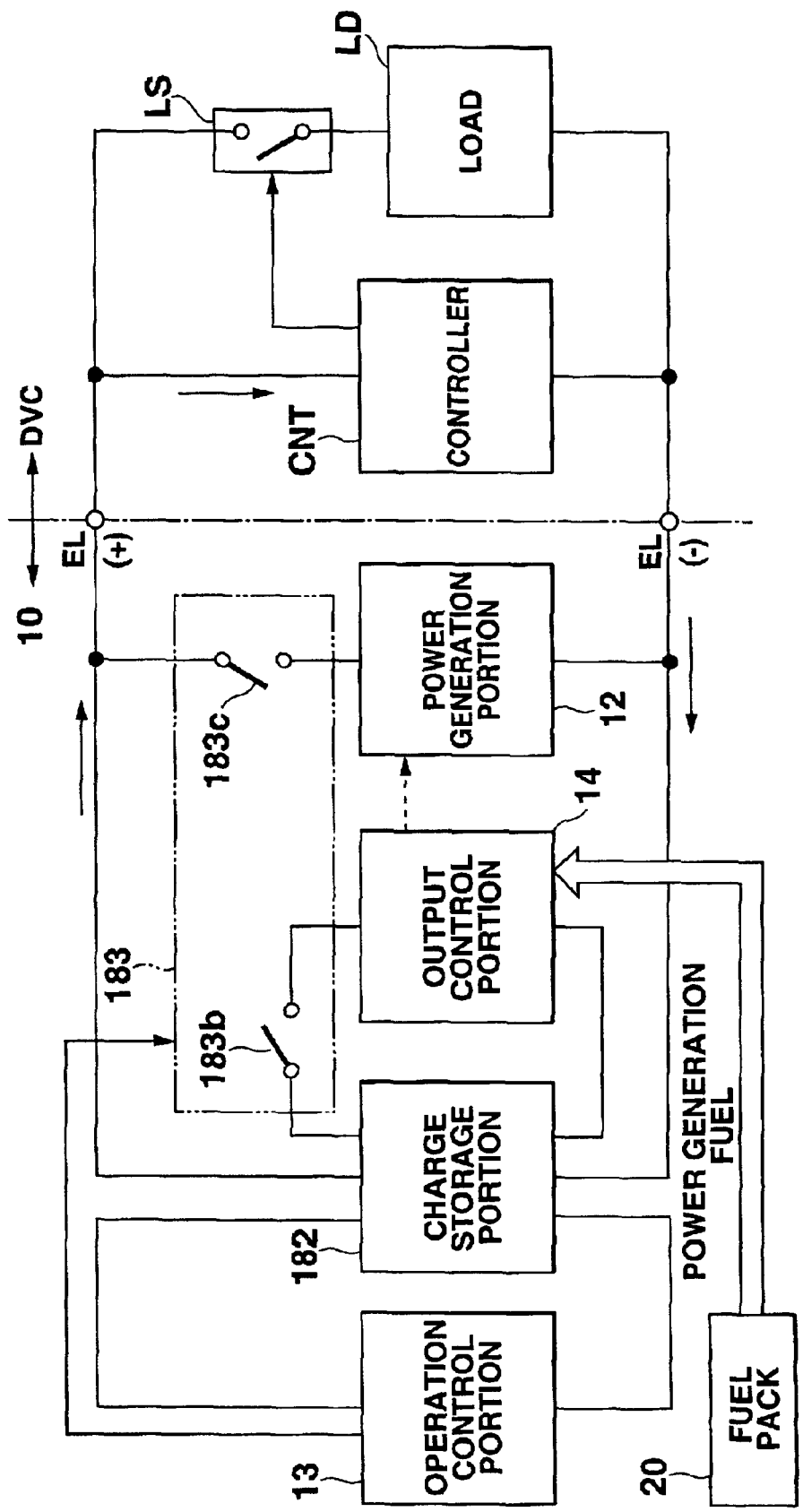
FIG. 16 is a schematic view showing an operation state (part 1) in still another example of the eighth structural example of the sub power supply portion applicable to the power generation module according to the embodiment.
Figure 17:
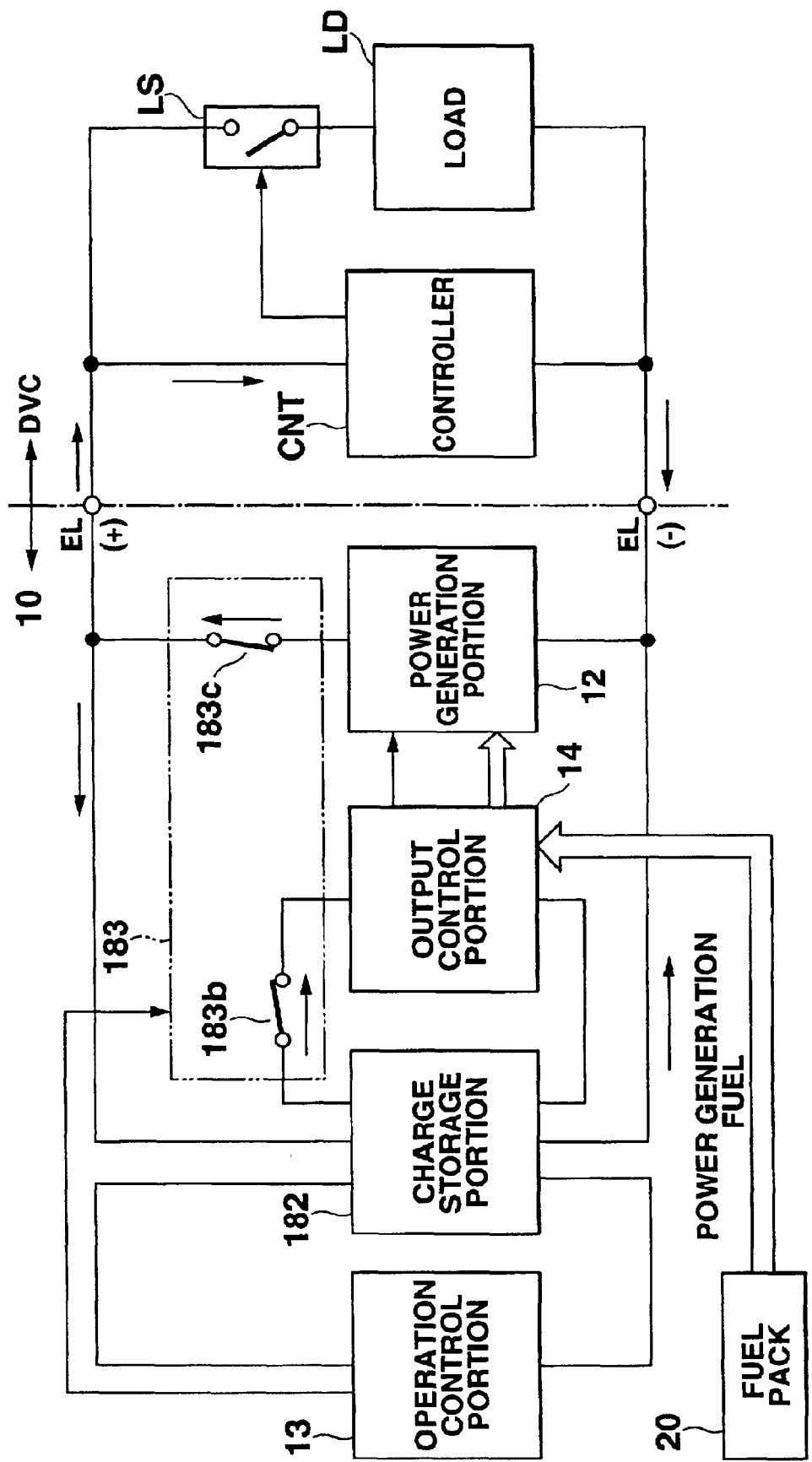
FIG. 17 is a schematic view showing an operation state (part 2) in still another example of the eighth structural example of the sub power supply portion applicable to the power generation module according to the embodiment.
Figure 18:
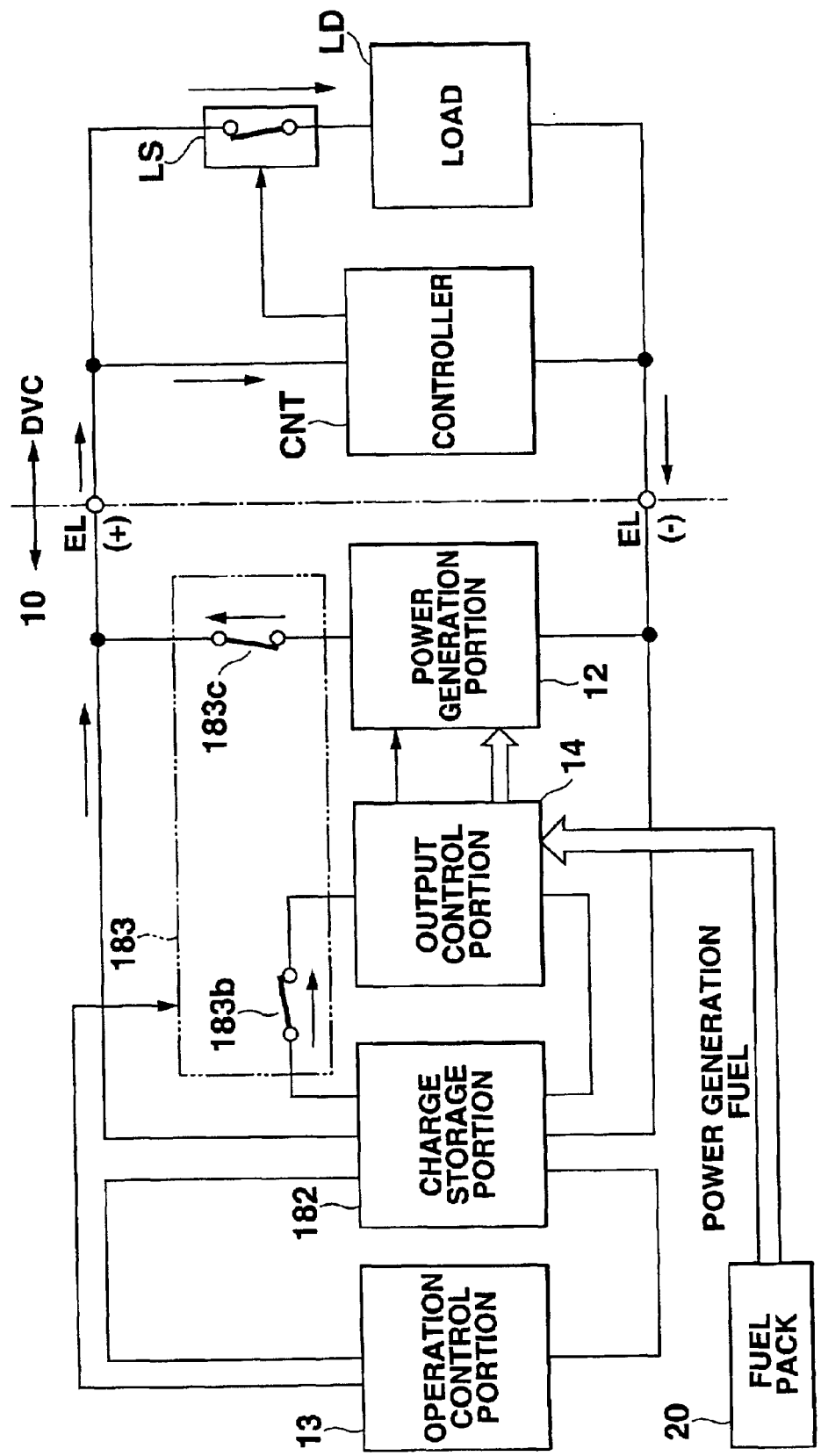
FIG. 18 is a schematic view showing an operation state (part 3) in still another example of the eighth structural example of the sub power supply portion applicable to the power generation module according to the embodiment.

In FIGS. 16 to 18, the charge storage portion 182 has a function for supplying electric power to the output control portion 14 through the switch 183b according to needs in order to drive the power generation portion 12 in addition to the function for constantly supplying the controller electric power for the controller CNT from the positive electrode terminal EL (+) and the negative electrode terminal EL (-) to the device DVC.

The controller CNT has a function for turning on the switch LS in order to supply electric power to the load LD when the device DVC is activated by an operation of a device DVC operator or for some reason.

The operation control portion 13 has a function for detection the storage state of the electric charge in the charge storage portion 182. The operation control portion 13 turns on the switch 183b and drives the output control portion 14 to cause the power generation portion 12 to generate electric power only when an amount of electric charge stored in the charge storage portion 182 is not sufficient irrespective of the drive state of the load LD. Moreover, the operation control portion 13 turns on the switch 183c and outputs the electric power generated in the power generation portion 12 together with the electric power of the charge storage portion 182 as the controller electric power for the controller CNT and the load drive electric power for the load LD.

FIG. 16 shows, in such a structure, a case that the operation control portion 13 turns off the switch 183 (the switch 183b and the switch 183c) and stops drive of the power generation portion 12 and the output control portion 14, and the charge storage portion 182 supplies electric power to the controller CNT when the device DVC is in the standby mode and the operation control portion 13 determines that the charge storage portion 182 has the sufficient electric charge stored therein.

FIG. 17 shows a circumstance that, when the device DVC is in the standby mode and the operation control portion 13 determines that the electric charge stored in the charge storage portion 182 is attenuated to a predetermined amount and progress of attenuation is slow because the load LD is not driven, the operation control portion 13 turns on the switch 183b and turns on the switch 183c to supply drive electric power from the charge storage portion 182 to the output control portion 14, the output control portion 14 and the power generation portion 12 are thereby driven, and the electric charge is stored in the charge storage portion 182 with the electric power generated in the power generation portion 12. At this moment, the output control portion 14 starts drive with the electric power from the charge storage portion 182, supplies a predetermined amount of fuel or the like from the fuel pack 20 to the power generation portion 12, and supplies the electric power to the power generation portion 12 so that the heater of the power generation portion 12 can reach a predetermined temperature in a predetermined time. Meanwhile, the charge storage portion 182 constantly supplies the electric power to the controller CNT. Then, when a predetermined amount of the electric charge is stored in the charge storage portion 182 from this state, as shown in FIG. 16 mentioned above, the operation control portion 13 turns off the switch 183 (the switch 183b and the switch 183c).

FIG. 18 shows a case that, with the load LD being driven by turning on the switch LS by the controller CNT, when the operation control portion 13 determines that the electric charge stored in the charge storage portion 182 is attenuated to a predetermined amount and progress of attenuation is fast because the load LD is driven, the operation control portion 13 turns on the switch 183b and drives the output control portion 14 to cause the power generation portion 12 to generate power, and the operation control portion 13 also turns on the switch 183c and outputs the electric power generated in the power generation portion 12 together with the electric power from the charge storage portion 182 as the controller electric power for the controller CNT and the load drive power for the load LD. An amount of electric power generated per unit time in the power generation portion 12 may be set to be larger than an amount when storing electric charge in the charge storage portion 182 (charging) shown in FIG. 17.

<Power Generation Portion 12>

The power generation portion 12 applied to the power generation module according to this embodiment has, as shown in FIG. 3, a structure for generating predetermined electric power (first electric power) required for driving the device DVC (load LD) by using the physical or chemical energy of the power generation fuel FL supplied from the fuel pack 20 based on the start-up control by the operation control portion 13. As a concrete structure of the power generation portion 12, it is possible to apply various kinds of conformation, for example, one using the electrochemical reaction using the power generation fuel FL supplied from the fuel pack 20 (fuel cell), one using the thermal energy involved by the combustion reaction (temperature difference power generation), one using the dynamic energy conversion action or the like for generating electric power by rotating the power generator by using the pressure energy involved by the combustion reaction or the like (internal combustion/external combustion engine power generation), or one for converting the fluid energy or the thermal energy of the power generation fuel FL into electric power by utilizing the principle of electromagnetic induction or the like (electromagnetic fluid mechanism power generator, thermoacoustic effect power generator, or the like).

Here, since the electric power (first electric power) generated by the power generation portion 12 is the main power supply for driving various functions (load LD) of the entire device DVC, the drive power characteristic is highly set. Therefore, when the above-described sub power supply portion 11 (charge storage portion 182) supplies the controller electric power of the device DVC or the operating electric power or the like for the operation control portion 13, the output control portion 14 and the power generation portion 12 and the power generation portion 12 supplies the load drive electric power for the load LD, the electric power supplied from the sub power supply portion 11 (second electric power) is different from the electric power supplied from the power generation portion 12 in property.

Each concrete example will now be briefly described hereinafter with reference to the drawings.

(First Structural Example of Power Generation Portion)

Figure 19:
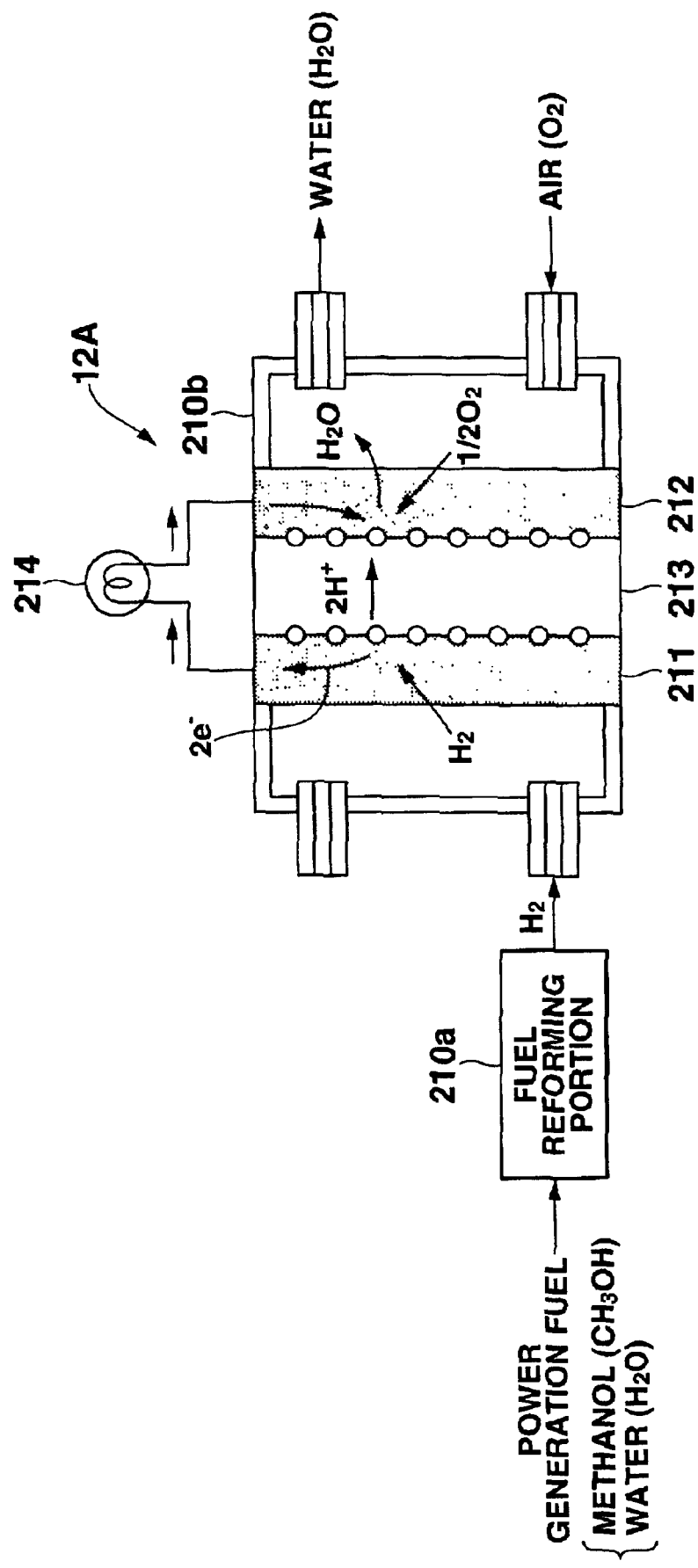
FIG. 19 is a schematic view showing a first structural example of a power generation portion applicable to the power generation module according to the embodiment.
Figure 20A:
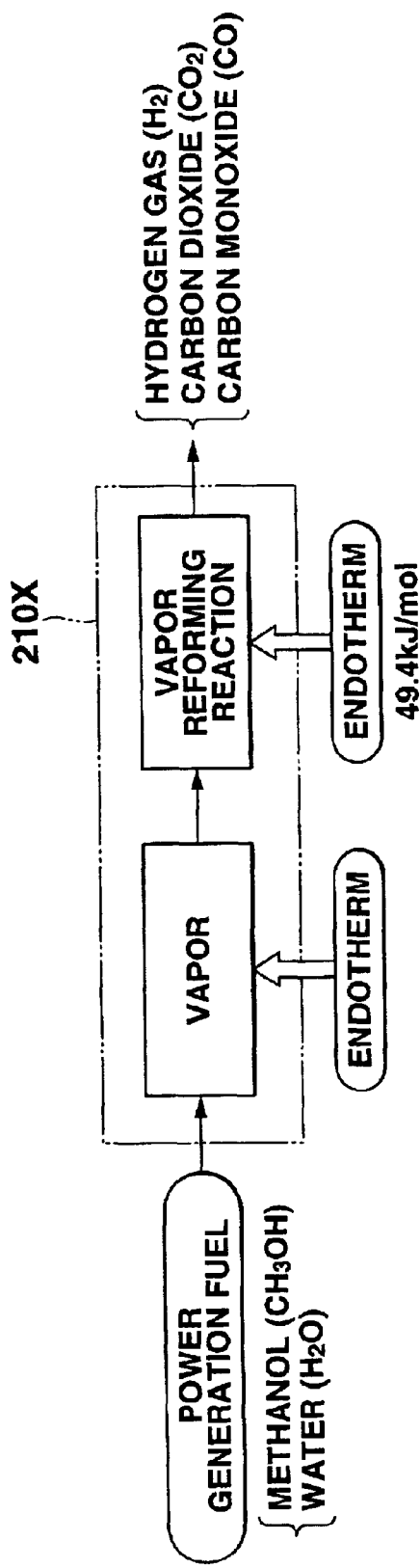
FIGS. 20A and 20B are perspective views showing a hydrogen generation process in a fuel reforming portion applied to the power generation portion according to the embodiment.
Figure 20B:
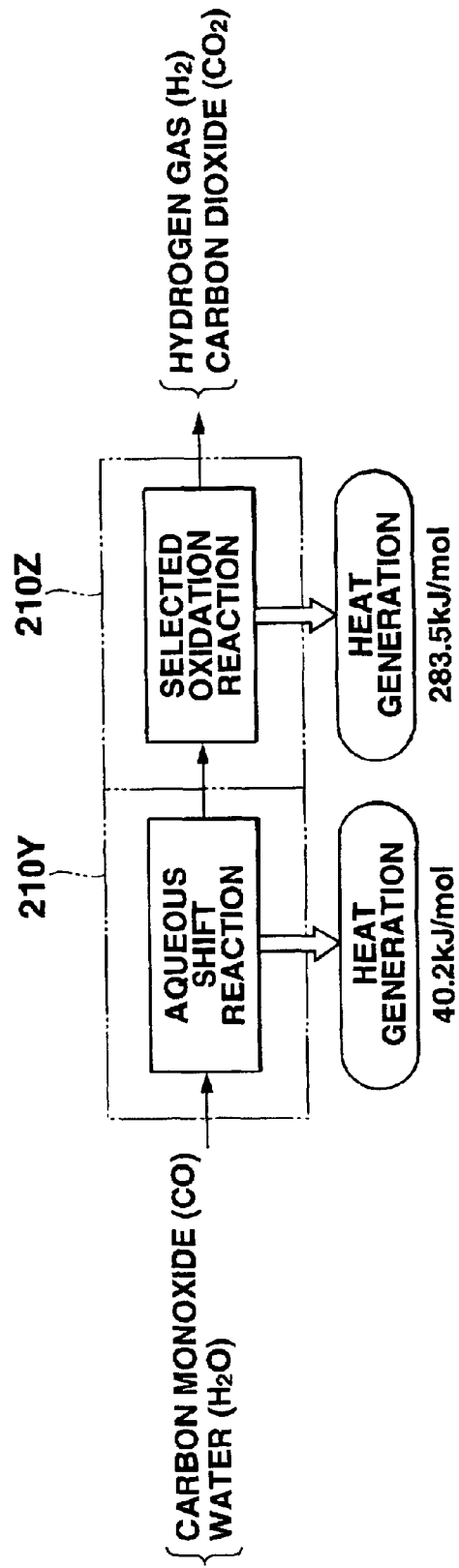

FIG. 19 is a view showing a first structural example of the power generation portion applicable to the power generation module according to this embodiment, and FIGS. 20A and 20B are views showing a hydrogen generation process in the fuel reforming portion applied to the power generation portion according to this structural example. Here, description will be given by appropriately making reference to the structure of the above-described power supply system (FIG. 3).

In the first structural example, as a concrete example, the power generation portion has a structure of a proton-exchange membrane fuel cell adopting a fuel reforming system by which the power generation fuel FL supplied from the fuel pack 20A through the output control portion 14 is used and electric power is generated by the electrochemical reaction.

As shown in FIG. 19, the power generation portion 12A is configured to roughly include: a fuel reforming portion (fuel reformer) 210a for extracting a predetermined fuel component (hydrogen) contained in the power generation fuel FL by utilizing a predetermined reforming reaction relative to the power generation fuel FL supplied from the fuel pack 20A; and a fuel cell portion 210b for generating a predetermined electric power (first electric power) for driving the load 214 (the device DVC or the load LD) by the electrochemical reaction utilizing the fuel component extracted by the fuel reforming portion 210a.

As shown in FIG. 20A, a vapor reforming reaction portion 210X of the fuel reforming portion 210a generally extracts the fuel component from the power generation fuel FL supplied from the fuel pack 20A via the output control portion 14 through each process consisting of evaporation and vapor reforming reactions. For example, in case of generating hydrogen gas ($H_2$) with methanol ($CH_3OH$) and water ($H_2O$) being used as the power generation fuel FL, in a vapor step, methanol ($CH_3OH$) and water ($H_2O$) are first vaporized by setting methanol and water as the liquid fuel in the atmosphere under a temperature condition of approximately a boiling point by the heater controlled by the output control portion 14.

Then, in the vapor reforming reaction process, by setting an atmosphere under a temperature condition of approximately 300° C. for vaporized methanol ($CH_3OH$) and water ($H_2O$) by using the heater, the thermal energy of 49.4 kJ/mol is absorbed, and hydrogen ($H_2$) and a small amount of carbon dioxide ($CO_2$) are generated as indicated by the following chemical equation (3). In the vapor reforming process, a small amount of carbon monoxide (CO) may be generated as a by-product besides hydrogen ($H_2$) and carbon dioxide ($CO_2$).

$$CH_3OH + H_2O \rightarrow 3H_2 + CO_2 \qquad (3)$$

Here, as shown in FIG. 20B, a selected oxidation catalyst portion 210Y for eliminating carbon monoxide (CO) generated as a by-product in the vapor reforming reaction may be provided at the rear stage of the vapor reforming reaction portion 210X so that carbon monoxide (CO) can be converted into carbon dioxide ($CO_2$) and hydrogen ($H_2$) through the respective processes consisting of the aqueous shift reaction and the selected oxidation reaction, thereby suppressing emission of harmful substances. Specifically, in the aqueous shift reaction process in the selected oxidation catalyst portion 210Y, the thermal energy of 40.2 kJ/mol is generated by causing water (vapor; $H_2O$) to react with carbon monoxide (CO), and carbon dioxide ($CO_2$) and hydrogen ($H_2$) are generated as indicated by the following chemical equation (4).

$$CO + H_2O \rightarrow CO_2 + H_2 \qquad (4)$$

Additionally, a selected oxidation reaction portion 210Z may be provided at the rear stage of the selected oxidation catalyst portion 210Y. In the selected oxidation reaction process, the thermal energy of 283.5 kJ/mol is generated by causing oxygen ($O_2$) to react with carbon monoxide (CO) which has not been converted into carbon dioxide ($CO_2$) and hydrogen ($H_2$) by the aqueous shift reaction, and carbon dioxide ($CO_2$) is generated as indicated by the following chemical equation (5). This selected oxidation reaction portion 210Z may be provided at the rear stage of the vapor reforming reaction portion 210X.

$$CO + (1/2)O_2 \rightarrow CO_2 \qquad (5)$$

A small amount of product (mainly carbon dioxide) other than hydrogen generated by a series of fuel at reforming reactions mentioned above is emitted into air through an emission hole (not shown; this will be described later in the concrete structural example) provided to the power generation module 10A.

The concrete structure of the fuel reforming portion having such a function will be explained later in the following concrete structural example together with other structures.

As shown in FIG. 19, as similar to the fuel direct supply type fuel cell applied to the above-described sub power supply portion 11, the fuel cell portion 210b generally includes: a fuel electrode (cathode) 211 consisting of a carbon electrode to which catalyst fine particles of, e.g., platinum, palladium, platinum-ruthenium adhere; an air electrode (anode) 212 consisting of a carbon electrode to which catalyst fine particles of, e.g., platinum adhere; and a film-like ion conductive membrane (exchange membrane) interposed between the fuel electrode 211 and the air electrode 212. Here, hydrogen gas ($H_2$) extracted by the fuel reforming portion 210a is supplied to the fuel electrode 211 from the power generation fuel FL whose amount supplied is controlled by the later-described output control portion 14, meanwhile oxygen gas ($O_2$) in air is supplied to the air electrode 212. As a result, power generation is carried out by the following electrochemical reaction, and electric power which can be predetermined drive electric power (voltage/electric current) is supplied to the load 214 (the load LD of the device DVC). Further, a part of the electric power generated in the fuel cell portion 210b is supplied to the fuel control portion 14a and/or the heater control portion 14e according to needs.

Specifically, as an example of the electrochemical reaction in the power generation portion 12 in this structural example, when hydrogen gas ($H_2$) is supplied to the fuel electrode 211, the electron ($e^-$) is separated by the catalysis at the fuel electrode 211, the hydrogen ion (proton; $H^+$) is generated and passes to the air electrode 212 side through the ion conductive membrane 213, and the electron ($e^-$) is taken out by the carbon electrode constituting the fuel electrode 211 and supplied to the load 214, as indicated by the following chemical equation (6).

$$3H_2 \rightarrow 6H^+ + 6e^- \qquad (6)$$

When air is supplied to the air electrode 212, the electron ($e^-$) which has passed through the load 214 by the catalysis at the air electrode 212, the hydrogen ion ($H^+$) which has passed through the ion conductive membrane, and the oxygen gas ($O_2$) in air react with each other, and water ($H_2O$) is thereby generated, as indicated by the following chemical equation (7).

$$6H^+ + (3/2)O_2 + 6e^- \rightarrow 3H_2O \qquad (7)$$

Such a series of the electrochemical reactions (chemical equations (6) and (7)) proceeds in the relatively low temperature environment of approximately 60 to 80° C., and the by-product other than the electric power (load drive electric power) is basically only water ($H_2O$). Here, by collecting water ($H_2O$) as a by-product generated at the air electrode 212 and supplying a necessary amount of water to the fuel reforming portion 210a mentioned above, water can be reused for the fuel reforming reaction or the aqueous shift reaction of the power generation fuel FL, an amount of water ($H_2O$) stored (charged) in the fuel pack 20A in advance for the fuel reforming reaction can be greatly reduced, and a collection amount in by-product collecting means which is provided in the fuel pack 20A and collects by-products can be considerably decreased. It is to be noted that the structure of the by-product collecting means for collecting and reusing the by-product such as water ($H_2O$) generated at the air electrode 212 will be described later together with the by-product collecting means in the above-described sub power supply portion 11.

The electric power produced by the above-described electrochemical reaction and supplied to the load 214 depends on an amount of hydrogen gas ($H_2$) supplied to the power generation portion 12A (the fuel electrode 211 of the fuel cell portion 210b). The electric power supplied to the device DVC can be arbitrarily adjusted by controlling an amount of the power generation fuel FL (substantially hydrogen gas) supplied to the power generation portion 12 through the output control portion 14 and, for example, it can be set so as to be equivalent to one of general-purpose chemical cells.

With application of the fuel reforming type fuel cell having such a structure to the power generation portion, since arbitrary electric power can be effectively generated by controlling an amount of the supplied power generation fuel FL by the output control portion 14, an appropriate power generation operation according to the drive state of the device DVC (load LD) can be realized based on the load drive information. Furthermore, with application of the structure as the fuel cell, since electric power can be directly produced from the power generation fuel FL by the electrochemical reaction, the very high power generation efficiency can be realized, and the power generation fuel FL can be effectively used or the power generation module 10A including the power generation portion 12 can be minimized.

As similar to the sub power supply portion 11 (see the first structural example) mentioned above, although description has been given on only the case that methanol is applied as the power generation fuel FL, the present invention is not restricted thereto, and a liquid fuel or a liquefied fuel or a gas fuel including at least a hydrogen element can suffice. It is, therefore, possible to excellently apply an alcohol-based liquid fuel such as methanol, ethanol or butanol, a liquefied fuel consisting of hydrocarbon which can be vaporized at an ordinary temperature under an ordinary pressure such as dimethyl ether, isobutene or natural gas, a gas fuel such as hydrogen gas, or the like.

Here, in case of using liquefied hydrogen or hydrogen gas as it is as the power generation fuel FL, it is possible to adopt the structure by which the power generation fuel FL whose amount supplied is solely controlled by the output control portion 14 is directly supplied to the fuel cell portion 210b without requiring a fuel reforming portion 210a such as described in this structural example. Furthermore, although only the fuel reforming type fuel cell has been described as the structure of the power generation portion 12, the present invention is not restricted thereto. As similar to the above-described sub power supply portion (see first structural example) 11, although the electric power generation efficiency is low, the fuel direct supply type fuel cell may be applied, and a liquid fuel, a liquefied fuel, a the gas fuel or the like may be used in order to generate electric power.

(Second Structural Example of Power Generation Portion)

Figure 21A:
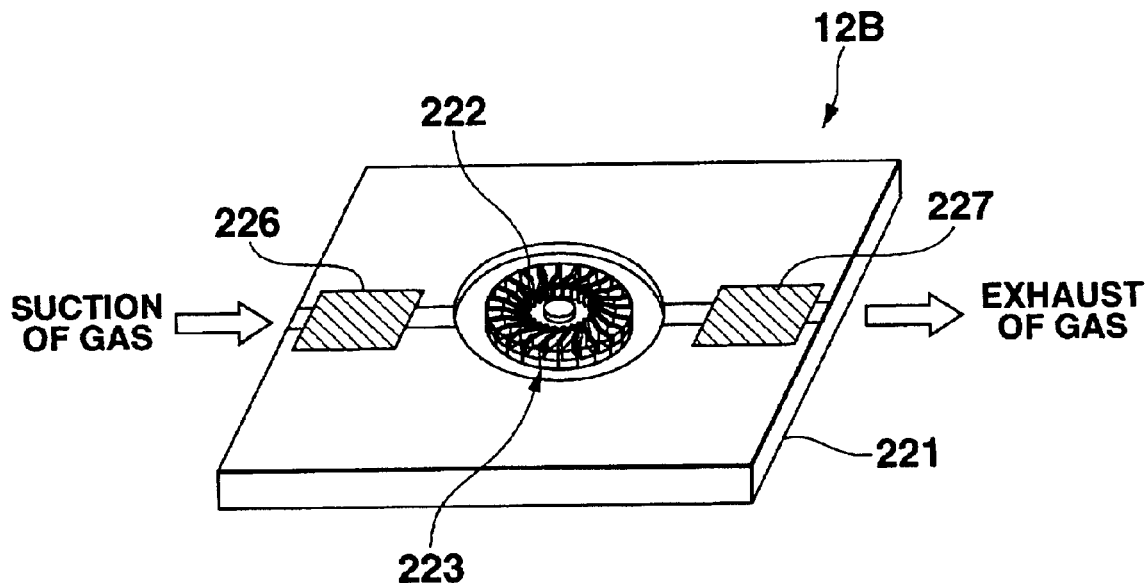
FIGS. 21A and 21B are views schematically showing a second structural example of the power generation portion applicable to the power generation module according to the embodiment.
Figure 21B:
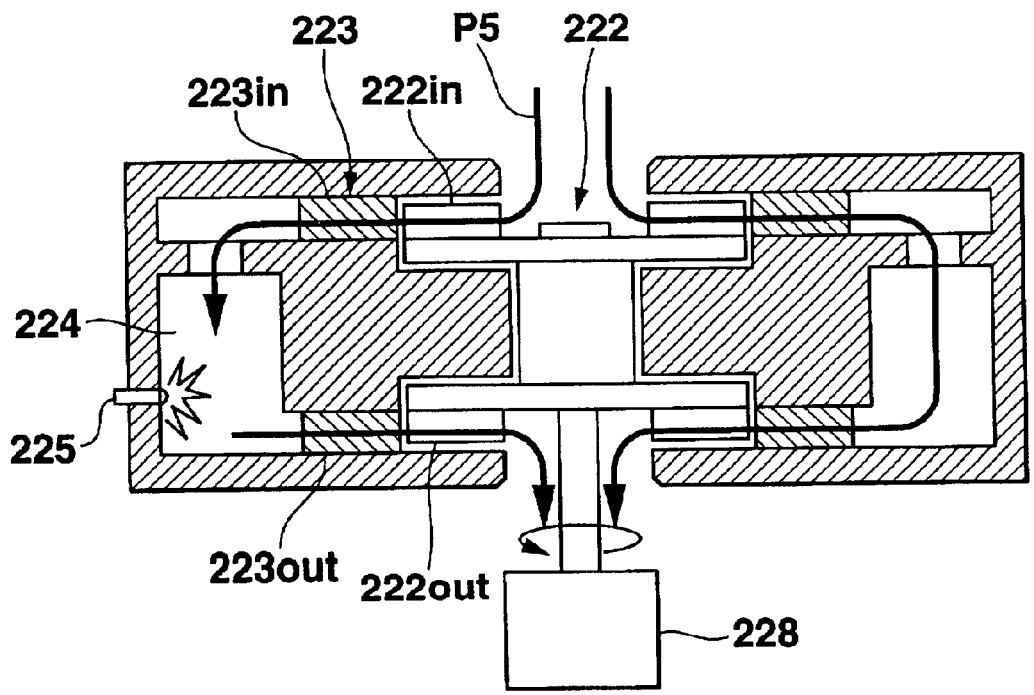

FIGS. 21A and 21B are views showing a second structural example of the power generation portion applicable to the power generation module according to this embodiment.

In the second structural example, as a concrete example, the power generation portion has a structure as a power generation device which uses the power generation fuel FL supplied from the fuel pack 20A through the output control portion 14, drives the gas combustion turbine (internal combustion engine) by the pressure energy involved by the combustion reaction and converts the drive energy into electric power.

As shown in FIGS. 21A and 21B, the power generation portion 12B according to this structural example generally includes: a movable blade 222 configured in such a manner that a plurality of blades are curved in a predetermined direction on the circumference, and suction blades 222*in* and exhaust blades 222*out* which are arranged on the circumference to substantially radially extend are coaxially connected to each other and capable of rotating; a fixed blade 223 consisting of suction blades 223*in* and exhaust blades 223*out*, which is configured in such a manner that a plurality of blades are curved in an opposite direction to that of the movable blade 222 (the suction blades 222*in* and the exhaust blades 222*out*) along the outer peripheral side of the movable blade 222, arranged on the circumference to substantially radially extend and fixed relatively to the movable blade 222; a combustion chamber 224 for burning the power generation fuel (fuel gas) FL sucked by the movable blade 222 with a predetermined timing; an ignition portion 225 for igniting the fuel gas sucked into the combustion chamber 224; a power generator 228 which is connected to the rotation center of the movable blade 222 and converts the rotational energy of the movable blade 222 into electric power based on the principle of known electromagnetic induction or piezoelectric conversion; a suction control portion 226 for controlling supply (intake) of the vaporized fuel gas to the gas combustion turbine made up of the movable blade 222 and the fixed blade 223; and an exhaust control portion 227 for controlling exhaust of the fuel gas (exhaust gas) after combustion in the gas combustion turbine. As to the structure of the power generation portion 12B including the gas combustion turbine, the suction control portion 226 and the exhaust control portion 227, the power generation portion 12B can be integrated and formed in a small space of the millimeter order on, e.g., a silicon chip 221 by applying the micromachine manufacturing technique as similar to the above-described sub power supply portion 11. In FIG. 21A, in order to clarify the structure of the gas combustion turbine, the suction blades 222*in* and 223*in* are illustrated so as to be exposed for the sake of convenience.

In such a power generation portion 12B, for example, as shown in FIG. 21B, when the fuel gas sucked from the suction blades 222*in* and 223*in* side of the gas combustion turbine through the suction control portion 226 is ignited by the ignition portion 225 in the combustion chamber 224 with a predetermined timing, burned and emitted from the exhaust blades 222*out* and 223*out* side (arrows P5), a vortex flow of the fuel gas is generated along the curved direction of the movable blade 222 and the fixed blade 223, and suction and exhaust of the fuel gas are automatically carried out by the vortex flow. Furthermore, the movable blade 222 continuously rotates in a predetermined direction, thereby driving the power generator 228. Consequently, the fuel energy obtained by the fuel gas is converted into electric power through the gas combustion turbine and the power generator 228.

Since the power generation portion 12B according to this structural example has a structure for generating electric power by using the combustion energy of the fuel gas, the power generation fuel (fuel gas) FL supplied from the fuel pack 20A must have at least the ignitability or combustibility. For example, it is possible to excellently apply an alcohol-based liquid fuel such as methanol, ethanol or butanol, a liquefied fuel consisting of hydrocarbon which is vaporized at an ordinary temperature under an ordinary pressure such as dimethyl ether, isobutene or natural gas, or a gas fuel such as a hydrogen gas.

In case of applying the structure by which the fuel gas (exhaust gas) after combustion is directly exhausted to the outside of the power supply system 301, it is needless to say that the flame resisting processing or the detoxication processing must be carried out before emitting the exhaust gas to the outside or means for collecting the exhaust gas must be provided if the exhaust gas contains a combustible or toxic component.

By applying the gas combustion turbine having such a structure to the power generation portion, as similar to the first structural example described above, since arbitrary electric power can be generated by the simple control method for adjusting an amount of the power generation fuel FL to be supplied, an appropriate power generation operation according to the drive state of the device DVC can be realized. Furthermore, by applying the structure as the micro-fabricated gas combustion turbine, electric power can be generated with the relatively high energy conversion efficiency, and the power generation module 10A including the power generation portion 12 can be minimized while effectively utilizing the power generation fuel FL.

(Third Structural Example of Power Generation Portion)

FIGS. 22A to 22D are view for illustrating the operation of a third structural example of the power generation portion applicable to the power generation module according to this embodiment.

In the third structural example, as a concrete example, the power generation portion has a structure as a power generation device which uses the power generation fuel FL supplied from the fuel pack 20A through the output control portion 14, drives a rotary engine (internal combustion engine) by the pressure energy obtained by the combustion reaction and converts the drive energy into electric power.

As shown in these drawings, the power generation portion 12C according to the third structural example includes: a housing 231 having an operation space 231*a* whose cross section is substantially elliptical; a rotor 232 which rotates while being eccentric along the inner wall of the operation space 231*a* and has a substantially triangular cross section; a known rotary engine provided with an ignition portion 234 which ignites and burns the compressed fuel gas; and a power generator (not shown) directly connected to a central shaft 233. As to the structure of the power generation portion 12C consisting of the rotary engine, as similar to each structural example mentioned above, the power generation portion 12C can be integrated and formed in a small space by applying the micromachine manufacturing technique.

In the power generation portion 12C having such a structure, by repeating each stroke of suction, compression, combustion (explosion) and exhaust carried out by rotation of the rotor 232, the pressure energy caused due to combustion of the fuel gas is converted into the rotational energy and the converted energy is transmitted to the power generator. That is, in the suction stroke, as shown in FIG. 22A, the fuel gas is sucked from an inlet 235*a* and charged into a predetermined operation chamber AS formed by the inner wall of the operation space 231*a* and the rotor 232. Subsequently, after the fuel gas in the operation chamber AS is compressed to have a high pressure in the compression stroke as shown in FIG. 22B, the fuel gas is ignited and burned (exploded) by the ignition portion 234 with a predetermined timing in the combustion stroke as shown in FIG. 22C, and the exhaust gas after combustion is emitted from the operation chamber AS through the outlet 235*b* in the exhaust stroke as shown in FIG. 22D. In this series of drive strokes, rotation of the rotor 232 in a predetermined direction (arrows P6) is maintained by the pressure energy involved by explosion and combustion of the fuel gas in the combustion stroke, and transmission of the rotational energy to the central shaft 233 is continued. As a result, the combustion energy obtained by the fuel gas is converted into the rotational energy of the central shaft 233 and further converted into electric power by the power generator (not shown) connected to the central shaft 233.

As to the structure of the power generator in this example, a known power generator utilizing electromagnetic induction or piezoelectric conversion can be applied as similar to the second structural example mentioned above.

In addition, since this structural example also has the structure for generating electric power based on the combustion energy of the fuel gas, the power generation fuel (fuel gas) FL must have at least the ignitability or combustibility. Additionally, in case of applying the structure for directly emitting the fuel gas after combustion (exhaust gas) to the outside of the power supply system 301, it can be understood that the flame resisting processing or the detoxication processing must be carried out before emitting the exhaust gas to the outside or means for collecting the exhaust gas must be provided if the exhaust gas contains a combustible or toxic substance.

By applying the rotary engine having such a structure to the power generation portion, as similar to each structural example mentioned above, since arbitrary electric power can be generated by the simple control method for adjusting an amount of the power generation fuel FL to be supplied, an appropriate power generation operation according to the drive state of the device can be realized. Further, by applying the structure as the micro-fabricated rotary engine, the power generation module 10A including the power generation portion 12 can be minimized while generating electric power by the relatively simple structure and the operation producing less vibration.

(Fourth Structural Example of Power Generation Portion)

Figure 23B:
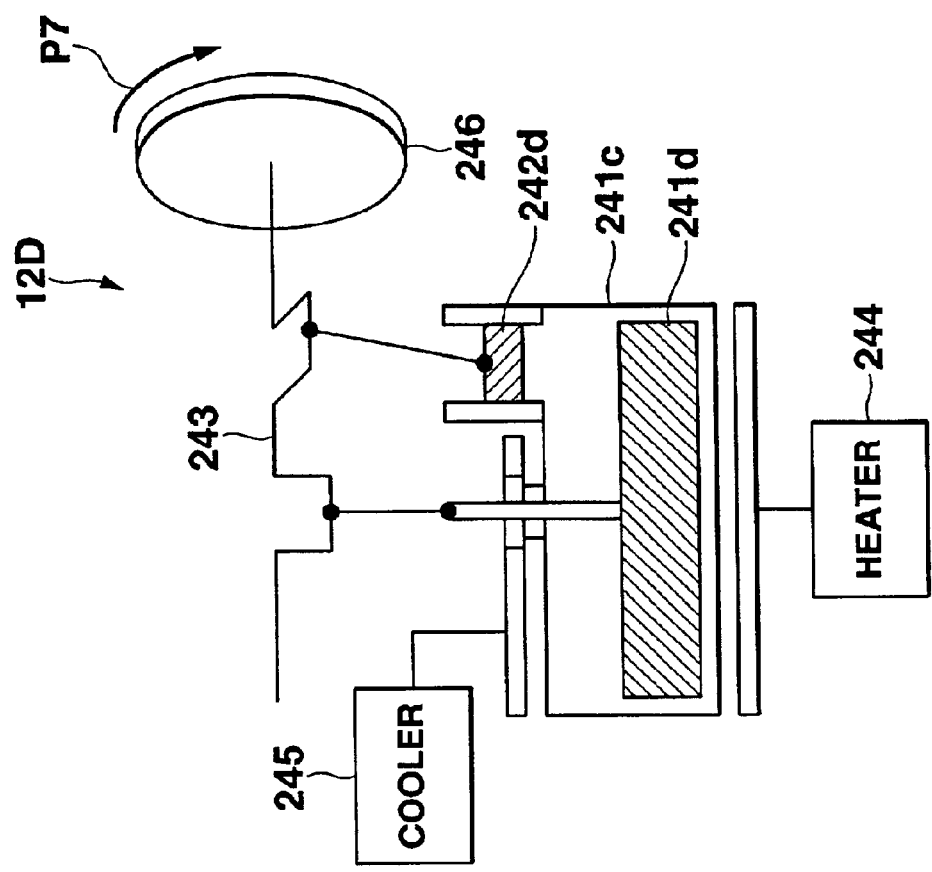
FIGS. 23A and 23B are views schematically showing a fourth structural example of the power generation portion applicable to the power generation module according to the embodiment.
Figure 23A:
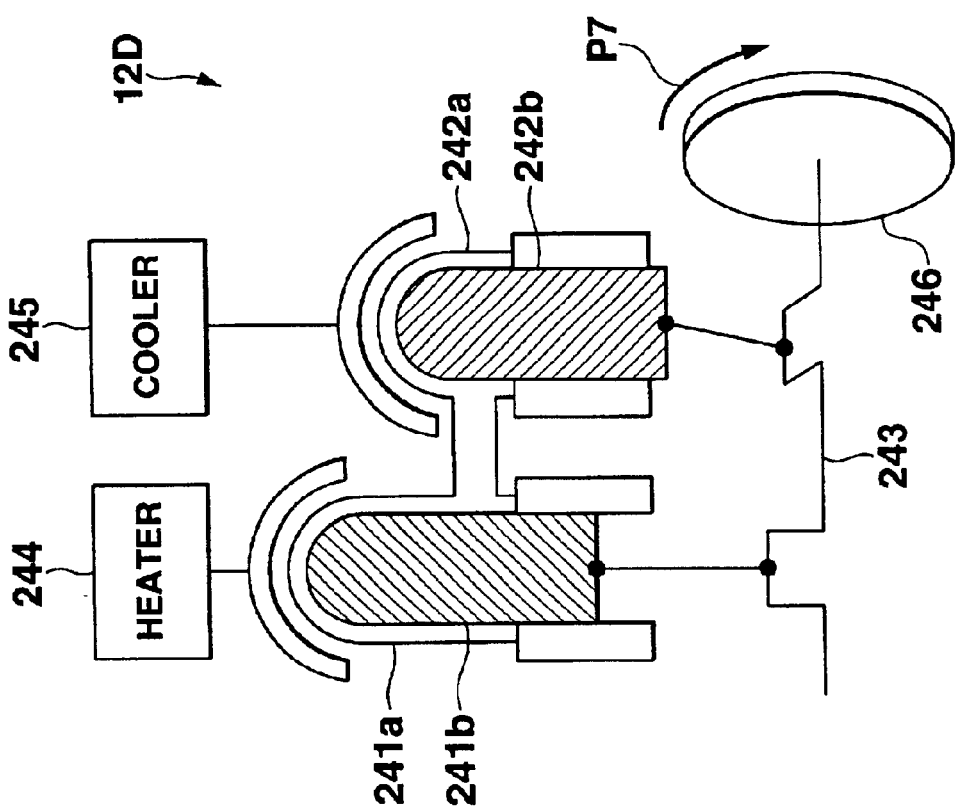

FIGS. 23A and 23B are schematic structural views showing a fourth structural example of the power generation portion applicable to the power generation module according to this embodiment. Here, only the basic structures (two-piston type and displacer type) of a known stirling engine applied to the fourth structural example are illustrated, and the operation will be described in the simple manner.

In the fourth structural example, as a concrete example, the power generation portion has a structure as a power generation device which uses the power generation fuel FL supplied from the fuel pack 20A through the output control portion 14, drives a stirling engine (external combustion engine) by the thermal energy obtained by the combustion reaction and converts the drive energy into electric power.

In the power generation portion 12D according to the fourth structural example, as shown in FIG. 23A, the two-piston type stirling engine generally includes: a high-temperature (expansion) side cylinder 241a and a low-temperature (compression) side cylinder 242a which are constituted to allow operative gas to reciprocate; a high-temperature side piston 241b and a low-temperature side piston 242b which are provided in these cylinders 241a and 242a and connected to a crank shaft 243 so as to reciprocate with a phase difference of 90°; a heater 244 for heating the high-temperature side cylinder 241a; a cooler 245 for cooling the low-temperature side cylinder 242a; a known stirling engine provided with a fly wheel 246 connected to the shaft of the crank shaft 243; and a power generator (not shown) directly connected to the crank shaft 243.

In the power generation portion 12D having such a structure, the high-temperature side cylinder 241a is maintained to be constantly heated by the thermal energy involved by combustion of the fuel gas, while the low-temperature side cylinder 242a is maintained to be constantly cooled by being brought into contact with or exposed to other areas inside and outside the power supply system 301 such as outside air, and each stroke of isochoric heating, isothermal expansion, isochoric cooling and isothermal compression is repeated. As a result, the kinetic energy for reciprocating the high-temperature side piston 241b and the low-temperature side piston 242b is converted into the rotational energy of the crank shaft 243 and transmitted to the power generator.

That is, in the isochoric heating process, when thermal expansion of the operative gas is commenced and the high-temperature side piston 241b starts to move down, in the low-temperature side cylinder 242a having a small capacity which is a space communicating with the high-temperature side cylinder 241a, the low-temperature side piston 242b moves up by reduction in pressure involved by sudden drop of the high-temperature side piston 241b, and the cooled operative gas of the low-temperature side cylinder 242a flows into the high-temperature side cylinder 241a. Subsequently, in the isothermal expansion stroke, the cooled operative gas which has flowed into the high-temperature side cylinder 241a is sufficiently thermally expanded and increases the pressure of the space in the high-temperature side cylinder 241a and the low-temperature side cylinder 242a, and both the high-temperature side piston 241b and the low-temperature side piston 242b move down.

Then, in the isochoric cooling stroke, the space in the low-temperature side cylinder 242a is increased by drop of the low-temperature side piston 242b, and the space in the high-temperature side cylinder 241a is contracted based on this. Furthermore, the high-temperature side piston 241b moves up, and the operative gas of the high-temperature side cylinder 241a flows into the low-temperature side cylinder 242a and is cooled. Thereafter, in the isothermal compression stroke, the cooled operative gas filled in the space within the low-temperature side cylinder 242a is contracted, and the both continuous spaces in the low-temperature side cylinder 242a and the high-temperature side cylinder 241a are reduced in pressure. Moreover, both the high-temperature side piston 241b and the low-temperature side piston 242b move up, and the operative gas is compressed. In this series of drive strokes, rotation of the crank shaft 243 in a predetermined direction (arrows P7) is maintained by due to heating and cooling of the fuel gas the reciprocating motion of the pistons. As a result, the pressure energy of the operative gas is converted into the rotational energy of the crank shaft 243 and then converted into electric power by the power generator (not shown) connected to the crank shaft 243.

On the other hand, in the power generation portion 12D according to the fourth structural example, as shown in FIG. 23B, the displacer type stirling engine is configured to generally include: a cylinder 241c god having a high-temperature space and a low-temperature space which are partitioned by a displacer piston 241d and in which the operative gas can reciprocate; a displacer piston 241d which is provided in the cylinder 241c and configured to be capable of reciprocating; a power piston 242d which reciprocates in accordance with a change in pressure in the cylinder 241c; a crank shaft 243 to which the displacer piston 241d and the power piston 242d are connected so as to have a phase difference of 90°; a heater 244 for heating one end side (high-temperature space side) of the cylinder 241c; a cooler 245 for cooling the other end side (low-temperature space side) of the cylinder 241c; a known stirling engine provided with a fly wheel 246 connected to the shaft center of the crank shaft 243; and a power generator (not shown) directly connected to the crank shaft 243.

In the power generation portion 12D having such a structure, the high-temperature side of the cylinder 241c is maintained to be constantly heated by the thermal energy involved by combustion of the fuel gas, while the low-temperature side space of the same is maintained to be constantly cooled. Moreover, by repeating each stroke of isochoric heating, isothermal expansion, isochoric cooling and isothermal compression, the kinetic energy for reciprocating the displacer piston 241d and the power piston 242d with a predetermined phase difference is converted into the rotational energy of the crank shaft 243 and transmitted to the power generator.

That is, in the isochoric heating stroke, when thermal expansion of the operative gas by the heater 244 is commenced and the displacer piston 241 starts to move up, the operative gas on the low-temperature space side flows to the high-temperature space side and is heated. Subsequently, in the isothermal expansion stroke, the increased operative gas on the high-temperature space side is thermally expanded and the pressure is increased. As a result, the power piston 242d moves up. Then, in the isochoric cooling stroke, when the displacer piston 241d moves down by inflow of the operative gas thermally expanded by the heater 244 to the low-temperature space side, the operative gas on the high-temperature space side flows into the low-temperature space side and is cooled. Thereafter, in the isothermal compression stroke, the operative gas cooled in the cylinder 241c on the low-temperature space side is contracted and the pressure in the cylinder 241c on the low-temperature space side is reduced, which results in drop of the power piston 242d. In this series of drive strokes, rotation of the crank shaft 243 in a predetermined direction (arrows P7) is maintained by heating of the operative gas and the reciprocating motion of the pistons involved by cooling. Consequently, the pressure energy of the operative gas is converted into the rotational energy of the crank shaft 243 and further converted into electric power by the power generator (not shown) connected to the crank shaft 243.

Here, as to the structure of the power generator, as similar to the second and third structural examples, a known power generator utilizing electromagnetic induction or piezoelectric conversion can be applied. Further, as to the structure of the power generation portion 12D provided with the stirling engine shown in FIGS. 23A and 23B, this power generation portion can be also integrated and formed in a small space as similar to each structural example mentioned above. Furthermore, in this structural example, since there is employed the structure for generating electric power based on the thermal energy involved by combustion of the fuel gas, the power generation fuel (fuel gas) must have at least the ignitability or combustibility.

By applying the stirling engine having such a structure to the power generation portion, as similar to the above-described third structural example, arbitrary electric power can be generated by the simple control method for adjusting an amount of the power generation fuel FL to be supplied, and hence an appropriate power generation operation according to the drive state of the device DVC (load LD) can be realized. Moreover, by applying a construction as a minimized sterling engine, the power generation module 10A including the power generation portion 12 can be minimized while generating electric power with the relatively simple structure and the operation with less vibrations.

Incidentally, in the second to fourth structural examples mentioned above, although the power generation device provided with the gas combustion turbine, the rotary engine and the stirling engine has been exemplified as the power generation device for converting a change in the gas pressure based on the combustion reaction of the power generation fuel FL into electric power through the rotational energy, the present invention is not restricted thereto. It is needless to say that it is possible to apply a combined use of various kinds of the internal combustion engine or the external combustion engine such as a pulse combustion engine and the power generator utilizing the principle of known electromagnetic induction or piezoelectric conversion.

(Fifth Structural Example of Power Generation Portion)

Figure 24A:
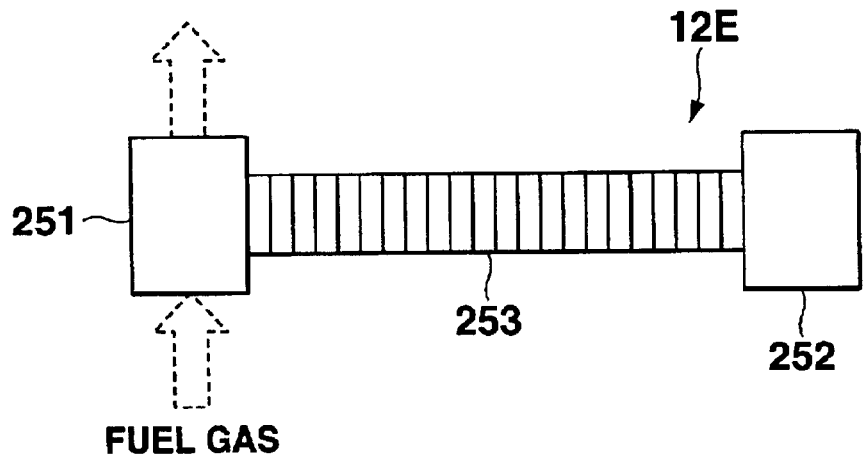
FIGS. 24A and 24B are views schematically showing a fifth structural example of the power generation portion applicable to the power generation module according to the embodiment.
Figure 24B:
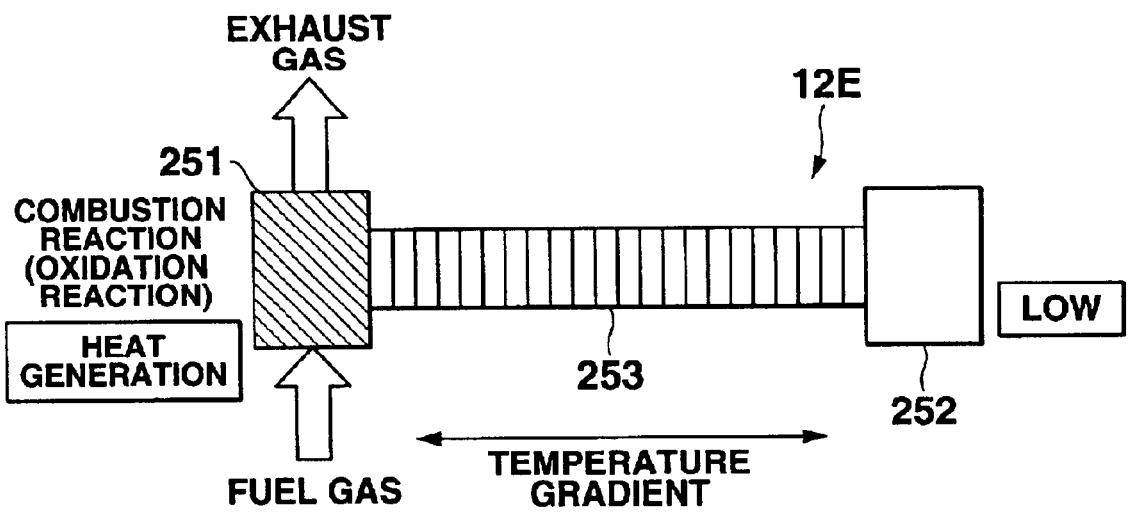

FIGS. 24A and 24B are schematic structural views showing a fifth structural example of the power generation portion applicable to the power generation module according to this embodiment.

In the fifth structural example, as a concrete example, the power generation portion has a structure of a power generation device which uses the power generation fuel FL supplied from the fuel pack 20A through the output control portion 14 and generates electric power by thermoelectric conversion power generation utilizing a difference in temperature caused due to production of the thermal energy based on the combustion reaction (oxidation reaction).

As shown in FIG. 24A, the power generation portion 12E according to the fifth structural example has a construction of a temperature-difference power generation generally including: a combustion heater 251 for generating the thermal energy by subjecting the power generation fuel FL to the combustion reaction (oxidation reaction); a fixed temperature portion 252 for maintaining a substantially fixed temperature; and a thermoelectric conversion element 253 connected between first and second temperature ends, the combustion heater 251 being determined as the first temperature end and the fixed temperature portion 252 as the second temperature end. Here, the thermoelectric conversion element 253 has the structure equivalent to that shown in FIG. 8B. The combustion heater 251 continuously maintains the combustion reaction to keep a high temperature by receiving the power generation fuel FL, while the fixed temperature portion 252 is configured to maintain a substantially fixed temperature (for example, an ordinary temperature or a low temperature) by being brought into contact with or exposed to other areas inside and outside the power supply system 301. As to the structure of the power generation portion 12E consisting of the temperature difference power generator shown in FIG. 24A, the power generation portion is also integrated and formed in a small space as similar to each structural example mentioned above.

In the power generation portion 12E having such a structure, as shown in FIG. 24B, when the power generation fuel charged in the fuel pack 20A is supplied to the combustion heater 251 through the output control portion 14, the combustion (oxidation) reaction proceeds in accordance with an amount of the power generation fuel to be supplied, and heat is generated, thereby increasing a temperature of the combustion heater 251. On the other hand, since a temperature of the fixed temperature portion 252 is determined to be set substantially constant, a difference in temperature is produced between the combustion heater 251 and the fixed temperature portion 252. Based on this difference in temperature, predetermined electromotive force is generated and electric power is then produced by the Seebeck effect in the thermoelectric conversion element 253.

By applying the temperature difference power generator having such a structure, as similar to each structural example mentioned above, arbitrary electric power can be generated by the simple control method for adjusting an amount of the power generation fuel FL to be supplied, and an appropriate power generation operation according to the drive state of the device DVC (load LD) can be hence realized. In addition, by applying the structure as the micro-fabricated temperature difference power generator, the power generation module 10A including the power generation portion 12 can be minimized while generating electric power by the relatively simple structure and the operation with less vibrations.

Incidentally, although description has been given as to the temperature difference power generator for generating electric power by the Seebeck effect based on a difference in temperature in the combustion heater 251 and the fixed temperature portion 252, the present invention is not restricted thereto and may have a structure for generating electric power based on the thermoelectronic emission phenomenon.

(Sixth Structural Example of Power Generation Portion)

Figure 25A:
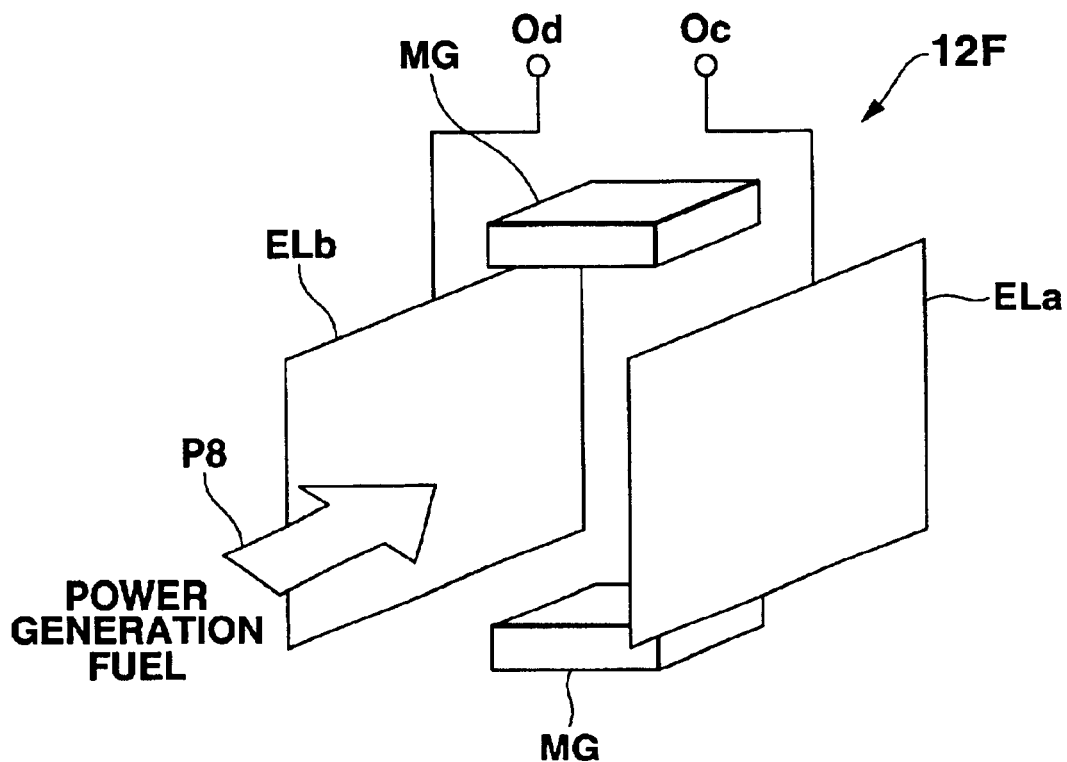
FIGS. 25A and 25B are views schematically showing a sixth structural example of the power generation portion applicable to the power generation module according to the embodiment.
Figure 25B:
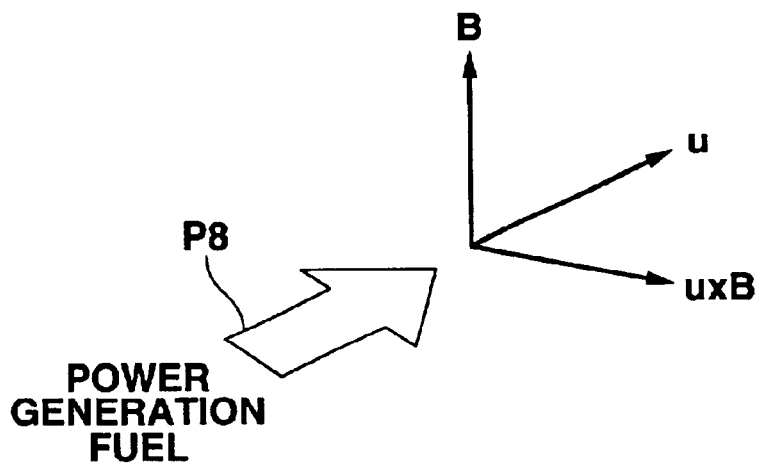

FIGS. 25A and 25B are schematic structural views showing a sixth structural example of the power generation portion applicable to the power generation module according to this embodiment.

In the sixth structural example, as a concrete example, the power generation portion has a structure as a power generation device which uses the power generation fuel FL supplied from the fuel pack 20A through the output control portion 14 and generates electric power (electromotive force) based on the principle of the magneto-hydro-dynamics.

As shown in FIG. 25A, the power generation portion 12F according to the sixth structural example has a structure of an MHD (Magneto-Hydro-Dynamics) power generator generally including: a pair of electrodes ELa and ELb which constitute side walls of a flow path along which the power generation fuel FL consisting of a conductive fluid passes in the form of a predetermined flux and are opposed to each other; magnetic field generating means MG including a Nd—Fe—B-based neodymium permanent magnet which generates a magnetic field having a predetermined intensity in a direction perpendicular to both the opposed direction of the electrodes ELa and ELb and the flow path direction of the power generation fuel FL; and output terminals Oc and Od individually connected to the respective electrodes ELa and ELb. Here, the power generation fuel FL is a conductive fluid (working fluid) such as plasma, a liquid metal, a liquid containing conductive substances, or gas, and its flow path is formed so that the power generation fuel FL can flow in a direction (arrow P8) parallel to the electrodes ELa and ELb. It is to be noted that the power generation portion 12F according to this structural example can be also integrated and formed in a small space by applying the micromachine manufacturing technique as similar to each structural example described above.

In the power generation portion 12F having such a structure, as shown in FIG. 25B, by generating a magnetic field B vertical to the flow path direction of the power generation fuel by the magnetic field generating means MG, and by moving the power generation fuel (conductive fluid) FL with the flux u into the flow path direction, the electromotive force u×B is induced when the power generation fuel FL comes across the magnetic field, based on the Faraday's law of electromagnetic induction, the enthalpy which the power generation fuel FL has is converted into electric power, and an electric current is caused to flow to the load (not shown) connected between the output terminals Oc and Od. As a result, the thermal energy that the power generation fuel FL has is directly converted into electric power.

Incidentally, in case of applying the structure for directly emitting the power generation fuel (conductive fluid) FL which has passed along the flow path of the MHD power generator to the outside of the power supply system 301, it is needless to say that the flame resisting processing or the detoxication processing must be carried out before emitting the power generation fuel FL to the outside or means for collecting the power generation fuel FL must be provided if the power generation fuel FL contains a combustible or toxic component.

By applying the MHD power generator having such a structure to the power generation portion, since arbitrary electric power can be generated by the simple control method for adjusting the speed of the power generation fuel FL moving along the flow path, an appropriate power generation operation according to the drive state of the device DVC can be realized. Further, by applying the structure as the micro-fabricated MHD power generator, the power generation module 10A including the power generation portion 12 can be minimized while generating electric power with the very simple structure requiring no drive parts.

Each structural example mentioned above is just an example of the power generation portion 12 applied to the power generation module 10A and is not intended to restrict the structure of the power supply system according to the present invention. In brief, the power generation portion 12 applied to the present invention may have any other structure as long as it can generate electric power based on the electrochemical reaction or heat generation, a temperature difference involved by the endoergic reaction, the conversion action of the pressure energy or the thermal energy, electromagnetic induction and the like in the power generation portion 12 when a liquid fuel or a liquefied fuel or a gas fuel charged in the fuel pack 20A is directly or indirectly supplied thereto. For example, it is possible to excellently apply a combined use of external force generating means utilizing the thermoacoustic effect and a power generator utilizing electromagnetic induction or piezoelectric conversion or the like.

Among the respective structural examples described above, the power generation portion 12 to which the second to fifth structural examples are applied is configured to use electric power (second electric power) supplied from the sub power supply portion 11 as start-up electric power as mentioned above for the ignition operation when taking out the thermal energy by subjecting the power generation fuel FL supplied to the power generation portion 12 to the combustion reaction or the like, as shown in FIG. 3.

<Operation Control Portion 13>

As shown in FIG. 3, the operation control portion 13 applied to the power generation module according to this embodiment operates with the operating electric power (second electric power) supplied from the above-described sub power supply portion 11, generates and outputs an operation control signal based on various kinds of information inside and outside the power supply system 301 according to this embodiment, namely, information (specifically, a detected voltage from a later-described voltage monitoring portion 16) concerning a change in a voltage component (output voltage) of the supply electric power which varies in accordance with the drive state of the device DVC (load LD) connected to the power supply system 301, and controls the operation state in the later-described power generation portion 12.

That is, specifically, the operation control portion 13 is driven with electric power generated by the sub power supply portion 11 when the power generation portion 12 is not operated. When the start-up command information for the load LD is detected from a change in voltage of the control electric power supplied to the device DVC, the operation control portion 13 outputs to the later-described start-up control portion 15 an operation control signal for starting up the output control portion 14 (start-up control). Furthermore, with the power generation portion 12 being in the operation mode, when information indicative of generation of a difference between electric power required for driving the load LD and electric power outputted to the load LD from the power generation portion 12 is detected from a change in voltage of the control electric power supplied to the device DVC (controller CNT), the operation control portion 13 outputs to the later-described output control portion 14 an operation control signal for adjusting an amount of electric power to be generated (amount of power generation) in the power generation portion 12. Thus, the load drive electric power supplied to the device DVC (load LD) can be an appropriate value according to the drive state of the load LD (feedback control).

On the other hand, with the power generation portion 12 being in the operation mode, when the state that a change in voltage of the load drive electric power supplied to the device DVC (load LD) deviates from a predetermined voltage range concerning the feedback control and becomes excessive is continuously detected for a predetermined time irrespective of execution of the feedback control, the operation control portion 13 outputs to the start-up control portion 15 an operation control signal for stopping the operation of the output control portion 14 (emergency stop control).

Furthermore, with the power generation portion 12 being in the operation mode, when the drive stop command information for the load LD is detected from a change in voltage of the control electric power supplied to the device DVC, the operation control portion 13 outputs to the start-up control portion 15 an operation control signal for stopping driving the output control portion 14 (normal stop control).

As will be described later, in case of applying the structures establishing electrical connection with the device DVC (load LD) by using only the positive and negative terminal electrodes as an outside shape of the power supply system 301 as similar to a general-purpose chemical cell, the drive state of the load LD can be detected by supplying the supply electric power consisting of the controller electric power or the load drive electric power to the device DVC through the positive and negative electrodes and constantly monitoring fluctuation of the voltage component of the supply electric power by using the voltage monitoring portion 16. Moreover, if the device DVC has a structure capable of outputting the load drive information concerning the drive state of the device DVC (load LD) from the controller CNT, the power supply system 301 may be provided with a terminal for inputting the load drive information besides the positive and negative terminal electrodes.

<Output Control Portion 14>

As shown in FIG. 3, the output control portion 14 applied to the power generation module according to this embodiment operates with electric power (start-up electric power) supplied from the above-described sub power supply portion 11 directly or through the start-up control portion 15 based on the operation control signal outputted from the operation control portion 13, and controls the operation state (the start-up operation, the steady operation, the stop operation, an amount of electric power to be generated (amount of power generation)) in the power generation portion 12.

Specifically, the output control portion 14 includes, for example, flow rate adjusting means (fuel control portion 14a) for adjusting a quantity of flow rate or a quantity of discharge of the power generation fuel, flow rate adjusting means (air control portion 14b) for adjusting a flow rate or a quantity of discharge of the power generation oxygen, heater temperature adjusting means (heater control portion 14e) for adjusting a temperature of a heater provided to the power generation portion 12 or the like. In the power generation portion 12 illustrated in each structural example mentioned above, the output control portion 14 controls the flow rate adjusting means and the heater temperature adjusting means based on the operation control signal for supply of the power generation fuel (a liquid fuel, a liquefied fuel, or a gas fuel) whose amount is required for generating and outputting the load drive electric power consisting of predetermined electric power and for optimization of a temperature of the heater for facilitating various kinds of reactions in the power generation portion 12 or the like.

Figure 26:
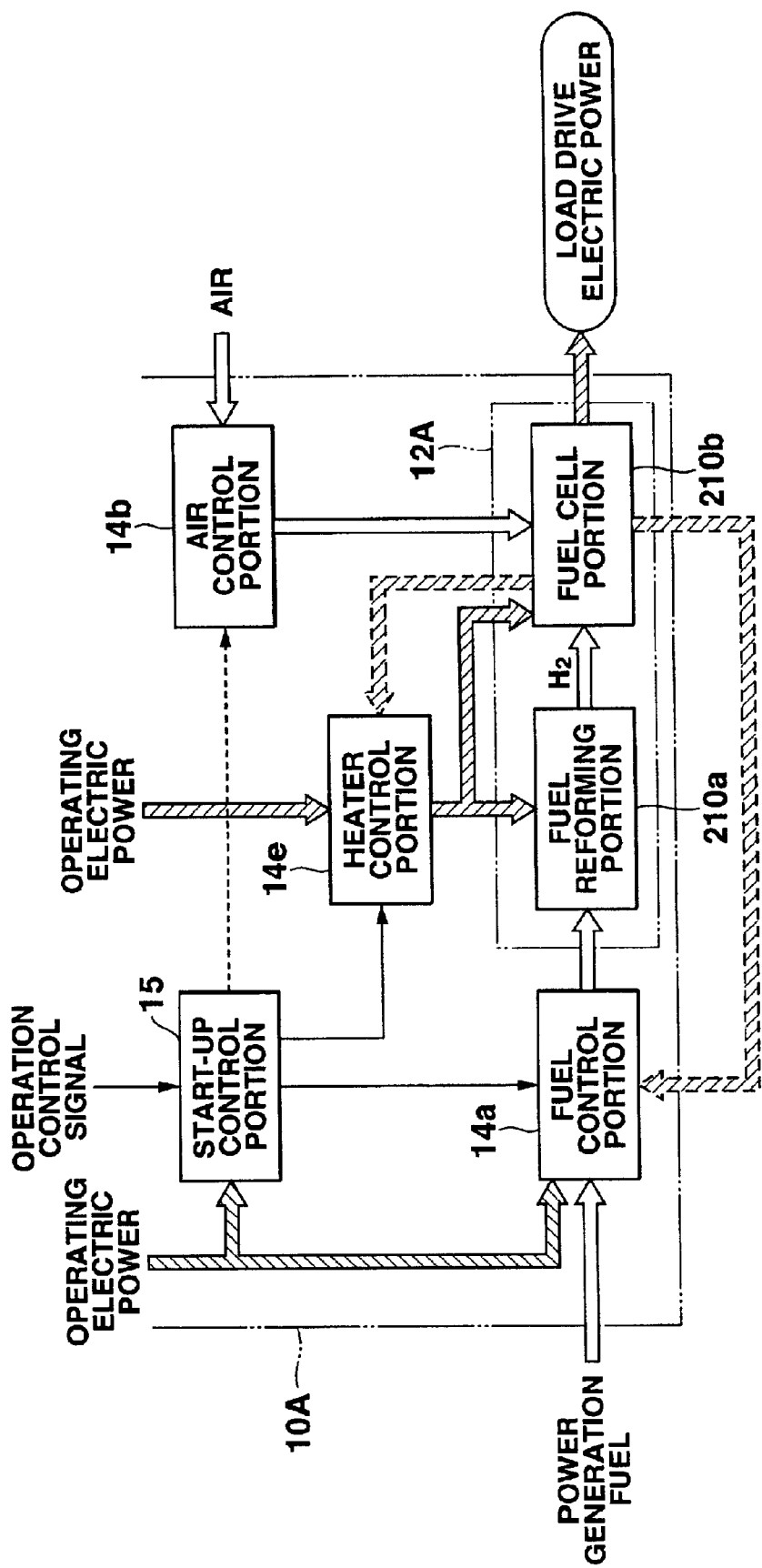
FIG. 26 is a block diagram showing a primary structure of a concrete example of the power generation module applicable to the power supply system according id to the embodiment.

FIG. 26 is a block diagram showing a primary structure of one concrete example of the power generation module applied to the power supply system according to this embodiment.

That is, in the above-described embodiment, when the structure of the fuel reforming type fuel cell illustrated in the above first structural example (see FIG. 19) is applied as the power generation portion 12, it is possible to provide a fuel control portion 14a for controlling an amount of the power generation fuel (hydrogen gas supplied to the fuel cell portion 210b) supplied to the power supply portion 12A based on the operation control signal from the operation control portion 13 and an air control portion 14b for controlling an amount of air (oxygen gas supplied to the fuel cell portion 210b) supplied to the power generation portion 12A as the structure of the output control portion 14 as shown in FIG. 26.

In this case, the fuel control portion 14a performs control to fetch from the fuel pack 20A the power generation fuel, water and the like for generating hydrogen gas ($H_2$) whose amount is required for producing predetermined electric power (first electric power), reform them into hydrogen gas ($H_2$) by the fuel reforming portion 210a and supply the obtained gas to the fuel electrode 211 of the fuel cell portion 210b. Moreover, the air control portion 14b performs control to fetch from atmosphere necessary amount of oxygen gas ($O_2$) according to the electrochemical reaction (see the chemical equations (6) and (7)) using hydrogen gas and then supply it to the air electrode 212 of the fuel cell portion 210b. By adjusting the amounts of hydrogen gas ($H_2$) and the oxygen gas ($O_2$) to be supplied to the power generation portion 12, by such fuel control portion 14a and air control portion 14b, the stages of progress of the electrochemical reaction in the power generation portion 12 (fuel cell portion 210b) can be controlled, and an amount of electric power to be generated as the load drive electric power or an output voltage can be controlled.

Here, the air control portion 14b may be set to constantly supply air when the power generation portion 12 is in the operation mode without controlling an amount of oxygen gas to be supplied to the air electrode 212 of the power generation portion 12 as long as the air control portion 14b can supply air corresponding to the maximum consumption of oxygen per unit time in the power generation portion 12. That is, in the structure of the power generation module 10A shown in FIG. 26, the output control portion 14 may be configured to control the stages of progress of the electrochemical reaction by only the fuel control portion 14a. In addition, a later-described air hole (slit) may be provided instead of the air control portion 14b so that air (oxygen)

<Start-Up Control Portion 15>

As shown in FIG. 3, the start-up control portion 15 applied to the power generation module according to this embodiment operates with electric power supplied from the sub power supply portion 11 mentioned above, and performs the start-up control for shifting the power generation portion 12 from the standby mode to the operation mode capable of power generation by supplying electric power (start-up electric power) to at least the output control portion 14 (the power generation portion 12 may be included depending on structures) based on the operation control signal outputted from the operation control portion 13.

Specifically, in the structure shown in FIG. 26, with the power generation portion 12A (fuel cell portion 210b) being inactive, when the start-up control portion 15 receives the operation control signal for starting up the power generation portion 12A from the operation control portion 13, the start-up electric power outputted from the sub power supply portion 11 is supplied to the fuel control portion 14a of the output control portion 14, and the start-up electric power outputted from the sup power supply portion 11 is supplied to the heater control portion 14e of the output control portion 14. As a result, the fuel control portion 14a controls an amount of fuel or the like to be supplied to the fuel reforming portion 210a (or both the fuel reforming portion 210a and the fuel cell portion 210b), and the heater control portion 14e adjusts an amount of electric power to be supplied to the heater of the fuel reforming portion 210a (or the heater of the fuel reforming portion 210a and the heater of the fuel cell portion 210b), thereby controlling a temperature of the heater. The fuel reforming portion 210a supplies hydrogen gas ($H_2$) reformed from the fuel or the like therein to the fuel electrode of the fuel cell portion 210b, and the air control portion 14b supplies oxygen gas ($O_2$) to the air electrode. Consequently, the fuel cell portion 210b is automatically started up and shifted to the operation mode (steady mode) for generating predetermined electric power (first electric power).

With the power generation portion 12A being driven, when the start-up control portion 15 receives the operation control signal for stopping the power generation portion 12A (fuel cell portion 210b) from the operation control portion 13, it stops supply of hydrogen gas ($H_2$) and oxygen gas ($O_2$) to the fuel cell portion 210b by controlling at least the fuel control portion 14a, the air control portion 14b and the heater control portion 14e. Thus, generation of electric power (power generation) to the fuel cell portion 210b is stopped, so that the fuel cell portion 210b is shifted to the standby mode in which only the sub power supply portion 11, and the operation control portion 13, the later-described voltage monitoring portion 16 and the controller CNT of the device DVC which receive the electric power (operating electric power, controller electric power) from the sub power supply portion 11 operate.

Here, although description has been given as to the case that the fuel reforming type fuel cell is applied as the power generation portion 12 and the operation state (the start-up operation, the stop operation) of the power generation portion 12A is controlled by controlling supply of the start-up electric power to the output control portion 14 (the fuel control portion 14a and the air control portion 14b) and the power generation portion 12A by the start-up control portion 15 in order to control supply/shutoff of the power generation fuel and air to the power generation portion 12A, the operation state of the power generation portion 12 can be controlled by the substantially equal control even if other structural examples mentioned above (for instance, the power generation device provided with the internal combustion engine, the external combustion engine or the like) are applied to the power generation portion 12. In addition, when applying the fuel direct supply type fuel cell capable of generating power at a room temperature as the power generation portion 12, the heater in the power generation portion 12, the fuel reforming portion 210a or the heater control portion 14e is no longer necessary, and an amount of electric power to be generated in the power generation portion 12 can be controlled by only controlling supply/shutoff of the power generation fuel. The start-up control portion 15 may, therefore, control supply of the start-up electric power only to the fuel control portion 14a of the output control portion 14.

Additionally, although the electric power from the sub power supply portion 11 is supplied to the start-up control portion 15 and the output control portion 14 (the fuel control portion 14a in the structure shown in FIG. 26) as the operating electric power or the start-up electric power in the structure shown in FIG. 3, if the electric power supplied from the sub power supply portion 11 can not suffice the electric power consumed by the output control portion 14 or the like at the time of steady operation of the power generation portion 12, the electric power can be maintained by outputting a part of the electric power generated in the power generation portion 12 to the output control portion 14 or the like in addition to the electric power from the sub power supply portion 11 (see dotted arrows in FIGS. 3 and 26).

At this moment, as the power supply system, the output control portion 14 controls a total amount of the power generation fuel corresponding to an increased part of the electric power consumed by the output control portion 14 itself and a power generation fuel corresponding to the electric power supplied to the device DVC to be supplied to the power generation portion 12 so as not to impair the electric power supplied to the device DVC (load LD) as the load drive electric power. Incidentally, in the structure shown in FIG. 26, the fuel control portion 14a performs control to supply a total amount of the power generation electric power to the fuel electrode 211 of the fuel cell portion 210b through the fuel reforming portion 210a, and the air control portion 14b executes control to supply air satisfying an amount of oxygen required for generating sufficient electric power (power generation) in the fuel cell portion 210b to the air electrode 212 of the fuel cell portion 210b.

<Voltage Monitoring Portion 16>

As shown in FIGS. 3 and 4, the voltage monitoring portion 16 applied to the power generation module according to the present embodiment detects a voltage component displaced in accordance with the drive status (increase/decrease in capacity) of the device DVC driven by output electric power which is generated by the above-described power generation portion 12 and outputted through the electrode terminal EL (specifically, the positive electrode terminal and the negative electrode terminal described later, or any other terminal) provided in the power supply system, namely, by the supply electric power supplied to the device DVC connected to the electrode terminal EL, and outputs it to the operation control portion 13.

Specifically, when the load LD in the device DVC is not driven, the voltage monitoring portion 16 detects a change in the voltage component of the controller electric power which is generated by the sub power supply portion 11 and supplied to the device DVC (controller CNT) through the electrode terminal EL. On the other hand, when the load LD in the device DVC is driven, the voltage monitoring portion 16 detects a change in the voltage component of the load drive electric power which is generated by the power generation portion 12 and supplied to the device DVC (load LD) through the electrode terminal EL. As a result, the operation control portion 13 executes a start-up control, a feedback control, a stop control and others, which will be described later, for the power supply system, based on the detected voltage. In this embodiment, therefore, each of the controller electric power and the load drive electric power which are generated by the sub power supply portion 11 or the power generation portion 12 and supplied to the device DVC is a target of voltage detection (monitoring voltage) by the voltage monitoring portion 16.

(B) Fuel Pack 20

The fuel pack 20A applied to the power supply system according to the present invention is, for example, a fuel storage container with the high sealing property, in which the power generation fuel FL consisting of a liquid fuel, a liquefied fuel or a gas fuel containing hydrogen in its compositional components is filled and charged. As shown in FIG. 3, the fuel pack 20A has a structure to be coupled with the power generation module 10A through the I/F portion 30A in the attachable and detachable manner or a structure to be integrally coupled with the same. The power generation fuel FL charged in the fuel pack 20A is taken into the power generation module 10A through the fuel feed path provided to the later-described I/F portion 30A, and the power generation fuel FL whose amount is required for generating electric power (first electric power) having a predetermined voltage characteristic according to the drive state (load state) of the device DVC is supplied to the power generation portion 12 by the above-described output control portion 14 at any given time.

In case of applying, as the sub power supply portion 11, the structure for generating electric power (second electric power) by using a part of the power generation fuel FL charged in the fuel pack 20A as described above and utilizing an electrochemical reaction, a catalytic combustion reaction or a dynamic energy conversion action and the like, at least a minimum quantity of the power generation fuel required for generating electric power which can be the controller electric power of the device DVC and the operating power of the operation control portion 13 is constantly supplied to the sub power supply portion 11 through the I/F portion 30A.

In particular, in case of applying, as the power supply system 301, the structure in which the power generation module 10A and the fuel pack 20A can be attached and detached without restraint, the power generation fuel FL is supplied to the power generation module 10A only when the fuel pack 20A is coupled with the power generation module 10A. In this case, when the fuel pack 20A is not coupled with the power generation module 10A, the fuel pack 20A is provided with, e.g., fuel leak preventing means having a control valve or the like which closes by a fuel charge pressure inside the fuel pack 20A or a physical pressure of a spring or the like in order to prevent the power generation fuel FL charged therein from leaking to the outside of the fuel pack 20A. When the fuel pack 20A is coupled with the power generation module 10A through the I/F portion 30A and means (leak prevention releasing means) which is provided to the I/F portion 30A and releases the leak prevention function by the fuel leak preventing means is thereby brought into contact with or presses the fuel pack 20A, thus the closed state of the control valve is released and the power generation fuel FL charged in the fuel pack 20A is supplied to the power generation module 10A through the I/F portion 30A, for example.

In the fuel pack 20A having such a structure, when the fuel pack 20A is separated from the power generation module 10A before the power generation fuel FL charged in the fuel pack 20A is run out, the power generation fuel FL can be prevented from leaking by again activating the leak prevention function of the fuel leak preventing means (for example, by bringing the leak prevention releasing means into the non-contact state to cause the control valve to again close), and the fuel pack 20A can be carried independently.

It is preferable for the fuel pack 20A to have a function as the above-described fuel storage container and be made up of a material which basically exists in the nature world under a specific environmental condition and can be converted into substances which constitute the nature or substances which cause no environmental pollution.

That is, the fuel pack 20A can be made up of a polymeric material (plastic) or the like having characteristics consisting of various kinds of decomposition reactions that the material can be converted into substances, which is not harmful to the nature world (substances which basically exist in the nature world and constitute the nature, for example, water and carbon dioxide or the like), by action of microbes or enzyme in the soil, irradiation of sunbeams, rain water, atmospheric air or the like even if all or part of the fuel pack 20A is jettisoned in the nature world or subjected to landfill disposal, for example, decomposition characteristics of the biodegradability, the photolytic property, the hydrolyzability, the oxidative degradability or the like.

The fuel pack 20A may be constituted by a material by which harmful substances such as a chlorinated organic compound (dioxin group; polychlorinated dibenzo-p-dioxin, polychlorinated dibenzofuran), hydrochloric gas or heavy metal, or environmental pollutants are not generated or generation of such substances are suppressed even if artificial heating/incineration processing or agent/chemical processing is carried out. It is needless to say that a material (for example, the polymeric material) constituting the fuel pack 20A can not be decomposed at least in a short time by contact with the charged power generation fuel FL and does not degenerate the charged power generation fuel FL at least in a short time to such an extent that it can not be used as a fuel. Also, it is needless to say that fuel pack 20A constituted by the polymeric material has the sufficient strength with respect to external physical stress.

As described above, taking into consideration the state that the collect rate of the chemical cell for recycling is only approximately 20% and remaining 80% is jettisoned in the natural world or subjected to landfill disposal, it is desirable to apply a material having the decomposition property, and biodegradable plastic in particular as a material of the fuel pack 20A. Specifically, it is possible to excellently apply a polymeric material containing a chemical synthesis type organic compound synthesized from a petroleum or vegetable raw material (polylactic acid, aliphatic polyester, copolyester or the like), microbial bio-polyester, a natural product utilizing polymeric material including farina, cellulose, chitin, chitosan or the like extracted from a vegetable raw material such as a corn or a sugar cane, or others.

As the power generation fuel FL used in the power supply system 301 according to this embodiment, it is preferable that it can not be a contaminant for the natural environment even if the fuel pack 20A having the power generation fuel FL charged therein is jettisoned in the natural world or subjected to landfill disposal and leaks into air, soil or water, that electric power can be generated with the high energy conversion efficiency in the power generation portion 12 of the power generation module 10A, and that it is a fuel substance which can maintain a stable liquid state or an air state under predetermined charge conditions (pressure, temperature or the like) and can be supplied to the power generation module 10A. Specifically, it is possible to excellently apply an alcohol-based liquid fuel such as methanol mentioned above, ethanol or butanol, a liquefied fuel consisting of hydrocarbon such as dimethyl ether, isobutane or natural gas which are gas at an ordinary temperature under an ordinary pressure, or a gas fuel such as hydrogen gas. Incidentally, as will be described later, the safety of the power supply system can be increased by providing the structure of, e.g., fuel stabilizing means for stabilizing the charged state of the power generation fuel in the fuel pack.

According to the fuel pack 20A and the power generation fuel FL having such a structure, even if all or a part of the power supply system 301 according to this embodiment is jettisoned in the natural world or artificially subjected to landfill disposal, incineration or chemical processing, pollution of air, soil or water quality to the natural environment, or generation of environmental hormone can be greatly suppressed, thereby contributing to prevention of environmental destruction, suppression of disfigurement of the natural environment, and prevention of the adverse effect to human bodies.

In case of constituting the fuel pack 20A so that it can be attached to and detached from the power generation module 10A without restraint, when an amount of the remaining power generation fuel FL charged is reduced or this fuel is run out, the power generation fuel FL can be replenished into fuel pack 20A, or the fuel pack 20A can be replaced or reused (recycling). This can, therefore, contribute to great reduction in a quantity of the fuel pack 20A or the power generation module 10A to be jettisoned. Furthermore, since a new fuel pack 20A can be replaced and attached to a single power generation module 10A and this module can be attached to the device DVC and used, it is possible to provide the power supply system which can be easily used as similar to a general-purpose chemical cell.

In case of generating electric power in the sub power supply portion 11 and the power generation portion 12 of the power generation module 10A, even if by-product is generated besides electric power and this by-product adversely affects the surroundings or if it may possibly exert its influence on functions, for example, it may cause the malfunction of the device DVC, it is possible to apply the structure in which means for holding the by-product collected by later-described by-product collecting means is provided in the fuel pack 20A. In this case, when the fuel pack 20A is detached from the power generation module 10A, it is possible to apply the structure having, e.g., absorbing polymer capable of absorbing, both absorbing and fixing, or fixing the by-product in order to prevent the by-product temporarily collected and held in the fuel pack 20A (collecting/holding means) from leaking to the outside of the fuel pack 20A, or a control valve which closes by the physical pressure of, e.g., a spring. The structure of the collecting/holding means for the by-product will be described later together with the by-product collecting means.

(C) I/F portion 30

Figure 83:
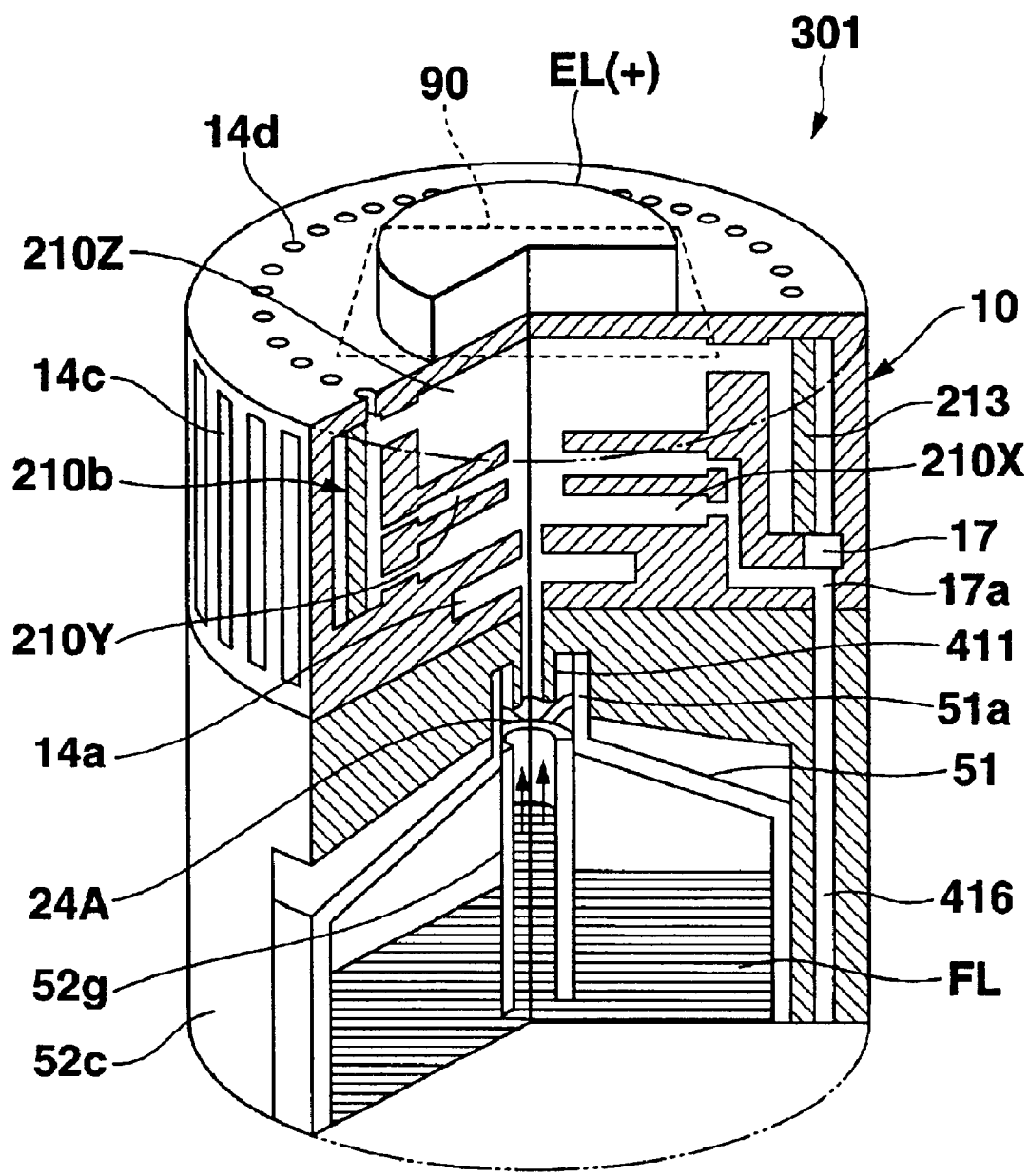
FIG. 83 is a perspective view showing a concrete structural example of the entire power supply system according to the present invention.

The I/F portion 30 applied to the power supply system according to the present invention is interposed between at least the power generation module 10 and the fuel pack 20. As shown in FIG. 3, the I/F portion 30A applied as an example has a function for physically coupling the power generation module 10A and the fuel pack 20A with each other, and supplying the power generation fuel FL charged in the fuel pack 20A in a predetermined state to the power generation module 10A through the fuel feed path. Here, as described above, in case of applying, as the power supply system 301, the structure in which the power generation module 10A and the fuel pack 20A can be attached and detached without restraint, the I/F portion 30A includes leak prevention releasing means (fuel feed pipe 411) for releasing the leak prevention function of fuel leak preventing means (fuel feed valve 24A) provided to the fuel pack 20A in addition to the fuel feed path, as shown in FIG. 83. Fuel feed valve 24A is set to be opened by pushing down to the fuel feed pipe 411. Moreover, as will be described later, in case of applying the structure also providing by-product collecting means for collecting a by-product generated in the sub-power supply portion 11 and the power generation portion 12 of the power generation module 10A, the I/F portion 30A is configured to include an water leading pipe 416 for feeding the by-product into the fuel pack 20A.

Specifically, the I/F portion 30A supplies to the power generation module 10A (the sub power supply portion 11 and the power generation portion 12) the power generation fuel FL charged in the fuel pack 20A under predetermined conditions (temperature, pressure and others) as a liquid fuel, a liquefied fuel or a gas fuel (fuel gas) obtained by vaporizing the fuel, through the fuel feed path. In the power supply system in which the power generation module 10A and the fuel pack 20A are integrally configured through the I/F portion 30A, therefore, the power generation fuel FL charged in the fuel pack 20A can be constantly supplied to the power generation module 10A through the fuel feed path. On the other hand, in the power supply system in which the power generation module 10A and the fuel pack 20A can be attached and detached through the I/F portion 30A without restrain, the leak prevention function of the fuel leak preventing means provided to the fuel pack 20A is released by the leak prevention releasing means when the fuel pack 20A is coupled with the power generation module 10A, and the power generation fuel FL can be supplied to the power generation module 10A through the fuel feed path.

Incidentally, in the power supply system in which the power generation module 10A and the fuel pack 20A are integrally constituted through the I/F portion 30A, the power generation fuel FL is constantly supplied to the power generation module 10A irrespective of attachment/detachment of the power supply system to/from the device DVC. Therefore, when electric power is generated in the sub power supply portion 11, the power generation fuel can not be efficiently consumed in some cases. Thus, for example, before using the power supply system (before attaching it to the device), efficient consumption of the power generation fuel can be realized by applying the structure that the fuel feed path of the I/F portion 30A is maintained in the shutoff (shielding) state, the shutoff state is released when using the power supply system and the fuel feed path is irreversibly controlled (allowed to pass the fuel therethrough) into the fuel supply enabled state.

<Overall Operation of First Embodiment>

The overall operation of the power supply system having the above-described structure will now be described with reference to the drawings.

Figure 27:
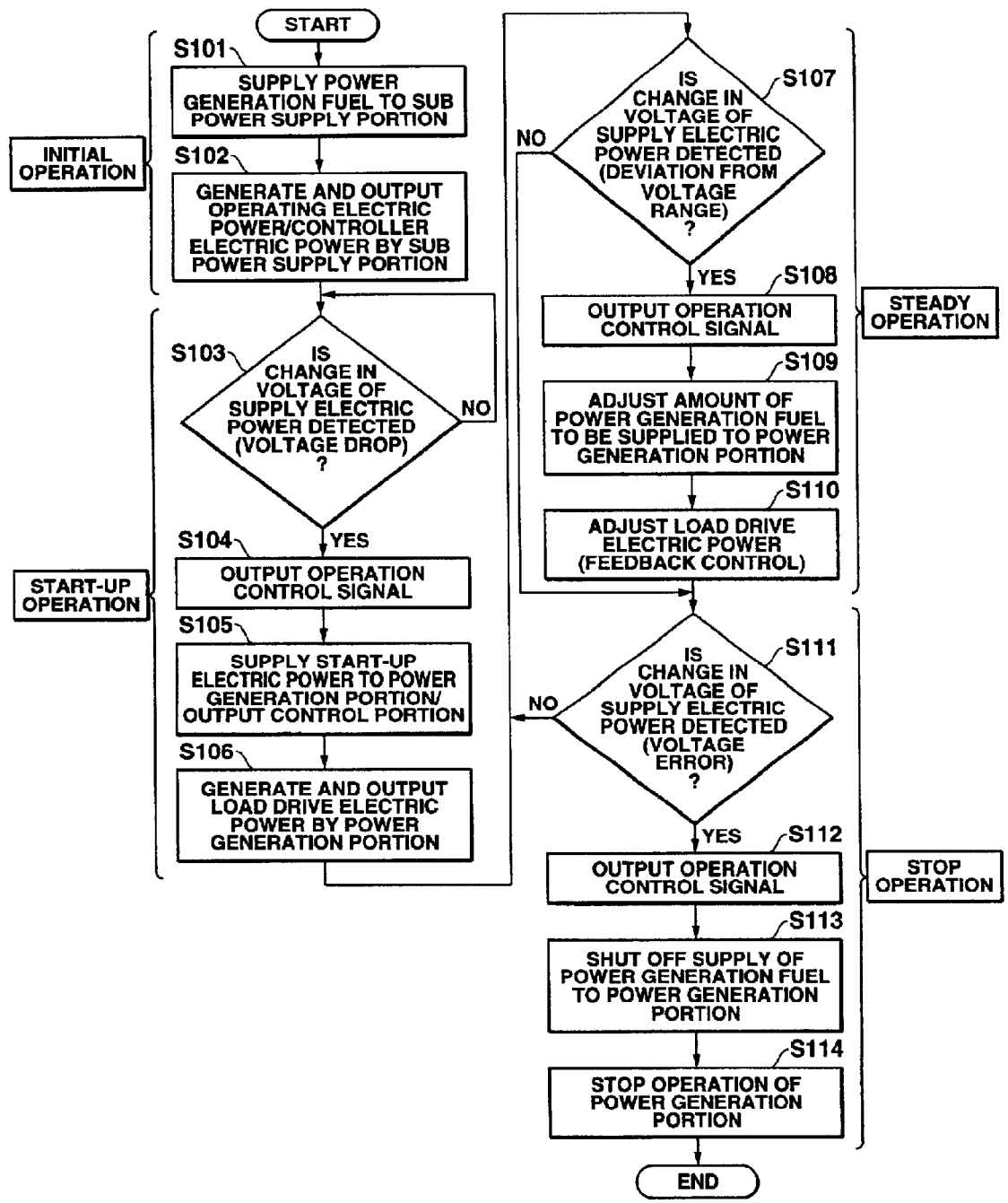
FIG. 27 is a flowchart showing a schematic operation of the power supply system according to the embodiment.

FIG. 27 is a flowchart showing a schematic operation of the power supply system according to this embodiment.

Figure 28:
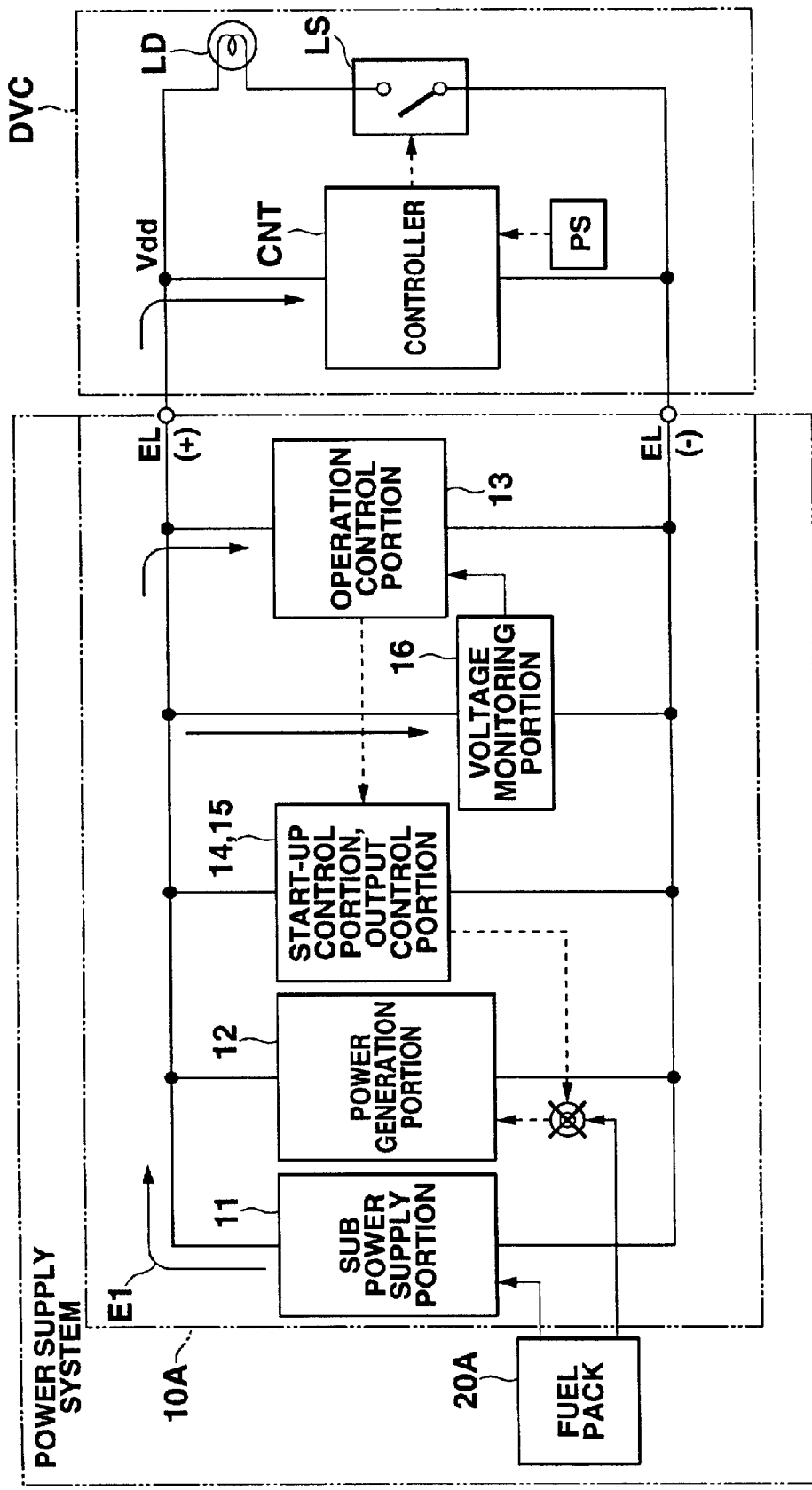
FIG. 28 is a view showing an initial operation (standby mode) of the power supply system according to the embodiment.
Figure 29:
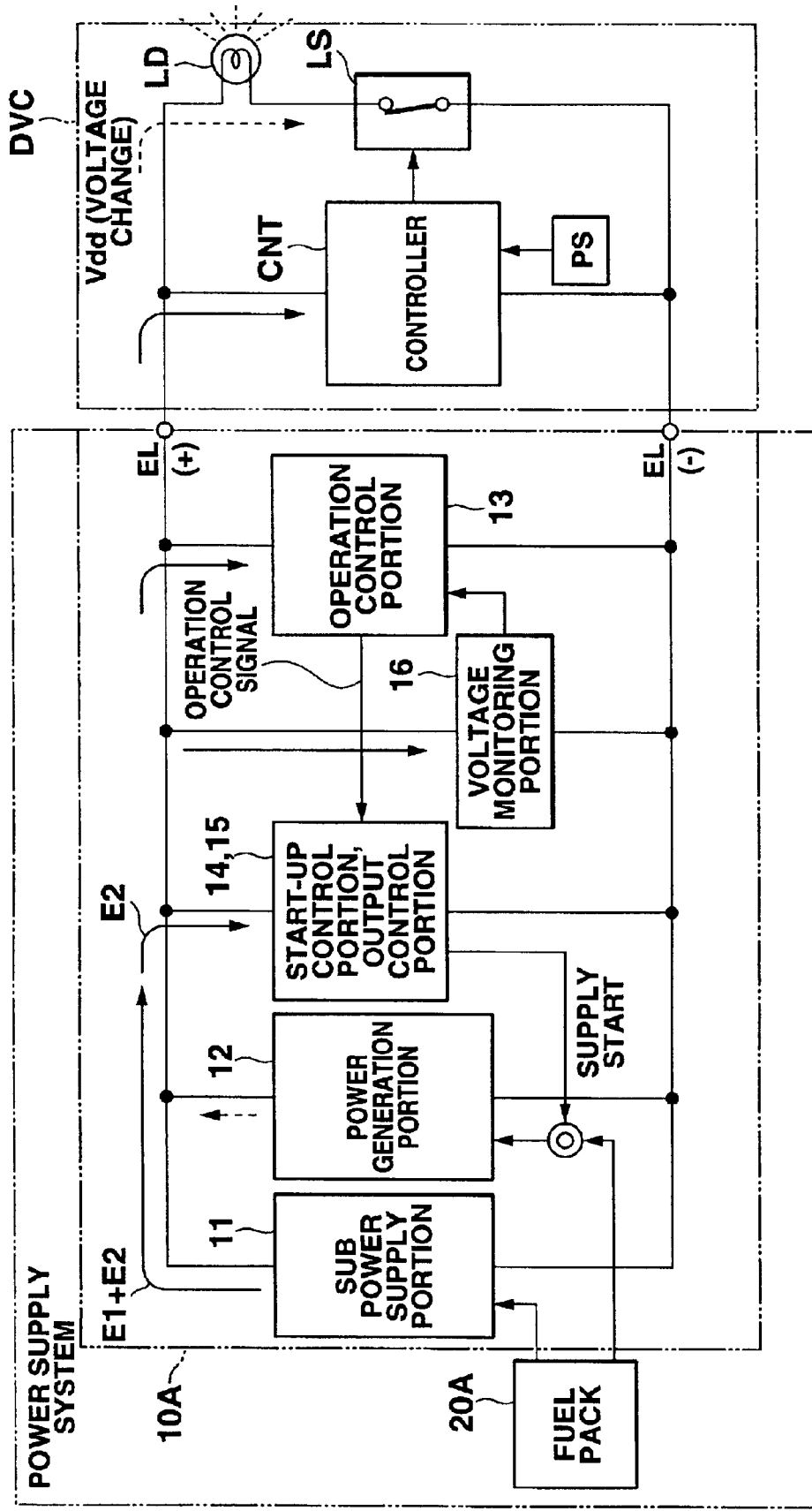
FIG. 29 is a view showing a start-up operation of the power supply system according to the embodiment.
Figure 30:
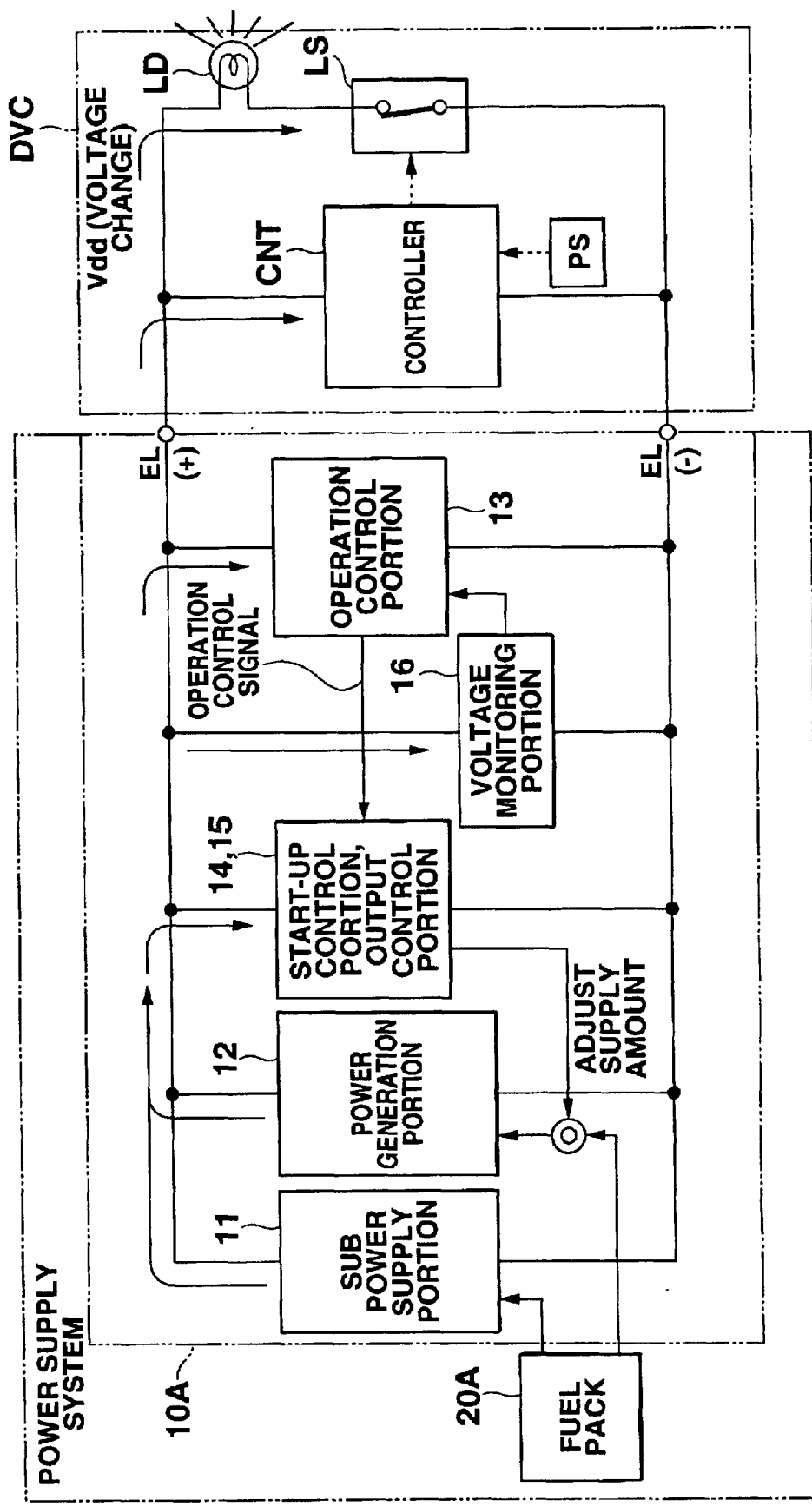
FIG. 30 is a view showing a steady operation (steady mode) of the power supply system according to the embodiment.
Figure 31:
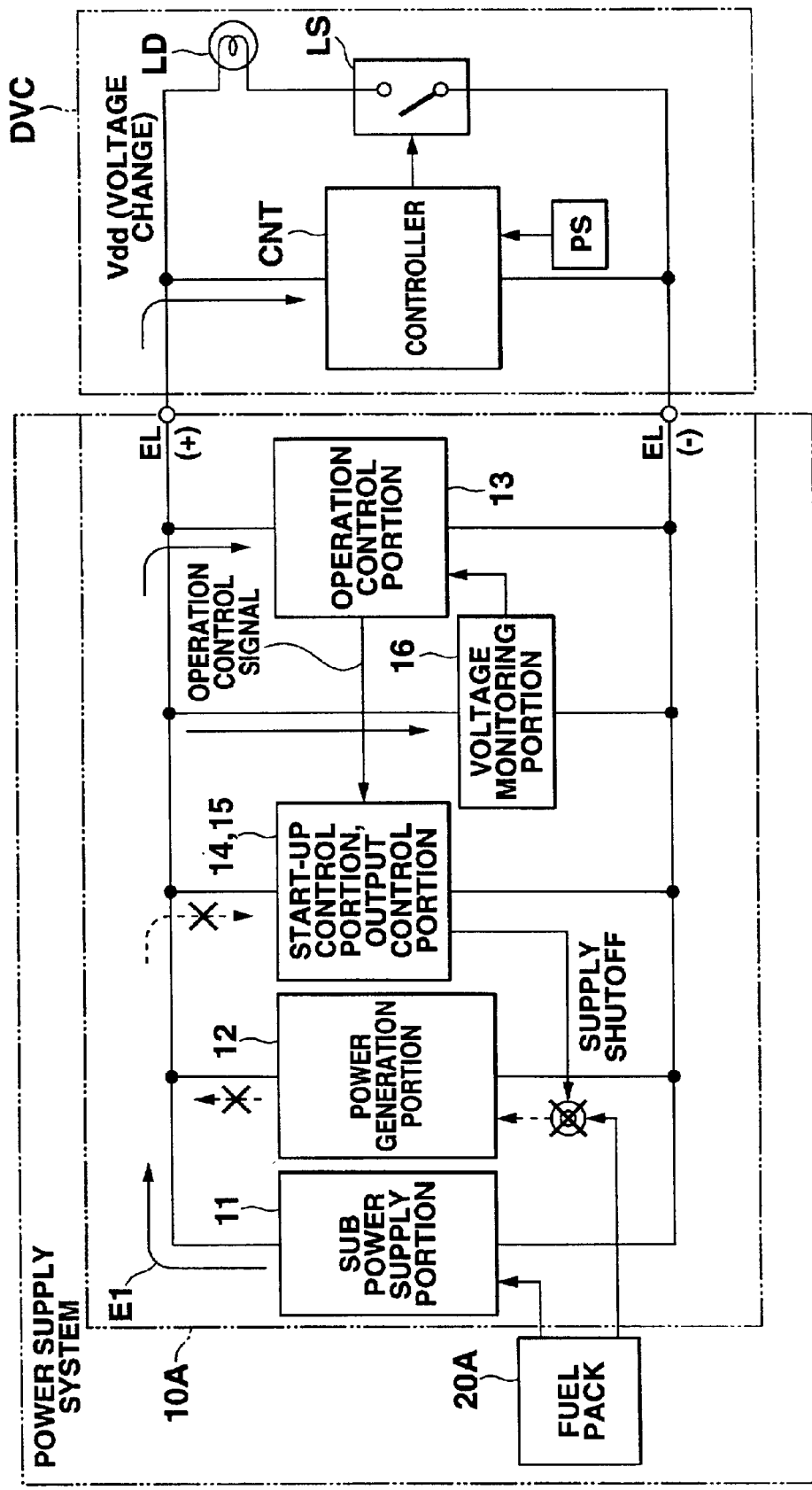
FIG. 31 is an operation conceptual view showing a stop operation of the power supply system according to the embodiment.

FIG. 28 is a view showing an initial operation state (standby mode) of the power supply system according to this embodiment. FIG. 29 is a view showing a start-up operation state of the power supply system according to this embodiment. FIG. 30 is a view showing a steady operation state of the power supply system according to this embodiment. FIG. 31 is a view showing a stop operation state of the power supply system according to this embodiment. Here, the operation will be described while appropriately making reference to the structure of the above-described power supply system (FIGS. 3 and 4).

As shown in FIG. 27, the power supply system 301 having the structure according to this embodiment is generally controlled to execute an initial operation (steps S101 and S102) for supplying the power generation fuel FL charged in the fuel pack 20A to the power generation module 10A, constantly and continuously generating electric power (second electric power) which can be the operating electric power and the controller electric power in the sub power supply portion 11, and outputting this electric power to the device DVC (controller CNT) through the electrode terminals EL (specifically, the positive electrode terminal EL (+) and the negative electrode terminal EL (−) shown in FIGS. 28 to 31); a start-up operation (steps S103 to S106) for supplying the power generation fuel FL charged in the fuel pack 20A to the power generation portion 12 based on drive of the load LD (changing from the non-drive mode to the drive mode) in the device DVC, generating the electric power (first electric power) which can be the load drive electric power, and outputting this power to the device DVC (load LD) through the electrode terminals EL (EL(+), EL(−)); a steady operation (steps S107 to S110) for adjusting an amount of the power generation fuel FL to be supplied to the power generation portion 12 based on a change in the drive state for the load LD, and generating and outputting electric power (first electric power) having a voltage component according to the drive state of the load; and a stop operation (steps S111 to S114) for shutting off supply of the power generation fuel FL to the power generation portion 12 based on stop of the load LD (changing from the drive state to the non-drive state) and stopping generation of electric power (first electric power).

Each operation will now be described in detail hereinafter with reference to FIGS. 28 to 31.

(A) Initial Operation of First Embodiment

At first, in the initial operation, in the power supply system in which the power generation module 10A and the fuel pack 20A are constituted integrally with each other through the I/F portion 30, for example, by releasing the shutoff state of the fuel feed path of the I/F portion 30 at the time of attachment to the device DVC, as shown in FIG. 28, the power generation fuel charged in the fuel pack 20A moves in the fuel feed path by the capillary phenomenon of the fuel feed path and is automatically supplied to the sub power supply portion 11 of the power generation module 10A (step S101). Subsequently, in the sub power supply portion 11, at least electric power (second electric power) E1 which can be the operating electric power of the operation control portion 13 and the drive electric power (controller electric power) for the controller CNT included in the device DVC is autonomously generated and outputted, and it is then continuously supplied to each of the operation control portion 13 and the controller CNT (step S102).

On the other hand, in the power supply system in which the power generation module 10A and the fuel pack 20A can be attached and detached without restraint, by coupling the fuel pack 20A with the power generation module 10A through the I/F portion 30, as shown in FIG. 28, the leak prevention function of the fuel leak preventing means provided to the fuel pack 20A is released, and the power generation fuel charged in the fuel pack 20A moves in the fuel feed path by the capillary phenomenon of the fuel feed path and is automatically supplied to the sub power supply portion 11 of the power generation module 10A (step S101). In the sub power supply portion 11, electric power (second electric power) E1 which can be the operating electric power and the controller electric power is autonomously generated and outputted, and it is then continuously supplied to the operation control portion 13, the voltage monitoring portion 16 and the controller CNT (step S102).

In all cases, only the electric power which can be operating electric power of the operation control portion 13 and the voltage monitoring portion 16 is outputted until the power supply system is connected to the device DVC.

By coupling the fuel pack 20A with the power generation module 10A through the I/F portion 30, the mode is shifted to the standby mode in which only the operation control portion 13 of the power generation module 10A, the voltage monitoring portion 16 and the controller CNT of the device DVC are operated. In this standby mode, the supply electric power (the controller electric power; a part of the electric power E1) supplied to the device DVC (controller CNT) through the positive electrode terminal EL (+) and the negative electrode terminal EL (−) is slightly consumed by the operation control portion 13, the voltage monitoring portion 16 and the controller CNT of the device DVC. The voltage Vdd which has slightly dropped by consumption is detected by the voltage monitoring portion 16 at any given time, and a change in the voltage Vdd is monitored by the operation control portion 13. Furthermore, the drive state of the load LD of the device DVC is controlled by the controller CNT.

(B) Start-up Operation of First Embodiment

Subsequently, in the start-up operation, as shown in FIG. 29, when the controller CNT controls the switch LS for supplying electric power to the load LD to be in the conductive state by an operation for driving the load LD, for example, by an operation of a power supply switch PS or the like (turning on) provided to the device DVC by a user of the device DVC, a part of the supply electric power (control electric power) supplied to the controller CNT is supplied to the load LD in the standby mode, which results in sudden drop in the voltage Vdd of the supply electric power.

Upon detecting a sudden change in the voltage Vdd through the voltage monitoring portion 16 (step S103), the operation control portion 13 outputs to the start-up control portion 15 an operation control signal for starting the power generation operation (start-up) in the power generation portion (step S104). By supplying a part of the electric power (electric power E2) generated by the sub power supply portion 11 to the output control portion 14 (or the output control portion 14 and the power generation portion 12) as start-up electric power based on the operation control signal from the operation control portion 13 (step S105), the start-up control portion 15 supplies the power generation fuel FL charged in the fuel pack 20A to the power generation portion 12 through the output control portion 14 and generates and outputs electric power (first electric power) which can be load drive electric power. The load drive electric power is outputted as the supply electric power together with the controller electric power generated by the above-described power supply portion 11 through the positive electrode terminal EL (+) and the negative electrode terminal EL (−), and supplied to the controller CNT and the load LD of the device DVC (step S106).

Therefore, when the load drive electric power generated by the power generation portion 12 is supplied to the device DVC, the voltage Vdd of the supply electric power is gradually increased from the dropped state and reaches a voltage appropriate for starting up the load LD. That is, with respect to drive of the load LD, the power generation fuel FL is automatically supplied, and the power generation portion 12 starts the power generation operation. Moreover, the load drive electric power having the predetermined voltage Vdd is autonomously supplied to the device DVC (load LD). Accordingly, the load LD can be excellently driven while realizing the electric power characteristic substantially equivalent to that of the general-purpose chemical cell.

(C) Steady Operation of First Embodiment

Subsequently, in the steady operation, as shown in FIG. 30, the operation control portion 13 monitors a change in the voltage Vdd (substantially a change in voltage of the load drive electric power) of the supply electric power supplied to the device DVC through the voltage monitoring portion 16 at any given time (step S107). If the operation control portion 13 detects a change in the voltage Vdd such that the voltage of the supply electric power deviates from a voltage range based on a predetermined specified value (for example, a fluctuation range of the output voltage in the general-purpose chemical cell), the operation control portion 13 outputs to the output control portion 14 an operation control signal for controlling an amount of electric power (amount of power generation) generated in the power generation portion 12 to be increased/decreased so that the voltage Vdd can be set within the voltage range (step S108).

The output control portion 14 adjusts an amount of the power generation fuel FL to be supplied to the power generation portion 12 based on an operation control signal from the operation control portion 13 (step S109), and executes the feedback control so that the voltage Vdd of the supply electric power (load drive electric power) to be supplied to the device DVC is set within a predetermined voltage range (step S110). As a result, even if the drive state of the load LD (load state) on the device DVC side is changed, it is possible to control so that the voltage of the supply electric power can be converged to an appropriate voltage range according to the drive state of the load LD, and electric power according to power consumption of the device DVC (load LD) can be hence supplied.

(D) Stop Operation of First Embodiment

Subsequently, in the above-described steady operation, when the device DVC is changed from the on state to the off state during the feedback control for the supply electric power, or when the abnormal operation of the device DVC or the power supply system 301 is provoked for some reason, the operation control portion 13 continuously detects for a predetermined time the state that the voltage Vdd of the supply electric power (load drive electric power) to be supplied to the device DVC deviates from the predetermined voltage range through the voltage monitoring portion 16. When it is determined that the conditions for this voltage range and the continuous time are satisfied (step S111), the operation control portion 13 performs the processing for the detected state, as the voltage error of the supply electric power, and outputs to the output control portion 14 an operation control signal for stopping generation of electric power in the power generation portion 12 (step S112). Based on the operation control signal from the operation control portion 13, the output control portion 14 shuts off supply of the power generation fuel FL to the power generation portion 12 and stops heating of the heater for facilitating the endoergic reaction for generating hydrogen (step S113). As a result, the power generation operation in the power generation portion 12 is stopped, and supply of the electric power (load drive electric power) other than the controller electric power to the device DVC is stopped (step S114).

That is, for example, if the load LD is stopped by controlling the switch LS supplying the electric power to the load LD to the shutoff state by using the controller CNT when a user of the device DVC operates the power supply switch PS or the like (turning off), or if the load is run out (ceased) when the power supply system 301 is removed from the device DVC, the voltage of the supply electric power may largely deviate from the predetermined voltage range even after performing the feedback control for setting the voltage of the supply electric power in the voltage range in the above-described steady operation. Therefore, when such a state is continuously detected over a predetermined period of time by the operation control portion 13, the operation control portion 13 determines that the load LD of the device DVC is stopped or run out and stops the power generation operation in the power generation portion 12. As a result, since supply of the power generation fuel FL is shut off and the power generation portion 12 is automatically shut down with respect to stop or the like of the load LD in the device DVC, the power generation portion 12 generates electric power only when the device DVC is normally driven, and the electromotive force can be maintained for a long time while effectively utilizing the power generation fuel.

As described above, according to the power supply system of this embodiment, since it is possible to perform control for supplying and shutting off the electric power which can be predetermined load drive electric power and control for adjusting an amount of the electric power to be generated in accordance with the drive state of the load (device or the like) connected to the power supply system without receiving supply of the fuel or the like from the outside of the power supply system, the power generation fuel can be efficiently consumed. Therefore, the power supply system which has less burden on the environment and has the very high energy utilization efficiency can be provided while realizing the electrical characteristic which is substantially equivalent to that of the general-purpose chemical cell.

Moreover, as will be described later, the power supply system according to this embodiment is reduced in size and weight by integrating and forming the power generation module in a small space by applying the micromachine manufacturing technique, and constituted so as to have the shape and dimensions substantially equal to those of the general-purpose chemical cell, e.g., an AA size battery, meeting the standards such as Japanese Industrial Standards (JIS). As a result, it is possible to realize the high compatibility with the general-purpose chemical cell in both the outside shape and the electrical characteristic (voltage/ electric current characteristic), and popularization in existing cell markets can be further facilitated. Consequently, in place of the existing chemical cell having many problems in, for example, environmental concerns or the energy utilization efficiency, it is possible to easily spread the power supply system applying the power generation device by which emission of a harmful substance of the fuel cell or the like can be greatly suppressed and which can realize the high energy utilization efficiency, and hence the energy resource can be efficiently utilized while suppressing the influence to the environment.

[Second Embodiment]

A second embodiment of the power generation module applied to the power supply system according to the present invention will now be described with reference to the drawings.

Figure 32:
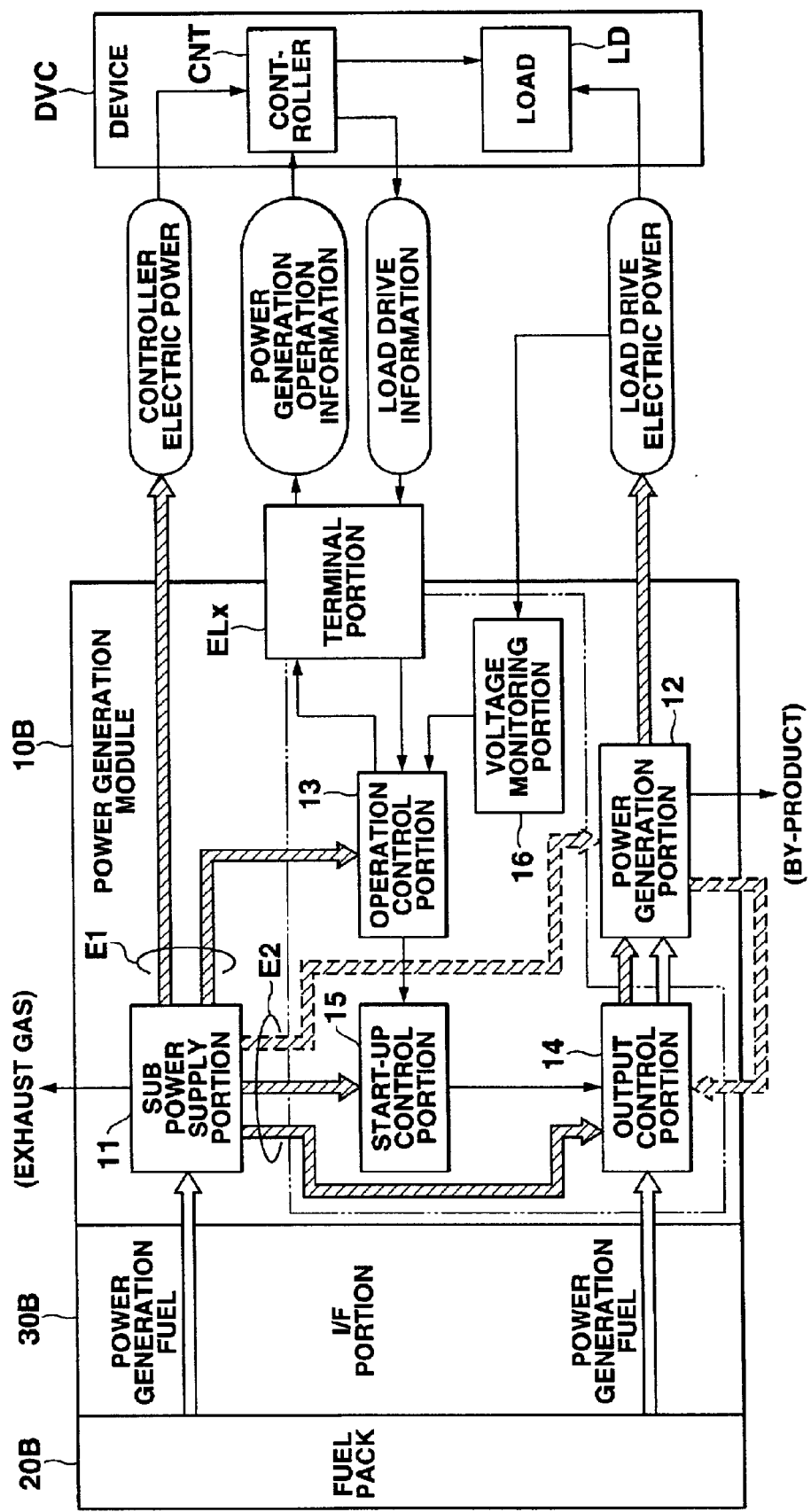
FIG. 32 is a block diagram showing a second embodiment of a power generation module applied to the power supply system according to the present invention.
Figure 33:
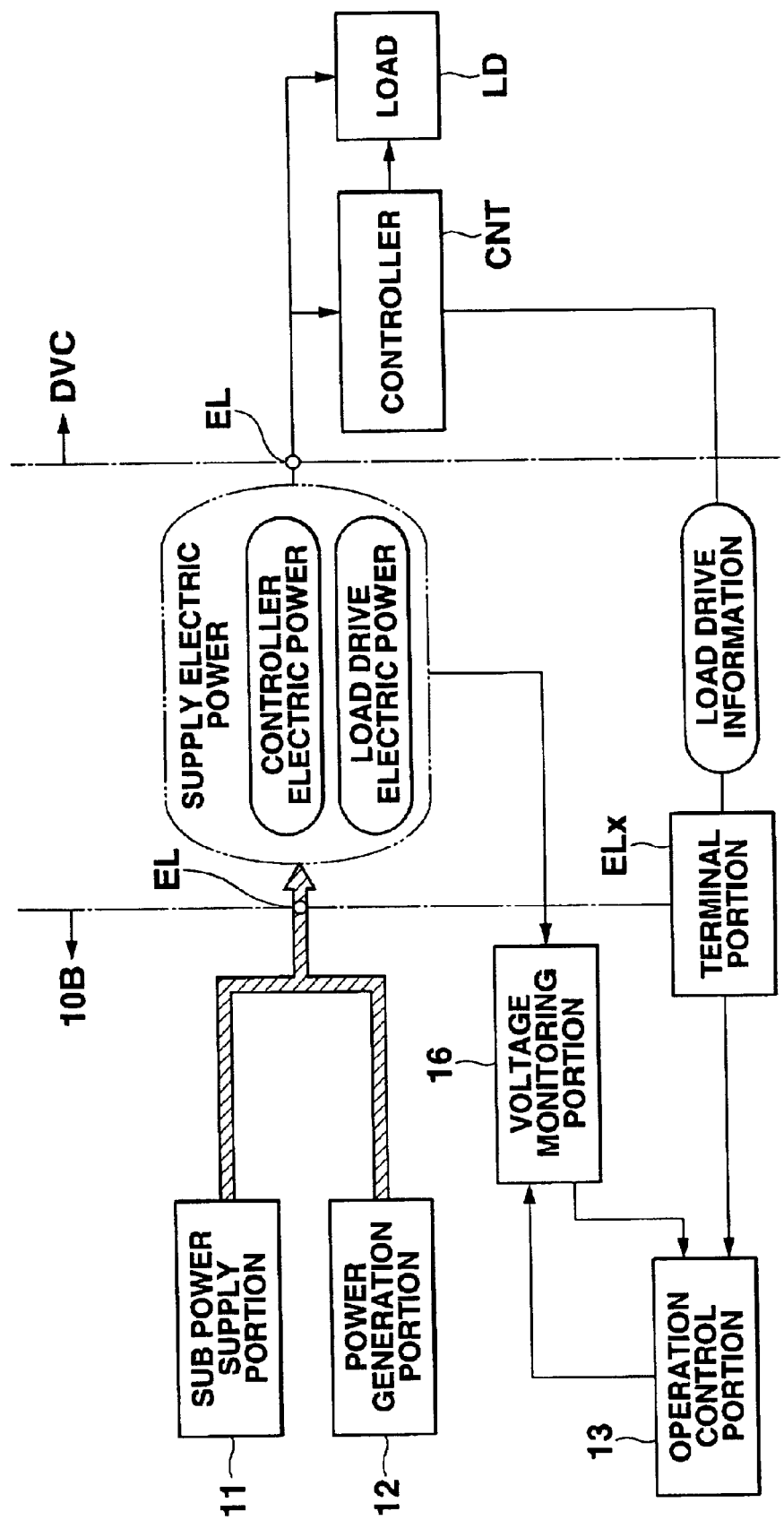
FIG. 33 is a schematic view showing the electrical connection relationship between the power supply system (power generation module) according to the embodiment and a device.

FIG. 32 is a block diagram showing a second embodiment of the power generation module applied to the power supply system according to the present invention, and FIG. 33 is a view schematically showing the electrical connection relationship between the power supply system (power generation module) according to this embodiment and the device. Here, like reference numerals denote structures similar to those in the above-described first embodiment, thereby simplifying or omitting their explanation.

As shown in FIG. 32, the power generation module 10B according to this embodiment generally includes: a sub power supply portion (second power supply means) 11 having functions similar to those in the above-described first embodiment (see FIG. 3); a power generation portion (first power supply means) 12; an operation control portion 13; an output control portion 14; a start-up control portion 15; a voltage monitoring portion (voltage detection portion) 16; and a terminal portion ELx for notifying predetermined information with respect to a controller CNT included in a device DVC to which the power supply system is connected. In this embodiment, the power supply system is configured to control the power generation state in the power generation module 10B (in particular, the power generation portion 12) based on at least load drive formation (electric power request) which is notified from the controller CNT included in the device DVC through the terminal portion ELx and corresponds to the drive state of the load LD.

In this embodiment, the controller CNT of the device DVC connected to the power supply system notifies the power supply system of the load drive information (electric power request) in accordance with the drive state of the load LD, and has a function as load drive controlling means for controlling the drive state of the load LD in accordance with power generation information (information concerning voltage components, start-up operation end information, and operation stop information) indicative of the power generation state of the power supply system based on the electric power request.

In the power supply system according to this embodiment, as shown in FIG. 33, the supply electric power consisting of the controller electric power and the load drive electric power outputted from each of the sub power supply portion 11 and the power generation portion 12 is likewise commonly supplied to the controller CNT and the load LD of the device DVC through a single electrode terminal EL, and the voltage component of this supply electric power (substantially the load drive electric power) is detected by the voltage monitoring portion 16 at any given time and monitored by the operation control portion 13.

<Overall Operation of Second Embodiment>

The overall operation of the power supply system having the above-described structure will now be described with reference to the drawings.

Figure 34:
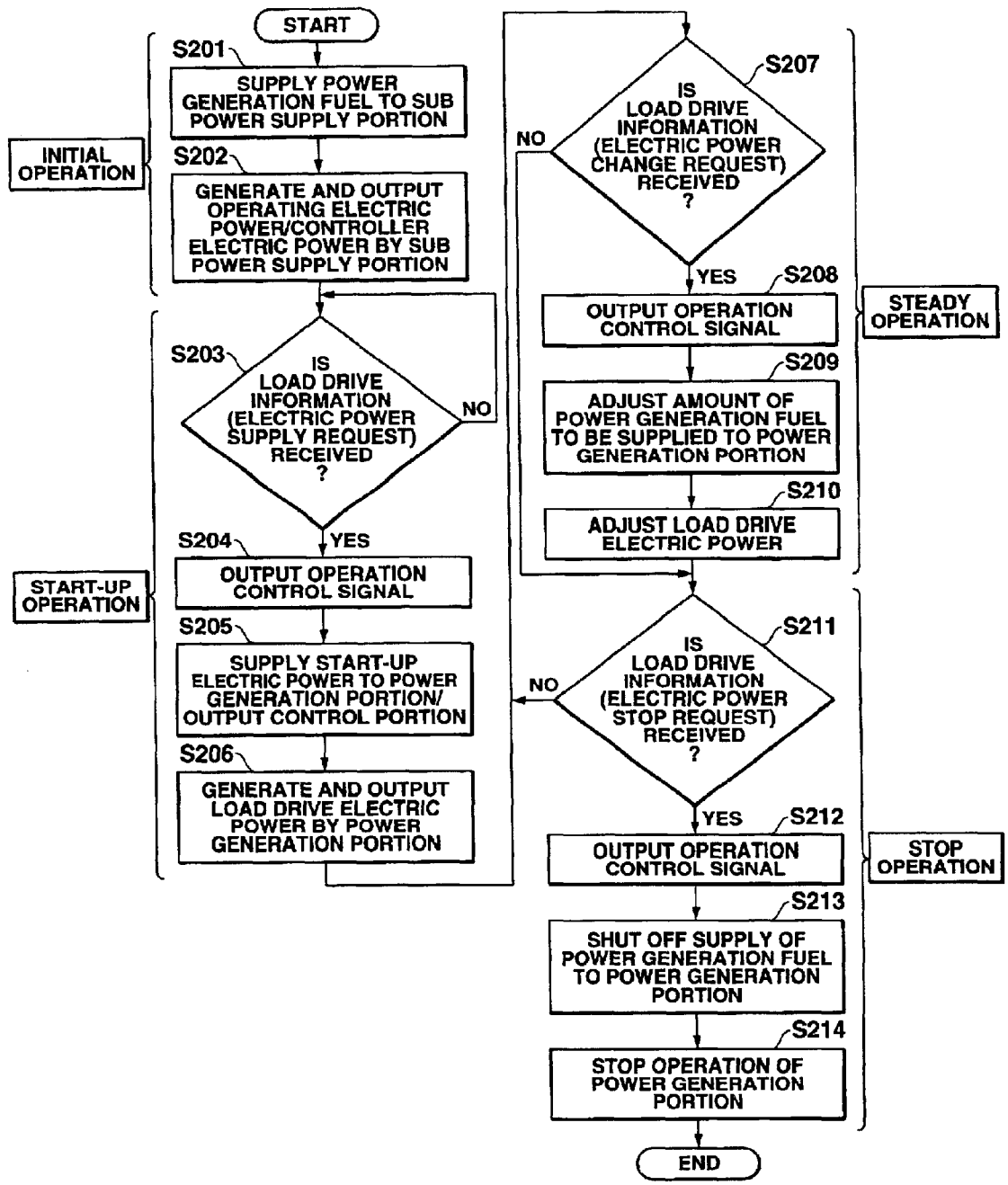
FIG. 34 is a flowchart showing a schematic operation of the power supply system according to the second embodiment.
Figure 35:
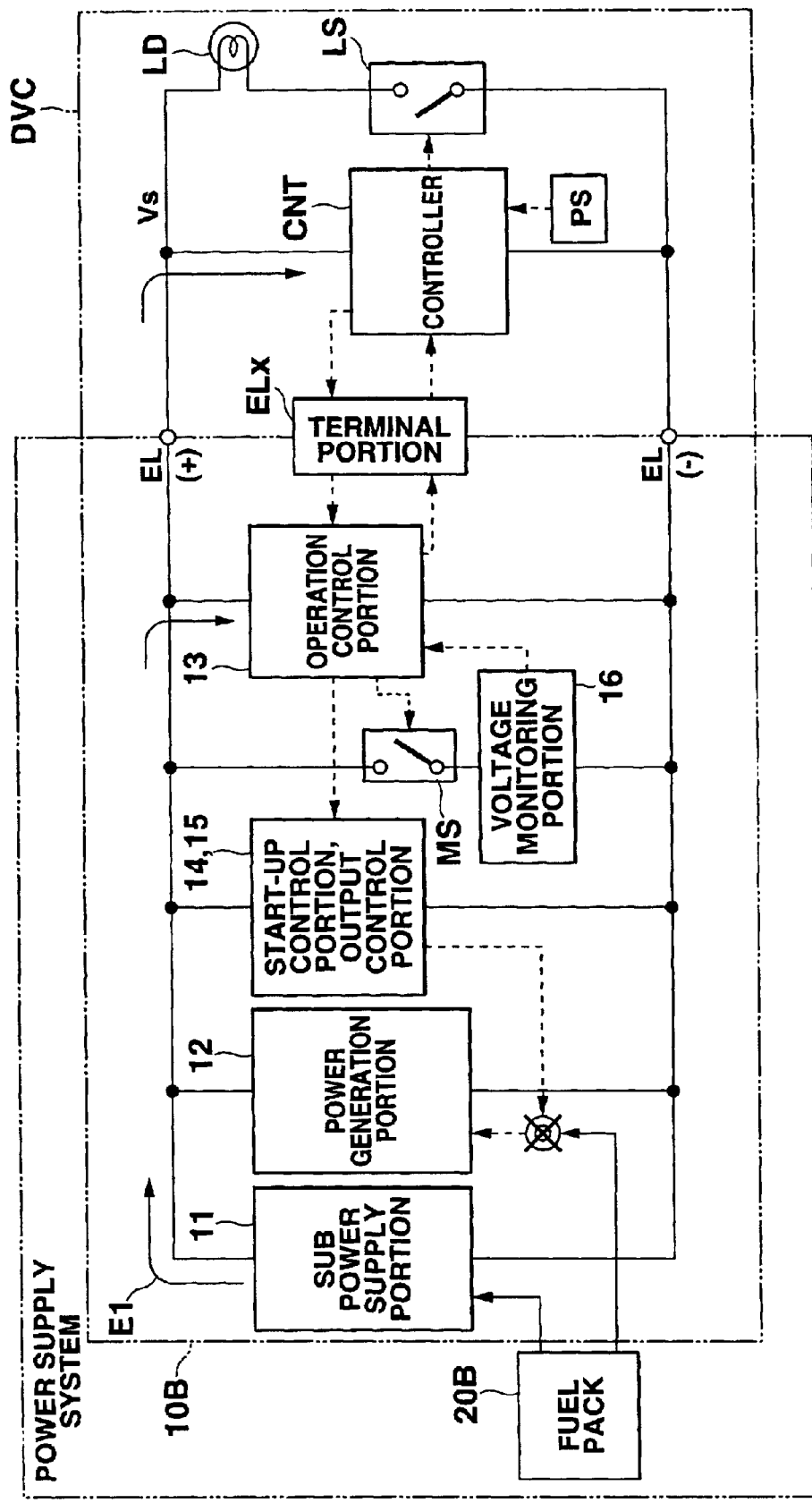
FIG. 35 is an operation conceptual view showing an initial operation (standby mode) of the power supply system according to the embodiment.
Figure 36:
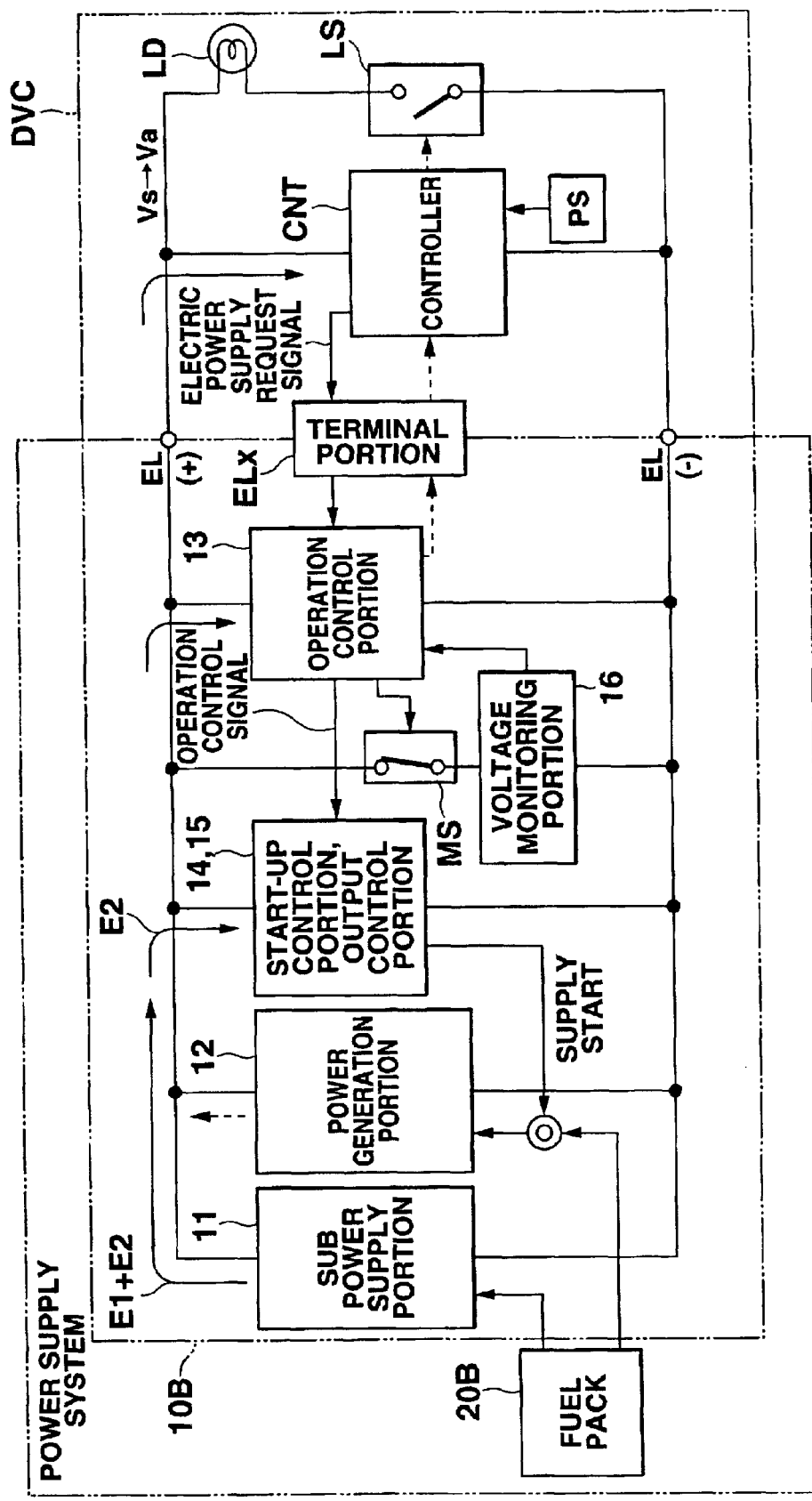
FIG. 36 is an operation conceptual view showing a start-up operation (part 1) of the power supply system according to the embodiment.
Figure 37:
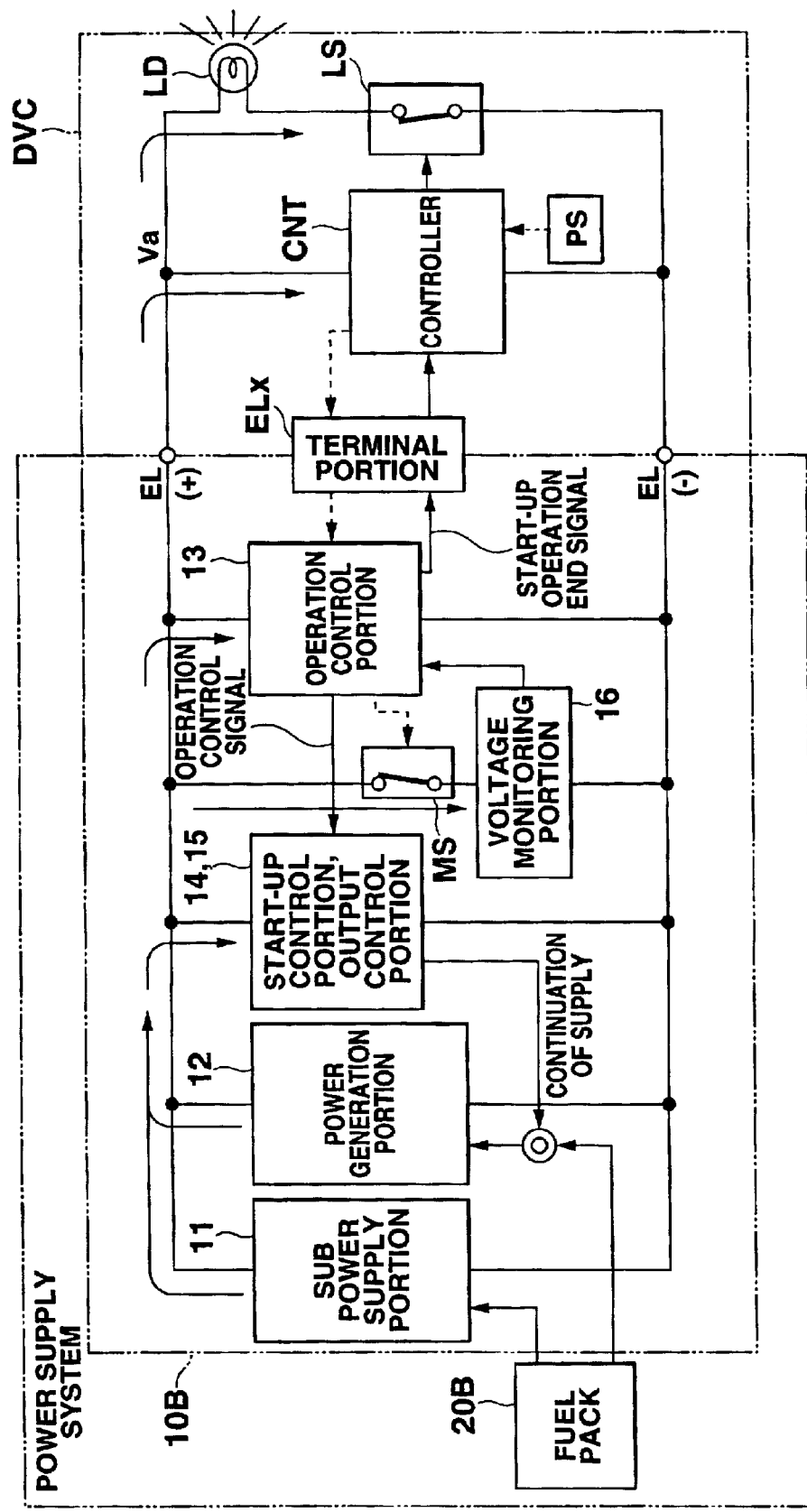
FIG. 37 is an operation conceptual view showing a start-up operation (part 2) of the power supply system according to the embodiment.
Figure 38:
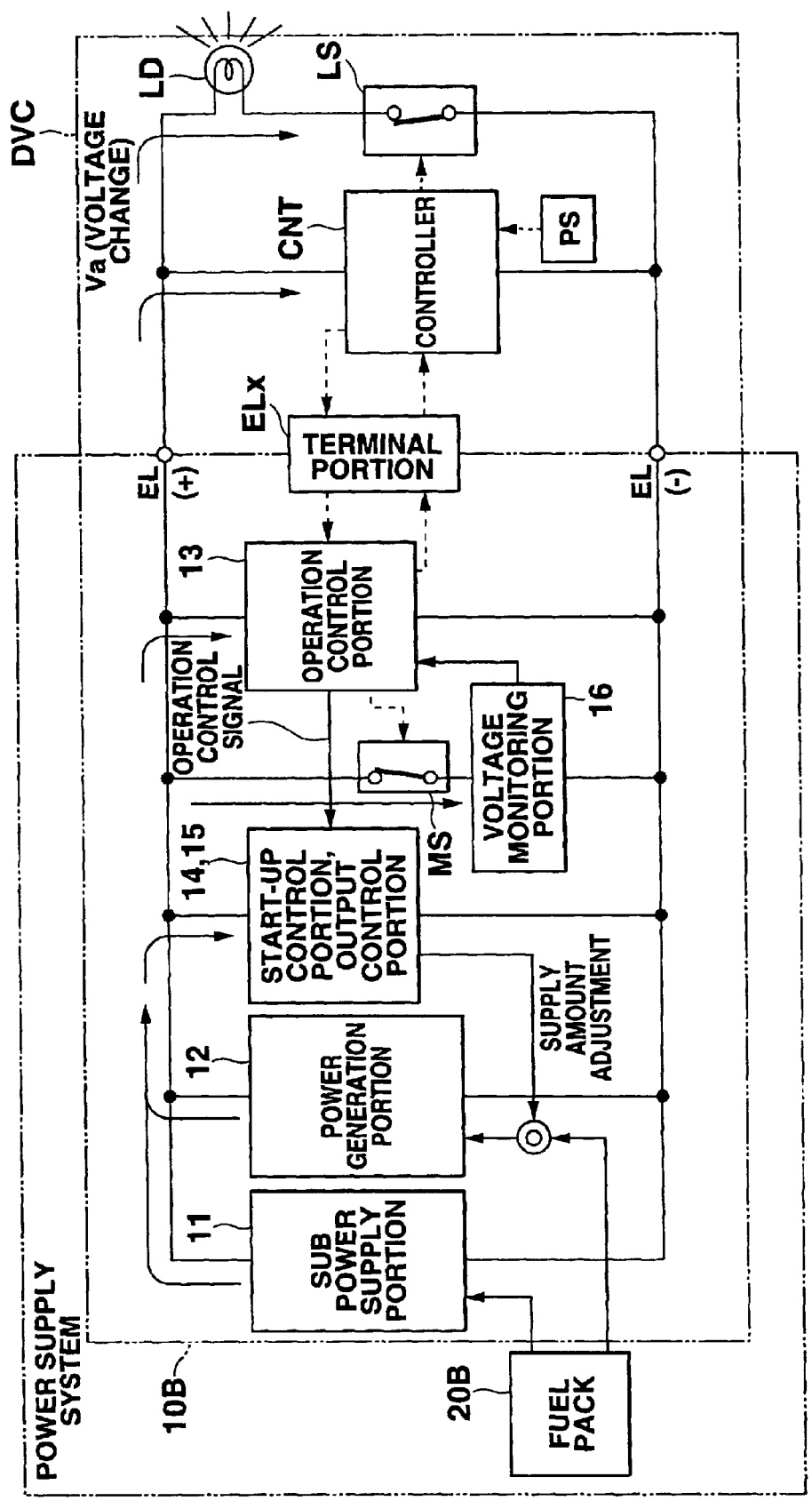
FIG. 38 is an operation conceptual view showing a steady operation (part 1) of the power supply system according to the embodiment.
Figure 39:
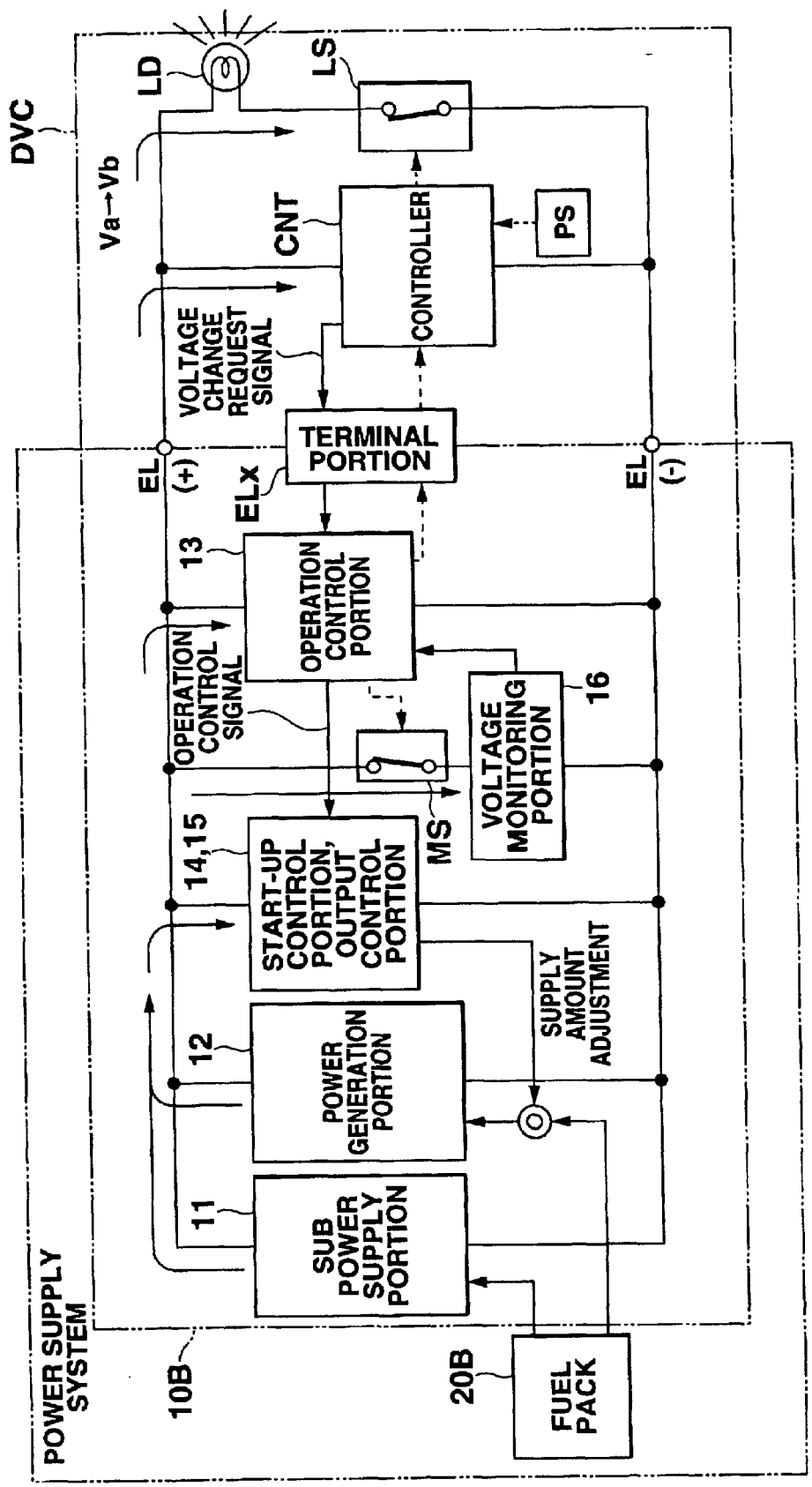
FIG. 39 is an operation conceptual view showing a steady operation (part 2) of the power supply system according to the embodiment.
Figure 40:
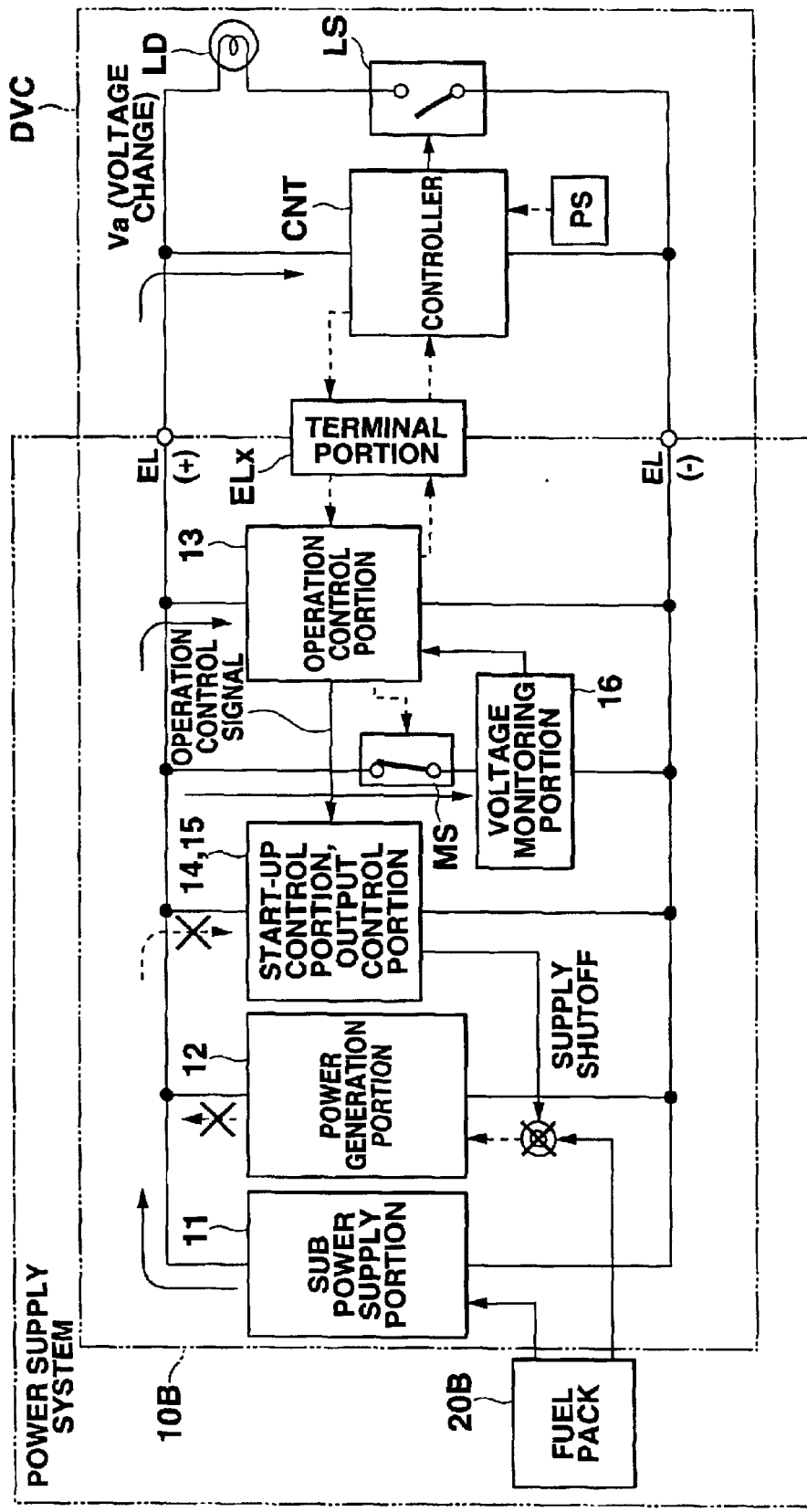
FIG. 40 is an operation conceptual view showing a stop operation (part 1) of the power supply system according to the embodiment.
Figure 41:
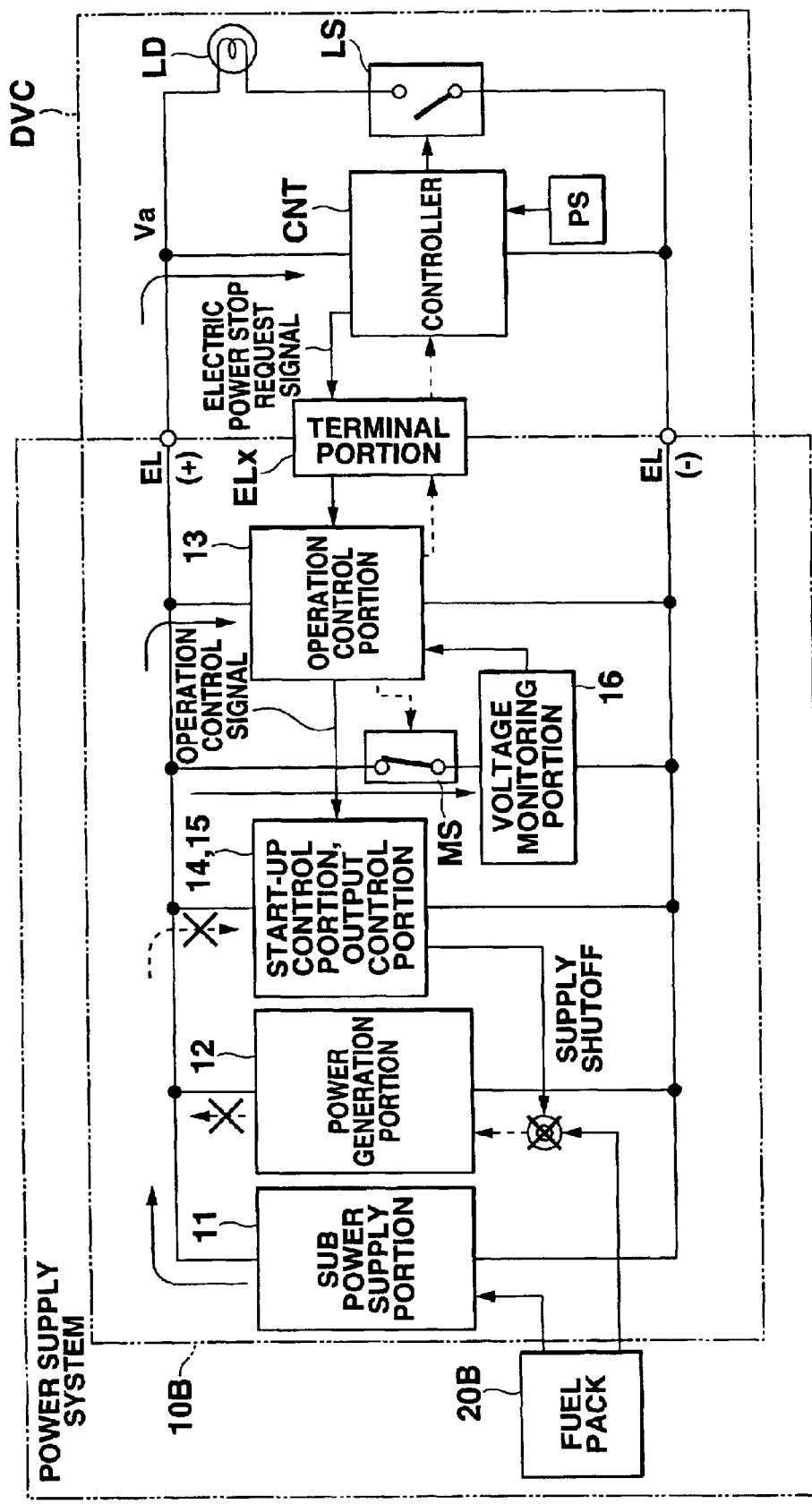
FIG. 41 is an operation conceptual view showing a stop operation (part 2) of the power supply system according to the embodiment.
Figure 42:
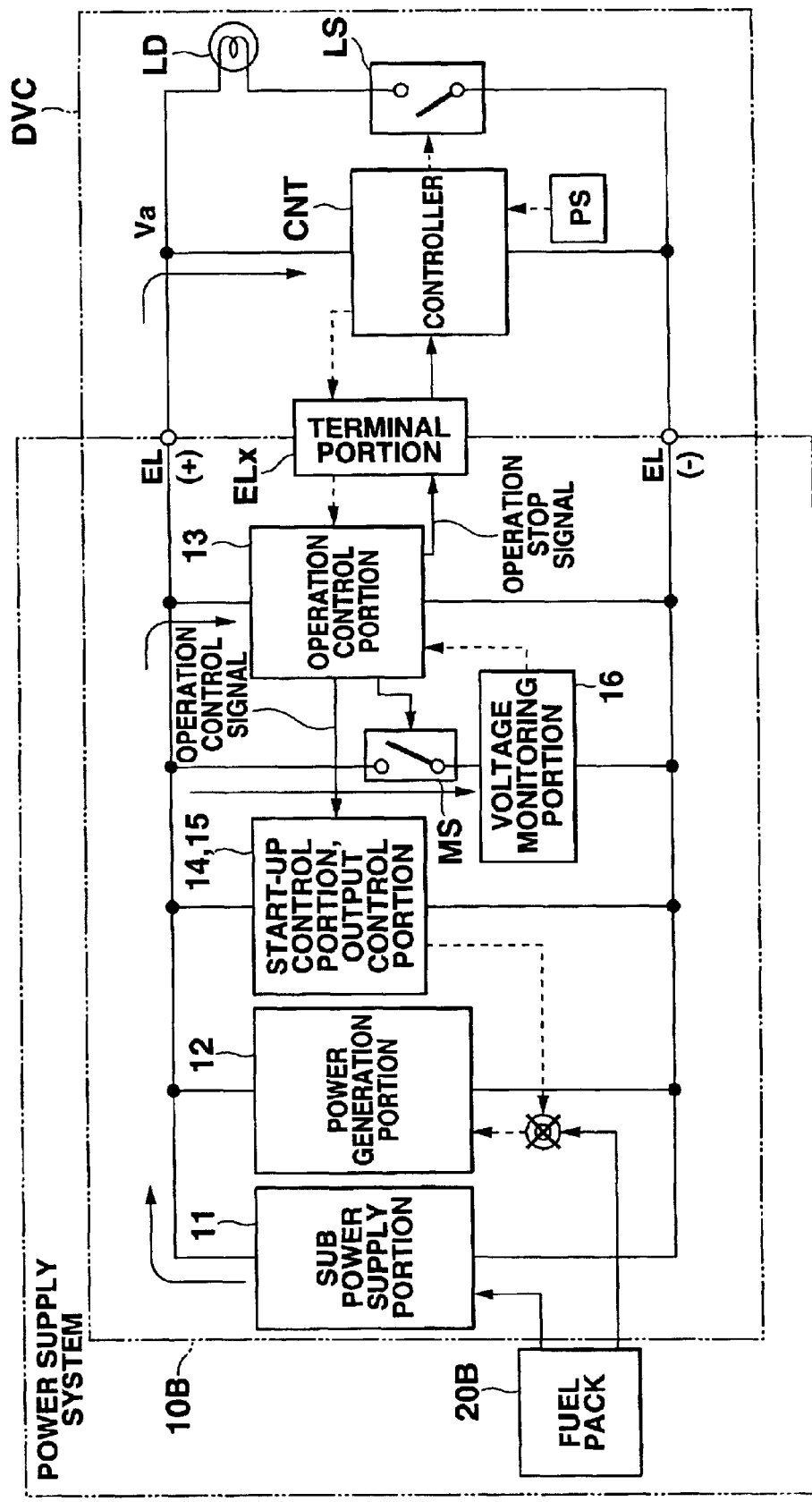
FIG. 42 is an operation conceptual view showing a stop operation (part 3) of the power supply system according to the embodiment.

FIG. 34 is a flowchart showing a schematic operation of the power supply system according to the second embodiment. FIG. 35 is a view showing an initial operation state (standby mode) of the power supply system according to this embodiment. FIGS. 36 and 37 are views showing a start-up operation state of the power supply system according to this embodiment. FIGS. 38 and 39 are views showing a steady operation state of the power supply system according to this embodiment. FIGS. 40 to 42 are views showing a stop operation state of the power supply system according to this embodiment. Here, the operation will be described while appropriately making reference to the structure of the above-described power supply system (FIGS. 32 and 33).

In this embodiment, upon receiving the load drive information concerning the drive control for the load notified from the controller CNT contained in the device DVC through a terminal portion ELx other than a positive electrode terminal EL (+) and a negative electrode terminal EL (−), the operation control portion 13 provided to the power generation module 10B executes a series of the operation controls mentioned below. In addition to the overall operation of this embodiment described below, all or only a part of the overall operation of the above-described first embodiment may be simultaneously executed in parallel.

That is, as shown in FIG. 34, as similar to the above-described first embodiment, the power supply system 301 having the structure according to this embodiment is generally controlled to perform: the initial operation (steps S201 and S202) for constantly and continuously generating and outputting electric power which can be operating electric power for the operation control portion 13 and drive electric power for the controller CNT (controller electric power) by the sub power supply portion 11; the start-up operation (steps S203 to S206) for generating and outputting electric power which can be load drive electric power by supplying start-up electric power to the power generation portion 12 and the output control portion 14 based on drive of the load LD; the steady operation (steps S207 to S210) for generating and outputting electric power (load drive electric power) according to the drive state of the load by adjusting an amount of the power generation fuel FL supplied to the power generation portion 12 based on a change in the drive state of the load LD; and the stop operation (steps S211 to S214) for terminating generation of electric power which can be the load drive electric power by shutting off supply of the power generation fuel FL to the power generation portion 12 based on stop of the load LD.

(A) Initial Operation of Second Embodiment

At first, in the initial operation, as shown in FIG. 35, as similar to the first embodiment, the power generation fuel charged in the fuel pack 20B is automatically supplied to the sub power supply portion 11 of the power generation module 10B through a fuel feed path provided to the I/F portion 30B (step S201), and electric power (second electric power) which can be operating electric power and controller electric power is autonomously generated and outputted by the sub power supply portion 11. Additionally, the operating electric power is continuously supplied to the operation control portion 13, and the power supply system is connected to the device DVC. As a result, the controller electric power is supplied as the supply electric power (voltage Vs) to the controller CNT built in the device DVC through the positive electrode terminal EL (+) and the negative electrode terminal EL (−) provided to the power supply system (step S202). Consequently, the mode is shifted to the standby mode in which only the operation control portion 13 of the power generation module 10A and the controller CNT of the device DVC are operative. In the standby mode, the operation control portion 13 constantly monitors the load drive information (later-described various kinds of electric power requests) notified from the controller CNT of the device DVC through the terminal portion ELx in accordance with the drive state of the load.

(B) Start-up Operation of Second Embodiment

Subsequently, in the start-up operation, as shown in FIG. 36, for example, when a user of the device DVC operates a power supply switch PS or the like provided to the device DVC (turning on), an electric power supply request signal requesting supply of electric power (first electric power) which can be the load drive electric power is first outputted as the load drive information from the controller CNT to the operation control portion 13 of the power generation module 10B through terminal portion ELx. Upon receiving the load drive information from the controller CNT (step S203), the operation control portion 13 outputs to the start-up control portion 15 an operation control signal for starting the operation (start-up) in the power generation portion 12 (step S204). Based on the operation control signal from the operation control portion 13, the start-up control portion 15 supplies the power generation fuel FL charged in the fuel pack 20B to the power generation portion 12 through the output control portion 14 and generates and outputs electric power (first electric power) which can be the load drive electric power by supplying a part of electric power (electric power E2) generated by the sub power supply portion 11 as the start-up electric power to the output control portion 14 (or the output control portion 14 and the power generation portion 12) (step S205). The load drive electric power is supplied to the device DVC as the supply electric power together with the controller electric power generated by the above-described sub power supply portion 11 through the positive electrode terminal EL (+) and the negative electrode terminal EL (−) (step S206). At this moment, the voltage of the supply electric power supplied to the device changes so as to gradually increase from the voltage Vs in the above-described standby mode.

Here, in the above-described start-up operation, as shown in FIG. 36, when outputting the operation control signal for starting up the power generation portion 12 at the step S204, the operation control portion 13 detects a change in voltage of the supply electric power (substantially the load drive electric power) which is generated and outputted by the power generation portion 12 and supplied to the device DVC through the voltage monitoring portion 16 at any given time by controlling the switch MS to the conductive state so as to connect the voltage monitoring portion 16 between the positive electrode terminal EL (+) and the negative electrode terminal EL (−). Then, as shown in FIG. 37, the operation control portion 13 notifies through the terminal portion ELx the controller CNT in the device DVC of the voltage data itself of the supply electric power detected by the voltage monitoring portion 16 at any given time, or a start-up operation end signal indicative of the fact that a predetermined voltage Va based on the electric power supply request has been reached as power generation operation information. When the voltage of the supply electric power supplied through the positive electrode terminal EL (+) and the negative electrode terminal EL (−) has reached the voltage Va appropriate for driving the load LD, the controller CNT controls the switch LS to the conductive state and supplies the supply electric power (load drive electric power) from the power supply system in order to drive the load LD based on the power generation operation information notified from the operation control portion 13.

(C) Steady Operation of Second Embodiment

Subsequently, in the steady operation, as shown in FIG. 38, as similar to the steps S107 to S110 described in connection with the first embodiment, the operation control portion 13 monitors a change in the voltage Va of the supply electric power (substantially a change in voltage of the load drive electric power) supplied to the device DVC through the voltage monitoring portion 16 at any given time, and executes a feedback control so that the voltage of the supply electric power can be set within a voltage range based on a predetermined specified value.

In such a steady operation, when the new drive state of the load LD is controlled and grasped by the controller CNT of the device DVC, as shown in FIG. 39, an electric power change request signal requesting supply of new electric power (for example, the supply electric power having a voltage Vb) according to the drive state of the load LD is outputted to the operation control portion 13 through the terminal portion ELx as the load drive information. Upon receiving the load drive information, the operation control portion 13 outputs to the output control portion 14 an operation control signal for setting electric power generated and outputted by the power generation portion 12 with respect to the start-up control portion 15 to the load drive electric power according to the new drive state of the load LD (step S208).

Based on the operation control signal from the operation control portion 13, the output control portion 14 adjusts an amount of the power generation fuel FL to be supplied to the power generation portion 12 or a heating time and a heating temperature of the heater (step S209), and controls so that the supply electric power supplied to the device DVC (load drive electric power) can have a voltage corresponding to the new drive state of the load LD (step S210). That is, the operation control portion 13 changes the specified value for setting the voltage range concerning the feedback control to the voltage Vb based on the electric power change request signal by receiving the electric power change request signal, and controls an amount of power generation in the power generation portion 12 so that the load drive electric power having a voltage corresponding to the changed voltage range can be generated. As a result, since the appropriate electric power is supplied in accordance with the drive state (load state) of the load LD on the device DVC side, the electric power corresponding to the power consumption of the device DVC (load LD) can be supplied, and the load LD can be excellently driven. Also, since a great change in voltage of the supply electric power involved by a change in the drive state of the load LD can be suppressed, production of the operational malfunction or the like in the device DVC can be held down.

(D) Stop Operation of Second Embodiment

Subsequently, in the steady operation mentioned above, as shown in FIG. 40, as similar to the steps S111 to S114 described in connection with the first embodiment, as a result of change of the device DVC from the on state to the off state (for example, the switch LS for supplying the load drive electric power to the load LD is controlled for shutoff) during the feedback control for the supply electric power, or as a result of the malfunction of the device DVC or the power supply system 301 provoked for some reason, when the state that the voltage Va of the supply electric power deviates from a predetermined voltage range is continuously detected for a predetermined period of time, the operation control portion 13 performs processing for this detected state as a voltage malfunction and outputs an operation control signal to the output control portion 14. The operation control portion 13 thereby, for example, shuts off supply of the power generation fuel FL to the power generation portion 12 and controls to stop the power generation operation in the power generation portion 12 (automatic power supply shut-off (auto power-off) operation).

Further, in the steady operation, as shown in FIG. 41, if the load LD is stopped by controlling the switch LS supplying electric power to the load LD to the shutoff state by the controller CNT when a user of the device DVC operates the power supply switch PS or the like (turning off), or if the load is run out (ceased) by removing the power supply system 301 from the device DVC, stop of driving the load LD is controlled and grasped by the controller CNT of the device DVC, and an electric power stop request signal requesting stop of supply of the supply electric power (load drive electric power) from the power supply system is outputted to the operation control portion 13 through the terminal portion ELx as the load drive information. Upon receiving the load drive information (step S211), the operation control portion 13 outputs to the output control portion 14 an operation control signal for stopping generation of electric power in the power generation portion 12 (step S212). Based on the operation control signal from the operation control portion 13, the output control portion 14 shuts off supply of the power generation fuel FL to the power generation portion 12 and stops heating of the heater for facilitating endoergic reaction for generating hydrogen (step S213). The output control portion 14 thereby stops the power generation operation in the power generation portion 12 and stops supply of the electric power (load drive electric power) other than the controller electric power to the device DVC (step S214).

Then, in the stop operation illustrated in FIG. 40 or 41, when the operation control portion 13 grasps shutdown of the power generation portion 12 by, for example, outputting the operation control signal for stopping generation of electric power in the power generation portion 12, or by detecting a change in voltage of the supply electric power (substantially the load drive electric power), which is attenuated by shutdown of the power generation portion 12, through the voltage monitoring portion 16 at any given time, as shown in FIG. 42, the operation control portion 13 electrically separates the voltage monitoring portion 16 from the position between the positive electrode terminal EL (+) and the negative electrode terminal EL (−) and notifies through the terminal portion ELx the controller CNT in the device DVC of a power supply shutoff notification signal (auto power-off notification signal) indicative of stop of the power generation operation in the power generation portion 12 or an operation stop signal as power generation operation information. As a result, supply of the power generation fuel is shut off and the power generation portion 12 is automatically shut down with respect to stop of driving the load LD in the device DVC. Then, supply of the load drive electric power to the device DVC is stopped, and the power supply system 301 and the device DVC again enter the above-described standby mode.

As described above, according to the power supply system of this embodiment, as similar to the first embodiment, the control for supplying and stopping electric power which can be predetermined drive electric power and the control for adjusting an amount of electric power to be generated can be enabled in accordance with the drive state of the device (load) connected to the power supply system and, in particular, the power generation portion 12 can perform the power generation operation only in a period of the operating mode in which the device DVC can be normally driven. Therefore, the power generation fuel can be efficiently consumed, and the electromotive force can be maintained for a long time. Accordingly, it is possible to provide the power supply system which can realize the electrical characteristic substantially equivalent to that of the general-purpose chemical cell, has less burden on the environment and has the extremely high energy utilization efficiency.

In this embodment, although description has been given as to bi-directional information notification that the load drive information is notified from the device DVC to the power supply system and the power generation operation information is notified from the power supply system to the device DVC, the present invention is not restricted thereto. The load drive electric power according to the drive state of the load may be generated and outputted in the power supply system (power generation module) by performing at least one-way information notification that the load drive information is notified from the device DVC to the power supply system.

[Third Embodiment]

A third embodiment of the power generation module applied to the power supply system according to the present invention will now be described with reference to the drawings.

Figure 43:
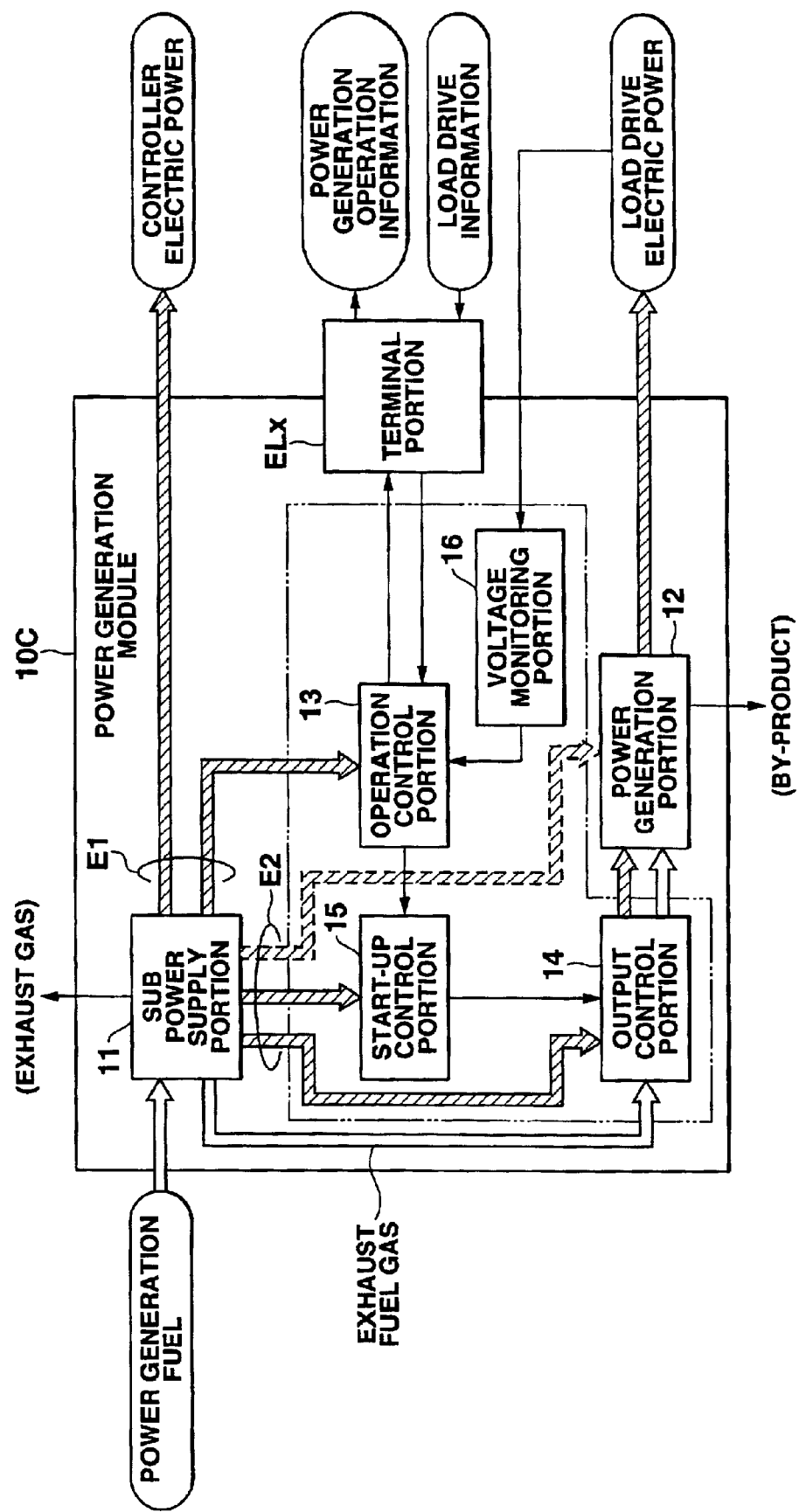
FIG. 43 is a block diagram showing a third embodiment of a power generation module applied to the power supply system according to the present invention.

FIG. 43 is a block diagram showing a third embodiment of the power generation module applied to the power supply system according to the present invention. Here, as similar to the second embodiment mentioned above, although description will be given as to the structure in which predetermined information is notified between the power supply system and the device to which the power supply system is connected through the terminal portion ELx, it is needless to say that there may be provided a structure in which the power supply system is connected with the device only through the electrode terminals (the positive electrode terminal and the negative electrode terminal) and any special notification is not carried out between the power supply system and the device as similar to the first embodiment. Furthermore, like reference numerals denote members equivalent to those in the first and second embodiments mentioned above, thereby simplifying or omitting their explanation.

In the power generation modules 10A and 10B according to the first and second embodiments, description has been given as to the structure for directly exhausting the power generation fuel FL utilized in the sub power supply portion 11 to the outside of the power supply system 301, as exhaust gas, or collecting the power generation fuel FL by the later-described by-product collecting means. In the power generation module 10C according to this embodiment, however, when a specific fuel component such as hydrogen or a hydrogen compound is contained even if the power generation operation in the sub power supply portion 11 involves or does not involve a change in component as a compound of the power generation fuel FL, the power generation fuel FL utilized in the sub power supply portion 11 is directly reused as the power generation fuel in the power generation portion 12, or reused by extracting a specific fuel component.

Specifically, as shown in FIG. 43, the power generation module 10C according to this embodiment includes: a sub power supply portion 11 having the structure and function similar to those in the above-described second embodiment (see FIG. 32); a power generation portion 12; an operation control portion 13; an output control portion 14; a start-up control portion 15; a voltage monitoring portion 16; and an electrode portion ELx. In particular, the power generation module 10C is configured in such a manner that all or a part of the power generation fuel used for generating electric power in the sub power supply portion 11 (which will be referred to as "exhaust fuel gas" for the sake of convenience) can be supplied to the power generation portion 12 through the output control portion 14 without being emitted to the outside of the power generation module 10C.

The sub power supply portion 11 applied to this embodiment has the structure capable of generating and outputting predetermined electric power (second electric power) without consuming and converting a fuel component of the power generation fuel FL supplied from the fuel pack 20 through the I/F portion 30 (for example, the power generation device shown in the second, third, fifth or seventh structural example in the above-described first embodiment), or the structure for generating the exhaust fuel gas containing a fuel component which can be used for the power generation operation in the power generation portion 12 even if the fuel component of the power generation fuel FL is consumed and converted (for example, the power generation device shown in the fourth or sixth structural example in the above-described first embodiment).

In case of applying the power generation device shown in the first to sixth structural examples in the first embodiment mentioned above as the power generation portion 12, as the power generation fuel FL charged in the fuel pack 20, there is applied a fuel substance having the ignitability or combustibility, for example, an alcohol-based liquid fuel such as methanol, ethanol or butanol, or a liquefied fuel consisting of hydrocarbon such as dimethyl ether, isobutane or natural gas, or a gas fuel such as hydrogen gas.

That is, the liquid fuel or the liquefied fuel is a liquid when it is charged in the fuel pack 20 under predetermined charging conditions (temperature, pressure and others). Such a fuel is vaporized to become fuel gas having the high pressure when shifting to predetermined environmental conditions such as an ordinary temperature or an ordinary pressure at the time of supply to the sub power supply portion 11. Also, when the gas fuel is compressed with a predetermined pressure to be charged in the fuel pack 20 and supplied to the sub power supply portion 11, it becomes fuel gas having the high pressure according to the charging pressure. Therefore, after generating electric power (second electric power) from such a power generation fuel FL by using, e.g., the pressure energy of the fuel gas in the sub power supply portion 11, electric power (first electric power) can be produced by the electrochemical reaction, the combustion reaction or the like using the exhaust fuel gas from the sub power supply portion 11 in the power generation portion 12.

[Fourth Embodiment]

A fourth embodiment of the power generation module applied to the power supply system according to the present invention will now be described with reference to the drawings.

Figure 44:
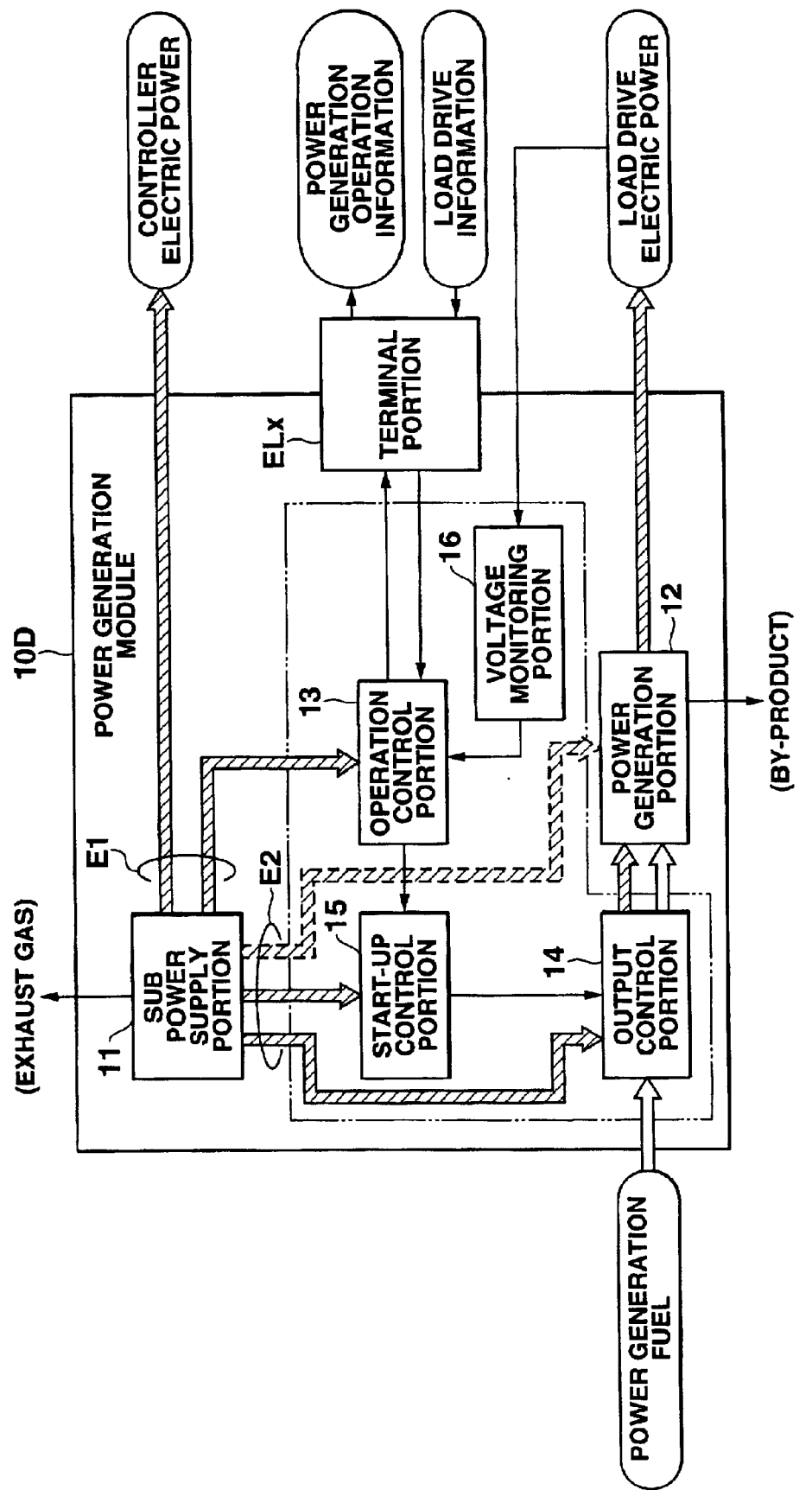
FIG. 44 is a block diagram showing a fourth embodiment of a power generation module applied to the power supply system according to the present invention.

FIG. 44 is a block diagram showing a fourth embodiment of the power generation module applied to the power supply system according to the present invention. Here, although description will be given as to the structure in which predetermined information is notified between the power supply system and the device to which the power supply system is connected as similar to the second and third embodiments mentioned above, the structure (structure explained in connection with the first embodiment) in which any special notification is not carried out between the power supply system and the device may be adopted. Furthermore, like reference numerals denote parts equivalent to those of the first to third embodiments mentioned above, thereby simplifying or omitting their explanation.

As to the power generation modules 10A and 10B according to the first to third embodiments mentioned above, description has been given on application of the structure as the sub power supply portion 11 in which predetermined electric power (second electric power) is constantly autonomously generated by using the power generation fuel supplied from the fuel packs 20A and 20B. However, the power generation module according to this embodiment has the structure in which the sub power supply portion 11 constantly autonomously generates predetermined electric power without using the power generation fuel FL charged in the fuel pack.

Specifically, as shown in FIG. 44, the power generation module 10D according to this embodiment includes: a power generation portion 12 having the structure and function similar to those in the second embodiment (see FIG. 32) mentioned above; an operation control portion 13; an output control portion 14; a start-up control portion 15; a voltage monitoring portion 16; and an electrode portion ELx, and also has a sub power supply portion 11 for constantly autonomously generating predetermined electric power (second electric power) without using the power generation fuel FL charged in the fuel pack.

As a concrete structure of the sub power supply portion 11, it is possible to excellently apply, for example, one utilizing thermoelectric conversion based on a difference in temperature in the circumference environment of the power supply system 301 (temperature difference power generation), as well as one utilizing photoelectric conversion based on the light energy entering from the outside of the power supply system 301 (photovoltaic generation).

A concrete example of the sub power supply portion 11 will now be described hereinafter with reference to the drawings.

(First Structural Example of Non-fuel Type Sub Power Supply Portion)

Figure 45A:
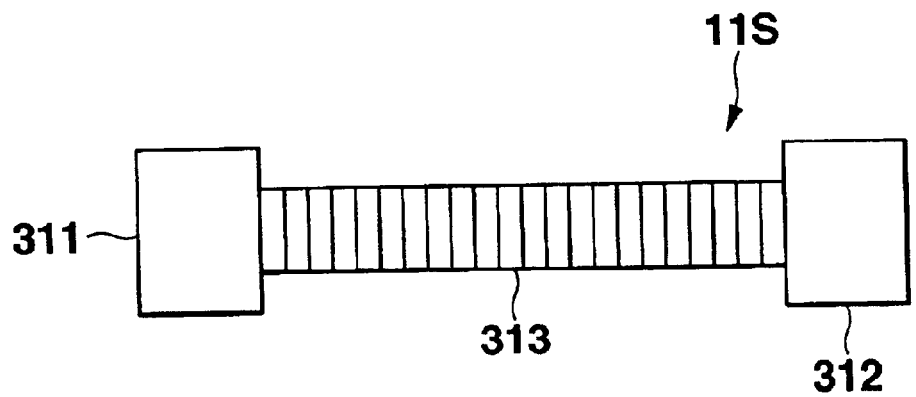
FIGS. 45A and 45B are views schematically showing a first structural example of a sub power supply portion applicable to the power generation module according to the embodiment.
Figure 45B:
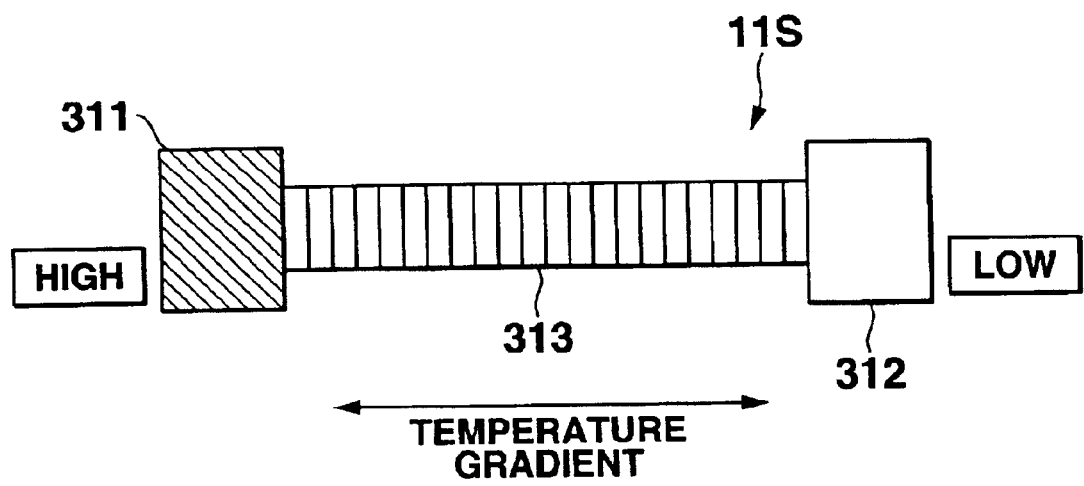

FIGS. 45A and 45B are schematic structural views showing a first structural example of the sub power supply portion applicable to the power generation module according to this embodiment.

In the first structural example, as a concrete example, the sub power supply portion 11S has a structure as a power generation device for generating electric power by thermoelectric conversion power generation utilizing a difference in temperature in the circumferential environment inside and outside the power supply system 301.

As shown in FIG. 45A, the sub power supply portion 11S according to the first structural example has, for example, a structure of a temperature difference power generator including: a first temperature holding portion 311 provided to one end side of the power supply system 301; a second temperature holding portion 312 provided to the other end side of the power supply system 301; a thermoelectric conversion element 313 having one end side connected to the first temperature holding portion side 311 and the other end connected to the second temperature holding portion side 312. Here, the first and second temperature holding portions 311 and 312 are constituted in such a manner that their heat quantities vary at any given time in accordance with a temperature state of the circumferential environment inside and outside the power supply system 301, and their arrangement positions are set in such a manner that temperatures in the first and second temperature holding portions 311 and 312 are different from each other.

Specifically, for example, it is possible to apply the structure that any one of the first and second temperature holding portions 311 and 312 is constantly exposed to outside air or atmosphere through an opening portion or the like (not shown) provided to the device DVC to which the power supply system 301 is attached so that it can be maintained at a fixed temperature. Furthermore, the thermoelectric conversion element 313 has the structure equivalent to that shown in the fourth structural example (see FIG. 8B) in the above-described first-embodiment. Incidentally, as to the structure of the sub power supply portion 11S having the temperature difference power generator, the sub power supply portion 11S can be also integrated and formed in a small space by applying the micromachine manufacturing technique in this embodiment, as similar to the structure of the above-described embodiments.

In the sub power supply portion 11S having such a structure, as shown in FIG. 45B, when a temperature gradient is produced between the first and second temperature holding portions 311 and 312 with bias of the temperature distribution in the surroundings of the power supply system 301, the electromotive force according to the thermal energy obtained from the temperature gradient is generated by the Seebeck effect in the thermoelectric conversion element 313, thereby producing electric power.

By applying the power generation device having such a structure to the sub power supply portion, therefore, predetermined electric power is constantly autonomously generated by the sub power supply portion 11S as long as there is bias of the temperature distribution in the surroundings of the power supply system 301, and it can be supplied to each structure inside and outside the power supply system 301. Moreover, according to this structure, since all of the power generation fuel FL charged in the fuel pack 20 can be utilized for generation of electric power (first electric power) in the power generation portion 12, the power generation fuel can be effectively used, and the electric power as the load drive electric power can be supplied to the device DVC for a long period of time.

Although description has been given as to the temperature difference power generator for generating electric power with respect to bias of the temperature distribution in the surroundings by the Seebeck effect in this structural example, the present invention is not restricted thereto, and it may have a structure for generating electric power based on the thermoelectronic emission phenomenon that free electrons are emitted from the metal surface by heating the metal.

(Second Structural Example of Non-fuel Type Sub Power Supply Portion)

Figure 46A:
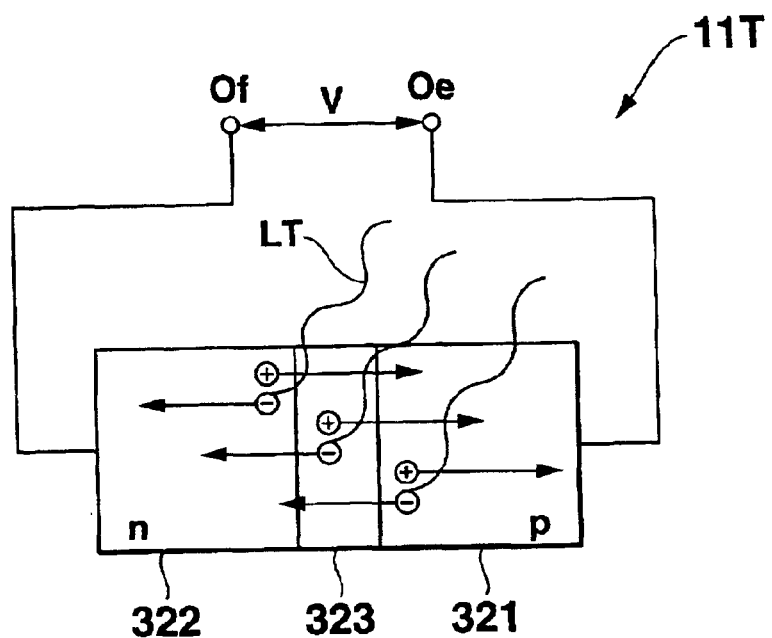
FIGS. 46A and 46B are views schematically showing a second structural example of the sub power supply portion applicable to the power generation module according to the embodiment.
Figure 46B:
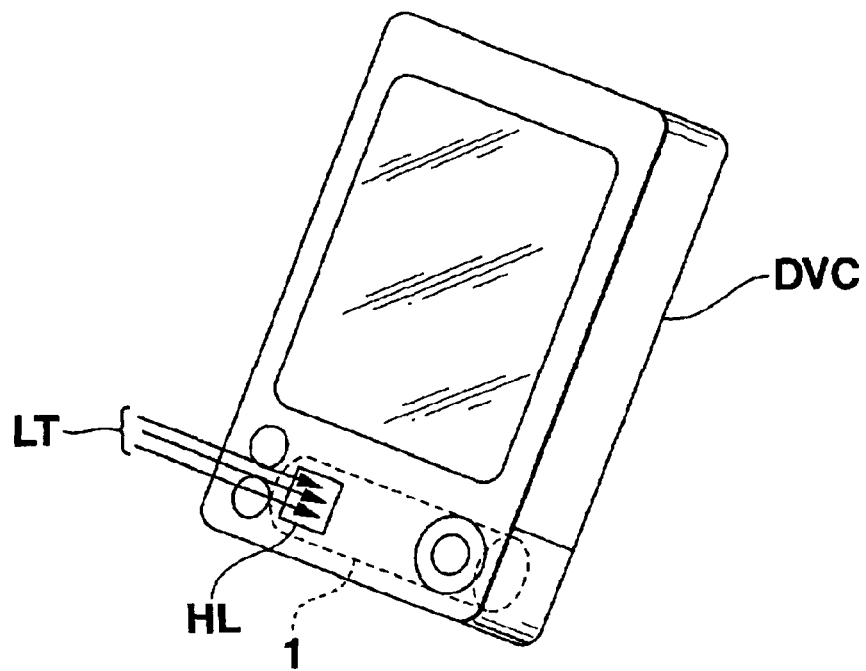

FIGS. 46A and 46B are schematic structural views showing a second structural example of the sub power supply portion 11T applicable to the power generation module according to this embodiment.

In the second structural example, as a concrete example, the sub power supply portion has a structure as a power generation device for generating electric power by photoelectric conversion power generation utilizing the light energy entering from the outside of the power supply system 301.

As shown in FIG. 46A, the sub power supply portion 11T according to the first structural example constitutes, for example, a known photoelectric conversion cell (solar cell) having a p-type semiconductor 321 and an n-type semiconductor 322 joined together.

When such a photoelectric conversion cell is irradiated with light (light energy) LT having a predetermined wavelength, electron-positive hole pairs are generated in the vicinity of a p-n junction portion 323 by the photovoltaic effect, and electrons (−) polarized by the electric field in the photoelectric conversion cell drift to the n-type semiconductor 322 while positive holes (+) drift to the p-type semiconductor 321, and the electromotive force is generated between the electrodes (between the output terminals Oe and Of) respectively provided to the p-type semiconductor and the n-type semiconductor, thereby producing electric power.

Here, in general, since an accommodation space for a cell (or a power supply unit) in an existing device is arranged at a position where the light energy (specifically, the sunbeam or the illumination light) on the rear surface side or the like of the device is hard to enter or this space has a structure for completely accommodating the cell in the device, there is the possibility that the light can not sufficiently enter the sub power supply portion. In case of attaching the power supply system 301 to which the sub power supply portion 11T according to this structural example is applied to the device DVC, therefore, as shown in FIG. 46B, it is necessary to apply a structure such that the minimum light energy (light LT having a predetermined wavelength) required for generating predetermined electric power in the sub power supply portion 11T can enter by adopting the structure that an opening portion or portions HL are provided to the device DVC in advance or the structure that a housing of the device DVC is constituted by a transparent or semitransparent member so that at least the sub power supply portion 11 or the power generation module 10C can be exposed.

By applying the power generation device having such a structure to the sub power supply portion, therefore, predetermined electric power can be constantly autonomously generated by the sub power supply portion 11T and supplied to each structure inside and outside the power supply system 301 as long as the device DVC is used in the environment where the predetermined light energy can enter, for example, the outdoor or indoor environment. In addition, according to this structure, since all of the power generation fuel FL charged in the fuel pack 20 can be used for producing electric power (first electric power) in the power generation portion 12, the power generation fuel can be effectively utilized.

Incidentally, in this structural example, in FIG. 46B, although only the most basic structure of the photoelectric conversion cell (solar cell) has been described, the present invention is not restricted thereto, a structure based on any other configuration or principle having the higher power generation efficiency may be applied.

<By-Product Collecting Means>

By-product collecting means applicable to the power supply system according to each embodiment mentioned above will now be described with reference to the drawings.

Figure 47:
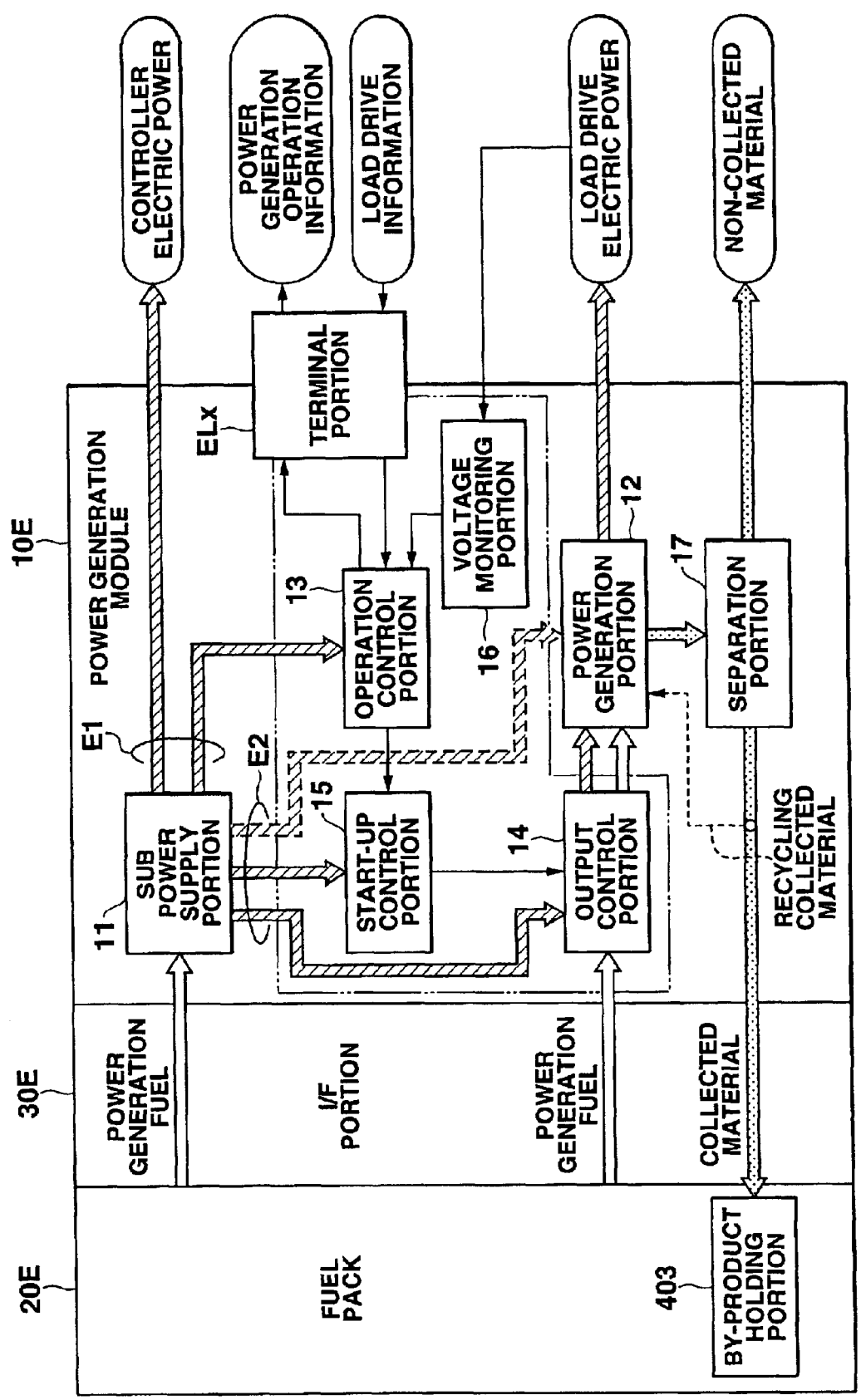
FIG. 47 is a block diagram showing an embodiment of by-product collecting means applicable to the power supply system according to the present invention.

FIG. 47 is a block diagram showing a first embodiment of by-product collecting means applicable to the power supply system according to the present invention. Here, as similar to the second to fourth embodiments mentioned above, although description will be given as to the structure in which predetermined information is notified between the power supply system and the device to which the power supply system is connected, a structure in which any special information is not notified between the power supply system and the device (structure described in connection with the first embodiment) may be used. In addition, like reference numerals denote parts equivalent to those in each embodiment mentioned above, thereby simplifying or omitting their explanation.

In each of the above-described embodiments, when there is applied as the power generation portion 12 or the sub power supply portion 11 the structure for generating predetermined electric power with the electrochemical reaction or the combustion reaction by using the power generation fuel FL charged in the fuel pack 20E (the power generation portion or the sub power supply portion shown in each of the above structural examples), a by-product may be emitted besides the electric power. Since such a by-product may contain a substance which can cause environmental destruction when emitted to the natural world or a substance which can be a factor of the malfunction of the device to which the power supply system is attached in some cases, it is preferable to apply a structure including such by-product collecting means as described below because emission of such a by-product must be suppressed as much as possible.

In the power generation module 10E, the fuel pack 20E and the I/F portion 30E having the structure and function equivalent to those in each of the above-described embodiments, as shown in FIG. 47, the by-product collecting means applicable to the power supply system according to the present invention has a configuration in which, for example, a separation portion 17 for collecting all or a part of the by-product generated at the time of generation of electric power in the power generation portion 12 is provided in the power generation module 10E and a by-product charged portion 403 for fixedly holding the collected by-product is provided in the fuel pack 20E. Incidentally, although only the case where the by-product generated in the power generation power 12 is collected will be described in detail, it is needless to say that such a structure can be similarly applied to the sub power supply portion 11.

The separation portion 17 has the structure shown in each of the foregoing embodiments. In the power generation portion 12 (sub power supply portion 11 may be included) for generating electric power which can be the load drive electric power (voltage/electric current) with respect to the device DVC to which the power supply system 301 is attached, the separation collection portion 17 separates a by-product generated at the time of generation of the electric power or a specific component in the by-product, and supplies it to the by-product charged portion 403 provided in the fuel pack 20E through a by-product collection path disposed in the I/F portion 30E.

Incidentally, in the power generation portion 12 (sub power supply portion 11 may be included) to which each of the foregoing embodiments is applied, as a by-product generated at the time of generation of electric power, there are water ($H_2O$) and others, and all or a part of them or only a specific component is collected by the separation portion 17 and supplied to the by-product collection path. Meanwhile, if the collected by-product is in a liquid state, the capillary phenomenon can be utilized in order to automatically supply the by-product from the separation portion 17 to the by-product charged portion 403 by forming the by-product collection path so that its inside diameter can continuously vary.

Further, the by-product charged portion 403 is provided to the inside or a part of the fuel pack 20E, and configured so as to be capable of supplying and holding the by-product collected by the separation portion 17 only when the fuel pack 20E is coupled with the power generation module 10E. That is, in the power supply system configured so that the fuel pack 20E can be attached to and detached from the power generation module 10E without restraint, with the fuel pack 20E being separated from the power generation module 10E, the by-product or a specific component collected and held can be fixedly or irreversibly held in the by-product charged portion 403 so that the by-product or a specific component can not leak or be exhausted to the outside of the fuel pack 20E.

Here, as described above, in cases where water ($H_2O$), nitrogen oxide (NOx) or sulfur oxide (SOx) is produced as a by-product by power generation in the power generation portion 12, since water ($H_2O$) is in a liquid state at an ordinary temperature under an ordinary pressure, the by-product can be excellently supplied to the by-product charged portion 403 through the by-product collection path. However, in case of a by-product such as nitrogen oxide (NOx) or sulfur oxide (SOx) which is slightly generated as the case may be, and whose evaporation point is below an ordinary temperature under an ordinary pressure and which is in a gas state, since there is the possibility that its cubic volume becomes extravagant and exceeds a preset capacity of the by-product charged portion 403, the collected by-product may be liquefied and its cubic volume may be reduced by increasing the air pressure in the separation portion 17 and the by-product charged portion 403, thereby holding the by-product in the by-product charged portion 403.

Therefore, as a concrete structure of the by-product charged portion 403, it is possible to excellently apply a structure capable of, e.g., irreversibly absorbing, both absorbing and fixing, or fixing the collected by-product or a specific component, for example, a structure that the absorbing polymer is filled in the by-product charged portion 403, or a structure including collected material leak preventing means such as a control valve which closes by the internal pressure of the by-product charged portion 403 or the physical pressure of a spring or the like as similar to the above-described fuel leak preventing means provided to the fuel pack 20.

Moreover, in the power supply system provided with the by-product collecting means having such a structure, in case of applying as the power generation portion 12 such a fuel reforming type fuel cell as shown in FIG. 19, carbon dioxide ($CO_2$) generated together with hydrogen gas ($H_2$) involved by the vapor reforming reaction, the aqueous shift reaction and the selected oxidation reaction (see the chemical equations (1) to (3)) in the fuel reforming portion 210a and water ($H_2O$) generated together with generation of electric power (first electric power) involved by the electrochemical reaction (see the chemical equations (6) and (7)) in the fuel cell portion 210b are exhausted from the power generation portion 12 as by-products. However, since an amount of carbon dioxide ($CO_2$) to be supplied is very small and there is almost no influence on the device, it is emitted to the outside of the power supply system as a non-collected substance and, on the other hand, water ($H_2O$) or the like is collected by the separation portion 17. Then, it is supplied to the by-product charged portion 403 in the fuel pack 20E through the by-product collection path by utilizing the capillary phenomenon and irreversibly held in the collection holding portion 21, for example.

Here, since the electrochemical reaction (chemical equations (2) and (3)) in the power generation portion 12 (fuel cell portion) proceeds at a temperature of approximately 60 to 80° C., water ($H_2O$) generated in the power generation portion 12 is exhausted in the substantially vapor (gas) state. Thus, the separation portion 17 liquefies only a water ($H_2O$) component by, for example, cooling the vapor emitted from the power generation portion 12 or by applying the pressure and separates it from other gas components, thereby collecting this component.

Incidentally, in this embodiment, description has been given as to the case where the fuel reforming type fuel cell is applied as the structure of the power generation portion 12 and methanol ($CH_3OH$) is applied as the power generation fuel. Therefore, separation and collection of a specific component (namely, water) in the separation portion 17 can be relatively easily realized when the majority of the by-product involved by power generation is water ($H_2O$) and also a small amount of carbon dioxide ($CO_2$) is exhausted to the outside of the power supply system. However, when a substance other than methanol is applied as the power generation fuel, or when a structure other than the fuel cell is applied as the power generation portion 12, a relatively large amount of carbon dioxide ($CO_2$), nitrogen dioxide (NOx), sulfur dioxide (SOx) or the like may be generated together with water ($H_2O$) in some cases.

In such a case, after separating, for example, water as a liquid from any other specific gas component (carbon dioxide or the like) generated in large quantities in the separation portion 17 by the above-described separation method, they may be held together or individually in a single or a plurality of the by-product charged portion 403 provided in the fuel pack 20E.

As described above, according to the power supply system to which the by-product collecting means according to this embodiment is applied, since emission or leak of the by-product to the outside of the power supply system can be suppressed by irreversibly holding in the by-product charged portion 403 provided in the fuel pack 20E at least one component of the by-product generated when generating electric power by the power generation module 10E, the malfunction or deterioration of the device due to the by-product (for example, water) can be prevented. Also, by collecting the fuel pack 20E holding the by-product therein, the by-product can be appropriately processed by a method which does not impose a burden on the natural environment, thereby preventing pollution of the natural environment or global warming due to the by-product (for example, carbon dioxide).

The by-product collected by the above-described separation collection method is irreversibly held in the collection holding portion by the following holding operation.

Figure 48A:
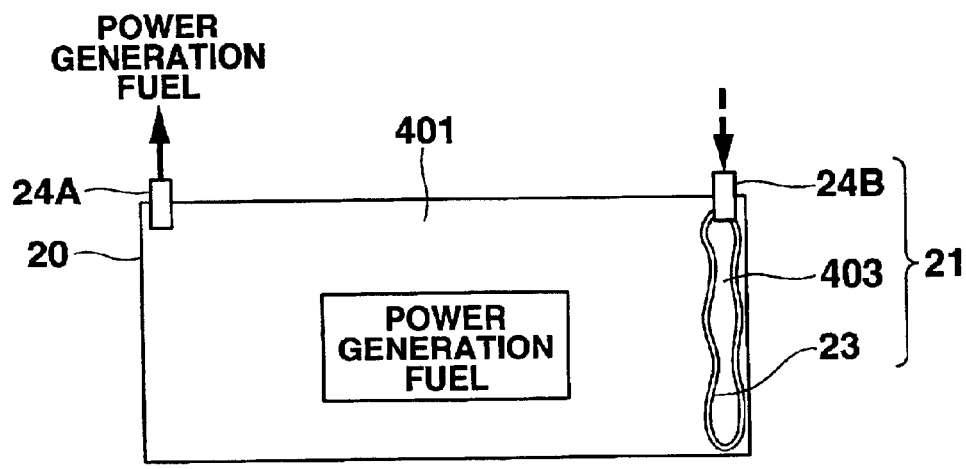
FIGS. 48A to 48C are views schematically showing operation for holding a by-product by the by-product collecting means according to one embodiment of the present invention.
Figure 48B:
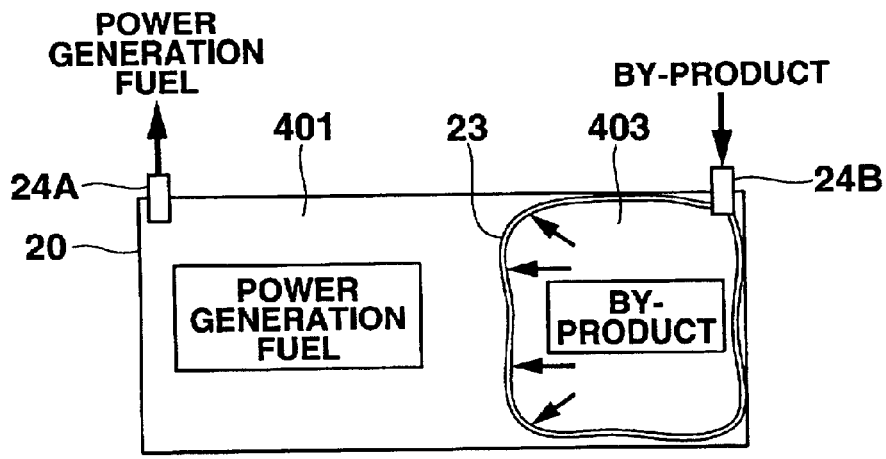
Figure 48C:
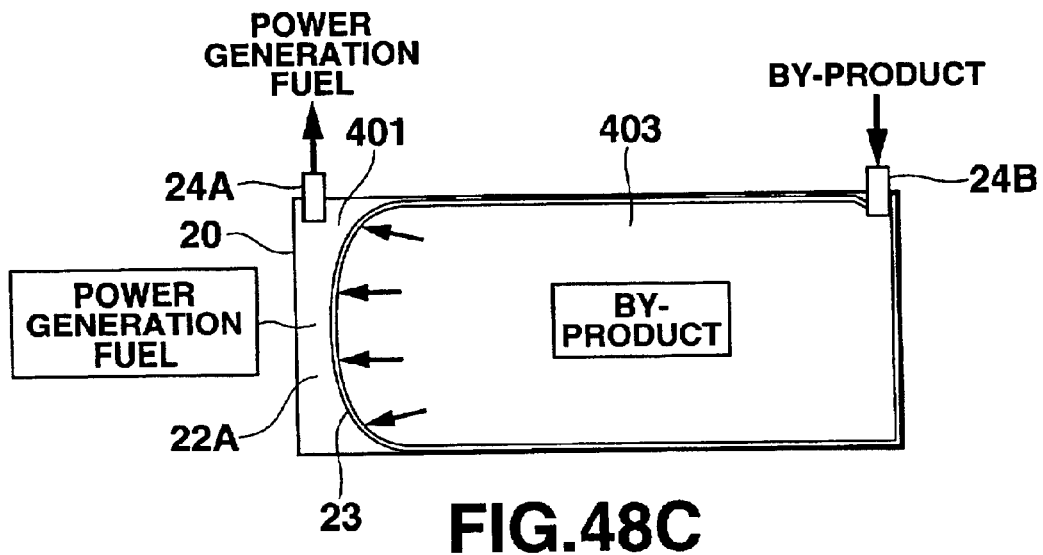

FIGS. 48A to 48C are views showing the operation for holding the by-product by the by-product collecting means according to this embodiment. Here, like reference numerals denote structures equivalent to each of the foregoing embodiments, thereby simplifying or omitting their explanation.

As shown in FIG. 48A, the fuel pack 20 according to this embodiment has a fixed capacity, and includes: a fuel charged portion 401 in which the power generation fuel FL such as methanol is charged or filled; a by-product charged portion 403 for holding therein a by-product such as water supplied from the separation portion 17; a collection bag 23 which relatively changes a capacity of the by-product charged portion 403 and completely separates the by-product charged portion 403 from the fuel charged portion 401 as will be described later; a fuel supply valve 24A for supplying to the output control portion 14 the power generation fuel FL charged in the fuel charged portion 401; and a by-product intake valve (intake port) 24B for fetching the by-product supplied from the separation portion 17 to the by-product charged portion 403.

As described above, both the fuel supply valve 24A and the by-product intake valve 24B have the structure provided with, e.g., a function of a check valve so that supply of the power generation fuel FL or intake of the by-product can be enabled only when the fuel pack 20 is coupled with the power generation module 10E through the I/F portion 30E. Incidentally, in place of providing a function of the check valve to the by-product intake valve 24B as described above, there may be employed a structure in which the absorbing (water absorption) polymer or the like is filled in the by-product charged portion 403.

In the fuel pack 20 having such a structure, when the power generation fuel charged in the fuel charged portion 401 is supplied to the power generation module 10E (the power generation portion 12, the sub power supply portion 11) through the fuel supply valve 24A, the operation for generating predetermined electric power is executed, and only a specific component (for example, water) in the by-product generated by the separation portion 17 with generation of electric power is separated and collected. Then, it is fetched and held in the by-product charged portion 403 through the by-product collection path and the by-product intake valve 24B.

As a result, as shown in FIGS. 48B and 48C, the capacity of the power generation fuel FL charged in the fuel charged portion 401 is decreased and, on the whole, the capacity of a specific component or substance held in the by-product charged portion 403 is increased. At this moment, applying the structure in which the absorbing polymer or the like is filled in the by-product charged portion 403 can control the capacity of the by-product charged portion 403 so that the by-product charged portion 403 can have a larger capacity than a substantial capacity of the fetched by-product.

Therefore, as to the relationship between the fuel charged portions 401 and 403, these spaces are not simply relatively increased or decreased with the operation for generation electric power (power generation) in the power generation module 10, but the pressure is applied to the power generation fuel FL charged in the fuel charged portion 401 by pushing the collection bag 23 toward the outside with a predetermined pressure as shown in FIG. 48B in accordance with an amount of the by-product held in the by-product charged portion 403. Supply of the power generation fuel FL to the power generation module 10E can be, therefore, appropriately carried out, and the power generation fuel FL charged in the fuel charged portion 401 can be supplied until it is completely run out by the by-product held in the by-product charged portion 403 as shown in FIG. 48C.

Incidentally, in this embodiment, description has been given as to the case where all or a part of the by-product separated and collected by the separation portion 17 additionally provided to the power generation module 10E is collected and held in the fuel pack 20 and a non-collected substance is emitted to the outside of the power supply system 301. However, there may be employed a structure in which all or a part of the collected by-product (for example, water) is reused as a fuel component when generating electric power in the power generation module 10E (in particular, the power generation portion 12 and the sub power supply portion 11). Specifically, in the structure in which the power generation device consisting of a fuel cell is applied as the power generation portion 12 (the sub power supply portion 11 may be included), water is generated as a part of the by-product. As described above, however, in the fuel reforming type fuel cell, since water is required for the vapor reforming reaction or the like of the power generation fuel, it is possible to adopt a structure that a part of water in the collected by-product is supplied to the power generation portion 12 and reused for such a reaction as indicated by dotted arrows (notated as "collected material to be reused") in FIG. 47. According to this structure, since an amount of water charged in the fuel pack 20 in advance together with the power generation fuel FL for the vapor reforming reaction or the like and an amount of a by-product (water) held in the by-product charged portion 403 can be reduced, a larger amount of the power generation fuel FL can be charged in the fuel pack 20 having a fixed capacity, thereby improving the electric power supply capability as the power supply system.

Other embodiments of the by-product elimination device capable of collecting a by-product according to the present invention will now be described hereinafter with reference to the accompanying drawings.

Figure 49:
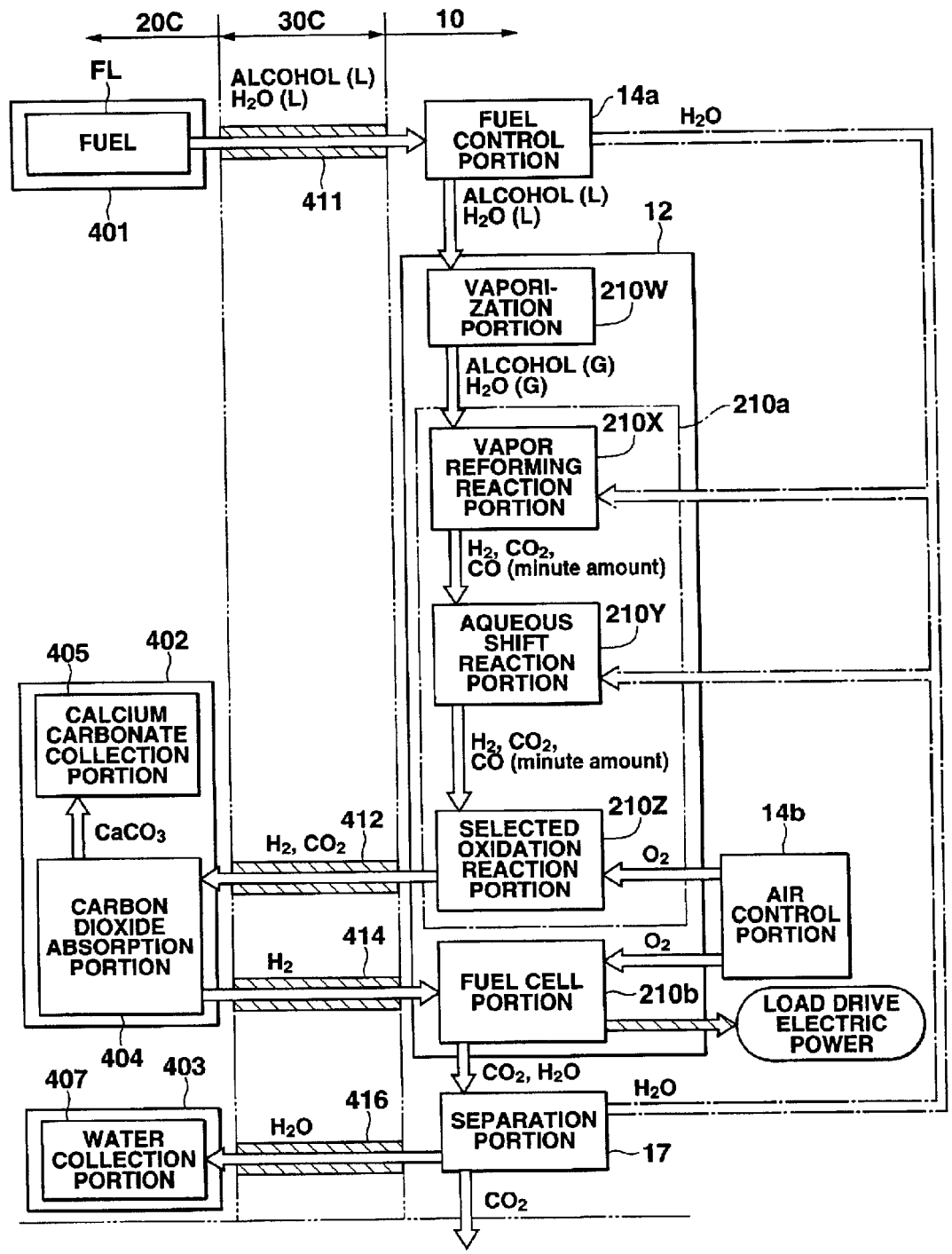
FIG. 49 is a block diagram showing another embodiment of by-product collecting means applicable to a power supply system according to the present invention.

FIG. 49 is a block diagram showing a part of a power supply system. As similar to the power supply system shown in FIG. 2, a power supply system according to this embodiment is generally constituted by: a fuel pack 20C in which a power generation fuel (fuel) or the like is charged; and a power generation module 10 which is detachably connected to the fuel pack 20C and generates the electrical energy (power generation) by using the fuel supplied from the fuel pack 20C, and others. To the fuel pack 20C are provided: a fuel charged portion 401; an absorbent charged portion 402; a by-product charged portion 403; and an I/F portion 30C connected to these charged portions 401 to 403, or the like. As similar to the power supply system shown in FIG. 47, the power generation module 10 is constituted by: a sub power supply portion 11; a power generation portion 12, an operation control portion 13; an output control portion 14; a start-up control portion 15; a voltage monitoring portion 16; a separation portion 17 and others.

As shown in FIGS. 50A to 50C, the fuel pack 20C includes a fuel charged portion 401 having an integrally formed storage bag which can vary without restraint, an absorbent charged portion 402, and a by-product charged portion 403. The fuel pack 20 is formed of a biodegradable synthetic resin, and the fuel charged portion 401, the absorbent charged portion 402 and the by-product charged portion 403 are separated from each other so as not to be mixed with each other, thereby obtaining the structure with the high sealing property.

The fuel charged portion 401 has charged therein a liquid (or liquefied) compound or a gas compound having hydrogen in its composition, e.g., methanol or butane and a fuel FL including water. The power generation fuel charged in the fuel charged portion 401, whose predetermined supply amount is required for generating load drive electric power to be outputted to a load LD by a fuel cell portion 210b, is fetched through a fuel reforming portion 210a only when the fuel pack 20C is coupled with the power generation module 10.

The absorbent charged portion 402 includes a carbon dioxide absorption portion 404 and a calcium carbonate collection portion 405. The carbon dioxide absorption portion 404 is connected to a selected oxidation reaction portion 210Z through a mixed gas leading pipe 412 and also connected to the fuel cell portion 210b through a hydrogen gas feed pipe 414. The carbon dioxide absorption portion 404 is adjacent to the calcium carbonate collection portion 405 so as to come into contact therewith, and selectively eliminates only carbon dioxide gas from hydrogen ($H_2$)— carbon dioxide ($CO_2$) mixed gas (first gas) generated by chemical transformation of the fuel led from the fuel charged portion 401 in the later-described fuel reforming portion 210a. Specifically, it is configured to lead the first gas generated in the fuel reforming portion 210a from the mixed gas leading pipe 412 only when the fuel pack 20C is connected with the power generation module 10, and feed to the fuel cell portion 210b second gas having as a main component hydrogen gas ($H_2$) extracted by eliminating carbon dioxide ($CO_2$) from the first gas. In the initial state that the fuel FL is filled in the fuel charged portion 401, the calcium carbonate collection portion 405 is vacant since calcium carbonate is not collected at all, and water is not collected in a water collection portion 407 at all. Further, the by-product charged portion 403 is substantially vacant.

A carbon dioxide absorbent is filled in the carbon dioxide absorption portion 404. As the carbon dioxide absorbent, however, there is used a substance which selectively absorbs only carbon dioxide from the hydrogen-carbon dioxide mixed gas generated in the fuel reforming portion 210a and which does not generate a harmful substance or an environmental pollutant by absorbing carbon dioxide even if it is discarded in the natural world, landfilled or burned.

Calcium oxide (CaO) is used as the carbon dioxide absorbent, and carbon dioxide is selectively eliminated from the mixed gas by the reaction indicated by the reaction chemical equation (8).

$$CaO + CO_2 \rightarrow CaCO_3 \qquad (8)$$

Calcium oxide is a very inexpensive substance. Furthermore, carbon dioxide absorbing means using these substances does not require conditions such as a high temperature, a high pressure and others when absorbing the carbon dioxide gas ($CO_2$). By using such substances as the carbon dioxide absorbent, therefore, the fuel pack 20C according to this embodiment can be very inexpensively manufactured in small size.

Moreover, although calcium carbonate generated by the reaction indicated by the reaction chemical equation (8) is accommodated in the calcium carbonate collection portion 405, it is a substance which is not harmful to human bodies or the natural environment. Even if calcium carbonate is discarded in the natural world, landfilled or burned, it does not generate a harmful substance. The fuel pack 20 having calcium oxide or calcium carbonate can be, therefore, subjected to the disposal treatment after use without adversely affecting the environment.

Incidentally, since the reaction indicated by the reaction chemical equation (8) is the exothermic reaction, the carbon dioxide absorption portion 404 may be configured to supply heat generated with absorption of carbon dioxide to the later-described fuel reforming portion 210a or the like. As a result, the energy utilization efficiency of the power supply system according to this embodiment can be further improved.

Figure 51:
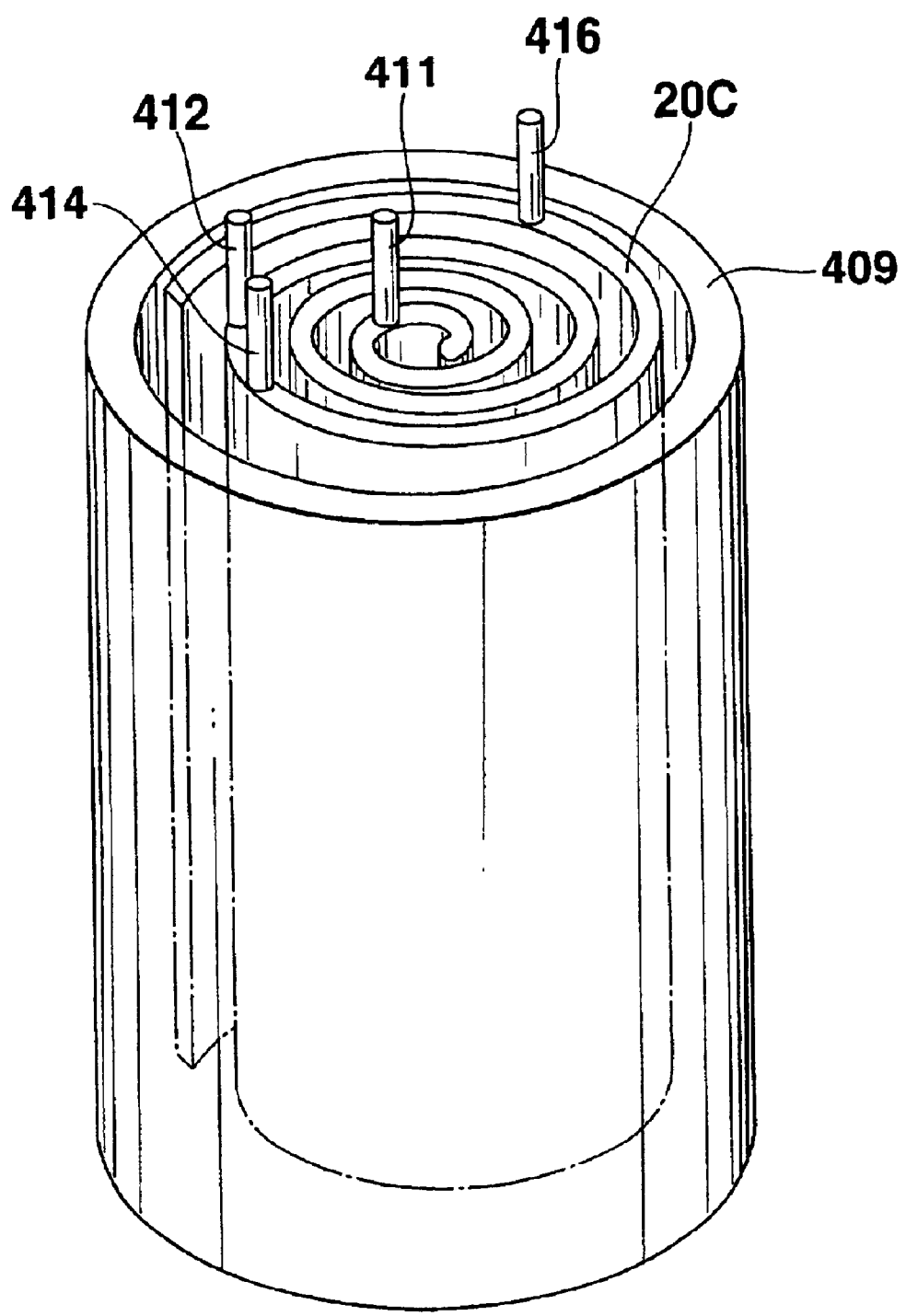
FIG. 51 is a schematic structural view showing the fuel pack depicted in FIGS. 50A to 50C in an accommodation portion.

Since the cubic volume per mol of calcium carbonate is larger than that of calcium oxide, the calcium carbonate collection portion 405 expands as calcium carbonate is generated. In addition, since the fuel FL is consumed in accordance with progress of the reaction in the fuel cell portion 210b and water generated in the fuel cell portion 210b is fed to the water collection portion 407, and the by-product charged portion 403 hence expands. Thus, as shown in FIG. 50A, in the initial state, although the absorbent charged portion 402 including the carbon dioxide absorption portion 404 having only calcium oxide is arranged on the left side, it moves to the right side as the absorbent charged portion 402 and the by-product charged portion 403 expand when the reaction proceeds as shown in FIG. 50B. Then, as shown in FIG. 50C, in the last result, the fuel pack 20C is substantially occupied by the absorbent charged portion 402 and the by-product charged portion 403 when the fuel FL is used up. As shown in FIG. 51, the sheet-like fuel pack 20C is rolled and accommodated in the accommodation portion 409. Then, it is attached to the power generation module 10. In this case, as will be described later, the power supply system can be readily formed so as to have substantially the same outside shape as that of a general-purpose chemical cell.

Here, although water ($H_2O$) of 3 mol is generated with respect to methanol ($CH_3OH$) of 1 mol and water ($H_2O$) of 1 mol by the reaction chemical equations (1) and (2), methanol ($CH_3OH$) of 1 mol in the liquid state is 40.56 cm$^3$, whereas water ($H_2O$) of 1 mol is 18.02 cm$^3$. Therefore, assuming that methanol charged in the fuel charged portion 401 in the initial state is M cm$^3$, the volumetric capacity that the liquid fuel (mixture of methanol ($CH_3OH$) and water ($H_2O$)) occupies in the fuel charged portion 401 is 1.444M cm$^3$.

Then, when all of methanol ($CH_3OH$) reacts, the cubic volume of water ($H_2O$) as a by-product is 1.333M cm$^3$, and the volume ratio of water with respect to the liquid fuel (mixture of methanol ($CH_3OH$) and water ($H_2O$)) in the initial state becomes approximately 92.31%. Therefore, the volumetric capacity of the fuel charged portion 401 for the fuel FL in the initial state is substantially equal to that of the by-product charged portion 403 when the fuel FL is used up, whereas the volumetric capacity of calcium carbonate generated when the fuel FL is used up is substantially twofold of that of calcium oxide in the initial state. Therefore, since the fuel pack 20C when the fuel FL is used up has the volumetric capacity larger than that of the fuel pack 20C in the initial state, it is preferable to set the volumetric capacity of the accommodation portion 409 in such a manner that it can be substantially filled with the fuel pack 20C when the fuel FL is used up. It is to be noted that the outside shape of the fuel pack 20C according to the present invention is not restricted to the above-described shape.

The separation portion 17 separates water ($H_2O$) among by-products generated when producing load drive electric power in the fuel cell portion 210b, feeds it to the water collection portion 407 of the by-product charged portion 403 through the water leading pipe 416, and emits carbon dioxide to the outside from the power generation module 10. A part of water separated by the separation portion 17 may be supplied to the vapor reforming reaction portion 210X and/or the aqueous shift reaction portion 210Y according to needs and combined with carbon monoxide.

The I/F portion 30C is configured to detachably connect the fuel pack 20C and the power generation module 10 with each other. Further, only when the fuel pack 20C and the power generation module 10 are coupled with each other through the I/F portion 30C, the power generation fuel is supplied from the fuel pack 20C to the power generation module 10, a specific component in the by-product which is produced when the electrical energy is generated is emitted from the power generation module 10 to the fuel pack 20C, and gas is supplied/received between the fuel pack 20C and the power generation module 10. The I/F portion 30C is constituted by a fuel feed pipe 411 for feeding the fuel FL to the power generation module by the capillary phenomenon, a mixed gas leading pipe 412 for leading hydrogen and carbon dioxide reformed in the fuel reforming portion 210 to the carbon dioxide absorption portion 404, a hydrogen gas feed pipe 414 for feeding hydrogen of high concentration from the carbon dioxide absorption portion 404, and a water leading pipe 416 for leading water separated by the separation portion 17 to the water collection portion 407. The I/F portion 30C is configured to be capable of preventing the fuel or a waste material from leaking before coupling the power generation module 10 or at the time of releasing coupling during use.

The fuel feed pipe 411 is inserted into the fuel pack 20C. The fuel feed pipe 411 attempts to feed the fuel to the operation control portion 13 or the like through the fuel feed pipe 411 by the capillary phenomenon when the fuel pack 20C is attached to the power generation module 10. When the fuel cell portion 210b is not driven, however, the fuel feed pipe 411 is controlled in such a manner a valve of the operation control portion 13 is closed. Furthermore, the voltage monitoring portion 16 detects a potential which demonstrates displacement when the load LD shifts from the standby (off) state to the state that the main functions are started up through a positive electrode and a negative electrode of the power supply system. When a start-up signal is supplied to the operation control portion 13, the operation control portion 13 starts up with electric power of the sub power supply portion 11 and opens the valve of the fuel feed pipe 411, thereby supplying fuel. Also, supply of a predetermined amount of the fuel to the fuel reforming portion 210a is started.

Here, the fuel pack 20C may be formed of a material that generation of a chlorinated organic compound (dioxin group; polychlorinated dibenzoparadioxine, polychlorinated dibenzofuran) or hydrochloric gas, a harmful substance such as heavy metal, or an environmental pollutant is small or restricted even if artificial heating/incineration or chemical treatment and the like is carried out.

Moreover, as the power generation fuel used in the power supply system according to this embodiment, it is possible to excellently apply a fuel which can not be a pollutant with respect to the natural environment even if the fuel pack 20C having the fuel for power generation charged therein is discarded in the natural world or landfilled and leaks into air, soil and water, and which can generate the electrical energy with the high energy conversion efficiency in the fuel cell portion 210b of the power generation module 10, specifically, a liquid compound having alcohol such as methanol, ethanol, butanol or the like, or a gas compound such as hydrocarbon gas, e.g., dimethyl ether, isobutane, natural gas (LPG) or the like, or hydrogen gas and others.

Figure 52:
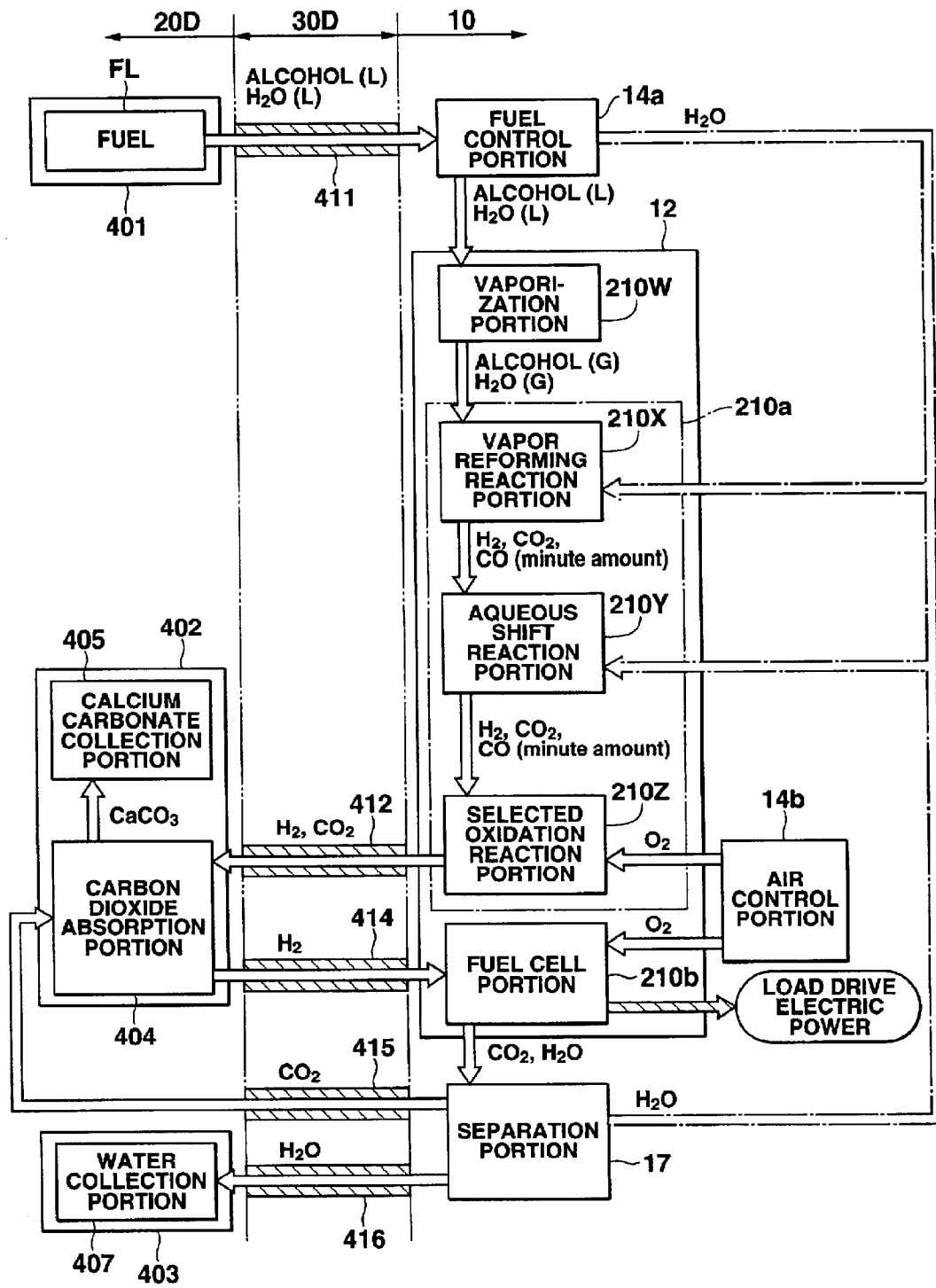
FIG. 52 is a block diagram showing still another embodiment of by-product collecting means applicable to the power supply system according to the present invention.

In addition, although carbon dioxide generated in the separation portion 17 is emitted through the discharge hole 14d in the above-described embodiment as shown in FIG. 83, carbon dioxide may be absorbed by the carbon dioxide absorption portion 404 from the separation portion 17 through the carbon dioxide leading pipe 415 as shown in FIG. 52. In such a power supply system, since the by-product is hardly discharged to the outside, the power supply system is particularly effective as a power supply for a device such that the power supply system is attached in a closed space so as not leak gas for example, as with a wrist watch having a waterproof function.

Additionally, although the absorbent charged portion 402 is constituted by the calcium carbonate collection portion 405 and the carbon dioxide absorption portion 404 having calcium oxide in the above-described embodiment, the carbon dioxide absorption portion 404 may have calcium hydroxide instead of calcium oxide, and calcium oxide may be provided as a water absorption portion.

Description will now be given as to a modification when applying calcium hydroxide to the carbon dioxide absorption portion 404 according to the present invention will now be described with reference to FIG. 53. Here, like names and like reference numerals are given to the structures equal to those in the foregoing embodiment, thereby simplifying or omitting their explanation. The power supply system according to this embodiment is generally constituted by a fuel pack 20M having a power generation fuel (fuel) charged therein and a power generation module 10 which is detachably connected to the fuel pack 20M generates the electrical energy (power generation) by using the fuel supplied from the fuel pack 20M, or the like. To the fuel pack 20M are provided a fuel charged portion 401, an absorbent charged portion 402, a by-product charged portion 403, an I/F portion 30E connected to these charged portions 401 to 403, or the like. Further, as similar to the power supply system shown in FIG. 47, the power generation module 10 is constituted by a sub power supply portion 11, a power generation portion 12, an operation control portion 13, an output control portion 14, a start-up control portion 15, a voltage monitoring portion 16, a separation portion 17 and others.

As shown in FIGS. 54A to 54C, the fuel pack 20M includes a fuel charged portion 401 having an integrally formed storage bag which can vary without restraint, an absorbent charged portion 402, and a by-product charged portion 403. The fuel pack 20M is formed of synthetic resin having the biodegradable property or the like, and the fuel charged portion 401, the absorbent charged portion 402 and the by-product charged portion 403 are separated so as not to be mixed with each other, thereby providing the structure with the high sealing property.

The absorbent charged portion 402 includes: a carbon dioxide absorption portion 404 containing calcium hydroxide; a calcium carbonate collection portion 405, and a water absorption portion 406 containing calcium oxide. The carbon dioxide absorption portion 404 is adjacent to the calcium carbonate collection portion 405 and the water absorption portion 406 so as to come into contact therewith, and selectively eliminates only carbon dioxide gas from the hydrogen ($H_2$)-carbon dioxide ($CO_2$) mixed gas (first gas) generated by chemical transformation of the fuel led from the fuel charged portion 401 in the fuel reforming portion 210a. Specifically, only when the fuel pack 20M is connected with the power generation module 10, the first gas generated in the fuel reforming portion 210a is led from a mixed gas leading pipe 412 and eliminates carbon dioxide ($CO_2$) from the first gas. Also, the second gas having hydrogen gas ($H_2$) and water which can be the by-product as main components is fed to the water absorption portion 406.

Calcium hydroxide ($Ca(OH)_2$) applied to the carbon dioxide absorption portion 404 selectively eliminates carbon dioxide from the mixed gas by the reaction indicated by the reaction chemical equation (9).

$$Ca(OH)_2 + CO_2 \rightarrow CaCO_3 + H_2O \qquad (9)$$

Calcium hydroxide ($Ca(OH)_2$) is a very inexpensive substance. Furthermore, carbon dioxide absorbing means using these substances does not require conditions, for example, a high temperature or a high pressure when absorbing the carbon dioxide gas ($CO_2$). Therefore, by using such substances as a carbon dioxide absorbent and others, the fuel pack 20M according to this embodiment can be inexpensively manufactured in small size.

Although calcium carbonate ($CaCO_3$) generated by the reaction indicated by the reaction chemical equation (9) is accommodated in the calcium carbonate collection portion 405, it is a substance which is not harmful to human bodies or the natural environment. Also, it does not generate a harmful substance even if it is discarded in the natural world, landfilled or burned. Thus, the fuel pack 20M having calcium oxide, calcium hydroxide or calcium carbonate can be discarded without adversely affecting the environment after use.

Incidentally, since the reaction indicated by the reaction chemical equation (9) is the exothermic reaction, the carbon dioxide absorption portion 404 may be constituted to supply heat generated with absorption of carbon dioxide to the later-described fuel reforming portion 210a or the like. As a result, the energy utilization efficiency of the power supply system according to this embodiment can be improved.

Here, although water is generated when the carbon dioxide absorbent of the carbon dioxide absorption portion 404 absorbs carbon dioxide, the water absorption portion 406 absorbs water in the second gas from the carbon dioxide absorption portion 404 through a water/hydrogen gas moving pipe 413 by the reaction indicated by the reaction chemical equation (10). Therefore, the water absorption portion 406 can absorb water generated in the carbon dioxide absorption portion 404 and a surplus of water used for the chemical reaction with carbon monoxide in the fuel reforming portion 210a.

$$CaO + H_2O \rightarrow Ca(OH)_2 \qquad (10)$$

As a result, the third gas fed from the water absorption portion 406 through the hydrogen gas feed pipe 414 can be hydrogen of high concentration, and calcium hydroxide generated by the equation (10) can function as the carbon dioxide absorption portion 404.

As shown in FIG. 54A, the absorbent charged portion 402 is constituted by the carbon dioxide absorption portion 404 containing calcium hydroxide and the water absorption portion 406 containing calcium oxide in the initial state. However, the chemical reaction of calcium oxide, calcium hydroxide and calcium carbonate proceeds in the mentioned order, and at last the absorbent charged portion 402 is substantially constituted by the carbon dioxide absorption portion 404 and the calcium carbonate collection portion 405 containing calcium carbonate.

Since the cubic volume per mol of calcium carbonate is larger than that of calcium oxide, the calcium carbonate collection portion 405 expands as calcium carbonate is generated. Since the cubic volume per mol of calcium hydroxide is larger than that of calcium oxide, the carbon dioxide absorption portion 404 tries to expand as calcium hydroxide is generated. However, calcium hydroxide transforms into calcium carbonate as described above, and the prominent expansion can not be hence observed. Furthermore, since the fuel FL is consumed in accordance with progress of the reaction in the fuel cell portion 210b and water generated in the fuel cell portion 210b is fed to the water collection portion 407, the by-product charged portion 403 expands.

Consequently, although the absorbent charged portion 402 is arranged on the left side, it moves to the right side as the absorbent charged portion 402 and the by-product charged portion 403 expand as shown in FIG. 54B when the reaction advances. Finally, as shown in FIG. 54C, the fuel pack 20M is substantially occupied by the absorbent charged portion 402 and the by-product charged portion 403 when the fuel FL is completely consumed. As shown in FIG. 51, the sheet-like fuel pack 20M can be rolled and accommodated in the accommodation portion 409. In this state, the fuel pack 20M can be attached to the power generation module 10. In this case, the power supply system can be easily formed so as to have substantially the same outside shape as that of a general-purpose chemical cell as will be described later.

The volumetric capacity of the fuel charged portion 401 having the fuel FL charged therein in the initial state is substantially equal to that of the by-product charged portion 403 when the fuel FL is completely consumed, whereas calcium carbonate generated when the fuel FL runs out has the volumetric capacity which is substantially twofold of that of the calcium oxide in the initial state. Therefore, since the volumetric capacity of the fuel pack 20M when the fuel FL runs out is larger than that of the fuel pack 20M in the initial state, it is preferable to set the volumetric capacity of the accommodation portion 409 so that the accommodation portion 409 can be substantially occupied by the fuel pack 20M when the fuel FL runs out.

Carbon dioxide separated by the separation portion 17 may be discharged through the discharge hole 14d, or may be absorbed by the carbon dioxide absorption portion 404 by providing a carbon dioxide leading pipe 415. Moreover, a part of water separated by the separation portion 17 may be supplied to the vapor reforming reaction portion 210X and/or the aqueous shift reaction portion 210Y according to needs and combined with carbon monoxide.

Figure 53:
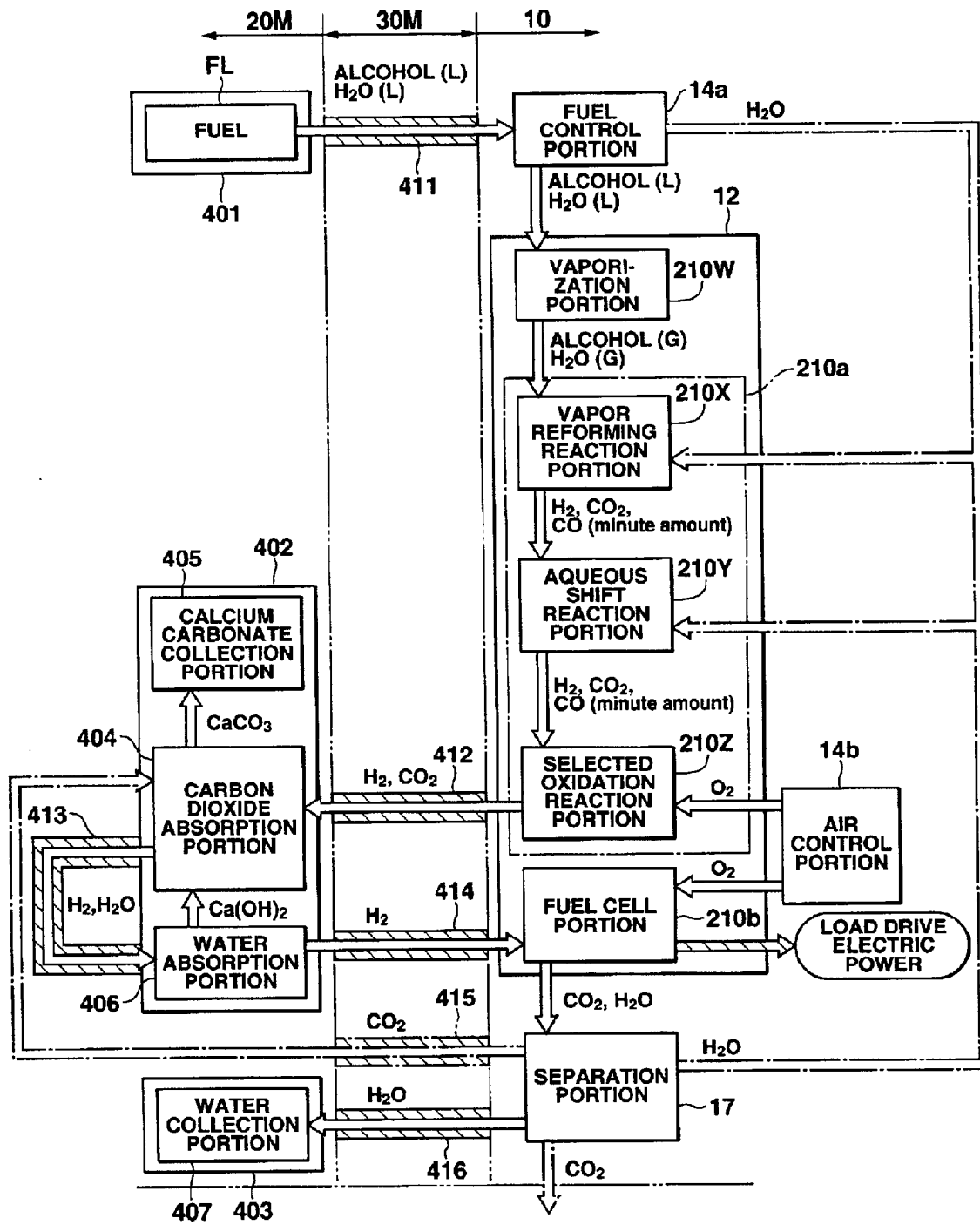
FIG. 53 is a block diagram showing yet another embodiment of the by-product collecting means applicable to the power supply system according to the present invention.
Figure 55:
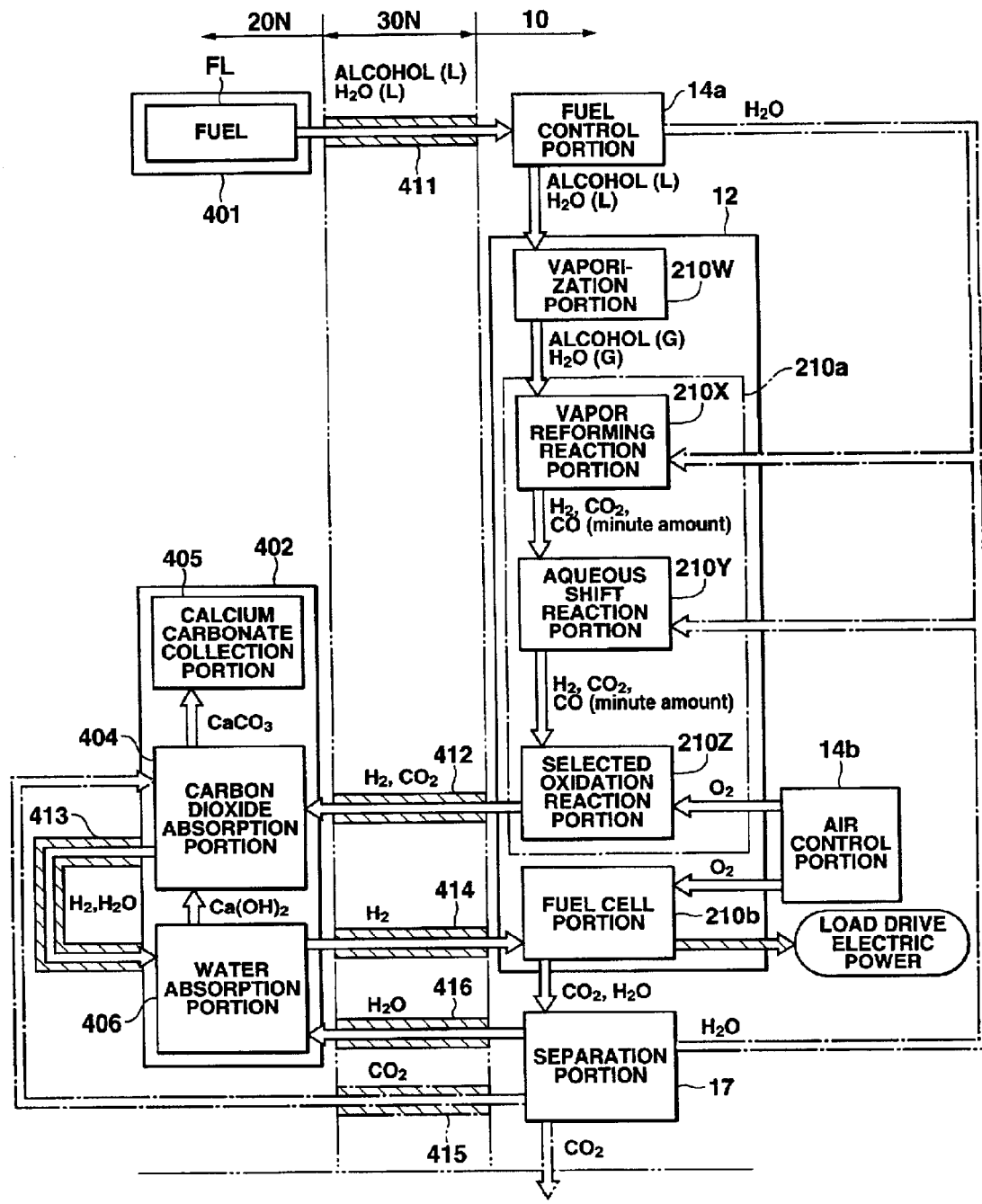
FIG. 55 is a block diagram showing a further embodiment of the by-product collecting means applicable to the power supply system according to the present invention.

Although the water absorption portion 406 is separately provided from the water collection portion 403 in the embodiment shown in FIG. 53, the water absorption portion 406 containing calcium oxide may also serve as the water collection portion as shown in FIG. 55. The water absorption portion 406 absorbs water from the carbon dioxide absorption portion 404 through the water/hydrogen gas moving pipe 413 and also absorbs water from the separation portion 17 through the water leaking pipe 416 of the I/F portion 30N. At this moment, the water absorption portion 406 of the fuel pack 20N may be a polymeric moisture absorbent.

Figure 56:
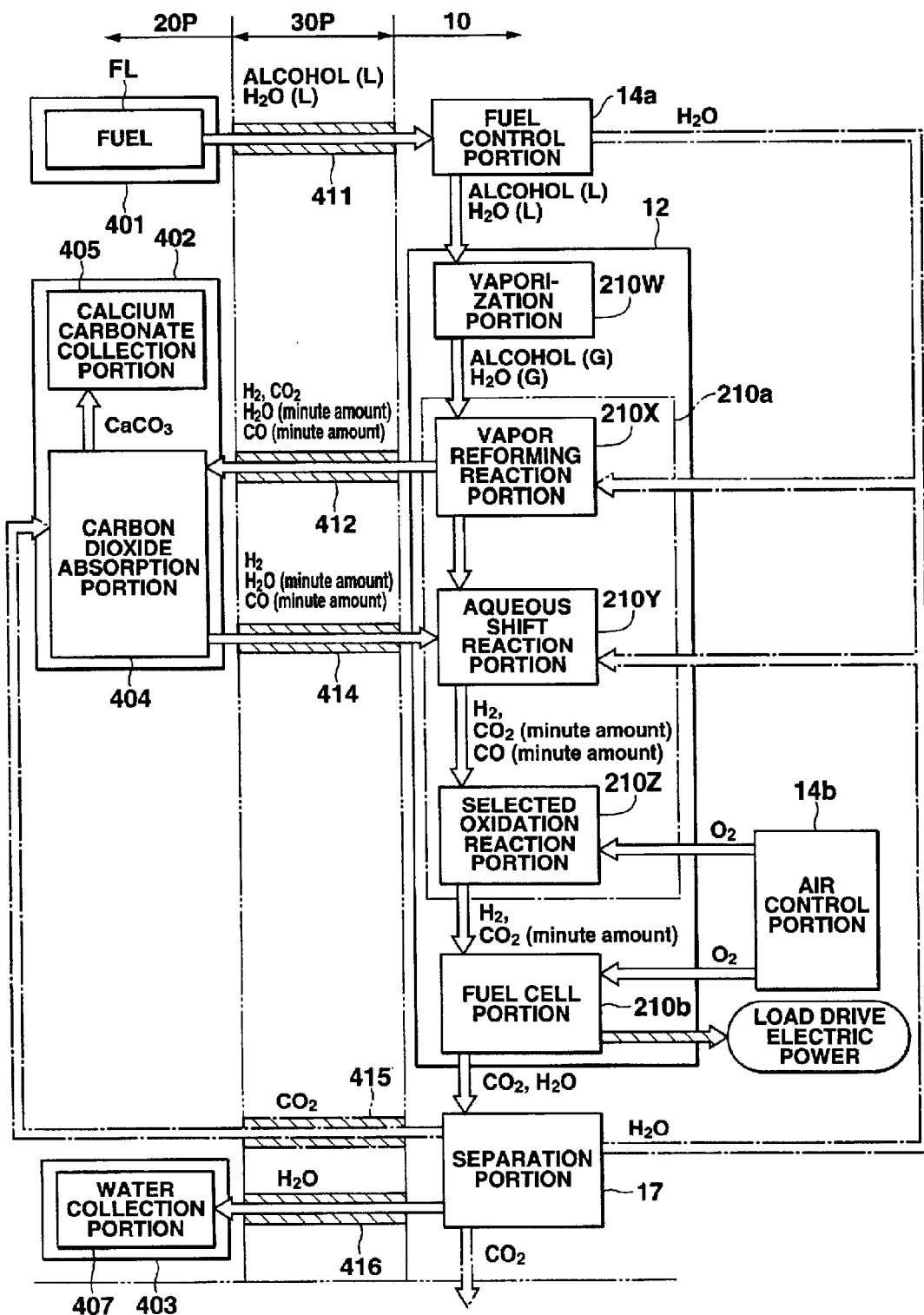
FIG. 56 is a block diagram showing a still further embodiment of the by-product collecting means applicable to the power supply system according to the present invention.
Figure 57:
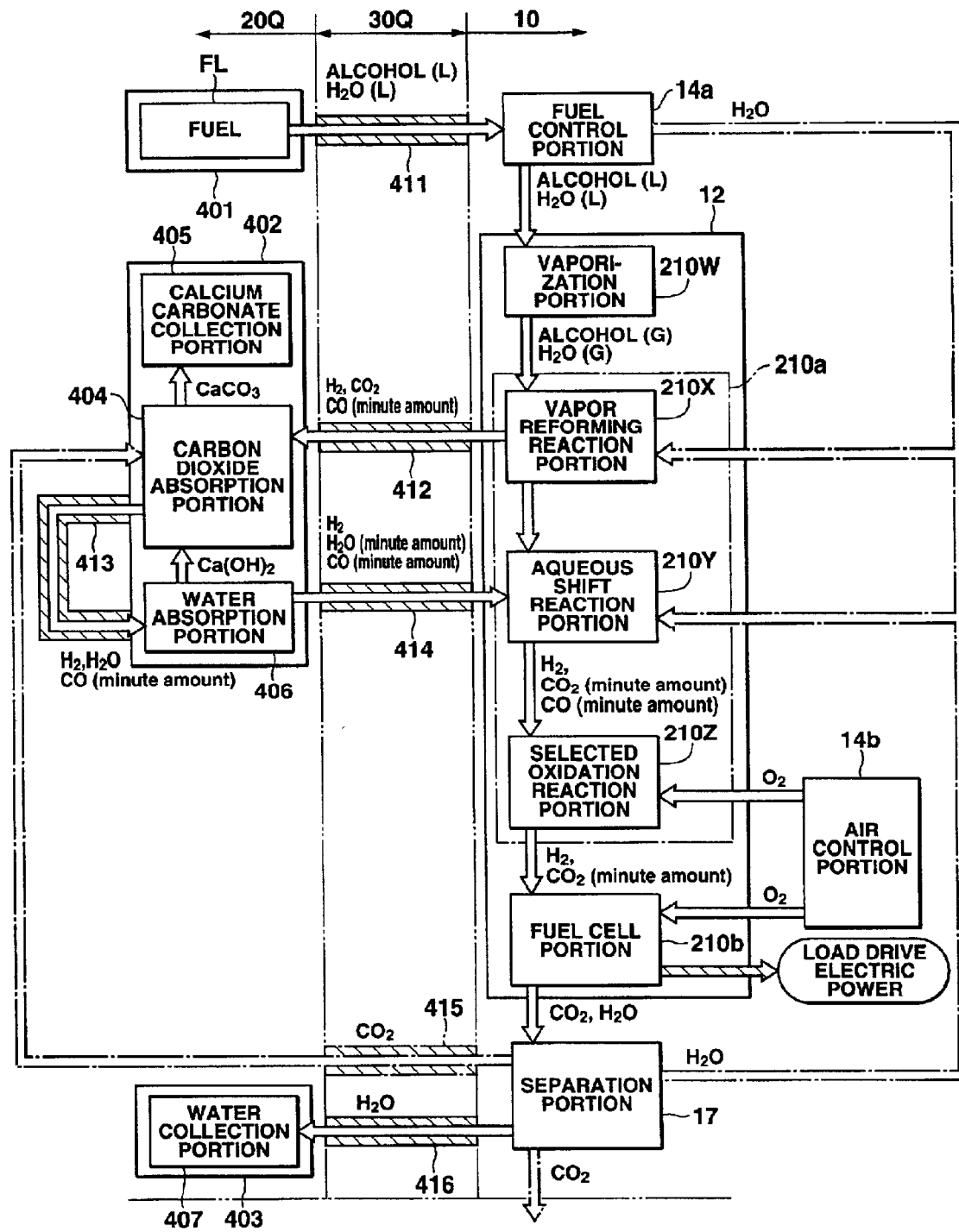
FIG. 57 is a block diagram showing a yet further embodiment of the by-product collecting means applicable to the power supply system according to the present invention.

In addition, carbon dioxide is absorbed by the carbon dioxide absorption portion 404 via the mixed gas leaking pipe 412 through the vapor reforming reaction portion 210X, the aqueous shift reaction portion 210Y and the selected oxidation reaction portion 210Z in the foregoing embodiment. However, since a quantity of carbon dioxide generated in the aqueous shift reaction portion 210Y and the selected oxidation reaction portion 210Z is small, carbon dioxide may be absorbed from the mixed gas reformed in the vapor reforming reaction portion 210X by the carbon dioxide absorption portion 404 containing calcium oxide through the mixed gas leading pipe 412 as shown in FIG. 56. Here, the carbon dioxide absorption portion 404 of the fuel pack 20P is connected with the vapor reforming reaction portion 210X through the mixed gas leading pipe 412 of the I/F portion 30P, and also connected with the aqueous shift reaction portion 210Y through the hydrogen gas feed pipe 414. Although the carbon dioxide absorption portion 404 absorbs carbon dioxide among hydrogen, carbon dioxide, a small amount of water and a small amount of carbon monoxide fed from vapor reforming reaction portion 210X, the carbon dioxide absorption portion 404 is not restricted to calcium oxide and calcium hydroxide may be used. In case of calcium hydroxide, water generated by absorbing carbon dioxide may be utilized for combination with carbon monoxide in the aqueous shift reaction portion 210Y. Incidentally, at this moment, carbon dioxide separated by the separation portion 17 may be discharged through the discharge hole 14$d$, and a carbon dioxide leading pipe 415 may be provided so that the carbon dioxide absorption portion 404 can absorb carbon dioxide. Additionally, calcium hydroxide may be applied to the carbon dioxide absorption portion 404 in place of calcium oxide. In this case, as shown in FIG. 57, the fuel pack 20Q may be provided with the water absorption portion 406 in order to absorb water generated in the carbon dioxide absorption portion 404. The water absorption portion 406 contains calcium oxide and is connected to the carbon dioxide absorption portion 404 through the water/hydrogen gas moving pipe 413. Also, it is connected to the aqueous shift reaction portion 210Y through the hydrogen gas feed pipe 414 of the I/F portion 30Q.

Carbon dioxide separated by the separation portion 17 may be discharged through the discharge hole 14$d$, and the carbon dioxide leading pipe 415 may be provided so that the carbon dioxide absorption portion 404 can absorb carbon dioxide. Further, a part of water separated by the separation portion 17 may be supplied to the vapor reforming reaction portion 210X and/or the aqueous shift reaction portion 210Y according to needs and combined with carbon monoxide.

Figure 58:
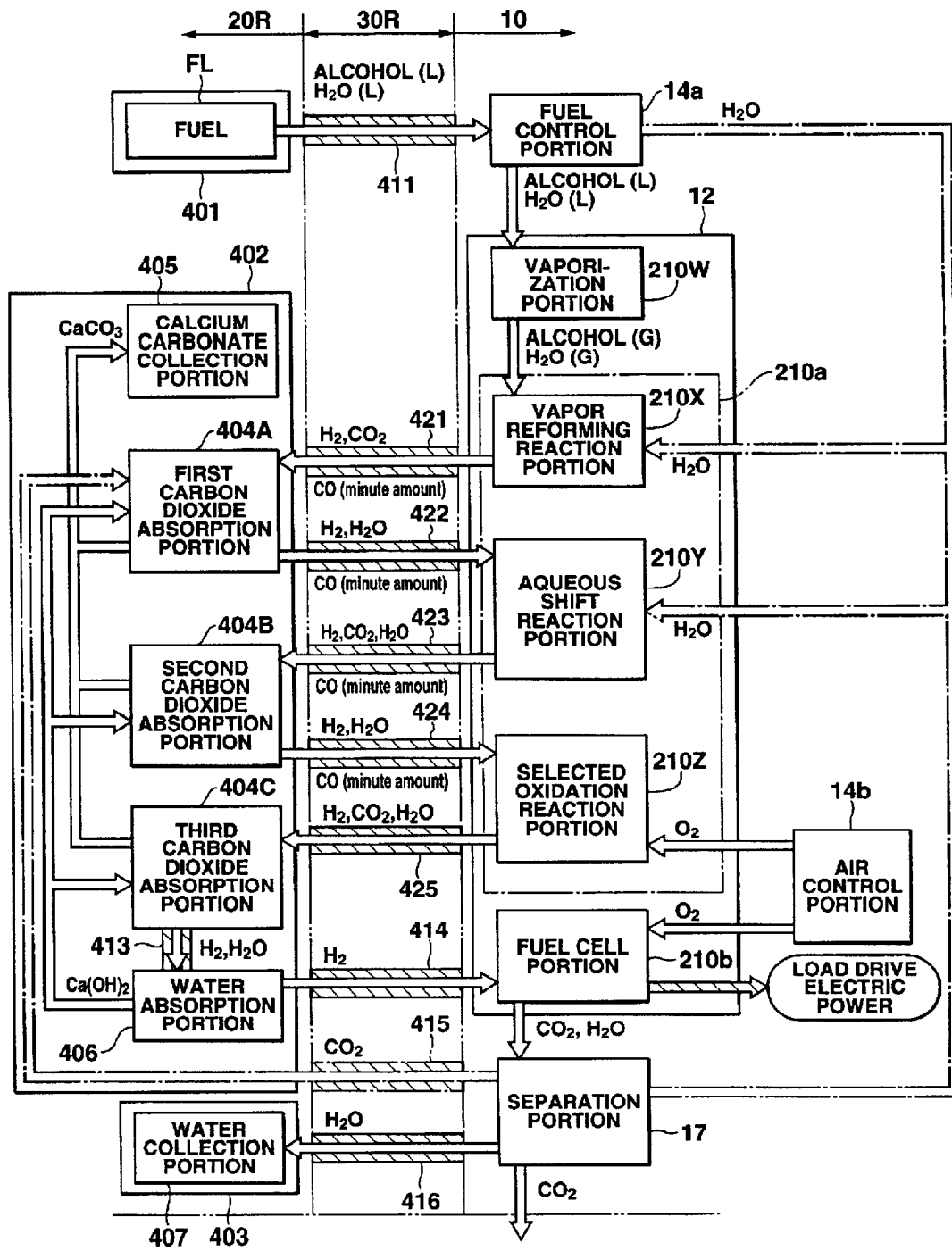
FIG. 58 is a block diagram showing another embodiment of the by-product collecting means applicable to the power supply system according to By the present invention.

Although the carbon dioxide absorption portion 404 is connected with only a part of the fuel reforming portion 210$a$ in the foregoing embodiment, it may be connected with a plurality of elements of the fuel reforming portion 210$a$, respectively. A modification of the carbon dioxide absorption portion according to the present invention will now be described hereinafter with reference to FIG. 58.

The fuel pack 20R includes a fuel charged portion 401, an absorbent charged portion 402 and a water collection portion 403, and is connected with an I/F portion 30R provided with a fuel feed pipe 411, a first mixed gas leading pipe 421, a first hydrogen gas feed pipe 422, a second mixed gas leading pipe 423, a second hydrogen gas feed pipe 424, a third mixed gas leading pipe 425, a hydrogen gas feed pipe 414 and a water leading pipe 416.

The absorbent charged portion 402 has a calcium carbonate collection portion 405, a water collection portion 406 containing calcium oxide, a first carbon dioxide absorption portion 404A, a second carbon dioxide absorption portion 404B and a carbon dioxide absorption portion 404C. The calcium carbonate collection portion 405 is vacant in the initial state, and the first carbon dioxide absorption portion 404A, the second carbon dioxide absorption portion 404B and the carbon dioxide absorption portion 404C respectively contain a required minimum amount of calcium oxide.

The first carbon dioxide absorption portion 404A is connected with the vapor reforming reaction portion 210X through the first mixed gas leading pipe 421 used for leading the first mixed gas containing hydrogen, carbon dioxide or the like, and also connected with the aqueous shift reaction portion 210Y through the first hydrogen gas feed pipe 422.

The second carbon dioxide absorption portion 404B is connected with the vapor reforming reaction portion 210Y through the second mixed gas leading pipe 423 used for leading the mixed gas containing carbon dioxide generated in the aqueous shift reaction portion 210Y, and also connected with the selected oxidation reaction portion 210Z through the second hydrogen gas feed pipe 424.

The third carbon dioxide absorption portion 404C is connected with the selected oxidation reaction portion 210Z through a third gas leading pipe 425 used for leading the mixed gas containing carbon dioxide generated in the selected oxidation reaction portion 210Z, and also connected with the water absorption portion 406 through the water/hydrogen gas moving pipe 413.

In the first carbon dioxide absorption portion 404A, the second carbon dioxide absorption portion 404B and the third carbon dioxide absorption portion 404C, calcium hydroxide reacts with carbon dioxide contained in the mixed gas and calcium carbonate is generated. Furthermore, calcium carbonate is supplied to the calcium carbonate collection portion 405. In the water absorption portion 406, calcium hydroxide reacts with water generated in the first carbon dioxide absorption portion 404A, the second carbon dioxide absorption portion 404B and the third carbon dioxide absorption portion 404C, and calcium hydroxide is generated. Then, calcium hydroxide is supplied to the first carbon dioxide absorption portion 404A, the second carbon dioxide absorption portion 404B and the third carbon dioxide absorption portion 404C. There is almost on calcium oxide of the water absorption portion 406 when the fuel FL runs out in the fuel charged portion 401, and the absorbent charged portion 402 is set in such a manner that calcium carbonate of the calcium carbonate collection portion 405 occupies a large part of the inside of the absorbent charged portion 402.

Carbon dioxide separated by the separation portion 17 may be discharged through the discharge hole 14$d$, and the carbon dioxide leading pipe 415 may be provided so that the carbon dioxide absorption portion 404 can absorb carbon dioxide. Furthermore, a part of water separated by the separation portion 17 may be supplied to the vapor reforming reaction portion 210X and/or the aqueous shift reaction portion 210Y according to needs and combined with carbon monoxide. Moreover, the water collection portion 403 may be omitted, and the water absorption portion 406 and the water leading pipe 416 may be connected to each other.

In each of the foregoing embodiments, although the absorbent charged portion 402 and/or the water collection portion 403 is integrally constituted with the fuel charged portion 401, a cutoff line may be provided between the fuel charged portion 401 and the absorbent charged portion 402 and/or the water collection portion 403 so that the absorbent charged portion 402 and/or the water collection portion 403 can be cut off from the fuel charged portion 401 and discarded.

In each of the foregoing embodiments, although the absorbent charged portion 402 is provided to the fuel pack 20, it may be provided in the power generation module 10 if a quantity of calcium carbonate to be generated is sufficiently small.

<Residual Quantity Detecting Means>

Residual quantity detecting means for the power generation fuel applicable to the power supply system according to each of the foregoing embodiments will now be described with reference to the drawings.

Figure 59:
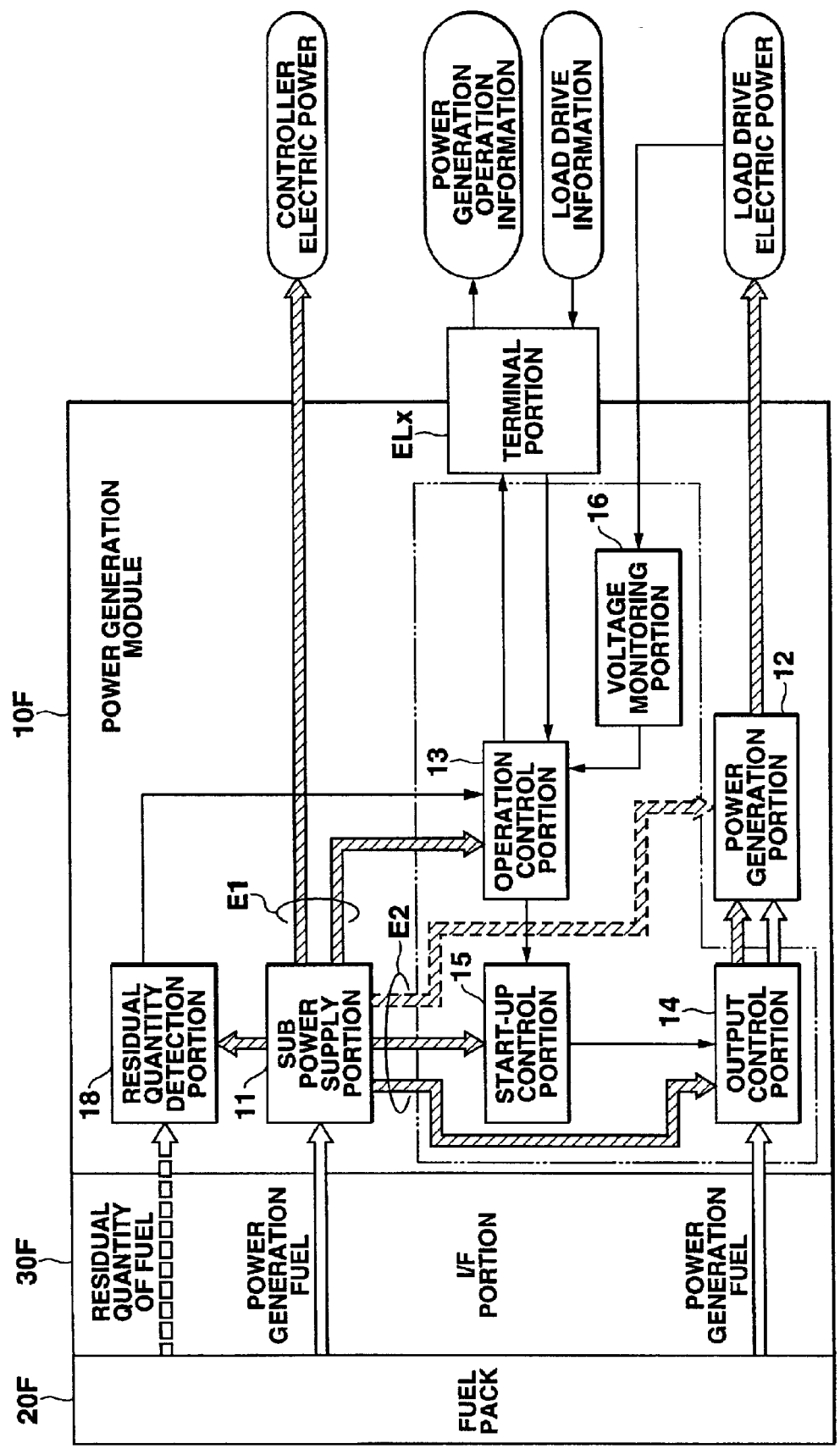
FIG. 59 is a block diagram showing an embodiment of residual quantity detecting means applicable to the power supply system according to the present invention.
Figure 60:
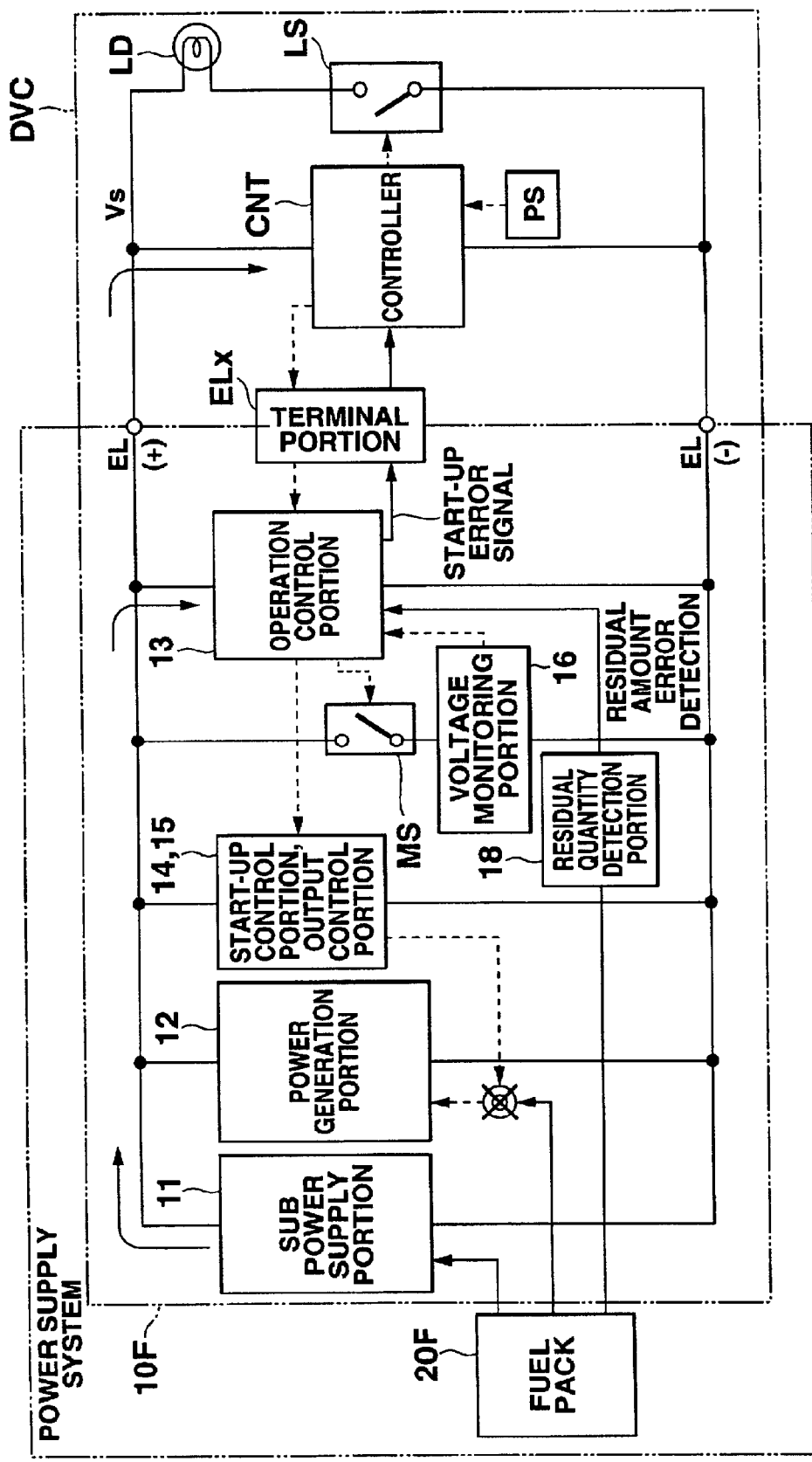
FIG. 60 is a view showing a start-up operation of the power supply system according to the embodiment.
Figure 61:
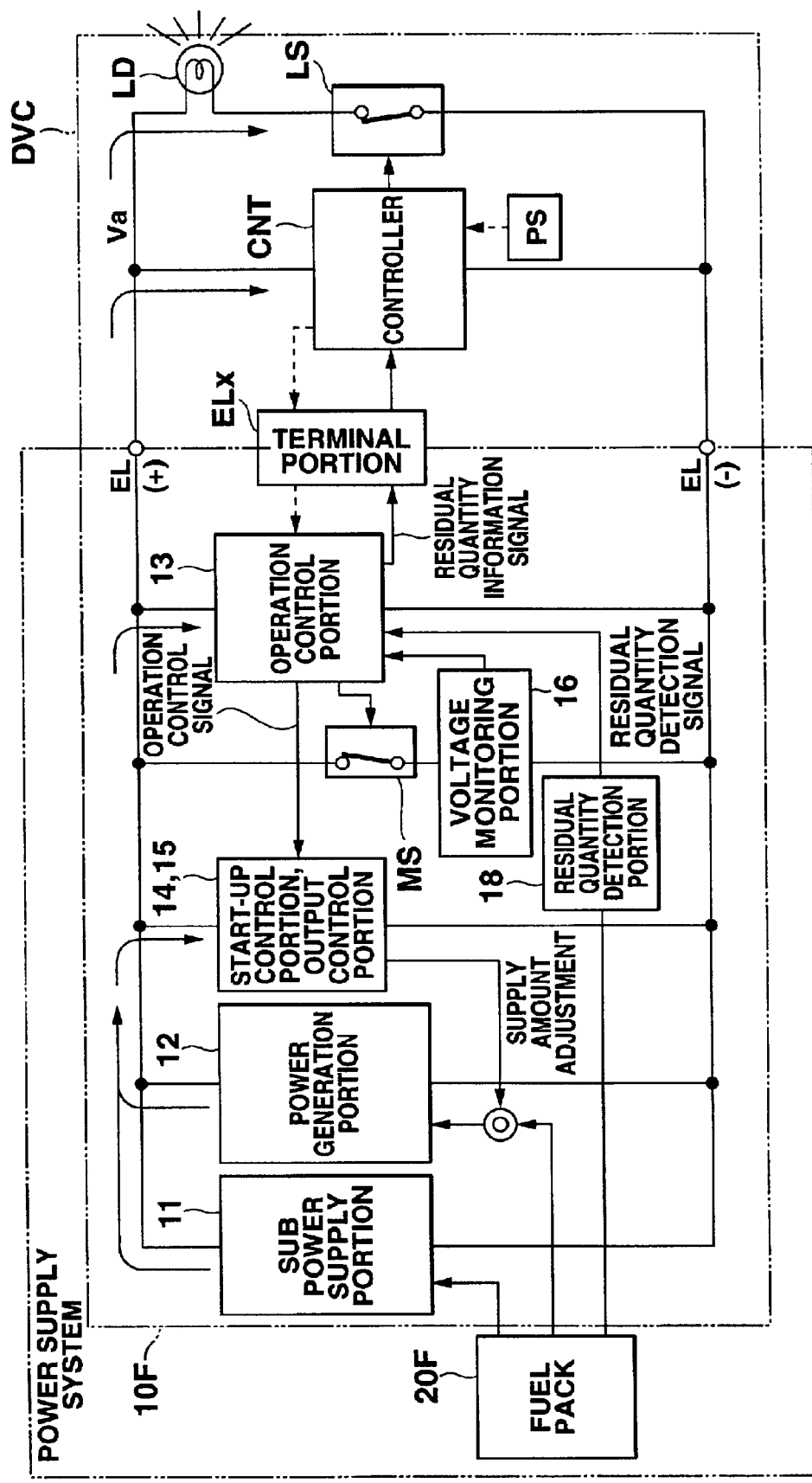
FIG. 61 is a view showing a steady operation (steady mode) of the power supply system according to the embodiment.

FIG. 59 is a block diagram showing an embodiment of residual quantity detecting means applicable to the power supply system according to the present invention. Further, FIG. 60 is a view showing a start-up operation state of the power supply system according to this embodiment; FIG. 61, a view showing a steady operation state of the power supply system according to this embodiment; and FIG. 62, a view showing a stop operation state of the power supply system according to this embodiment. Here, as similar to the second to fourth embodiments, description will be given as to the case where predetermined information is notified between the power supply system and the device to which the power supply system is connected. It is, however, possible to apply a structure in which any special notification is not carried out between the power supply system and the device (structure shown in the first embodiment). Furthermore, like reference numerals denote structures equivalent to those in each of the foregoing embodiments, thereby simplifying or omitting their explanation.

As shown in FIG. 59, in the power generation module 10F, the fuel pack 20F and the I/F portion 30F having the structure and function equivalent to those in each of the above-described embodiments, the fuel residual quantity detecting means applicable to the power supply system according to the present invention has a structure in which a residual quantity detection portion 18 for detecting an amount of the power generation fuel FL remaining in the fuel pack 20F (residual quantity) and outputting its residual quantity detection signal to the operation control portion 13 is provided to the inside of any of the power generation module 10F, the I/F portion 30F and the fuel pack 20F (here, inside of the power generation module 10F).

The residual quantity detection portion 18 is used for detecting an amount of the power generation fuel FL remaining in the fuel pack 20F. For example, when the power generation fuel FL is charged in the fuel pack 20F in the liquid state, a residual quantity of the power generation fuel FL is detected by adopting a technique for measuring a liquid level of the fuel by an optical sensor or the like or a technique for measuring a change in attenuation of the light (dimming ratio) which has passed through the fuel. Then, a residual quantity of the power generation fuel FL detected by the residual quantity detection portion 18 is outputted to the operation control portion 13 as a residual quantity detection signal. Based on the residual quantity detection signal, the operation control portion 13 outputs an operation control signal for controlling the operation state in the power generation portion 12 to the output control portion 14, and outputs information concerning a residual quantity of the power generation fuel to the controller CNT contained in the device DVC. It is to be noted that the residual quantity detection portion 18 is driven with electric power from the sub power supply portion 11 every time the fuel pack 20F having the power generation fuel FL charged therein is coupled with the power generation module 10F and the I/F portion 30F.

In the power supply system having such a structure, the operation control equivalent to that in the second embodiment mentioned above (including the case where the operation control in the first embodiment is simultaneously executed in parallel) can be basically applied, and an operation control inherent to this embodiment such as described below can be applied in addition to the above control.

At first, in the start-up operation in the overall operation described in connection with the first and second embodiments (see FIGS. 27 and 34), when the operation control portion 13 detects a change in voltage of the supply electric power through the voltage monitoring portion 16 or when it receives load drive information which is notified from the controller CNT contained in the device DVC and requests electric power supply, the operation control portion 13 makes reference to the residual quantity detection signal from the residual quantity detection portion 18 and makes judgment upon whether the power generation fuel FL whose amount is enough for normally starting up the power generation portion 12 remains before the operation for outputting to the start-up control portion 15 the operation control signal for starting up the power generation portion 12 (steps S104 or S204).

When the operation control portion 13 determines that the power generation fuel having a sufficient amount required for the start-up operation for the power generation portion 12 remains in the fuel pack 20F based on the residual quantity detection signal, the operation control portion 13 executes the start-up operation (steps S104 to S106 or S204 to S206) described in connection with the above first or second embodiment, generates the load drive electric power by the power generation portion 12, and supplies the predetermined supply capability to the device DVC.

On the other hand, as shown in FIG. 60, when the operation control portion 13 determines that the power generation fuel having a sufficient amount required for the start-up operation remains in the fuel pack 20F based on the residual quantity detection signal (when it detects a residual quantity error), the operation control portion 13 notifies the controller CNT in the device DVC of a start-up error signal based on the residual quantity error as the power generation operation information through the terminal portion ELx. As a result, the controller CNT can notify a device DVC user of information concerning the residual quantity error and urge appropriate processing such as replacement of the power supply system or replenishment of the power generation fuel.

Furthermore, in the steady operation in the overall operation described in connection with the first or second embodiment (see FIGS. 27 and 34), as shown in FIG. 61, the operation control portion 13 can sequentially monitor the residual quantity detection signal (residual quantity) detected through the residual quantity detection portion 18, and notifies through the terminal portion ELx the controller CNT in the device DVC of a residual quantity information signal such as an assumed remaining time in which the actual residual quantity data itself, a residual quantity ratio or electric power can be outputted to the controller CNT contained in the device DVC as power generation operation information.

As shown in FIG. 61, the operation control portion 13 may output to the output control portion 14, for example, an operation control signal for controlling an amount of electric power generation in the power generation portion 12 in accordance with a residual quantity of the power generation fuel FL detected through the residual quantity detection portion 18, adjust an amount of the power generation fuel supplied to the power generation portion 12 so as to be reduced as a residual quantity of the power generation fuel FL is decreased, and control the load drive electric power (substantially a voltage of the supply electric power supplied to the device DVC) generated by the power generation portion 12 to gradually vary (lower) with time.

Consequently, the controller CNT can accurately grasp a residual quantity of the power generation fuel in the power supply system or an assumed time enabling driving the device DVC based on a residual quantity information signal or a change in voltage of the supply electric power, and notify a user of information urging replacement of the power supply system or replenishment of the power generation fuel. Therefore, for example, the function for notifying a device user of a residual quantity of the cell can be excellently operated based on an output voltage from the power supply or a residual quantity of the cell, thereby realizing the use conformation substantially equivalent to that in case of applying the general-purpose chemical cell as the operating electric power of the device.

Figure 62:
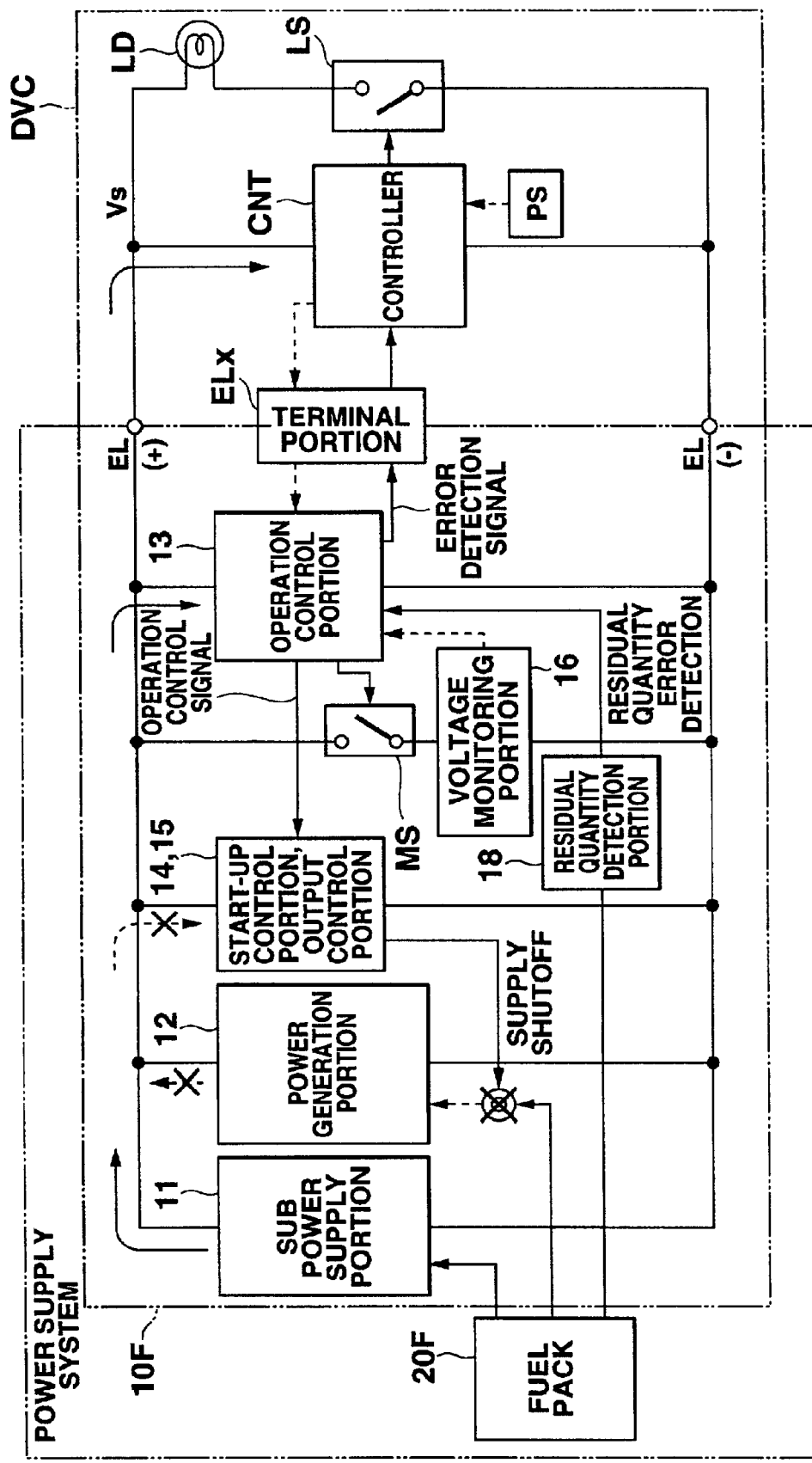
FIG. 62 is an operation conceptual view showing a stop operation of the power supply system according to the embodiment.

In this steady operation, when the operation control portion 13 detects a residual quantity error such as sudden drop in a residual quantity of the power generation fuel FL from the residual quantity detection portion 18 during the feedback control of the supply electric power (load drive electric power generated by the power generation portion 12) as shown in FIG. 62, the operation control portion 13 shuts off supply of the power generation fuel to the power generation portion 12 and stops the power generation operation of the power generation portion 12 by outputting to the output control portion 14 an operation control signal for stopping generation of electric power in the power generation portion 12, as the power generation operation information. Moreover, the operation control portion 13 stops heating by the heater for facilitating the endoergic reaction for generating hydrogen, and notifies through the terminal portion ELx the controller CNT in the device DVC of an abnormal stop signal based on the residual quantity error or stop of the operation in the power generation portion 12 as the power generation operation information. As a result, the controller CNT can notify a device DVC user of information concerning stop of the operation involved by the residual quantity error, and urge to take appropriate measures for occurrence of leak or the like of the power generation fuel FL from the fuel pack to the outside of the power supply system 301.

The structure of each block will now be described concretely hereinafter.

[Fifth Embodiment]

(A) Power Generation Module 10

Description will now be given as to a fifth embodiment of the power generation module applied to the power supply system according to the present invention with reference to FIG. 63. Here, like reference numerals denote structures equivalent to those in the first embodiment, thereby simplifying or omitting their explanation.

The power generation module 10G according to this embodiment is configured to generally include: a sub power supply portion (second power supply means) 11 which constantly autonomously generates predetermined electric power (second electric power) by using the power generation fuel supplied from the fuel pack 20G through the I/F portion 30G and outputs it as at least drive electric power (controller electric power) for the controller CNT which is contained in the device DVC connected to the power supply system 301 and controls to drive the load LD (an element or a module having various kinds of functions for the device DVC) and operating electric power for the later-described operation control portion 13 which is provided in the power generation module 10G; an operation control portion 13 which operates with electric power supplied from the sub power supply portion 11 and controls the operation state of the entire power supply system 301;

a power generation portion (first power supply means) 12 which generates predetermined electric power (first electric power) by using the power generation fuel supplied from the fuel pack 20G through the I/F portion 30G or a specific fuel component extracted from the power generation fuel, and outputs it as at least load drive electric power for driving various kinds of functions (load LD) of the device DVC connected to the power supply system 301; an output control portion 14 which controls at least an amount of the power generation fuel to be supplied to the power generation portion 12 and/or an amount of electric power to be supplied based on an operation control signal from the operation control portion 13; and a start-up control portion 15 which controls at least the power generation portion 12 so as to shift from the standby mode to the operation mode capable of power generation based on an operation control signal from the operation control portion 13. The operation control portion 13, the output control portion 14 and the start-up control portion 15 according to this embodiment constitute system controlling means in the present invention.

The power generation module 10G has a structure in which a residual quantity detection portion 18 for detecting an amount of the power generation fuel FL remaining in the fuel pack 20G (residual quantity) and outputting its residual quantity detection signal to the operation control portion 13 is provided to the inside of any of the power generation module 10G, the I/F portion 30G or the fuel pack 20G (here, inside of the power generation module 10G).

That is, the power supply system 301 according to this embodiment is configured to be capable of outputting predetermined electric power (load drive electric power) to the device DVC connected to the power supply system 301 without depending on fuel supply or control from the outside of the system (other than the power generation module 10G, the fuel pack 20G and the I/F portion 30G).

<Sub Power Supply Portion 11 in Fifth Embodiment>

Figure 63:
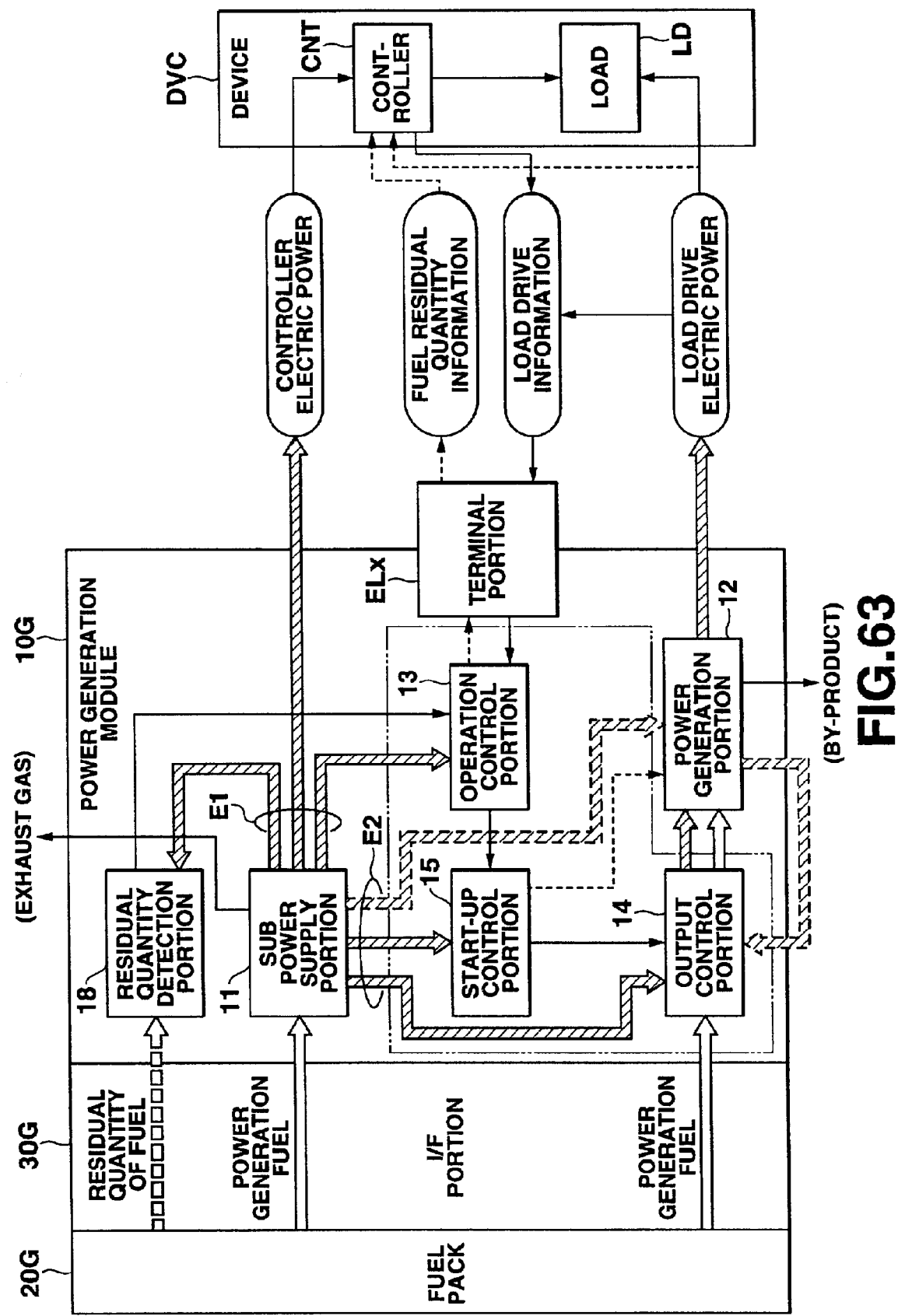
FIG. 63 is a block diagram showing a first embodiment of the power generation module applied to the power supply system according to the present invention.

As shown in FIG. 63, the sub power supply portion 11 applied to the power generation module according to this embodiment is configured to constantly autonomously generate predetermined electric power (second electric power) required for the start-up operation of the power supply system 301 by using the physical or chemical energy of the power generation fuel FL supplied from the fuel pack 20G. In addition, this electric power is roughly constituted by: drive electric power (controller electric power) for the controller which is contained in the device DVC and controls its drive state; electric power E1 which is constantly supplied as the operating electric power for the operation control portion 13 for controlling the operation state of the entire power generation module 10G and the residual quantity detection portion 18 for detecting a residual quantity of the power generation fuel FL charged in the fuel pack 20G;

and electric power E2 which is supplied to at least the output control portion 14 (the power generation portion 12 may be included depending on structures), the start-up control portion 15 and the residual quantity detection portion 18 as start-up electric power (voltage/electric current) at the time of starting up the power generation module 10G. It is to be noted that the electric power which can be the operating electric power for the residual quantity detection portion 18 may be configured to be supplied after starting up the power generation module 10G by the start-up control portion 15 as well as it is constantly supplied.

As a concrete structure of the sub power supply portion 11, for example, one utilizing the electrochemical reaction using the power generation fuel FL supplied from the fuel pack 20G (fuel cell) or one utilizing the thermal energy involved by the catalytic combustion reaction (temperature difference power generation) can be excellently applied. Also, it is possible to apply one utilizing the dynamic energy conversion action or the like for generating electric power by rotating the power generator by using a charging pressure for the power generation fuel FL charged in the fuel pack 20G or a gas pressure generated by evaporation of the fuel (gas turbine power generation), one capturing the electron generated from metabolism (photosynthesis, aspiration or the like) by microbes using the power generation fuel FL as a source of nutrition and directly converting it into electric power (biochemical power generation), one converting the vibration energy produced from the fluid energy of the power generation fuel FL based on the charging pressure or the gas pressure into electric power by utilizing the principle of electromagnetic induction (vibration power generation), one utilizing discharge from a unit of electric power storing means such as a secondary cell (battery charger) or a capacitor, one storing electric power generated by each structure performing the power generation in the electric power storing means (secondary cell, capacitor or the like) and emitting (discharging) it, or the like.

<Overall Operation of Fifth Embodiment>

The overall operation of the power supply system having the above-described structure will now be described with reference to the drawings.

Figure 64:
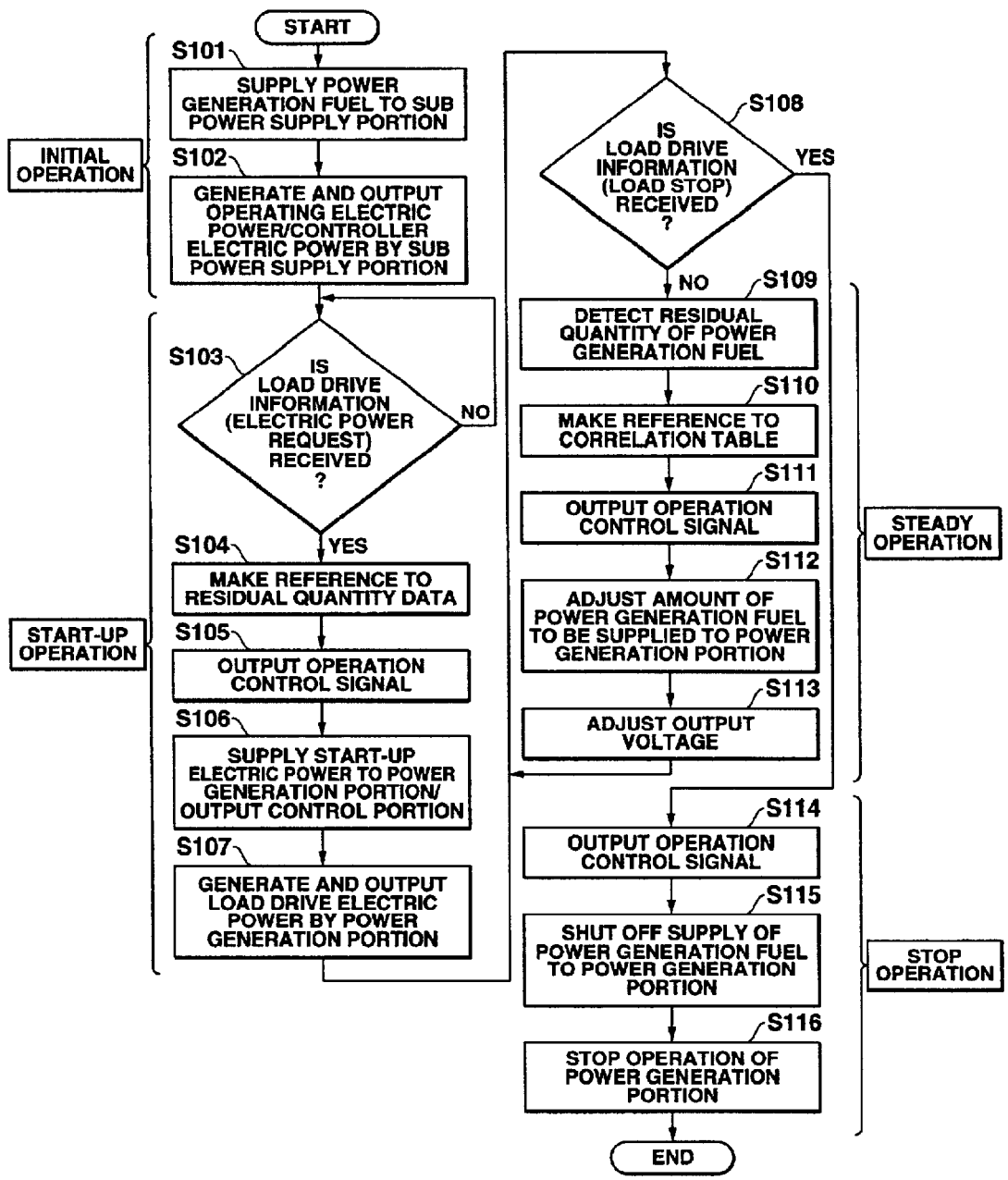
FIG. 64 is a flowchart showing a schematic operation of the power supply system.

FIG. 64 is a flowchart showing a schematic operation of the power supply system. Here, description will be given while appropriately making reference to the structure of the above-described power supply system (FIG. 63).

As shown in FIG. 64, the power supply system 301 having the above-described structure is controlled to generally execute: an initial operation (steps S101 and S102) for supplying the power generation fuel FL charged in the fuel pack 20 to the power generation module 10 and constantly continuously generating and outputting electric power (second electric power) which can be the operating electric power and the controller electric power in the sub power supply portion 11;

a start-up operation (steps S103 to S106) for supplying the power generation fuel FL charged in the fuel pack 20 to the power generation portion 12 based on a residual quantity of the power generation fuel in the fuel pack 20 and drive of the load LD in the device DVC, and generating and outputting electric power (first electric power) which can be load drive electric power; a steady operation (steps S109 to S113) for adjusting an amount of the power generation fuel FL supplied to the power generation portion 12 based on a residual quantity of the power generation fuel and the drive state of the load LD, and performing feedback control for generating and outputting electric power according to the drive state of the load LD; and a stop operation (steps S114 to S116) for shutting off supply of the power generation fuel FL to the power generation portion 12 based on stop of the load LD and stopping generation of electric power. As a result, the power supply system applicable even in an existing device DVC can be realized.

(A) Initial Operation of Fifth Embodiment

At first, in the initial operation, in the power supply system in which the power generation module 10 and the fuel pack 20 are integrally configured through the I/F portion 30, by releasing the shutoff state of the fuel feed path of the I/F portion 30 at the time of, e.g., attachment to the device, the power generation fuel charged in the fuel pack 20 moves in the fuel feed path by the capillary phenomenon of the fuel feed path and is automatically supplied to the sub power supply portion 11 of the power generation module 10 (step S101). In the sub power supply portion 11, at least electric power (second electric power) which can be the operating electric power for the operation control portion 13 and the drive electric power (controller electric power) for the controller CNT included in the device DVC is autonomously generated and constantly continuously outputted (only electric power which can be the operating electric power for the operation control portion 13 and the residual quantity detection portion 18 is outputted until the power supply system is connected to the device) (step S102).

On the other hand, in the power supply system configured in such a manner that the power generation module 10 and the fuel pack 20 can be attached and detached without restraint, by coupling the fuel pack 20 to the power generation module 10 through the I/F portion 30, the leak prevention function of fuel leak preventing means provided to the fuel pack 20 is released, and the power generation fuel charged in the fuel pack 20 moves in the fuel feed path by the capillary phenomenon of the fuel feed path and is automatically supplied to the sub power supply portion 11 of the power generation module 10 (step S101). In the sub power supply portion 11, electric power (second electric power) which can be at least the operating electric power and the controller electric power is autonomously generated and constantly continuously outputted (only electric power which can be the operating electric power for the operation control portion 13 and the residual quantity detection portion 16 is outputted until the power supply system is connected to the device) (step S102).

As a result, the operation control portion 13 and the residual quantity detection portion 16 of the power generation module 10 become operative and monitor the load drive information from the device DVC and the residual quantity detection signal from the residual quantity detection portion 16. In addition, when the power supply system is connected to the device DVC, a part of electric power generated by the sub power supply portion 11 is supplied to the controller CNT contained in the device DVC as the controller electric power, and the controller CNT is driven to control drive of the load LD of the device DVC. Also, the operation control portion 13 of the power supply system 301 (power generation module 10) is informed of the drive state as the load drive information.

(B) Start-up Operation of Fifth Embodiment

Subsequently, in the start-up operation, when a device DVC user or the like performs the operation for driving the load LD, an electric power supply request signal requesting supply of electric power (first electric power) which can be the load drive electric power for the operation control portion 13 of the power generation module 10 is outputted from the controller CNT as the load drive information. Upon receiving the load drive information indicative of the voltage displacement inputted through the terminal portion Elx of the power supply system 301 (step S103), the operation control portion 13 makes reference to residual quantity data of the power generation fuel FL based on the residual quantity detection signal outputted from the residual quantity detection portion 16 and makes judgment upon whether the power generation fuel FL having an amount capable of normally executing the start-up operation (step S104) presents or not, before the start-up operation of the power generation module 10.

Here, when an error is detected in the residual quantity of the power generation fuel FL (for example, when the residual quantity is zero), the operation control portion 13 outputs fuel residual quantity information concerning an error in the residual quantity to the controller CNT of the device DVC, notifies a device DVC user of this error and stops the start-up operation. On the other hand, when it is determined that the sufficient power generation fuel FL remains in the fuel pack 20, the operation control portion 13 outputs to the start-up control portion 15 an operation control signal for starting the power generation portion (start-up) in the power generation portion 12 (step S105).

Based on the operation control signal from the operation control portion 13, by supplying a part of electric power generated by the sub power supply portion 11 to the output control portion 14 and the power generation portion 12 as the start-up electric power (step S106), the start-up control portion 15 supplies the power generation fuel FL charged in the fuel pack 20 to the power generation portion 12 through the output control portion 14 and performs the operation for generating electric power (first electric power) which can be the load drive electric power and outputting it to the device DVC (load LD) (step S107). As a result, upon receiving the power generation fuel, the power generation portion 12 is automatically started up in response to a request for driving the load LD in the device DVC, and the load drive electric power consisting of a predetermined output voltage is supplied. Therefore, the load LD can be excellently driven while realizing the electric power characteristic substantially equivalent to that of the general-purpose chemical cell.

In this start-up operation, the operation control portion 13 may be configured to monitor a change in voltage of the electric power (load drive electric power) generated by the power generation portion 12 and supplied to the device DVC as one of load drive information and output a start-up end signal indicating that a predetermined voltage is reached to the controller CNT of the device DVC. Consequently, based on a voltage value of the load drive electric power, the present invention can be also excellently applied as a power supply to the device DVC having a structure for controlling the drive state of the load LD.

(C) Steady Operation of Fifth Embodiment

Then, in the steady operation after the above-described start-up operation, as the overall control (voltage control with time) for an output voltage of the load drive electric power, until the operation control portion 13 shifts to the later-described stop operation based on, e.g., stop of the load LD, the operation control portion 13 constantly or periodically detects a residual quantity detection signal from the residual quantity detection portion 16 and monitors residual quantity data of the power generation fuel FL (step S109); makes reference to a predetermined correlation table in which the correlation between a residual quantity of the power generation fuel and an output voltage is determined based on the residual quantity data (step S110); and outputs to the output control portion 14 an operation control signal for controlling in such a manner that an amount of electric power to be generated (amount of power generation) in the power generation portion 12 varies in accordance with a predetermined output voltage characteristic (step S111).

Here, by making reference to the correlation table, the operation control portion 13 outputs an operation control signal for controlling in such a manner that an output voltage of the load drive electric power outputted from the power generation module 10 varies while demonstrating the output voltage characteristic equivalent to, for example, a tendency of a voltage change with time in one type of general-purpose chemical cells (for example, a manganese cell, an alkali cell, a button type alkali cell, a coin-shaped lithium cell, and others). At this moment, the operation control portion 13 outputs to the controller CNT included in the device DVC the actual residual quantity data itself or a residual quantity ratio or an estimated remaining time, with which electric power can be outputted, as fuel residual quantity information.

Based on the operation control signal from the operation control portion 13, the output control portion 14 adjusts an amount of the power generation fuel FL supplied to the power generation portion 12 (step S112), and controls in such a manner that an output voltage of the load drive electric power supplied to the device DVC can be set to a voltage in accordance with the output voltage characteristic (step S113). As a result, since the output voltage of the load drive electric power supplied from the power supply system 301 to the device DVC demonstrates a tendency of changes with time equivalent to that of the general-purpose chemical cell, the existing residual quantity notification function that the controller CNT included in the device DVC has can be excellently operated based on the output voltage or the fuel residual quantity information, and a user of the device DVC can be periodically or continuously informed of a residual quantity of the cell or an estimated time with which the load LD can be driven.

Further, as the partial control for the output voltage of the load drive electric power (individual voltage control), in addition to the above-described overall control, the operation control portion 13 may receive a change in the output voltage of the load drive electric power supplied from the power generation portion 12 to the device DVC as load drive information and output to the output control portion 14 an operation control signal for controlling an amount of electric power (amount of power generation) generated in the power generation portion 12 to be increased or decreased in such a manner that the output voltage of the load drive electric power can be set within a predetermined voltage range (a fluctuation allowable range of the output voltage which varies in accordance with the output voltage characteristic in the general-purpose chemical cell mentioned above). As a result, the output control portion 14 adjusts an amount of the power generation fuel FL supplied to the power generation portion 12 based on the operation control signal from the operation control portion 13, and the feedback control is executed so that the output voltage of the load drive electric power supplied to the device DVC can be set within the above-described voltage range. Therefore, even if the voltage of the load drive electric power varies due to a change in the drive state (load state) of the load LD on the device DVC side, it is possible to supply electric power according to power consumption of the device DVC which varies with the drive of the load LD.

Furthermore, if the drive state of the load LD is grasped by the controller CNT of the device DVC and there is provided a function for requesting supply of the electric power according to the drive state the power supply system side, the operation control portion 13 may, as the further partial control of the output voltage of the load drive electric power, receive H an electric power change request signal from the controller CNT as the load drive information and output to the output control portion 14 an operation control signal for setting the electric power generated in the power generation portion 12 to an output voltage according to the request. As a result, based on the operation control signal from the operation control portion 13, the output control portion 14 adjusts an amount of the power generation fuel FL supplied to the power generation portion 12, the control is carried out in such a manner that the output voltage of the load drive electric power supplied to the device DVC can be set to a voltage according to the request, and appropriate electric power can be supplied in accordance with the drive state (load state) of the load LD on the device DVC side. Therefore, changes in the voltage of the load drive electric power involved by variations in the drive state of the load LD can be considerably suppressed and occurrence of operation errors in the device DVC can be held down.

Here, description will be given as to the output voltage characteristic applied to the overall control for the output voltage of the load drive electric power mentioned above in detail.

Figure 65:
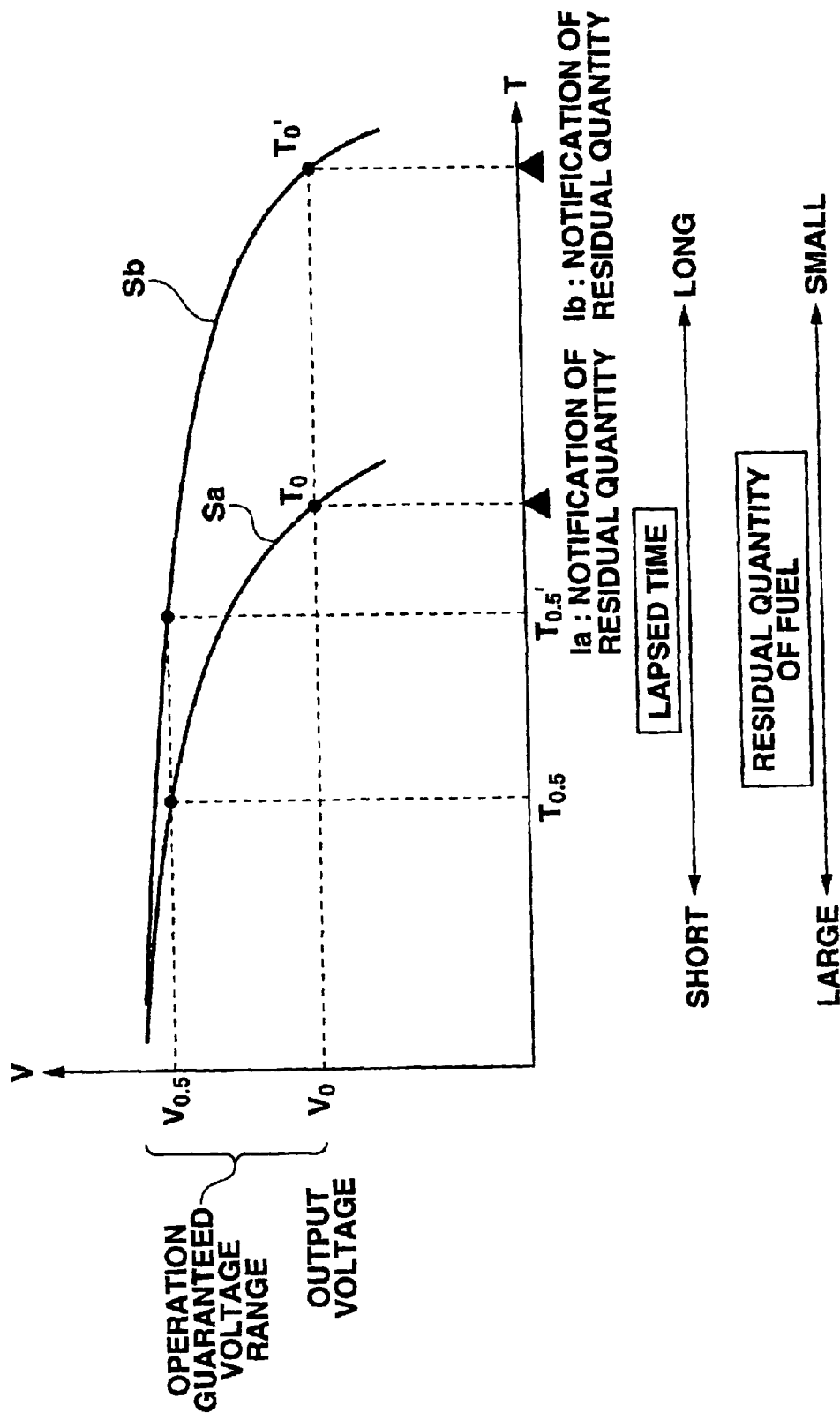
FIG. 65 is a characteristic view showing changes with time of an output voltage of the power supply system according to the embodiment.

FIG. 65 is a characteristic view showing changes in the output voltage of the power supply system according to this embodiment with time. Here, description will be given on comparison in the electromotive force characteristic between the general-purpose chemical cell and the prior art fuel cell while appropriately making reference to the structure of the above-described power supply system (FIG. 63).

As shown in FIG. 65, as to the output voltage characteristic (which will be written as the "first it output voltage characteristic Sa" for convenience of explanation) in the power supply system according to this embodiment, the output voltage is controlled so as to demonstrate a tendency of changes substantially equivalent to a tendency of changes with time of the output voltage involved by discharge in the general-purpose chemical cell. That is, at least an amount of the power generation fuel FL to be supplied to the power generation portion 12 by the output control portion 14 is controlled (set to be decreased) so that power generation state in the power generation portion 12 of the power generation module 10 can be attenuated in accordance with elapse of the time involved by discharge (in other words, a residual quantity of the liquid fuel in the fuel pack 20).

Specifically, in regard to the method for controlling the output voltage according to this embodiment, as described above, a quantity of the power generation fuel FL remaining in the fuel pack 20 is first detected by the residual quantity detection portion 16, and its residual quantity detection signal is constantly (continuously) or periodically inputted to the operation control portion 13. Here, a residual quantity of the power generation fuel FL is, however, reduced in accordance with elapse of the time involved by generation of electric power in the power generation portion 12, and hence a residual quantity of the power generation fuel FL and the lapsed time has the close correlation.

On the other hand, the operation control portion 13 is provided with a correlation table having the first output voltage characteristic Sa by which the correlation between a residual quantity of the power generation fuel FL and the output voltage is uniquely defined so as to correspond to a tendency of changes with time of the output voltage involved by discharge in the general-purpose chemical cell (a manganese cell, an alkali cell, a button type alkali cell, a coin-shaped lithium cell and others). As a result, the operation control portion 13 associates a residual quantity of the power generation fuel FL obtained by the residual quantity detection signal with elapse of the time involved by discharge, uniquely determines an output voltage based on the characteristic curve (first output voltage characteristic Sa) shown in FIG. 65, and performs adjustment so as to supply the power generation fuel FL whose amount corresponds to this output voltage to the power generation portion 12. Here, uniquely defining the correlation between a residual quantity of the liquid fuel and the output voltage means the relationship that the an output voltage value or an output electric power value corresponds to a residual quantity of the power generation fuel FL one on one as shown in FIG. 4, and this is not restricted to one demonstrating a tendency of the changes indicated by a curve as shown by the characteristic curve in FIG. 65 but may be one which varies in the form of a primary straight line.

Moreover, as to an output of the general-purpose chemical cell, since the displacement of the output voltage with time differs depending on each capacity of, e.g., D to AAAA size batteries or a coin-shaped battery, the shape and dimension of the power supply system according to this embodiment may comply with the shape and dimension of the general-purpose chemical cell in conformity to the standards of the general-purpose chemical cell as will be described later, and the correlation table (output voltage characteristic) of the operation control portion 13 may be set in such a manner that the output voltage according to a residual quantity of the power generation fuel FL accords with or approximates to or becomes analogical with the output voltage according to the remaining duration of life of a chemical cell of the same type. Therefore, for example, a trajectory of changes with time of the output voltage of the D size fuel power supply system according to the present invention is set so that it matches with a trajectory of changes with time of the attenuated output voltage in the electromotive force of any of various kinds of chemical cells such as a D size manganese cell according to JIS or it is enlarged or decreased along the time axis.

That is, as described above, although a residual quantity of the power generation fuel FL and the lapsed time have the close correlation, this relationship does not have to necessarily match with the relationship between a battery residual quantity of the general-purpose chemical cell and the lapsed time in charge. Namely, in case of applying the fuel cell or the like as a structure of the power generation portion 12, since there is a characteristic that the energy conversion efficiency becomes higher than that of the general-purpose chemical cell, the voltage may change (lower) in units of longer time than that of the first output voltage characteristic Sa corresponding to a tendency of changes in voltage with time in the general-purpose chemical cell, as indicated by, e.g., a second output voltage characteristic Sb in FIG. 65.

Specifically, in the first output voltage characteristic Sa, assuming that the lower limit of the operation guaranteed voltage range is a voltage $V_0$ and a time required for reaching the voltage $V_0$ is $T_0$, a time which is ½ of the time $T_0$, namely, the time when the remaining duration of like becomes half is determined as $T_{0.5}$ and a voltage at this moment is determined as $V_{0.5}$. Here, it is preset that the residual quantity notification Ia is carried out when the controller CNT included in the device DVC detects that the output voltage of the power supply system has reached the voltage $V_0$.

On the other hand, in the second output voltage characteristic Sb, assuming that a voltage when a residual quantity of the power generation fuel FL is substantially zero is set to be equal to the voltage $V_0$ of the chemical cell and a time required to reach the voltage $V_0$ is $T_0'$, a time which is ½ of the time $T_0'$, namely, the time when the remaining duration of life becomes half is determined as $T_{0.5}'$ and a voltage at this moment is set to be equal to the voltage $V_{0.5}$ of the chemical cell.

That is, an amount of the power generation fuel FL to be supplied or an amount of oxygen or air to be supplied set by the output control portion 14 is controlled in such a manner that the voltage outputted from the power generation module 10 when a residual quantity of the power generation fuel FL charged in the fuel pack 20 becomes half is equal to the voltage when a residual quantity of the electromotive force in the operation guaranteed voltage range of the general-purpose chemical cell becomes half and the voltage when a residual quantity of the power generation fuel FL is substantially zero is equal to the voltage when a residual quantity of the electromotive force in the operation guaranteed voltage range of the general-purpose chemical cell is substantially zero.

As described above, in cases where the power supply system according to this embodiment is applied as a power supply of the device DVC, when the output voltage uniquely determined based on a residual quantity of the power generation fuel FL reaches a voltage below the operation guaranteed voltage range of the device DVC irrespective of the lapsed time involved by discharge, the residual quantity notification Ib for urging replacement or charge of the cell is carried out by the device DVC, and this timing does not have to match with the timing of the residual quantity notification Ia when using the general-purpose chemical cell.

Therefore, the duration of life $T_0'$ (point in time at which the output voltage becomes below the lower limit of the operation guaranteed voltage range of the device DVC with reduction in the power generation fuel FL) of the power supply system according to this embodiment does not have to be matched with the duration of life $T_0$ of the general-purpose chemical cell, and a time-output voltage characteristic such that a trajectory enlarged or decreased along the time axis T is drawn can suffice. Incidentally, the residual quantity detection portion 16 may detect a minutely divided residual quantity of the power generation fuel FL, for example, when a residual quantity is 33% or 25% without restricting detection to only the timing when a residual quantity of the power generation fuel FL becomes half or substantially zero. At any rate, it is good enough to set an output voltage which substantially match with the output voltage according to a residual quantity of the electromotive force of the chemical cell.

According to the power supply system having such an output voltage characteristic, since the output voltage from the power supply system demonstrates a tendency of changes with time equivalent to that of the general-purpose chemical cell when applied to the existing device DVC as the operating electric power, when the existing residual quantity notification function is excellently operated by detecting a change in this output voltage by means of the controller CNT provided in the device DVC, a residual quantity of the cell or an estimated time with which the device DVC can be driven can be periodically or continuously displayed, or the residual quantity notification urging replacement or charge of the cell can be accurately carried out by the device DVC when a voltage which is below the operation guaranteed voltage range of the device DVC is reached.

In addition, as will be described, when the power supply system (power generation module) according to this embodiment is integrated in a small space by applying the micromachine manufacturing technique, reduced in size and weight and configured to have the outside shape or dimensions equivalent to those of a commercially available chemical cell, it is possible to realize the complete compatibility with the commercially available chemical cell in the outside shape and the voltage characteristic, and popularization in an existing cell market can be further facilitated. As a result, since the power supply system such as a fuel cell having the high energy utilization efficiency can be generalized without trouble in place of the existing chemical cell having many problems in the environmental concerns or the energy utilization efficiency, the energy resource can be effectively utilized while suppressing the influence on the environment.

(D) Stop Operation of Fifth Embodiment

Subsequently, in the stop operation, when the operation control portion 13 receives the load drive information concerning stop of the load LD (S108), it outputs to the output control portion 14 an operation control signal for stopping generation of electric power in the power generation portion 12 (step S114). Based on the operation control signal from the operation control portion 13, the output control portion 14 shuts off supply of the power generation fuel FL to the power generation portion 12 (step S115), stops the operation of the power generation portion 12 (step S116) and stops supply of the load drive electric power to the device DVC.

Specifically, even though the feedback control is carried out in the above-described steady operation, when the operation control portion 13 continuously detects for a predetermined time a state that an output voltage of the load drive electric power supplied to the device DVC deviates from a predetermined voltage range, the operation control portion 13 deals with the output voltage error as load drive information and outputs to the output control portion 14 an operation control signal for stopping generation of electric power in the power generation portion 12.

That is, when a user of the device DVC conducts the operation for stopping the load LD or when the load is run out by, e.g., removing the power supply system 301 from the device DVC, even if the feedback control or the like for setting the output voltage of the load drive electric power within a predetermined voltage range is carried out in the above-described steady operation, the output voltage deviates from the preset voltage range of the load drive electric power. Therefore, when the operation control portion 13 continuously detects such a state beyond a predetermined time, it determines that the load LD of the device DVC is stopped or ceased and stops the power generation operation in the power generation portion 12.

Additionally, when the stopped state of the load LD is grasped by the controller CNT of the device DVC and there is provided a function for requesting stop of supply of electric power to the power supply system side, the operation control portion 13 receives an electric power stop request signal from the controller CNT as the load drive information and outputs to the output control portion 14 an operation control signal for stopping generation of electric power in the power generation portion 12.

As a result, since supply of the power generation fuel is shut off and the power generation portion 12 is automatically shut down with respect to stop or the like of the load LD in the device DVC, the electric power characteristic substantially equivalent to that of the general-purpose chemical cell can be realized while efficiently consuming the power generation fuel FL.

Further, when the residual quantity detection portion 16 detects a residual quantity error such as sudden reduction in a residual quantity of the power generation fuel FL, the operation control portion 13 may output to the output control portion 14 an operation control signal for stopping generation of electric power in the power generation portion 12 base on a detection signal concerning the residual quantity error, stop the power generation operation of the power generation portion 12, and output information concerning the residual quantity error to the controller CNT included in the device DVC so that a user of the device DVC can be notified of this information. As a result, it is possible to rapidly detect occurrence of the abnormal state such as leak of the power generation fuel FL from the fuel pack 20 to the outside of the power supply system 301 and inform a user of the device DVC to take appropriate measures.

As described above, according to the power supply system according to this embodiment, it is possible to control supply of electric power which can be a predetermined drive power supply, stop of electric power and adjustment of an amount of electric power to be generated in accordance with the drive state (load drive information) of the load LD connected to the power supply system and a residual quantity of the power generation fuel FL without receiving supply of the fuel or the like from the outside of the power supply system. Therefore, the power supply system which has less burden on the environment but the very high energy conversion efficiency can be provided while realizing the electrical characteristic substantially equivalent to that of the general-purpose chemical cell. Consequently, in place of the existing chemical cell having many problems in the environmental concerns or the energy utilization efficiency, the power supply system according to this embodiment can be popularized in the existing cell market without trouble. Incidentally, although the output voltage is changed in accordance with a residual quantity of the power generation fuel FL in this embodiment, the present invention is not restricted thereto, and an output electric current value may be changed.

[Sixth Embodiment]

Description will now be given as to a sixth embodiment of the power generation module applied to the power supply system according to the present invention with reference to the accompanying drawings.

Figure 66:
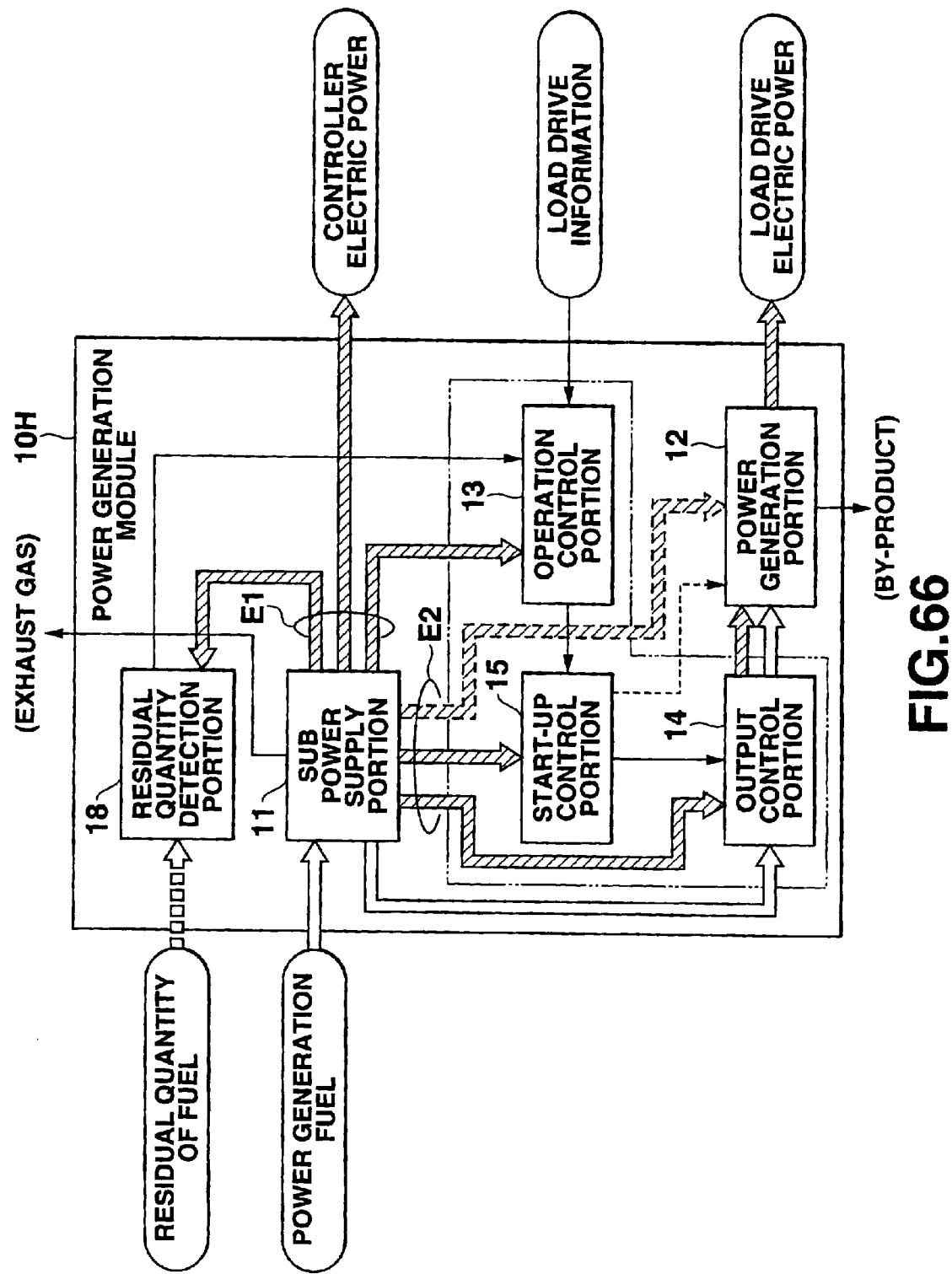
FIG. 66 is a block diagram showing a second embodiment of the power generation module applied to the power supply system according to the present invention.

FIG. 66 is a block diagram showing the sixth embodiment of the power generation module applied to the power supply system according to the present invention. Here, like reference numerals denote structures equivalent to those in the fifth embodiment described above, thereby simplifying or omitting their explanation.

In the power generation module 10G according to the fifth embodiment mentioned above, description has been given on the structure in which the power generation fuel FL utilized in the sub power supply portion 11 is directly emitted to the outside of the power supply system 301 as exhaust gas or collected by the later-described by-product collecting means. However, in the power generation module 10H according to this embodiment, when the power generation operation in the sub power supply portion 11 does not involve a change in components of the power generation fuel FL or when a specific fuel component is contained even if a change in components is involved, the power generation fuel FL used in the sub power supply portion 11 is directly reused as the power generation fuel in the power generation portion 12 or reused after extracting a specific fuel component.

Specifically, as shown in FIG. 66, the power generation module 10H according to this embodiment includes: a sub power supply portion 11; a power generation portion 12, an operation control portion 13; an output control portion 14; a start-up control portion 15; and a residual quantity detection portion 16 which have the structures and functions similar to those in the above-described fifth embodiment (see FIG. 63) and, in particular it is configure so that all or a part of the power generation fuel (exhaust gas) used for generation of electric power in the sub power supply portion 11 can be supplied to the power generation portion 12 through the output control portion 14 without being emitted to the outside of the power generation module 10H.

The sub power supply portion 11 applied to this embodiment has a structure capable of generating and outputting predetermined electric power (second electric power) without consuming and transforming a fuel component of the power generation fuel FL supplied from the fuel pack 20G through the I/F portion 30G (for example, the power generation device explained in the second, third, fifth or seventh structural example in the first embodiment mentioned above), or a structure for generating exhaust gas containing a fuel component which can be used for the power generation operation in the power generation portion 12 even if a fuel component of the power generation fuel FL is consumed and transformed (for example, the power generation device explained in the fourth or sixth structural example in the first embodiment mentioned above).

Further, in case of applying as the power generation portion 12 the power generation device shown in the first to sixth structural examples in the above-described first embodiment, there is applied, as the power generation fuel FL charged in the fuel pack 20G, a fuel substance having the ignitability or combustibility, for example, an alcohol-based liquid fuel such as methanol, ethanol or butanol, or a liquefied fuel consisting of hydrocarbon such as dimethyl ether or isobutane, or a gas fuel such as hydrogen gas.

The liquid fuel or the liquefied fuel is a liquid when charged in the fuel pack 20G under predetermined charging conditions (a temperature, a pressure and others). If this fuel is shifted to predetermined environmental conditions such as an ordinary temperature, an ordinary pressure and others when supplied to the sub power supply portion 11, it is vaporized to become a high-pressure fuel gas. Further, when the gas fuel is charged in the fuel pack 20G in the state compressed with a predetermined pressure and supplied to the sub power supply portion 11, it becomes a high-pressure fuel gas according to the charging pressure. Therefore, with such a power generation fuel FL, for example, after generating electric power (second electric power) by using the pressure energy of the fuel gas in the sub power supply portion 11, electric power (first electric power) can be generated in the power generation portion 12 by the electrochemical reaction, the combustion reaction or the like using the exhaust gas from the sub power supply portion 11.

[Seventh Embodiment]

A seventh embodiment of the power generation module applied to the power supply system according to the present invention will now be described with reference to the drawings.

Figure 67:
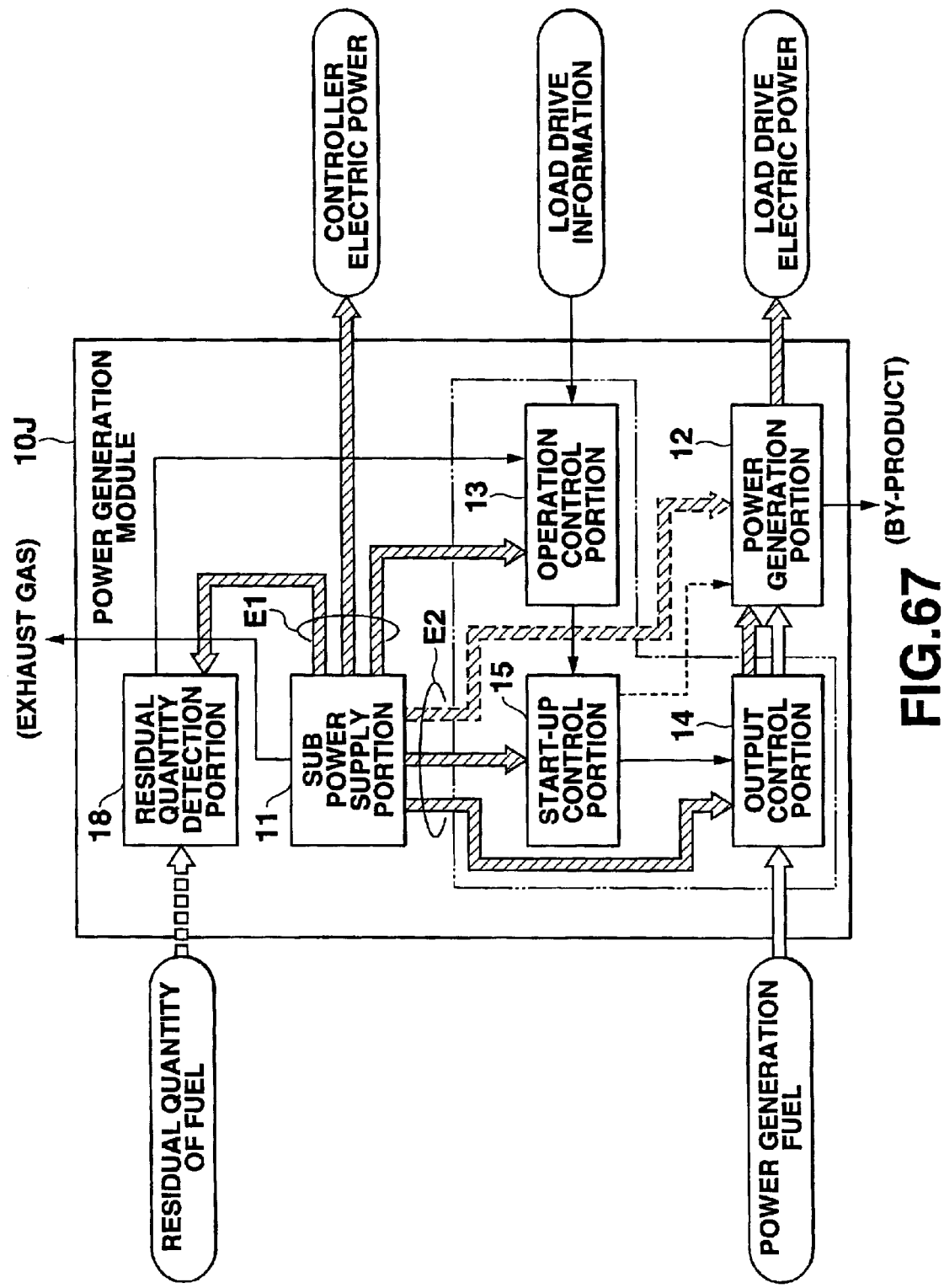
FIG. 67 is a block diagram showing a third embodiment of the power generation module applied to the power supply system according to the present invention.

FIG. 67 is a block diagrams showing a seventh embodiment of the power generation module applied to the power supply system according to the present invention. Here, like reference numerals denote structures equivalent to those of the first embodiment, thereby simplifying or omitting their explanation.

In the power generation modules 10G and 10H according to the fifth and sixth embodiments mentioned above, description has been given as to the case where there is applied as the sub power supply portion 11 the structure for constantly autonomously generating predetermined electric power (second electric power) by using the power generation fuel FL supplied from the fuel pack 20G. However, in the power generation module according to this embodiment, the sub power supply portion has the structure for constantly autonomously generating predetermined electric power without using the power generation fuel FL charged in the fuel pack 20G.

Specifically, as shown in FIG. 67, the power generation module 10J according to this embodiment includes: a power generation portion 12; an operation control portion 13; an output control portion 14; a start-up control portion 15; and a residual quantity detection portion 16 which have the structures and functions similar to those of the fifth embodiment (see FIG. 63) mentioned above, and the power generation module 10J is also provided with a sub power supply portion 11 for constantly autonomously generating predetermined electric power (second electric power) without using the power generation fuel FL charged in the fuel pack 20.

As the concrete structure of the sub power supply portion 11, it is possible to excellently apply one utilizing thermoelectric conversion based on a difference in temperature in the peripheral environment of the power supply system 301 (temperature difference power generation), one utilizing piezoelectric conversion based on the light energy entering from the outside of the power supply system 301 (photovoltaic generation), and others.

<Any Other By-Product Collecting Means>

Any other by-product collecting means applicable to the power supply system according to each of the foregoing embodiments will now be described with reference to the drawings.

Figure 68:
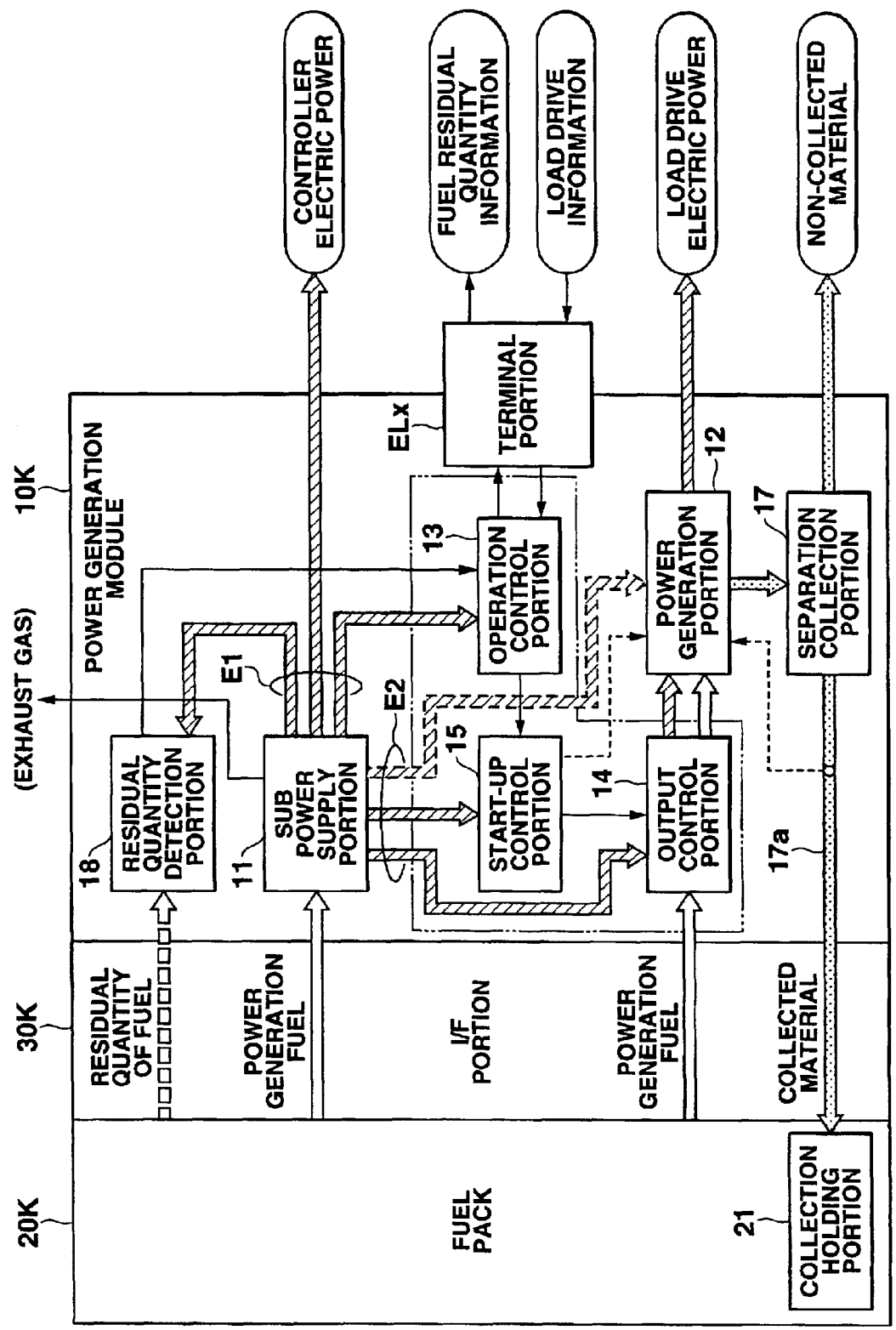
FIG. 68 is a block diagrams showing an embodiment of by-product collecting means applicable to the power 4u supply system according to the present invention.

FIG. 68 is a block diagram showing an embodiment of the by-product collecting means applicable to the power supply system according to the present invention. Here, like reference numerals denote structures equivalent to those in each of the foregoing embodiments, thereby simplifying or omitting their explanation.

In each embodiment mentioned above, when there is applied as the power generation portion 12 or the sub power supply portion 11 the structure (the power generation portion or the sub power supply portion shown in each of the above-described structural examples) for generating predetermined electric power by the electrochemical reaction or the combustion reaction by using the power generation fuel FL charged in the fuel pack 20, by-products may be emitted besides the electric power in some cases. Since such by-products may include a substance which can cause the environmental pollution when emitted to the natural world or a substance which can be a factor of the malfunction of the device to which the power supply system is attached in some cases, it is preferable to apply the structure provided with the following by-product collecting means because emission of such by-products must be suppressed as much as possible.

As shown in FIG. 68, for example, the by-product collecting means applicable to the power supply system according to the present invention has the structure in which a separation portion 17 for collecting all or a part of components of the by-product generated at the time of power generation in the power generation portion 12 is provided in the power generation module 10K, the fuel pack 20 and the I/F portion 30K having the structures and functions similar to those in each of the foregoing embodiments, e.g., in the power generation module 10K in this example, and a by-product charged portion 403 for fixedly holding the collected by-product is provided in the fuel pack 20K. Incidentally, here, although description will be given as to only the case where the by-product generated in the power generation portion 12 is collected, it is needless to say that this structure can be similarly applied to the sub power supply portion 11.

The separation portion 17 has the structure shown in each of the foregoing embodiments. In the power generation portion 12 (the sub power supply portion 11 may be included) which generates to at least the device DVC having the power supply system 301 attached thereto electric power which can be the load drive electric power (voltage/electric current) by the electrochemical reaction or the combustion reaction using the power generation fuel FL supplied from the fuel pack 20K, the separation collection portion 17 separates a by-product generated at the time of power generation or a specific component in the by-product and feeds it to the by-product charged portion 403 provided in the fuel pack 20K through a by-product collection path provided to the I/F portion 30K.

In the power supply portion 12 (the sub power supply portion 11 may be included) to which each structural example mentioned above is applied, as a by-product generated when producing electric power, there are water ($H_2O$), nitrogen oxide (NOx), sulfur oxide (SOx) and others, all or a part of them or only a specific component of them is collected by the separation portion 17 and fed to the by-product collection path. Incidentally, if the collected by-product is in the liquid state, the capillary phenomenon can be utilized to automatically feed the by-product from the separation portion 17 to the by-product charged portion 403 by, for example, forming the inside diameter of the by-product collection path so as to continuously vary.

The by-product charged portion 403 is provided to the inside of the fuel pack 20K or a part of the inside of the same. The collection holding portion 21 is configured to be capable of feeding and holding the by-product collected by the separation portion 17 only when the fuel pack 20K is coupled with the power generation 10K. That is, in the power supply system in which the fuel pack 20K can be attached to or detached from the power generation module 10K without restraint, when the fuel pack 20K is detached from the power generation module 10K, the collected and held by-product or a specific component is fixedly or irreversibly held in the by-product charged portion 403 so as not to leak or be emitted to the outside of the fuel pack 20K.

As described above, when water ($H_2O$), nitrogen oxide (NOx) and/or sulfur oxide (SOx) is generated as a by-product due to power generation in the power generation portion 12, since water ($H_2O$) is in the liquid state at an ordinary temperature under an ordinary pressure, water can be excellently fed to the by-product charged portion 403 through the by-product collection path. However, in case of a by-product whose point of vaporization is generally less than an ordinary temperature under an ordinary pressure and which is in the gas state such as nitrogen oxide (NOx) or sulfur oxide (SOx), its cubic volume may become extravagant and exceed the preset capacity of the by-product charged portion 403. Therefore, it is possible to adopt the structure in which the collected by-product is liquefied and the cubic volume is reduced so that the by-product can be held in the by-product charged portion 403 by increasing the air pressure in the separation portion 17 and the by-product charged portion 403.

Therefore, as the concrete structure of the by-product charged portion 403, it is possible to excellently apply a structure capable of irreversibly An absorbing, both absorbing and fixing, and fixing the collected by-product or a specific component, for example, the structure in which the absorbing polymer is filled in the by-product charged portion 403, or the structure provided with collected material leak preventing means such as a control valve which closes by the internal pressure of the by-product charged portion 403 or the physical pressure or the like of, e.g., a spring, as similar to the fuel leak preventing means provided in the fuel pack 20 mentioned above.

In the power supply system provided with the by-product collecting means having such a structure, when such a fuel reforming type fuel cell as shown in FIG. 26 is applied to the power generation portion 12, carbon dioxide ($CO_2$) generated together with hydrogen gas ($H_2$) by the vapor reforming reaction, the aqueous shift reaction and the selected oxidization reaction (chemical equations (1) to (3)) in the fuel reforming portion 210a, and water ($H_2O$) produced with generation of electric power (first electric power) by the electrochemical reaction (chemical equations (6) and (7)) are emitted from the power generation portion 12 as the by-products. However, since carbon dioxide ($CO_2$) rarely has any affect on the device, it is emitted to the outside of the power supply system as a non-collected substance. On the other hand, water ($H_2O$) or the like is collected by the separation portion 17, supplied to the by-product charged portion 403 in the fuel pack 20K through the by-product collection path by utilizing the capillary phenomenon or the like, and reversibly held in the by-product charged portion 403. Here, since the electrochemical reaction (chemical equations (2) and (3)) in the power generation portion 12 (fuel cell portion) proceeds at a temperature of approximately 60 to 80° C., water ($H_2O$) generated in the power generation portion 12 is exhausted in the substantially vapor (gas) state. Thus, the separation portion 17 liquefies only a water ($H_2O$) component by, for example, cooling the vapor emitted from the power generation portion 12 or by applying the pressure and separates it from other gas components, thereby collecting this component.

Incidentally, in this embodiment, description has been given as to the case where the fuel reforming type fuel cell is applied as the structure of the power generation portion 12 and methanol ($CH_3OH$) is applied as the power generation fuel. Therefore, separation and collection of a specific component (namely, water) in the separation collection portion 17 can be relatively easily realized when the majority of the by-product involved by power generation is water ($H_2O$) and also a small amount of carbon dioxide ($CO_2$) is exhausted to the outside of the power supply system. However, when a substance other than methanol is applied as the power generation fuel, or when a structure other than the fuel cell is applied as the power generation portion 12, a relatively large amount of carbon dioxide ($CO_2$), nitrogen dioxide ($NOx$), sulfur dioxide ($SOx$) or the like may be generated together with water ($H_2O$) in some cases.

In such a case, after separating, for example, water as a liquid from any other specific gas component (carbon dioxide or the like) generated in large quantities in the separation collection portion 17 by the above-described separation method, they may be held together or individually in a single or a plurality of collection holding portions 21 provided in the fuel pack 20E.

As described above, according to the power supply system to which the by-product collecting means according to this embodiment is applied, since emission or leak of the by-product to the outside of the power supply system can be suppressed by irreversibly holding in the collection holding portion 21 provided in the fuel pack 20E at least one component of the by-product generated when generating electric power by the power generation module 10E, the malfunction or deterioration of the device due to the by-product (for example, water) can be prevented. Also, by collecting the fuel pack 20E holding the by-product therein, the by-product can be appropriately processed by a method which does not impose a burden on the natural environment, thereby preventing pollution of the natural environment or global warming due to the by-product (for example, carbon dioxide).

The by-product collected by the above-described separation collection method is irreversibly held in the collection holding portion by such an holding operation as described with reference to FIGS. 48A to 48C.

<Fuel Stabilizing Means>

Description will now be given as to fuel stabilizing means applicable to the power supply system according to each of the foregoing embodiments with reference to the drawings.

Figure 69:
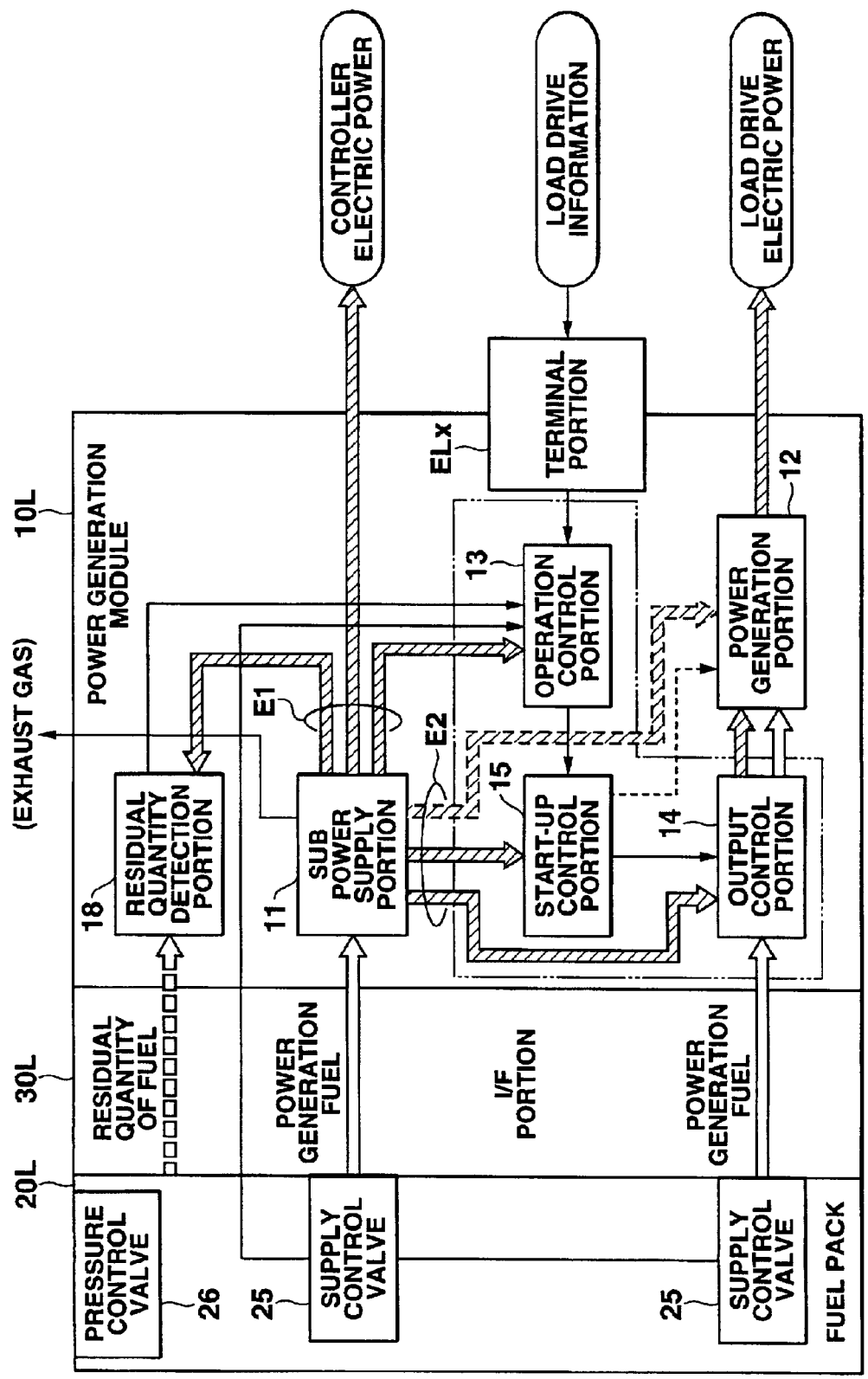
FIG. 69 is a block diagram showing an embodiment of fuel stabilizing means applicable to the power supply system according to the present invention.

FIG. 69 is a block diagram showing an embodiment of the fuel stabilizing means applicable to the power supply system according to the present invention. Here, like reference numerals denote structures equivalent to those in each of the foregoing embodiments, thereby simplifying or omitting their explanation.

As shown in FIG. 69, in the power generation module 10L, the fuel pack 20L and the I/F portion 30L having the structures and functions similar to those in each of the above-described embodiments, the fuel stabilizing means applicable to the power supply system according to the present invention has the structure that a support control valve 25 which detects the charged state (a temperature, a pressure and others) of the power generation fuel FL charged in the fuel pack 20L and stops supply of the power generation fuel FL from the fuel pack 20L to the power generation module 10L (the sub power supply portion 11 and the power generation portion 12) when the charged state exceeds a predetermined threshold value and a pressure control valve 26 which detects the charged state (a temperature, a pressure and others) of the power generation fuel FL in the fuel pack 20L and controls the charged state to a predetermined stabilized state are provided in any one of the I/F portion 30L and the fuel pack 20L (the fuel pack 20L in this example).

The supply control valve 25 is automatically actuated when a temperature of the power generation fuel FL charged in the fuel pack 20L increases beyond a predetermined threshold value, and shuts off supply of the power generation fuel FL to the fuel fed path. Concretely, it is possible to excellently apply the control valve which closes when a pressure in the fuel pack 20L increases with increase in temperature of the power generation fuel FL.

Further, the pressure control valve 26 is automatically actuated when a pressure in the fuel pack 20L increases beyond a predetermined threshold value with increase in temperature of the power generation fuel FL charged in the fuel pack 20L, and reduces the pressure in the fuel pack 20L. Concretely, it is possible to excellently apply the pressure release valve (release valve) which opens when the pressure in the fuel pack 20L increases.

As a result, for example, with the power supply system being attached to the device DVC, when the temperature or the pressure in the fuel pack 20L increase due to, e.g., generation of heat involved by electric power generation in the power generation module 10L or driving the load of the device, the operation for stopping supply of the power generation fuel FL or the operation for releasing the pressure is automatically carried out, thereby stabilizing the charged state of the power generation fuel FL.

Then, in the overall operation of the above-described power supply system (see FIG. 64), in case of performing the operation for starting up the power supply system, the operation control portion 13 makes reference to the operation state of the supply control valve 25 in advance, namely, the supply state of the power generation fuel FL from the fuel pack 20L, makes judgment upon whether the power generation fuel FL is normally supplied, and thereafter executes the above-described operation. Here, when shutoff of supply of the power generation fuel FL is detected irrespective of the operation for stabilizing the charged state of the power generation fuel FL by the above-described fuel stabilizing means (the pressure control valve 26 in particular), the operation control portion 13 outputs to the controller CNT included in the device DVC information concerning the charging error of the power generation fuel FL, and informs a device DVC user of this error.

Furthermore, in the overall operation of the above-described power supply system (see FIG. 64), in case of continuing the steady operation (feedback control) of the power supply system, the operation control portion 13 sequentially makes reference to the operation state of the supply control valve 25, namely, the supply state of the power generation fuel FL from the fuel pack 20L. Then, when shutoff of supply of the power generation fuel FL is detected or when sudden drop of the load drive electric power to the device DVC is received as the load drive information irrespective of the stabilizing operation by the fuel stabilizing means (the pressure control valve 26 in particular), the operation control portion 13 outputs information concerning a charging error of the power generation fuel FL to the controller CNT included in the device DVC, and informs a device DVC user of this error.

As a result, it is possible to provide the power supply system with the high reliability which rapidly detects occurrence of deterioration of the power generation fuel FL due to an error of the charging conditions (a temperature, a pressure and others) of the power generation fuel FL in the fuel pack 20L, an operation error (for example, an output voltage defect) in the power generation module 10L or leak of the power generation fuel FL from the fuel pack 20L to the outside of the power supply system 301, and assures the safety of the power generation fuel FL having the combustibility.

Description will now be given as to any other fuel stabilizing means applicable to the power supply system according to each of the above-described embodiments with reference to the drawing.

Figure 70:
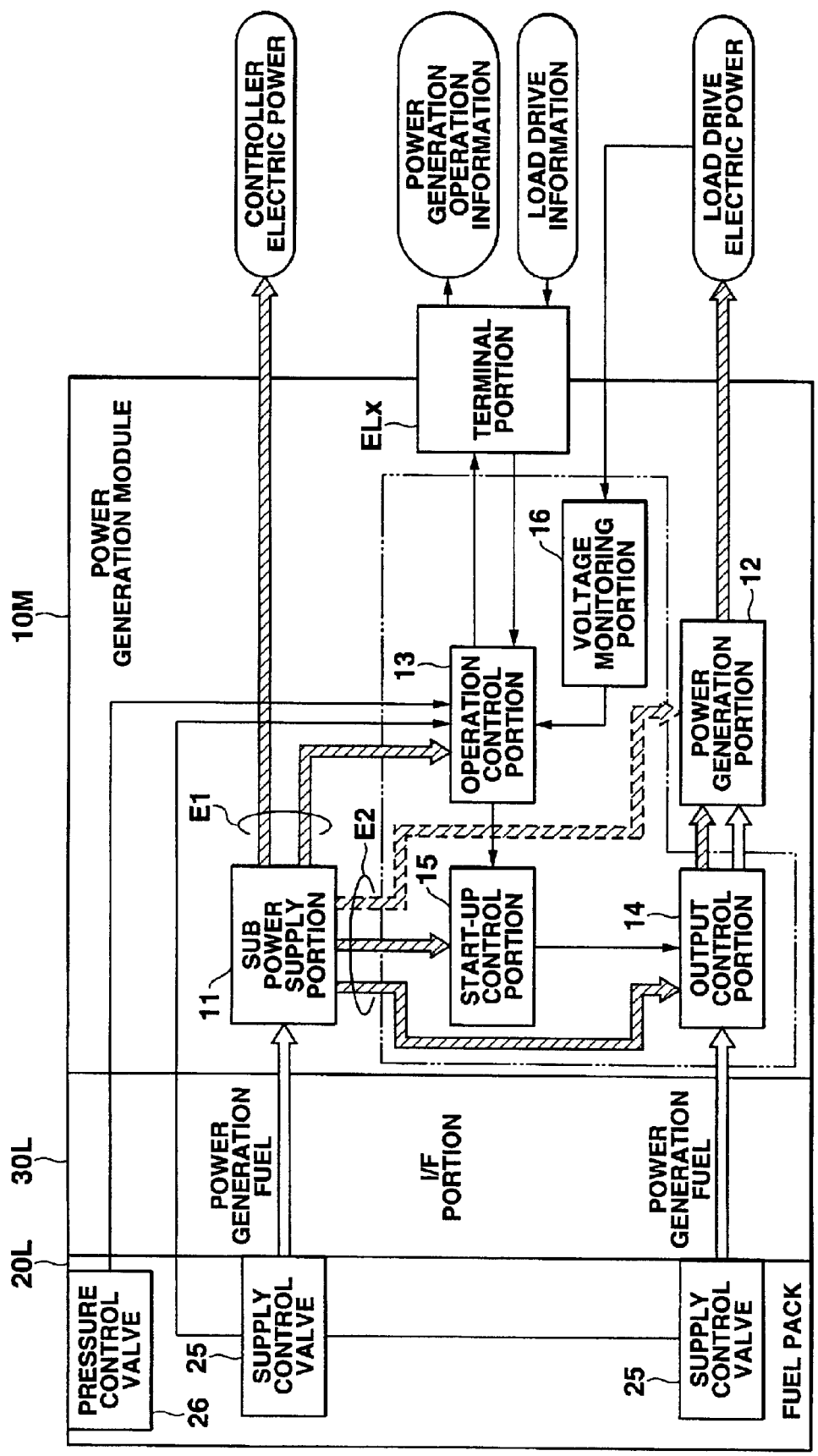
FIG. 70 is a block diagram showing an embodiment of the fuel stabilizing means applicable to the power supply system according to the present invention.
Figure 71:
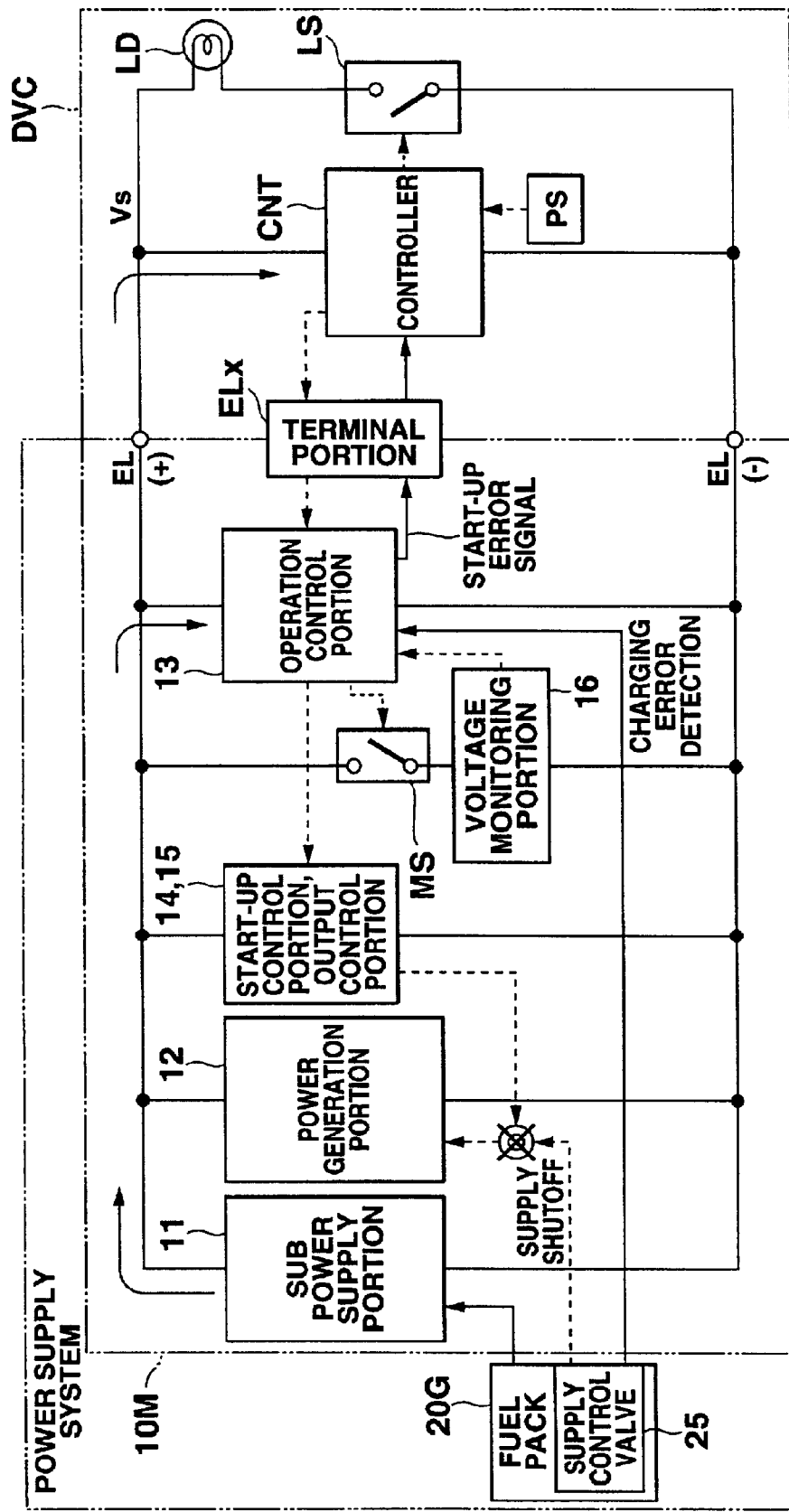
FIG. 71 is an operation conceptual view showing a start-up operation of the power supply system according to the embodiment.
Figure 72:
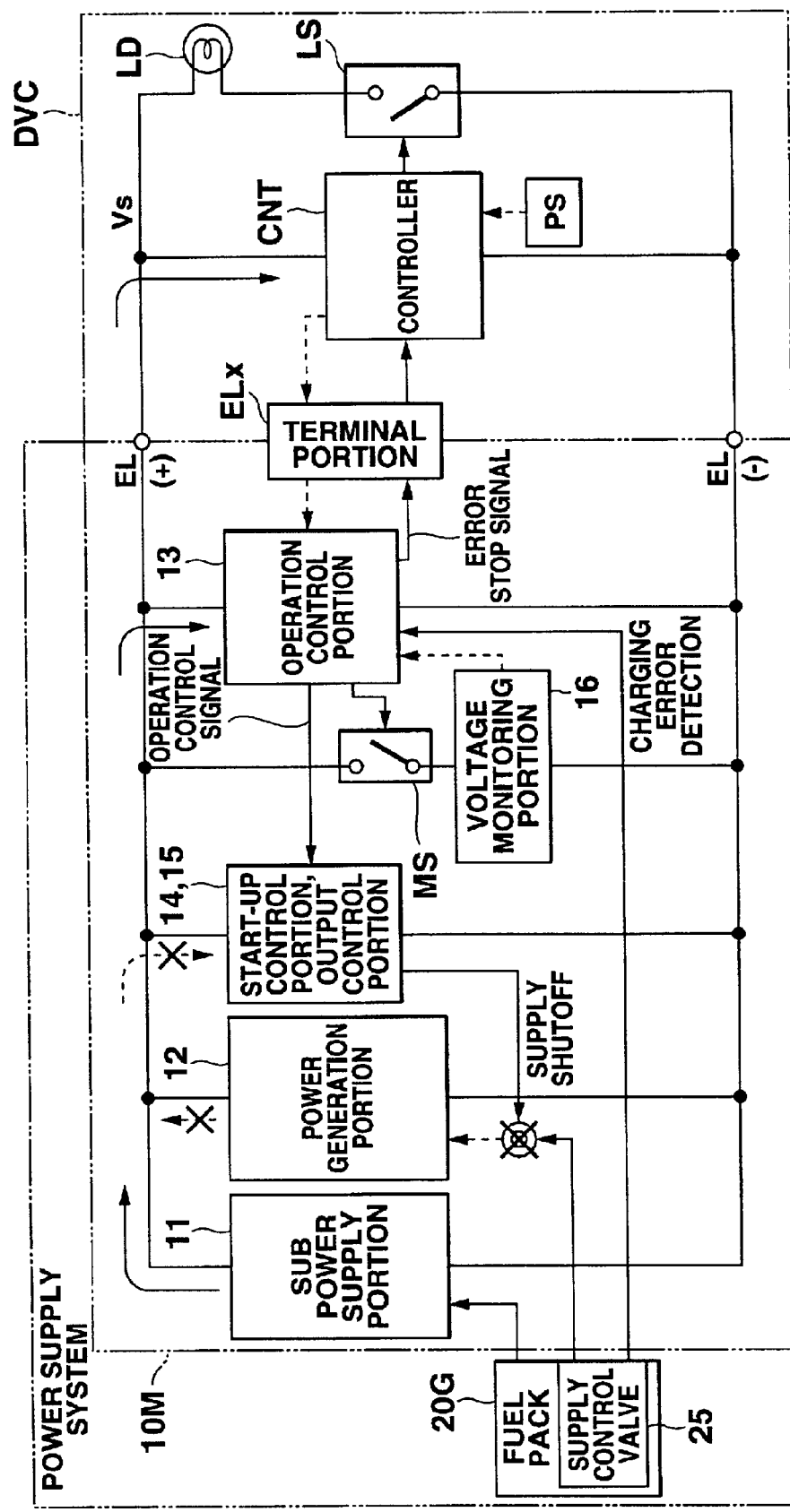
FIG. 72 is an operation conceptual view showing a stop operation of the power supply system according to the embodiment.

FIG. 70 is a block diagram showing an embodiment of fuel stabilizing means applicable to the power supply system according to the present invention. Moreover, FIG. 71 is a view showing a start-up operation state of the power supply system according to this embodiment, and FIG. 72 is a view showing the stop operation state of the power supply system according to this embodiment. Here, as similar to the second to fourth embodiments mentioned above, although description will be given on the case where predetermined information is notified between the power supply system and the device to which the power supply system is connected, it is also possible to apply the structure in which any special notification is not carried out between the power supply system and the device (the structure explained in connection with the first embodiment). In addition, like reference numerals denote structures equivalent to those in each of the foregoing embodiments, thereby simplifying or omitting their explanation.

As shown in FIG. 70 in the power generation module 10M, the fuel pack 20L and the I/F portion 30L having the structures and functions equivalent to those in each of the above-described embodiments, the fuel stabilizing means applicable to the power supply system according to the present invention has the structure that a supply control valve 25 which detects a charged state (a temperature, a pressure and others) of the power generation fuel FL charged in the fuel pack 20L and stops supply of the power generation fuel FL from the fuel pack 20L to the power generation module 10M (the sub power supply portion 11 and the power generation portion 12) when the charged state exceeds a predetermined threshold value and a pressure control valve 26 which detects the charged state (a temperature, a pressure and others) of the power generation fuel FL in the fuel pack 20L and controls the charged state to a predetermined stabilized state are provided in any one of the I/F portion 30L and the fuel pack 20L (the fuel pack 20L in this example).

The supply control valve 25 is automatically actuated when a temperature of the power generation fuel FL charged in the fuel pack 20L increases beyond a predetermined threshold value and shuts off supply of the power generation fuel FL to the fuel feed path. Concretely, it is possible to excellently apply a check valve which closes when a pressure in the fuel pack 20L increases with increase in temperature of the power generation fuel FL.

The pressure control valve 26 is automatically actuated when a pressure in the fuel pack 20L increases beyond a predetermined threshold value with increase in temperature of the power generation fuel FL charged in the fuel pack 20L, and reduces the pressure in the fuel pack 20L. Concretely, it is possible to excellently apply a pressure release valve (release valve) which opens when the pressure in the fuel pack 20L increases.

As a result, for example, with the power supply system being attached to the device DVC, when a temperature or a pressure in the fuel pack 20L increases due to, e.g., generation of heat involved by electric power generation in the power generation module 10M or driving the load of the device, the operation for stopping supply of the power generation fuel FL or the operation for releasing the pressure is automatically carried out, thereby autonomously stabilizing the charged state of the power generation fuel FL.

In the power supply system having such a structure, basically, the operation control equivalent to that of the above-described second embodiment (including the case where the operation control in the first embodiment is substantially executed in parallel) can be applied. In addition to this, the following operation control which is characteristic of this embodiment can be applied.

In the start-up operation in the overall operation (see FIGS. 27 and 34) described in connection with the first or second embodiment, when the operation control portion 13 detects a change in voltage of the supply electric power through the voltage monitoring portion 16, or when the operation control portion 13 receives the load drive information which is informed from the controller CNT included in the device DVC which requests supply of electric power, the operation control portion 13 makes reference to the operation state of the supply control valve 25, namely, the supply state of the power generation fuel FL from the fuel pack 20L before the operation for outputting to the start-up control portion 15 an operation control signal for starting up the power generation portion 12 (steps S104 or S204), and makes judgment upon whether the charged state of the power generation fuel FL is normal (or whether the power generation fuel can be supplied to the power generation portion 12).

Based on the operation state of the supply control valve 25, when the operation control portion 13 determines that the charged state of the power generation fuel FL is normal and the power generation fuel can be supplied to the power generation portion 12, it executes the start-up operation (steps S104 to S106 or S204 to S206) described in connection with the first or second embodiment mentioned above, generates the load drive electric power by the power generation portion 12, and supplies predetermined supply electric power to the device DVC.

As shown in FIG. 71, based on the operation state of the supply control valve 25, when the operation control portion 13 determines that the charged state of the power generation fuel FL is abnormal and supply of the power generation fuel to the power generation portion 12 is shut off (when a charging error is detected), it informs the controller CNT in the device DVC of a start-up error signal based on the charging error as power generation operation information through the terminal portion ELx.

In the steady operation in the overall operation (see FIGS. 27 and 34) described in connection with the first or second embodiment, the operation control portion 13 sequentially monitors the operation state of the supply control valve 25 during the feedback control over the supply electric power. Then, as shown in FIG. 72, when the operation control portion 13 detects an error of the charged state of the power generation fuel FL irrespective of the pressure releasing operation (stabilizing operation) by the pressure control valve 26 for stabilizing the charged state of the power generation fuel FL in the fuel pack 20L, it shuts off supply of the power generation fuel to the power generation portion 12 by outputting to the output control portion 14 an operation control signal for stopping generation of electric power in the power generation portion 12, and stops the power generation operation of the power generation portion 12. Also, the operation control portion 13 stops heating by the heater for facilitating the endothermic reaction for producing hydrogen, and informs the controller CNT in the device DVC of an error stop signal based on the charging error or shutdown of the operation of the power generation portion 12 as the power generation operation information through the terminal portion ELx.

As a result, it is possible to avoid occurrence of, e.g., deterioration of the power generation fuel FL due to an error of the charging conditions (a temperature, a pressure and others) of the power generation fuel FL in the fuel pack 20L, an operation error (for example, a voltage defect of the supply electric power) in the power generation module 10M or leak of the power generation fuel FL from the fuel pack 20L to the outside of the power supply system 301. Also, it is possible to notify a device DVC user of information concerning the charging error and urge to take appropriate measures such as improvement of the device using environment or replacement of the power supply system. Therefore, the highly reliable power supply system which assures the safety of the power generation fuel FL having the combustibility can be provided.

In regard to the by-product collecting means, the residual quantity detecting means and the fuel stabilizing means, although description has been given on the case where they are individually applied to the foregoing embodiments, the present invention is not restricted thereto. It is needless to say that they can be appropriately selected and an arbitrary combined use can be applied. According to this, it is possible to further improve, e.g., load to the environment of the power supply system according to the present invention, the energy conversion efficiency, the use conformation, the safety, and others.

<Outside Shape>

Outside shapes applicable to the power supply system according to the present invention will now be described with reference to the drawings.

Figure 73A:
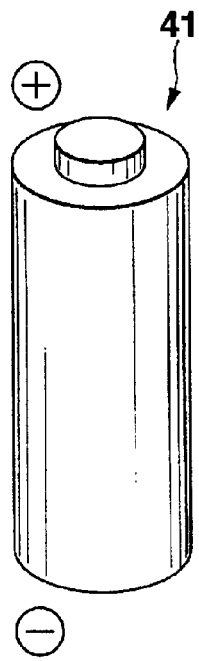
FIGS. 73A to 73F are views schematically showing concrete examples of outside shapes applicable to the power supply system according to the present invention.
Figure 73B:
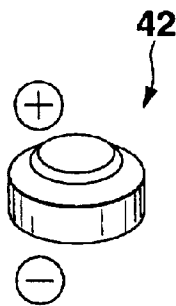
Figure 73C:
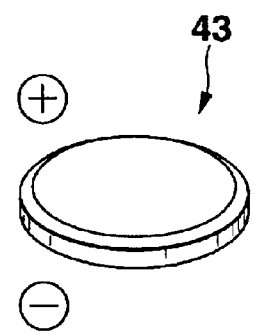
Figure 73D:
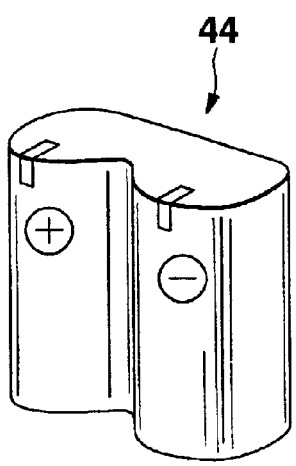
Figure 73E:
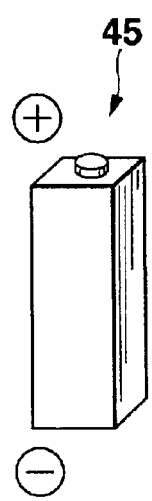
Figure 73F:
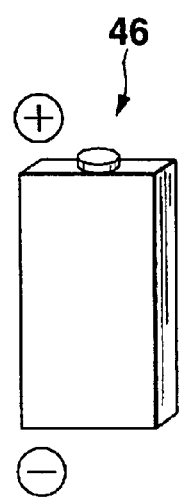
Figure 74C:
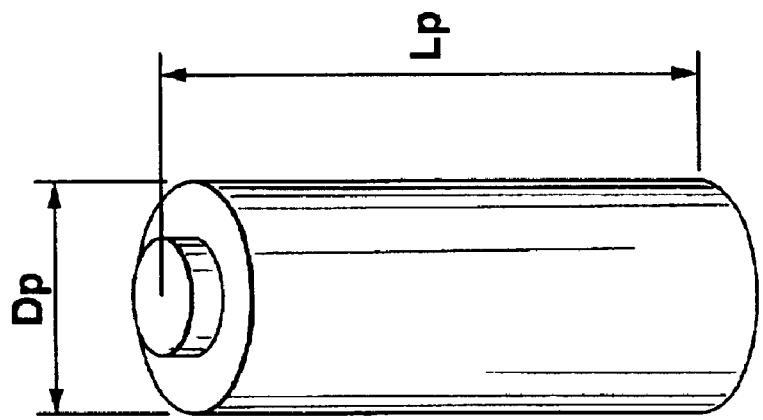
FIGS. 74A to 74C are views schematically showing the correspondence relationship between the outside shapes applicable to the power supply system according to the present invention and outside shapes of a general-purpose chemical cell.
Figure 74B:
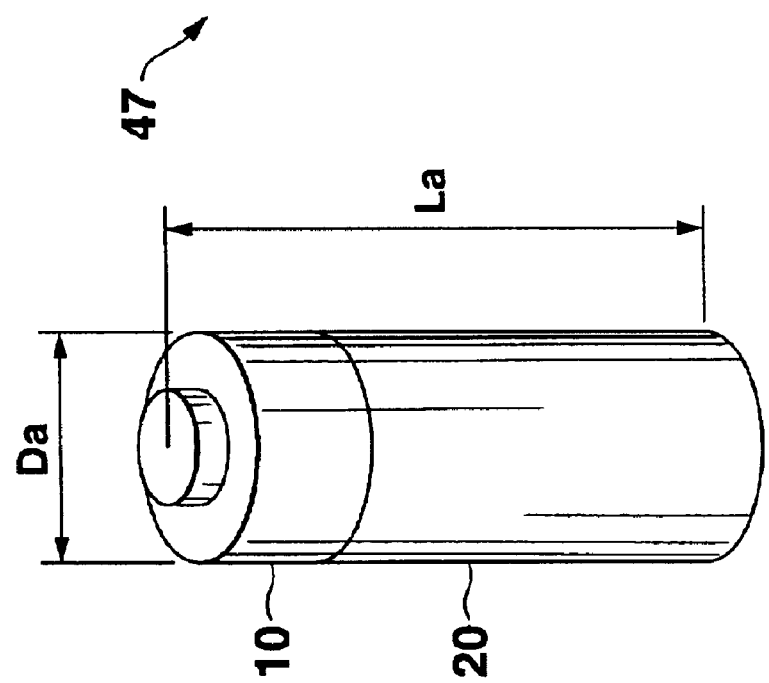
Figure 74A:
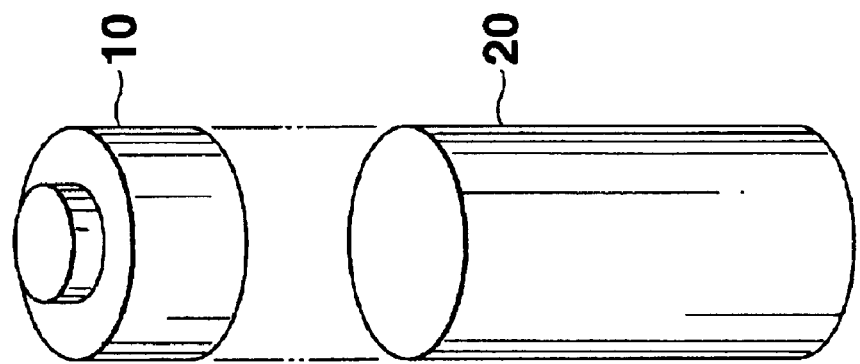
Figure 75A:
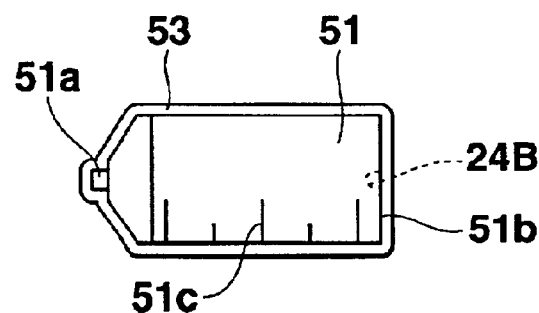
FIGS. 75A to 75H are views schematically showing outside shapes of a fuel pack and a holder portion of the power supply system according to the first embodiment of the present invention.
Figure 75B:
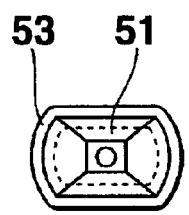
Figure 75C:
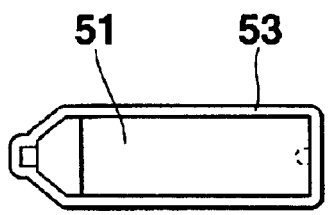
Figure 75D:
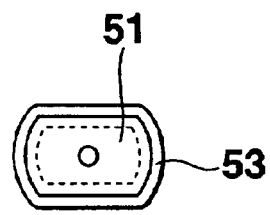
Figure 75E:
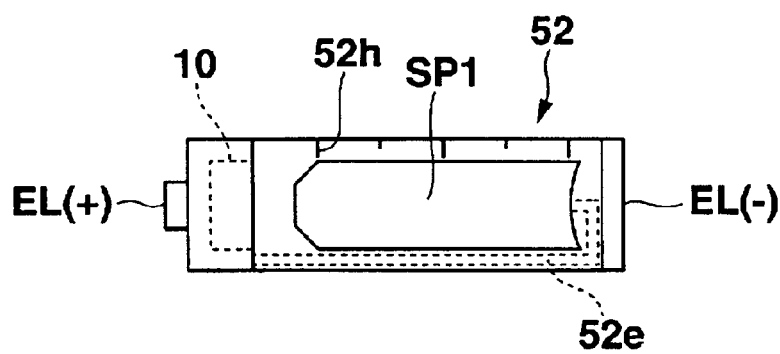
Figure 75F:
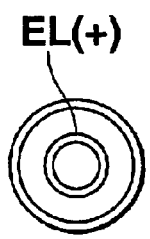
Figure 75G:
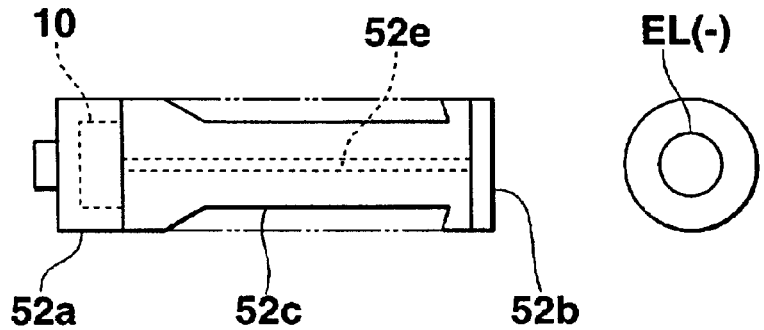
Figure 75H:
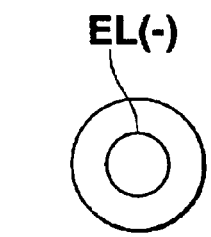

FIGS. 73A to 73F are views showing concrete examples of the outside shape applicable to the power supply system according to the present invention, and FIGS. 74A to 74C are views showing the outside shapes applied to the power supply system according to the present invention and the correspondence relationship between such shapes and the outside shapes of the general-purpose chemical cell.

In the power supply system having the above-described structure, as shown in FIGS. 73A to 73F respectively for example, the outside shape with the fuel pack 20 being coupled with the power generation module 10 through the I/F portion 30 or these members being integrally configured is formed so as to have the outside shape and dimensions equivalent to any of circular cells 41, 42 and 43 which are in heavy usage as general-purpose chemical cells conforming to JIS or international standards or cells having a special shape (non-circular cells) 44, 45 and 46 in conformity with standards of these cells. Also, the outside shape is configured in such a manner electric power (first and second electric power) generated by the sub power supply portion 11 or the power generation portion 12 of the above-described power generation module 10 can be outputted through the positive (+) and negative (−) electrode terminals of each of the illustrated cell shapes.

Here, the positive electrode terminal is attached to the upper part of the power generation module 10 while the negative electrode terminal is attached to the fuel pack 20, and the negative electrode terminal is connected to the power generation module 10 through the wiring although not shown. Additionally, a terminal portion ELx which is wound around the power generation module 10 on the side portion thereof in the zonal form may be provided. When the power supply system 301 is accommodated in the device DVC, the internal controller CNT and the terminal portion ELx are automatically electrically connected to each other, thereby enabling reception of the load drive information. Incidentally, it is needless to say that the terminal portion ELx is insulated from the positive electrode and the negative electrode.

Specifically, with the fuel pack 20 and the power generation module 10 being coupled with each other, for example, the power generation portion to which the fuel cell is applied (see FIG. 19) has the structure that the fuel electrode 211 of the fuel cell portion 210b is electrically connected to the negative electrode terminal and the air electrode 212 is electrically connected to the positive electrode terminal. Further, in a structure that internal and external combustion engines of, e.g., a gas combustion engine or a rotary engine are combined with the power generator utilizing electromagnetic induction or the like (see FIGS. 21 to 23), or in the power generation portion to which a temperature difference power generator or an MHD power generator is applied (see FIGS. 24 and 25), there is provided the structure in which the output terminal of each power generator is electrically connected with the positive electrode terminal and the negative electrode terminal.

Here, concretely, the circular cells 41, 42 and 43 are in heavy usage as a commercially available manganese dry cell, an alkali dry cell, a nickel-cadmium cell, a lithium cell and others and have the outside shape of, e.g., a cylinder type with which many devices can cope (cylindrical type: FIG. 73A), a button-like type used in wrist watches and others (FIG. 73B), a coin-like type used in cameral, electronic notebooks and others (FIG. 73C) or the like.

On the other hand, concretely, the non-circular cells 44, 45 and 46 have the outside shape of a special shape type which is individually designed in accordance with a shape of a device to be used, e.g., a compact camera or a digital still camera (FIG. 73D), an angular type corresponding to reduction in side or thickness of a portable acoustic device or a mobile phone (FIG. 73E), a flat type (FIG. 73F) or the like.

Incidentally, as described above, each structure of the power generation module 10 mounted on the power supply system according to this embodiment can be realized as a microchip of the millimeter order or micron order or as a microplant by applying the existing micromachine manufacturing technique. Further, applying a fuel cell, a gas fuel turbine or the like capable of realizing the high energy utilization efficiency as the power generation portion 12 of the power generation module 10 can suppress an amount of the power generation fuel required for realizing a battery capacity equivalent to (or above) that of the existing chemical cell to a relatively small value.

In the power supply system according to this embodiment, the existing cell shape shown in the drawings can be excellently realized. For example, as illustrated in FIGS. 74A and 74B, it is possible to provide the structure that the outside dimension (for example, a length La and a diameter Da) when the fuel pack 20 is coupled with the power generation module 10 or when they are integrally constituted becomes substantially equivalent to the outside shape (for example, a length Lp and a diameter Dp) of such a general-purpose chemical cell 47 as shown in FIG. 74C.

Incidentally, FIGS. 74A to 74C only conceptually show the relationship between the attachable and detachable structure of the power supply system according to the present invention (coupling relationship) and the appearance shape, and a concrete electrode structure and others are not taken into consideration. The relationship between the attachable and detachable structure of the power generation module 10 and the fuel pack 20 and the electrode structure when each cell shape is applied to the power supply system according to the present invention will be described in detail in connection with the later-described embodiment.

Furthermore, each illustrated outside shape is only an example of the chemical cell which is commercially available in conformity with standards in Japan, or attached to a device and distributed or is on the sale. Only part of structural examples to which the present invention can be applied is shown. That is, outside shapes applicable to the power supply system according to the present invention other than the above concrete examples may be adopted. For example, such outside shapes match with shapes of chemical cells which are distributed or on the sale around the world or chemical cells which will be put into practical use in future, and it is needless to say that those outside shapes can be designed so as to match with the electrical characteristic.

Detailed description will now be given as to the relationship between the attachable and detachable structure of the power generation module 10 and the fuel pack 20 and the electrode structure when each of the above cell shapes is applied to the power supply system according to the present invention with reference to the drawings.

(First Embodiment of Attachable and Detachable Structure)

Figure 76A:
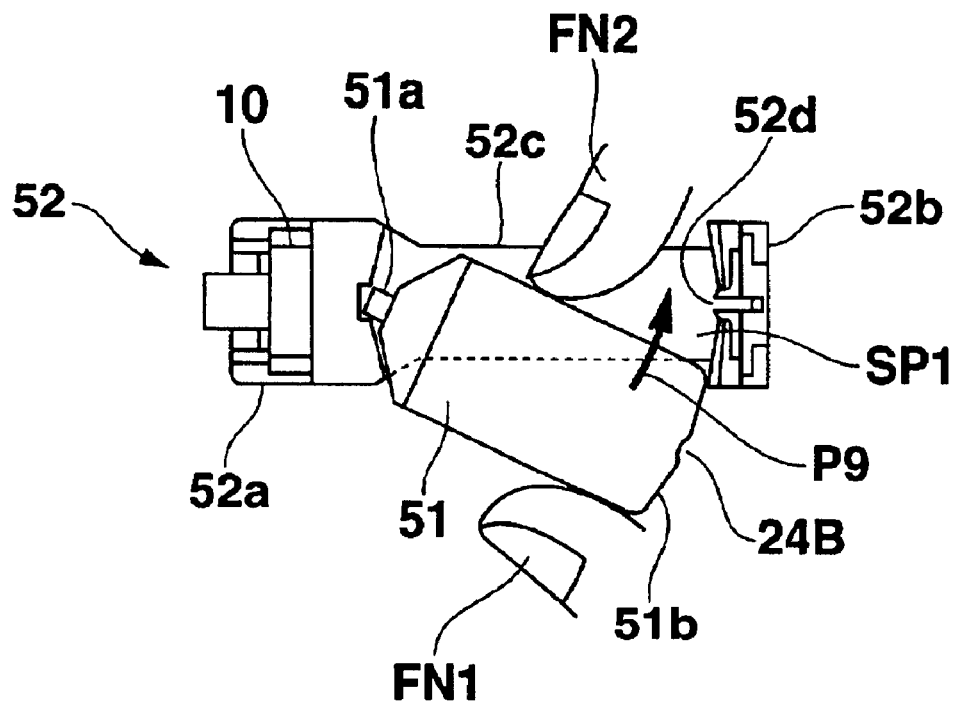
FIGS. 76A and 76B are views schematically showing an attachable and detachable structure of the power generation module and the fuel pack in the power supply system according to the embodiment.
Figure 76B:
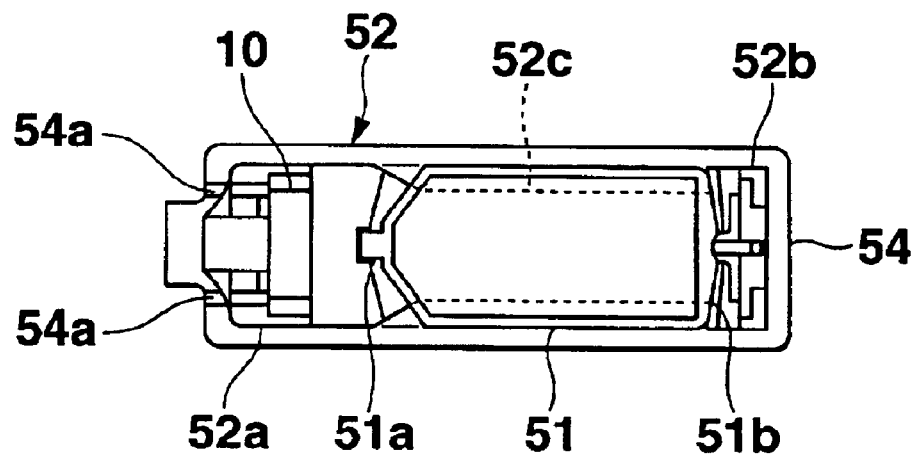

FIGS. 75A to 75D and FIGS. 75E to 75H are views age showing the outside shapes of the fuel pack and a holder portion of the power supply system according to a first embodiment of the present invention when seen from an upper direction, a front direction, a transverse direction and a rear direction. FIGS. 76A and 76B are views showing the attachable and detachable structure of the power generation module and the fuel pack in the power supply system according to this embodiment. Here, like reference numerals denote structures equivalent to those in each of the foregoing embodiment, thereby simplifying or omitting their explanation.

As shown in FIGS. 75A to 75D and FIGS. 75E to 75H, the power supply system according to this embodiment is configured to include: a fuel pack 51 (corresponding to the fuel pack 20) in which the power generation fuel is charged under predetermined conditions; and a holder portion 52 functioning as the power generation module 10 and the I/F portion 30, to which the fuel pack is detachably disposed. Here, when the fuel pack 51 is a transparent degradable polymeric case in which the fuel FL is charged and it is unused, the periphery of the case is covered with a package 53 for protecting from a degradation factor such as bacteria. Moreover, when attaching the fuel pack 51, as will be described later, exfoliating the package 53 from the fuel pack 51 can suffice. In addition, since the fuel pack 51 is a transparent case and an index 51c is carved thereon, it is possible to confirm a residual quantity of the see-through fuel.

The holder portion 52 is configured to generally include: a power generation portion 52a in which the power generation module 10 and the I/F portion 30 having the structure equivalent to that of each of the foregoing embodiment are accommodated and a positive electrode terminal EL (+) is provided; an opposed portion 52b to which a negative electrode portion EL (−) is provided; and a connection portion 52c which electrically connects the power generation portion 52a with the opposed portion 52b and electrically connects the power generation portion 52a with the negative electrode terminal EL (−). A piercing space SP1 surrounded by the power generation portion 52a, the opposed portion 52b and the connection portion 52c becomes an accommodation position when the fuel pack 51 is coupled. The holder portion 52 includes: a convex portion 52d which has the elasticity of a spring or the like around the contact portion of the opposed portion 52b and has a hole at the center (see FIG. 76A); and an water leading pipe 416 for connecting the hole of the convex portion 52d with the by-product supply path 17a of the power generation module 10. Since an index 52h is carved on the holder portion 52 in place of the index 51c of the fuel pack 51, it is possible to confirm a residual quantity of the see-through fuel. At this moment, the index 52h can be easily visually confirmed when the connection portion 52c is not transparent.

In the power supply system having such a structure, as shown in FIG. 76A, with respect to the space SP1 constituted by the power generation portion 52a, the opposed portion 52b and the connection portion 52c, the fuel feed port (one end side) 51a to which the fuel supply valve 24A of the fuel pack 51 is provided is brought into contact with the holder portion 52 and this contact point is determined as a supporting point while using fingers FN1 and FN2 to support the fuel pack 51 from which the package 53 has been removed, and the other end side 51b of the fuel pack 51 is swiveled and thrusted (an arrow P9 in the drawing). As a result, as shown in FIG. 76B, a bottom portion (the other end side) 51b of the fuel pack 51 is brought into contact with the opposed portion 52b and the fuel pack 51 is accommodated in the space SP1. At this moment, a fuel feed pipe 411 which can be the fuel feed path (FIG. 73) pushes down the fuel supply valve 24A whose posture is fixed by the spring, and the leak prevention function of the fuel pack 51 is thereby released. Also, the power generation fuel FL charged in the fuel pack 51 is automatically carried and supplied to the power generation module 10 by the surface tension in a capillary tube 52g (FIG. 73) and the fuel feed pipe 411. FIG. 76B shows the unused power supply system to which the fuel pack 51 and the holder portion 52 are set. In this drawing, the periphery of the case is covered with the package 54 for protecting from a degradation factor such as bacteria. When this power supply system is used as a power supply for a device or the like, exfoliating the package 54 can suffice. Moreover, if the sub power supply portion 11 consumes the fuel of the fuel pack 51 and constantly generates power as with a direct type fuel cell or the like, a hole 54a for supplying oxygen and emitting carbon dioxide may be provided to the package 54 in the vicinity of the power generation module 10. If the sub power supply portion 11 does not consume the fuel as with a capacitor or the like, the hole 54a does not have to be necessarily provided.

Here, when the fuel pack 51 is accommodated in the space SP1 and coupled with the holder portion 52, the power supply system is configured to have the outside shape and dimensions substantially equivalent to those of the above-described cylindrical general-purpose chemical cell (see FIGS. 73A and 74C). In addition, at this moment, with the fuel pack 51 being normally accommodated in the space SP1, it is preferable that the other end side 51b of the fuel pack 51 is pressed with appropriate force so that the fuel feed port 51a of the fuel pack 51 can be excellently brought into contact with and connected with the fuel feed path on the power generation portion 52a side, and that the other end side 51b of the fuel pack 51 is engaged with the contact portion of the opposed portion 52b by using appropriate pressing force in order to prevent the fuel pack 51 from accidentally coming off the holder portion 52.

Specifically, as shown in FIGS. 76A and 76B, an engagement mechanism can be applied between a concave portion at which a by-product fetching valve 24B formed on the other end side 51b of the fuel pack 51 is arranged in order to collect water or the like as a by-product and a convex portion 52d having the elasticity of a spring or the like around the contact part of the opposed portion 52b. At this moment, the by-product fetching valve 24B is changed from the closed state to the opened state when pushed up by the convex portion 52d, and it is connected with the water leading pipe 416. The by-product fed from the water leading pipe 416 can be, therefore, collected in a collection bag 23 provided in the fuel pack 51.

As a result, as described on the overall operation (see FIGS. 27 and 34), electric power (second electric power) is autonomously generated in the sub power supply portion 11, and the operating electric power is supplied to at least the operation control portion 13 in the power generation module 10. In addition, when the power supply system according to this embodiment is attached to a predetermined device DVC, a part of electric power generated by the sub power supply portion 11 is supplied as drive electric power (controller electric power) to the controller CNT included in the device DVC through the positive electrode terminal EL (+) provided to the power generation portion 52a and the negative electrode terminal EL (−) provided to the opposed portion 52b (initial operation).

Therefore, it is possible to realize the completely compatible power supply system which can be easily handled as with the general-purpose chemical cell, has the outside shape and dimensions (cylindrical shape in this example) equal or similar to those of the general-purpose chemical cell, and can supply electric power having the same or similar electrical characteristic. Accordingly, electric power can be applied as the operating electric power to a device such as an existing portable device as similar to the general-purpose chemical cell.

In particular, in the power supply system according to this embodiment, when the structure provided with the fuel cell is applied as the power generation module and a material such as the above-described degradable plastic is applied as the fuel pack 51 which is configured to be attached to or detached from the power generation portion 52a (power generation module 10) without restraint, the high energy utilization efficiency can be realized while suppressing the affect (burden) on the environment. It is, therefore, possible to excellently solve problems such as environmental concerns caused due to dumping of the existing chemical cell or landfill disposal or the energy utilization efficiency.

Additionally, according to the power supply system according to this embodiment, since the space SP1 on the holder portion 52 side in which the fuel pack 51 is accommodated has a piercing shape with two opening portions, the fuel pack 51 can be readily attached to the holder portion 52 while gripping the opposed side portions of the fuel pack 51 with fingers FN1 and FN2, and the fuel pack 51 is thrusted out from one of the two opening portions by pushing the fuel pack 51 from the other one of the two opening portions, thereby easily and securely removing the fuel pack 51.

(Second Embodiment of Attachable and Detachable Structure)

FIGS. 77A to 77C are views schematically showing an outside shape of the fuel pack of the power supply system according to the second embodiment of the present invention as seen from the front direction, the transverse direction and the rear direction. When the fuel pack 61 is a transparent degradable polymeric case in which the fuel FL is charged and is unused, the periphery of the case is covered with a package 63 for protecting from degradation factors such as bacteria. Further, in case of attaching the fuel pack 61, as will be described later, perforating the package 63 from the fuel pack 61 can suffice. Furthermore, since the fuel pack 61 is a transparent case and an index 61b is carved thereto, it is possible to confirm a residual quantity of the see-through fuel.

Figure 78A:
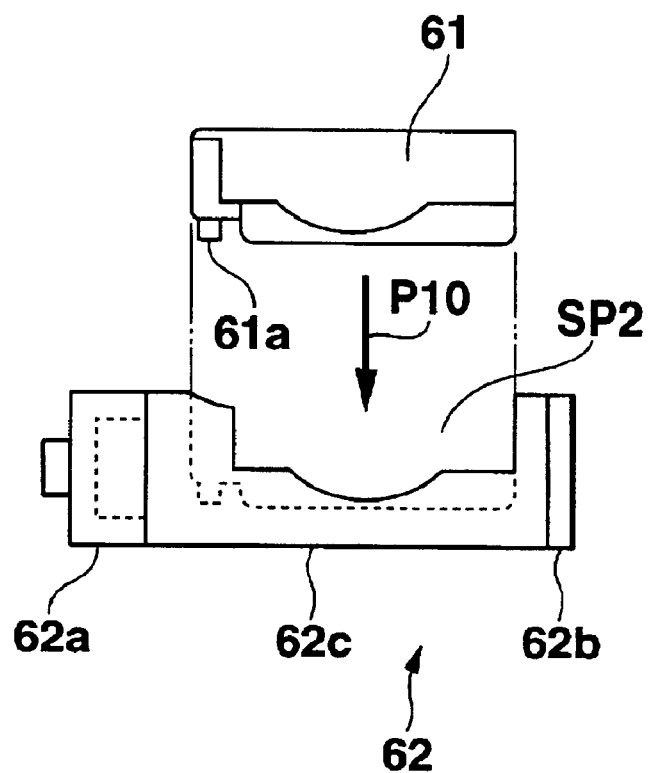
FIGS. 78A and 78B are views schematically showing an attachable and detachable structure of the power generation module and the fuel pack in the power supply system according to the embodiment.
Figure 78B:
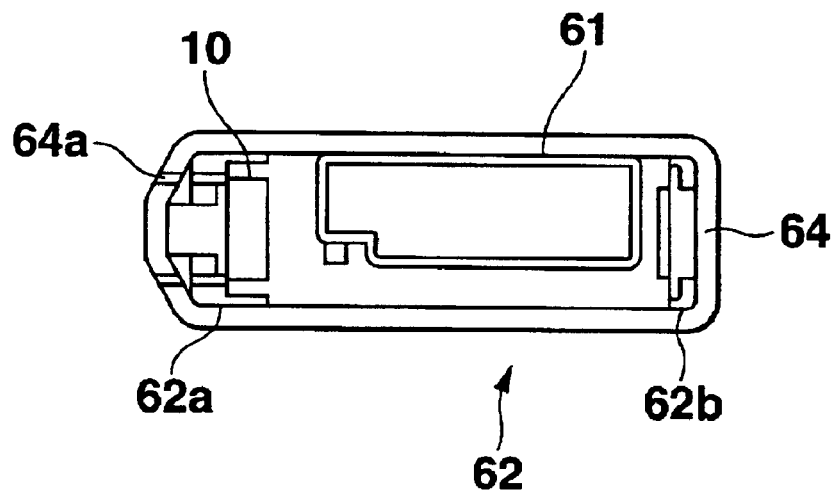

FIGS. 77D to 77G are views schematically showing an outside shape of the holder portion 62 of the power supply system according to the present invention as seen from the front direction, the upper direction, the rear direction and the lateral direction, and FIGS. 78A and 78B are views showing the attachable and detachable structure of the power generation module and the fuel pack in the power supply system according to this embodiment. Since an index 62d is carved to the holder portion 62 functioning as the power generation module 10 and the I/F portion 30 in place of the index 61b of the fuel pack 61, it is possible to confirm a residual quantity of the see-through fuel. At this moment, when the connection portion 62c is not transparent, the index 62d can be easily visually confirmed. Here, explanation of structures equivalent to those in each of the foregoing embodiments will be simplified or omitted. FIG. 78B shows an unused power supply system in which the fuel pack 61 and the holder portion 62 are set. The periphery of the power supply system is covered with a package 64 for protecting from degradation factors such as bacteria. When the power supply system is used as a power supply of a device or the like, perforating the package 64 can suffice. Moreover, if the sub power supply portion 11 consumes the fuel in the fuel pack 61 and constantly generates electric power as with a direct type fuel cell or the like, a hole 64a for supply of oxygen and rejection of carbon dioxide may be provided to the package 64 in the vicinity of the power generation module 10. If the sub power supply portion 11 does not consume the fuel as with a capacitor or the like, the hole 64a does not have to be necessarily provided.

As shown in FIGS. 77A to 77G, the power supply system according to this embodiment is configured to include: a fuel pack 61 in which power generation fuel is charged under predetermined conditions; and a holder portion 62 configured so that the fuel pack 61 can be attached to and detached from it without restraint. Here, since the fuel pack 61 has the structure and function equivalent to those in each of the foregoing embodiments, thereby omitting its explanation.

The holder portion 62 is configured to generally include: a power generation portion 62a in which the power generation module 10 is accommodated and to which a positive electrode terminal EL (+) is provided; an opposed portion 62b to which a negative electrode terminal EL (−) is provided; and a connection portion 62c which electrically connects the power generation portion 62a with the opposed portion 62b and electrically connects the power generation portion 62a with the negative electrode terminal EL (−). Here, a concave space SP2 surrounded by the opposed portion 62b and the connection portion 62c is an accommodation position where the fuel pack 61 is coupled.

In the power supply system having such a structure, as shown in FIG. 78A, when the fuel pack 61 is fitted into the space SP2 constituted by the power generation portion 62a, the opposed portion 62b and the connection portion 62c (arrow P10 in the drawing) while bringing a fuel feed port 61a of the fuel pack 61 from which the package 63 is removed into contact with a fuel feed path on the power generation portion 62a side, the fuel pack 61 is accommodated in the space SP2 as shown in FIG. 78B, and the leak prevention function of the fuel pack 61 released. In addition, the power generation fuel FL charged in the fuel pack 61 is supplied to the power generation module 10 included in the power generation portion 62a through the fuel feed path.

Here, as similar to the above-described first embodiment, when the fuel pack 61 is accommodated in the space SP2 and coupled with the holder portion 62, the power supply system is configured to have the shape and dimensions substantially equivalent to those of, e.g., the above-described cylindrical general-purpose chemical cell (see FIGS. 73A and 74C). Additionally, at this moment, with the fuel pack 61 being normally accommodated in the space SP2, in order to prevent the fuel pack 61 from accidentally coming off the holder portion 62, it is desirable to provide the structure that the outside shape of the fuel pack 61 is engaged with the internal shape of the space SP2 of the holder portion 62.

As a result, as similar to the first embodiment mentioned above, it is possible to realize the completely compatible portable type power supply system which can be easily handled as with the general-purpose chemical cell and has the outside shape and the electrical characteristic equal or equivalent to those of the general-purpose chemical cell. Further, by appropriately selecting a structure of the power generation device applied to the power generation module or a material forming the attachable and detachable fuel pack, the influence on the environment can be greatly suppressed and it is possible to solve problems such as environmental concerns caused by dumpling or landfill disposal of the existing chemical cell or the energy utilization efficiency.

(Third Embodiment of Attachable and Detachable Structure)

FIGS. 79A to 79C are views schematically showing an outside shape of the fuel pack of the power supply system according to a third embodiment of the present invention as seen from the front direction, the transverse direction and the rear direction, FIGS. 79D to 79F are views schematically showing an outside shape of the holder portion of the power supply system according to the present invention as seen from the front direction, the transverse direction and the rear direction, and FIGS. 80A to 80C are views showing the attachable and detachable structure of the power generation module and the fuel pack in the power supply system according to this embodiment. Here, the explanation of the structures equivalent to those in each of the above-described embodiments will be simplified or omitted.

As shown in FIGS. 79A to 79F, the power supply system according to this embodiment includes: a transparent fuel pack 71 in which the power generation fuel is charged under predetermined conditions; and a holder portion 72 which is configured in such a manner that a plurality of the fuel packs 71 can be accommodated therein. When the fuel pack 71 is a transparent degradable polymeric case in which the fuel FL is charged and it is unused, the periphery of the case is covered with the package 73 for protecting from degradation factors such as bacteria. In case of attaching the fuel pack 71, as will be described later, perforating the package 73 from the fuel pack 71 can suffice. Since the fuel pack 71 is a transparent case and an index 71c is carved thereto, a residual quantity of the see-through fuel can be confirmed. Further, if the sub power supply portion 11 consumes the fuel in the fuel pack 71 and constantly generates power as with a direct type fuel cell or the like, a hole 74a for supplying oxygen and disposing of carbon dioxide may be provided to the package 74 in the vicinity of the power generation module 10. If the sub power supply portion 11 does not consume fuel as with a capacitor or the like, the hole 74a does not have to be necessarily provided.

The holder portion 72 functioning as the power generation module 10 and the I/F portion 30 is configured to generally include: a power generation portion 72a in which the power generation module 10 is accommodated and to which a terminal portion ELx for transmitting/receiving the load drive information is provided in addition to a positive electrode terminal EL (+) and a negative electrode terminal EL (−) on the same end surface; a transparent accommodation case 72b provided so as to have a space SP3 between itself and the power generation portion 72a; and an opening/closing cover 72c which enables the fuel pack 71 to be accommodated in or removed from the space SP3, and presses and fixes the fuel pack 71 accommodated in the space SP3. Since an index 72d is carved to the accommodation case 72b in place of the index 71c of the fuel pack 71, it is possible to confirm a residual quantity of the see-through fuel. Here, explanation of the structures equivalent to those of each of the foregoing embodiments will be simplified or emitted.

In the power supply system having such a structure, as shown in FIG. 80A, with an opening/closing cover 72c of the holder portion 72 being opened and one surface side of a space SP3 being opened, a plurality of (two in this example) of the fuel packs 71 from which the packages 73 are removed are inserted in the same direction, and the opening/closing cover 72c is then closed as shown in FIGS. 80B and 80C. As a result, the fuel packs 71 are accommodated in the space SP3, and the opening/closing cover 72c pushes the other end side 71b of the fuel packs 71, thereby bringing a fuel feed port 71a of the fuel pack 71 into contact with a fuel feed path (I/F portion; not shown) on the power generation portion 72a side. Consequently, the leak prevention function of the fuel pack 71 is released, and the power generation fuel FL charged in the fuel pack 71 is supplied to the power generation module 10 included in the power generation portion 72a through the fuel feed path.

Here, the power supply system is configured to have the outside shape and dimensions substantially equivalent to those of, e.g., the above-described chemical cell having a special shape when the fuel packs 71 are accommodated in the space SP3 and coupled with the holder portion 72. FIGS. 80B and 80C show an unused power supply system in which the fuel packs 71 and the holder portion 72 are set. The periphery of the case is covered with a package 74 for protecting from degradation factors such as bacteria. In case of utilizing the power supply system as a power supply of a device or the like, perforating the package 74 can suffice.

As a result, as similar to each of the foregoing embodiments, it is possible to realize a completely compatible portable type power supply system which has the outside shape and the electrical characteristic equal or equivalent to those of the existing chemical cell. Also, by appropriately selecting a structure of the power generation device applied to the power generation module or a material forming the attachable and detachable fuel pack, the influence on the environment can be considerably suppressed, and it is possible to excellently solve problems such as environmental concerns caused by dumping or landfill disposal of the existing chemical cell or the energy utilization efficiency.

(Fourth Embodiment of Attachable and Detachable Structure)

FIGS. 81A to 81C are views schematically showing the outside shape of the fuel pack of the power supply system according to the fourth embodiment as seen from the front direction, the transverse direction and the rear direction, FIGS. 81D to 81F are views schematically showing the outside shape of the holder portion of the power supply system according to the present invention as seen from the upper direction, the transverse direction and the front direction, and FIGS. 82A to 82C are schematic views showing the attachable and detachable structure of the power generation module and the fuel pack in the power supply system according to this embodiment.

As shown in FIGS. 81A to 81F, the power supply system according to this embodiment is configured to include: a fuel pack 81 in which the power generation fuel is charged under predetermined conditions; and a holder portion 82 constituted to be capable of accommodating therein a plurality of the fuel packs 81. Here, when the fuel pack 81 is a transparent degradable polymeric case in which the fuel FL is charged and it is unused, the periphery of the case is covered with a package 83 for protecting from degradable factors such as bacteria. Additionally, in case of attaching the fuel pack 81, as will be described later, perforating the package 83 from the fuel pack 81 can suffice. Further, since the fuel pack 81 is a transparent case and an index 81c is carved thereto, it is possible to confirm a residual quantity of the see-through fuel. Furthermore, if the sub power supply portion 11 consumes the fuel in the fuel pack 81 and constantly generates power as with a direct type fuel cell or the like, a hole 84a for supply of oxygen and rejection of carbon dioxide may be provided to the package 84 in the vicinity of the power generation module 10. If the sub power supply portion 11 does not consume the fuel as with a capacitor or the like, the hole 84a does not have to be necessarily provided.

The holder portion 82 functioning as the power generation module 10 and the I/F portion 30 is configured to generally include: a power generation portion 82a in which the power generation module 10 is accommodated and to which a terminal portion ELx for transmitting/receiving load drive information is provided on the same end surface in addition to a positive electrode terminal EL (+) and a negative electrode terminal EL (−); an opposed portion 82b having a surface opposed to the power generation portion 82a; and a base portion 82c for connecting the power generation portion 82a with the opposed portion 82b. Here, a concave space SP4 surrounded by the power generation portion 82a, the opposed portion 82b and the base portion 82c is an accommodation position when the fuel pack 81 is coupled. Since the index 82d is carved to the holder portion 82 in place of the index 81c of the fuel pack 81, it is possible to confirm a residual quantity of the see-through fuel. At this moment, if the base portion 82c is not transparent, the index 82d can be easily visually confirmed.

In the power supply system having such a structure, as shown in FIG. 82A, when a fuel feed port (one end side) 81a of the fuel pack 81 is brought into contact with a fuel feed path (I/F portion; not shown) on the power generation portion 82a side so that the contact part is determined as a supporting point while the other end side 81b of the fuel pack 81 is swiveled and thrusted into the space SP4 constituted by the power generation portion 82a, the opposed portion 82b and the base portion 82c (arrow P11 in the drawing), as shown in FIG. 82B, the other end side 81b of the fuel pack 81 is brought into contact with the opposed portion 82b and fixed, and a plurality of (two in this example) the fuel packs 81 are accommodated in the space SP4 in the same direction. At this moment, the leak prevention function of the fuel pack 81 is released, and the power generation fuel FL charged in the fuel pack 81 is supplied to the power generation module 10 included in the power generation portion 82a through the fuel feed path.

Here, the power supply system is configured to have the outside shape and dimensions substantially equivalent to those of, e.g., the above-described chemical cell having a special shape when the fuel packs 81 are accommodated in the space SP4 and coupled with the holder portion 82. Moreover, at this moment, with the fuel packs 81 being normally accommodated in the space SP4, the fuel feed port 81a of the fuel packs 81 excellently comes into contact with and connected to the fuel feed path on the power generation portion 82a side. Also, in order to prevent the fuel packs 81 from accidentally coming off the holder portion 82, as similar to the first embodiment mentioned above, the contact part between the other end side 81b of the fuel packs 81 and the opposed portion 82b is configured to engage by appropriate thrusting force.

As a result, it is possible to realize the power supply system having the effects and advantages similar to those in each of the foregoing embodiments.

FIGS. 82B and 82C show an unused power supply system in which the fuel pack 81 and the holder portion 82 are set. The periphery of the case is covered with a package 84 for protecting from degradable factors such as bacteria. At the time of utilizing the power supply system as a power supply of a device or the like, perforating the package 84 can suffice.

Incidentally, a fuel feed pipe having the function equivalent to that of the fuel feed pipe 411 of the holder portion 52 is provided to each of the holder portions 62, 72 and 82, and a by-product collection path equivalent to the water leading pipe 416 is provided to each of these holder portions.

CONCRETE STRUCTURAL EXAMPLE

Description will now be given as to a concrete structural example of the entire power supply system to which any of the foregoing embodiments (including each structural example) is applied with reference to the drawings.

Figure 84:
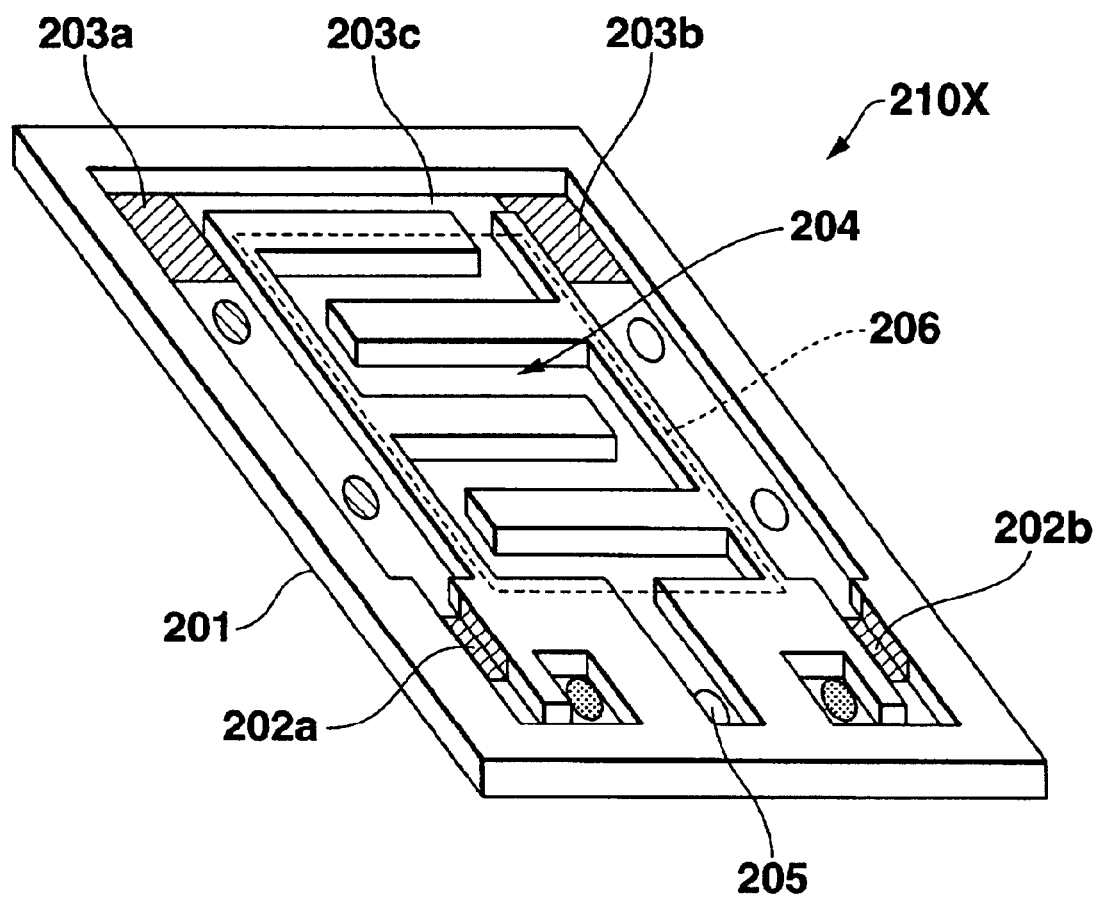
FIG. 84 is a perspective view showing a structural example of the fuel reforming portion applied to the concrete structural example.
Figure 85:
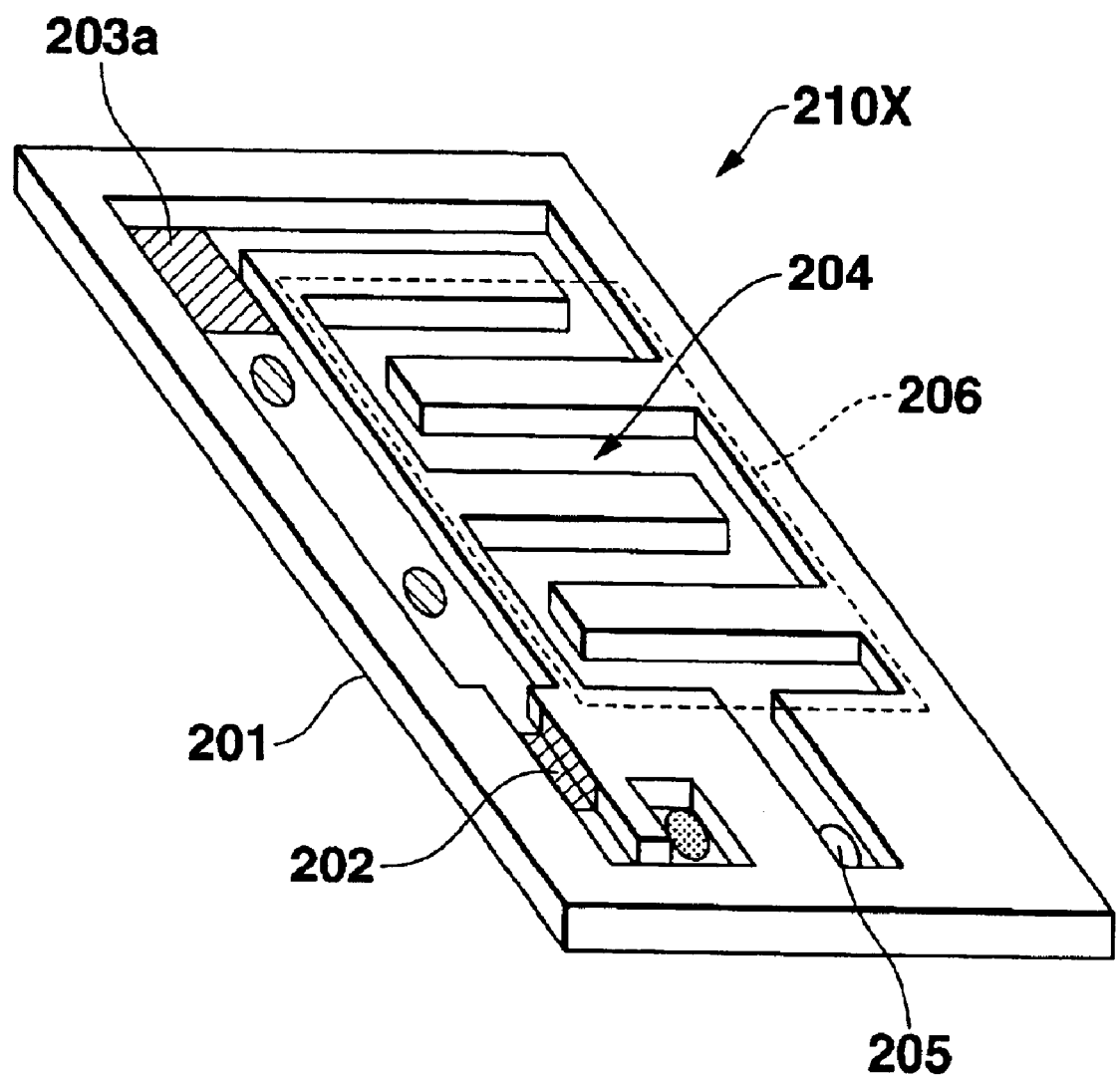
FIG. 85 is a perspective view showing another structural example of the fuel reforming portion applied to the concrete structural example.

FIG. 83 is a view showing a concrete structural example of the entire power supply system according to the present invention. Further, FIG. 84 is a view showing a structural example of a fuel reforming portion applied to this concrete structural example, and FIG. 85 is a view showing another structural example of the fuel reforming portion applied to this concrete structural example. Here, it is determined that a fuel direct supply type fuel cell is applied as the sub power supply portion 11 provided to the power generation module, and a fuel reforming type fuel cell is applied as the power generation portion 12. Furthermore, reference is appropriately made to each of the foregoing embodiments and each of the structural examples, and like reference numerals denote equivalent structures, thereby simplifying their explanation.

As shown in FIG. 83, the power supply system 301 according to this concrete structural example has the power generation module 10 and the fuel pack 20 being configured to be attachable thereto and detachable therefrom through the I/F portion 30 as shown in FIG. 2, and has a cylindrical outside shape as a whole as shown in FIG. 73A or FIGS. 74A to 74C. Moreover, these structures (power generation module 10 in particular) are constituted in a small space by using the micromachine manufacturing technique or the like, and this power supply system is configured to have the outside dimension equivalent to that of the general-purpose chemical cell.

The power generation module 10 is configured to generally include: a fuel cell portion 210b extending along the circumferential side surface of the cylindrical shape; a vapor reforming reactor (vapor reforming reaction portion) 210X, which has a fuel flow path whose depth and width are respectively not more than 500 $\mu$m and a heater for setting a space in the flow path to a predetermined temperature being formed therein, in the cylindrical power generation module 10; an aqueous shift reactor (aqueous shift reaction portion) 210Y having a fuel flow path whose depth and width are respectively not more than 500 $\mu$m and a heater for setting a space in the flow path to a predetermined temperature being formed therein; a selected oxidation reactor (selected oxidation reaction portion) 210Z having a fuel flow path whose depth and width are respectively not more than 500 $\mu$m and a heater for setting a space in the flow path to a predetermined temperature being formed therein; a control chip 90 which is realized as a microchip and accommodated in the power generation module 10, and has an operation control portion 13 and a start-up control portion 15 or the like mounted thereon; a plurality of air holes (slits) 14c which pierce from the cylindrical side surface of the power generation module 10 to air electrodes 112 and 212 of the sub power supply portion 11 and the power generation portion 12 and take in outside air; a separation portion 17 which liquefies (condenses) a by-product (for example, water) generated on the air electrodes 112 and 212 side, separates and collects it; a by-product supply path 16a for supplying a part of the collected by-product to the vapor reforming reaction portion 210X; an exhaust hole 14d which pierces from the top face of the cylinder to the air electrode of the power generation portion 12 and emits to the outside of the power generation module at least a by-product (for example, carbon dioxide) as a non-collected material which is generated on the fuel electrode side of the power generation portion or in the vapor reforming reaction portion 210X and the selected oxidation reaction portion 210Z; and a sub power supply portion 11 although not described. The vapor reforming reaction portion 210X and the aqueous shift reaction portion 210Y utilize at least one of water which is supplied through the by-product supply path 17a and generated in the fuel cell portion 210b and water in the fuel FL in the fuel pack 51 as water required for reaction. Moreover, carbon dioxide generated by each reaction in the vapor reforming reaction portion 210X, the aqueous shift reaction portion 210Y and the selected oxidation reaction portion 210Z is emitted to the outside of the power generation module 10 through the exhaust hole 14d.

Incidentally, it is possible to provide the carbon dioxide leading pipe 415 instead of the exhaust hole 14d as shown in FIGS. 49 to 54 and absorb the carbon dioxide in the carbon dioxide absorption portion 404

In this instance, the device is especially available as the power supply system of the device, for example, that may be attached in the closed space to such a extent that gas is not be leaked, since by-product is hardly exhausted from the power supply system to the outside.

As similar to the structure shown in FIG. 48, the fuel pack 20 (51, 61, 71, 81) is configured to generally include: a fuel charged portion 401 in which the power generation fuel FL to be supplied to the power generation portion 12 or the sub power supply portion 11 according to needs is filled and charged; a by-product charged portion 403 (collection holding portion 21) for fixedly holding a by-product (water) collected by the separation portion 17; a fuel supply valve 24A (fuel leak preventing means) which is on the boundary with the power generation module 10 and prevents the power generation fuel FL from leaking; and a by-product fetching valve 24B (collected material leak preventing means) for preventing a collected and held by-product (collected material) from leaking. Here, the fuel pack 20 is formed of degradable plastic such as mentioned above.

When the fuel pack 20 having such a structure is coupled with the power generation module 10 and the I/F portion 30, the fuel feed pipe 411 pushes down the fuel supply valve 24A whose posture is fixed by a spring, and the leak prevention function of the fuel pack 51 is released. Also, the power generation fuel FL charged in the fuel pack 51 is automatically carried to the power generation module 10 by the surface tension in a capillary tube 52g and the fuel feed pipe 411. In addition, when the fuel pack 20 is removed from the power generation module 10 and the I/F portion 30, the fuel supply valve 24A is again closed by the resilience of the spring so that the power generation fuel FL can be prevented from leaking.

The I/F portion 30 is configured to include: a fuel feed path 31 for supplying the power generation fuel FL charged in the fuel pack 20 to the power generation portion 12 or the sub power supply portion 11 according to needs; and a by-product collection path 32 for supplying to the fuel pack 20 all or a part of a by-product (water) which is generated in the power generation portion 12 or the sub power supply portion 11 in some cases and collected by the separation portion 17.

Incidentally, although not shown, the fuel pack 20 or the I/F portion 30 may have the structure in which residual quantity detection means for detecting a residual quantity of the power generation fuel FL charged in the fuel pack 20 or fuel stabilizing means for stabilizing the charging state of the power generation fuel is provided, as shown in FIGS. 59 and 70.

The vapor reforming reaction portion 210X applied to the power supply system according to this concrete structural example is, for example as shown in FIG. 84, configured to include: a fuel discharge portion 202*a*; a water discharge portion 202*b*; a fuel vaporization portion 203*a*; a water vaporization portion 203*b*; a mixing portion 203*c*; a reforming reaction flow path 204; and a hydrogen gas exhaust portion 205, each of these members being provided so as to have a predetermined groove shape and a predetermined flat surface pattern on one surface side of a small substrate 201 of, e.g., silicon by using the micro-fabrication technique such as a semiconductor manufacturing technique. The vapor forming reaction portion 210X also includes a thin-film heater 206 which is an area corresponding to an area in which the reforming reaction flow path 204 is formed, and provided on, e.g., the other surface side of the small substrate 201.

The fuel discharge portion 202*a* and the water discharge portion 202*b* have a fluid discharge mechanism for discharging the power generation fuel which can be a raw material in the vapor reforming reaction and water into the flow path as liquid particles in accordance with a predetermined unit quantity, for example. Therefore, since the stages of progress of the vapor reforming reaction indicated by, for example, the chemical equation (3) are controlled based on a discharge quantity of the power generation fuel or water in the fuel discharge portion 202*a* and the water discharge portion 202*b* (specifically, a heat quantity from the later-described thin-film heater 206 also closely relates thereto), the fuel discharge portion 202*a* and the water discharge portion 202*b* have a structure serving as a part of the adjustment function for the fuel supply quantity in the above-described output control portion 14 (fuel control portion 14*a*).

The fuel vaporization portion 203*a* and the water vaporization portion 203*b* are heaters heated under vaporization conditions such as a boiling point of each of the power generation fuel and water, execute the vaporization process shown in FIG. 20A and vaporize the power generation fuel or water discharged from the fuel discharge portion 202*a* and the water discharge portion 202*b* as liquid particles by subjecting the power generation fuel or water to heating processing or pressure reduction processing, thereby generating mixed gas obtained from the fuel gas and the vapor in the mixing portion 203*c*.

The thin-film heater 206 leads the mixed gas generated in the mixing portion 203*c* into the reforming reaction flow path 204, and cause the vapor reforming reaction shown in FIG. 20A and the chemical equation (3) based on a copper-tin (Cu—Zn) basis catalyst (not shown) formed to adhere on the inner wall surface of the reforming reaction flow path 204 and predetermined thermal energy supplied to the reforming reaction flow path 204 from the thin-film heater 206 provided in accordance with an area in which the reforming reaction flow path 204 is formed to the reforming reaction flow path 204, thereby generating hydrogen gas ($H_2O$) (vapor reforming reaction process).

The hydrogen gas exhaust portion 205 emits hydrogen gas which is generated in the reforming reaction flow path 204 and contains carbon monoxide and the like, eliminates carbon monoxide (CO) through the aqueous shift reaction process and the selected oxidation reaction process in the selected oxidation reaction portion 210Z, and thereafter supplies the obtained gas to the fuel electrode of the fuel cell constituting the power generation portion 12. As a result, a series of the electrochemical reactions based on the chemical equations (6) and (7) are produced in the power generation portion 12, thereby generating predetermined electric power.

In the power supply system having such a structure, for example, when the fuel pack 20 is coupled with the power generation module 10 through the I/F portion 30 in accordance with the above-described overall operation (the initial operation, the start-up operation, the steady operation, and the stop operation), the leak prevention function by the fuel supply valve 24A (fuel leak preventing means) is released, and the power generation fuel (for example, methanol) FL charged in the fuel charged portion 401 of the fuel pack 20 is supplied to the fuel electrode of the fuel battery directly constituting the sub power supply portion 11 through the fuel feed path 31, thereby generating second electric power. This electric power is supplied to the operation control portion 13 mounted on the control chip 90 as the operating electric power, and also supplied as the drive electric power to the controller CNT included in the device DVC (not shown) to which the power supply system 301 is electrically connected through the positive electrode terminal and the negative electrode terminal which are not illustrated.

When the operation control portion 13 receives information concerning the drive state of the load LD of the device DVC from the controller CNT, the operation control portion 13 outputs an operation control signal to the start-up control portion 15, and uses a part of the electric power generated by the sub power supply portion 11 to heat the thin-film heater 206 of the vapor reforming reaction portion 210X. Also, the operation control portion 13 discharges predetermined amounts of the power generation fuel and water to the reforming reaction flow path 204 of the vapor reforming reaction portion 210X. As a result, hydrogen gas ($H_2$) and carbon dioxide ($CO_2$) are generated by the vapor reforming reaction and the selected oxidation reaction indicated by the above chemical equations (3) to (5), and hydrogen gas ($H_2$) is supplied to the fuel electrode of the fuel cell constituting the power generation portion 12, thereby generating first electric power. The first electric power is supplied to the load LD of the device DVC as the load drive electric power. Further, carbon dioxide ($CO_2$) is emitted to the outside of the power generation module 10 (power supply system 301) through, for example, the exhaust hole 14*d* provided on the top face of the power generation module 10.

A by-product (gas such as vapor) generated at the time of the power generation operation in the power generation portion 12 is cooled and liquefied in the separation portion 17. Consequently, the by-product is separated into water and any other gas components, and only water is collected and partially supplied to the vapor reforming reaction portion 210X through the by-product supply path 16*a*. Furthermore, any other water is irreversibly held in the by-product charged portion 403 in the fuel pack 20 through the by-product collection path 32.

According to the power supply system 301 relating to this concrete structural example, therefore, appropriate electric power (first electric power) according to the drive state of the driven load (device DVC) can be autonomously outputted without accepting resupply of the fuel from the outside of the power supply system 301, the power generation operation can be effected with the high energy conversion efficiency while realizing the electrical characteristic equivalent to that of the general-purpose chemical cell and easy handling. Moreover, it is possible to realize the portable type power supply system which imposes less burden on the environment at least in case of discarding the fuel pack 20 to the natural world or subjecting the same to landfill disposal.

In this concrete structural example, description has been given as to the case where a part of a by-product (water) generated or collected in the power generation portion 12, the vapor reforming reaction portion 210X or the like is supplied to the vapor reforming reaction portion 210X and reused, water charged in the fuel pack 20 together with the power generation fuel (methanol or the like) is utilized and the vapor reforming reaction is executed in the vapor reforming reaction portion 210X in the power supply system to which such a structure is not applied.

In case of performing the power generation operation by using the charged power generation fuel to which water is mixed in advance, therefore, as shown in FIG. 85, as a structure of the vapor reforming reaction portion 210X, it is possible to apply a structure in which there is formed a single flow path consisting of only the fuel discharge portion 202, the fuel vaporization portion 203, the reforming reaction flow path 204 and the hydrogen gas exhaust portion 205 on one surface side of the small substrate 201.

As described above, the power supply system according to the present invention can be achieved by arbitrarily combining members in the foregoing structural examples, the power generation modules in the respective embodiments and the attachable and detachable structures in the respective embodiments. In some cases, a plurality of either the sub power supply portions or the power generation portions may be provided in parallel, or a plurality of types of the same may be provided in parallel. Since drive of the power generation portion is controlled in accordance with the start-up state of the device by such a structure, waste of the power generation fuel can be suppressed, and the energy resource utilization efficiency can be improved. In particular, the present invention can be extensively utilized for a portable device to which a removable general-purpose cell is applied as a power supply such as a mobile phone, a personal digital assistant (PDA), a notebook-size personal computer, a digital video cameral, a digital still camera and others, or a display unit such as a liquid crystal element, an electroluminescent element and others.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A by-product elimination device used in a power generation system, comprising:
   (a) a fuel pack provided with a fuel charged portion having a power generation fuel comprising a liquid or gas containing hydrogen charged therein;
   (b) a power generation module which is attachable/detachable from said fuel pack to receive said power generation fuel from said fuel charged portion, and which includes (i) a reforming portion which transforms said power generation fuel supplied from said fuel charged portion into a first gas containing hydrogen gas and carbon dioxide as main components, and (ii) a fuel cell which generates electrical energy by using the hydrogen gas contained in said first gas; and
   (c) an absorbent charged portion in said fuel pack which receives said first gas from said reforming portion, and which selectively absorbs carbon dioxide contained in said first gas fed from said reforming portion and feeds a second gas whose carbon dioxide concentration is lower than a carbon dioxide concentration of said first gas to said fuel cell.

2. The by-product elimination device according to claim 1, wherein a volumetric capacity of said absorbent charged portion is increased as carbon dioxide is absorbed.

3. The by-product elimination device according to claim 1, wherein said absorbent charged portion comprises one of calcium oxide and calcium hydroxide.

4. The by-product elimination device according to claim 1, wherein said absorbent charged portion includes (i) a carbon dioxide absorption portion, and (ii) a calcium carbonate collection portion for containing calcium carbonate generated in said carbon dioxide absorption portion.

5. The by-product elimination device according to claim 4, wherein said carbon dioxide absorption portion supplies to said calcium carbonate collection portion calcium carbonate generated as carbon dioxide is absorbed.

6. The by-product elimination device according to claim 4, wherein said carbon dioxide absorption portion contains one of calcium oxide and calcium hydroxide.

7. The by-product elimination device according to claim 1, wherein said absorbent charged portion includes a carbon dioxide absorption portion, a calcium carbonate collection portion which collects calcium carbonate generated in said carbon dioxide absorption portion, and a water absorption portion which absorbs water generated in said carbon dioxide absorption portion.

8. The by-product elimination device according to claim 7, wherein said water absorption portion supplies to said carbon dioxide absorption portion calcium hydroxide generated as water is absorbed.

9. The by-product elimination device according to claim 8, wherein said carbon dioxide absorption portion supplies to said calcium carbonate collection portion calcium carbonate generated as carbon dioxide is absorbed.

10. The by-product elimination device according to claim 7, wherein said water absorption portion contains calcium oxide.

11. The by-product elimination device according to claim 7, said carbon dioxide absorption portion contains calcium hydroxide.

12. The by-product elimination device according to claim 1, wherein a reforming reaction in said reforming portion includes (i) a first reaction which generates hydrogen gas, and (ii) a second reaction which reforms carbon monoxide generated in said first reaction into carbon dioxide, and
   wherein said absorbent charged portion is adapted to absorb carbon dioxide generated by the second reaction.

13. The by-product elimination device according to claim 1, wherein said reforming portion comprises at least one of a vapor reforming reaction portion, an aqueous shift reaction portion, and a selected oxidation reaction portion.

14. The by-product elimination device according to claim 1, wherein said reforming portion comprises a vapor reforming reaction portion and an aqueous shift reaction portion, and said absorbent charged portion is connected to said vapor reforming reaction portion and said aqueous shift reaction portion.

15. The by-product elimination device according to claim 1, further comprising a water collection portion which selectively collects at least water among discharged substances discharged from said fuel cell.

16. The by-product elimination device according to claim 1, wherein said by-product elimination device includes a water collection portion which selectively collects at least water among discharged substances discharged from said fuel cell, and
   wherein said fuel charged portion, said absorbent charged portion and said water collection portion are separated from one another.

17. The by-product elimination device according to claim 1, further comprising (i) a path from said power generation module used for feeding the first gas fed from said reforming portion to said fuel pack, and (ii) a path from said fuel pack used for feeding the second gas fed from said absorbent charged portion to said power generation module.

18. The by-product elimination device according to claim 1, wherein said reforming portion generates the first gas from said power generation fuel by an exothermic reaction, and said absorbent charged portion is adapted to supply heat generated by absorbing carbon dioxide to said reforming portion.

19. A fuel pack which can be connected to a power generation module without restraint, comprising:
- a fuel charged portion which contains a fuel to be supplied to a reforming portion which generates hydrogen and carbon dioxide from said fuel, and whose volumetric capacity is reduced as carbon dioxide is generated in said reforming portion; and
- a carbon dioxide absorption portion which absorbs carbon dioxide generated by said reforming portion and whose volumetric capacity is increased as carbon dioxide is generated in said reforming portion.

20. A fuel pack which can be connected to a power generation module without restraint, comprising:
- a fuel charged portion which contains a fuel to be supplied to a reforming portion which generates mixed gas containing hydrogen and a first by-product from said fuel, and whose volumetric capacity is reduced as said first by-product is generated in said reforming portion;
- a first by-product absorption portion which generates a second by-product by absorbing said first by-product from said mixed gas, and whose volumetric capacity is increased as said first by-product is generated in said reforming portion; and
- a second by-product absorption portion which absorbs said second by-product in a mixture including said hydrogen and said second by-product fed from said first by-product absorption portion.

21. The fuel pack according to claim 20, which further comprises a third by-product absorption portion which absorbs a third by-product from a fuel cell which generates said third by-product as power is generated by using the hydrogen fed from said second by-product absorption portion.

22. The fuel pack according to claim 20, wherein said first by-product absorption portion and said second by-product absorption portion are connected to each other, and said third by-product absorption portion is separated from said first by-product absorption portion and said second by-product absorption portion.

23. A fuel pack which can be connected to a power generation module without restraint, comprising:
- a fuel charged portion which contains a fuel to be supplied to a reforming portion which generates mixed gas including hydrogen and a first by-product from said fuel, and whose volumetric capacity is reduced as said first by-product is generated in said reforming portion;
- a first by-product absorption portion which absorbs said first by-product from said mixed gas, and whose volumetric capacity is increased as said first by-product is generated in said reforming portion; and
- a second by-product absorption portion which collects a second by-product from a fuel cell which generates power by using said hydrogen fed from said first by-product absorption portion, and whose volumetric capacity is increased as power is generated in said fuel cell.

24. A by-product elimination device adapted to be used in a power generation system, comprising:
- a fuel pack provided with a fuel charged portion having a power generation fuel comprising a liquid or gas containing hydrogen charged therein;
- a power generation module which is attachable/detachable to said fuel pack, and which includes a fuel cell which generates electrical energy using said fuel supplied from said fuel pack; and
- an absorbent charged portion in said fuel pack which selectively absorbs carbon dioxide received from said power generation module.

* * * * *